US011738345B2

(12) United States Patent
Soto-Moreno et al.

(10) Patent No.: US 11,738,345 B2
(45) Date of Patent: Aug. 29, 2023

(54) MULTI-CARTRIDGE DIGITAL MICROFLUIDICS APPARATUSES AND METHODS OF USE

(71) Applicant: mirOculus Inc., San Francisco, CA (US)

(72) Inventors: Jorge Abraham Soto-Moreno, San Francisco, CA (US); Mais Jehan Jebrail, Toronto (CA); Juan Matias DeCarli, Buenos Aires (AR)

(73) Assignee: mirOculus Inc., San Francisco, CA (US)

( * ) Notice: Subject to any disclaimer, the term of this patent is extended or adjusted under 35 U.S.C. 154(b) by 466 days.

(21) Appl. No.: 16/843,743

(22) Filed: Apr. 8, 2020

(65) Prior Publication Data

US 2020/0316606 A1  Oct. 8, 2020

Related U.S. Application Data

(60) Provisional application No. 62/831,171, filed on Apr. 8, 2019.

(51) Int. Cl.
*B01L 3/00* (2006.01)

(52) U.S. Cl.
CPC . *B01L 3/502792* (2013.01); *B01L 2400/0427* (2013.01)

(58) Field of Classification Search
CPC ......... G01N 35/00029; B01L 3/502792; B01L 2400/0427
See application file for complete search history.

(56) References Cited

U.S. PATENT DOCUMENTS

| | | | |
|---|---|---|---|
| 4,489,863 | A | 9/1984 | Ts'o et al. |
| 4,569,575 | A | 2/1986 | Le Pesant et al. |
| 4,636,785 | A | 1/1987 | Le Pesant |
| 4,818,052 | A | 4/1989 | Le Pesant et al. |
| 5,034,506 | A | 7/1991 | Summerton et al. |
| 5,130,238 | A | 7/1992 | Malek et al. |
| 5,216,141 | A | 6/1993 | Benner |
| 5,235,033 | A | 8/1993 | Summerton et al. |
| 5,270,185 | A | 12/1993 | Margolskee |

(Continued)

FOREIGN PATENT DOCUMENTS

| | | |
|---|---|---|
| CA | 2470847 A1 | 7/2003 |
| CA | 2740113 A1 | 4/2010 |

(Continued)

OTHER PUBLICATIONS

Davoust et al.; Evaporation rate of drop arrays within a digital microfluidic system; Sensors and Actuators B Chemical; 189; pp. 157-164; Dec. 2013.

(Continued)

*Primary Examiner* — Shogo Sasaki
(74) *Attorney, Agent, or Firm* — Shay Glenn LLP

(57) ABSTRACT

High-throughput digital microfluidic (DMF) systems and methods (including devices, systems, cartridges, DMF apparatuses, etc.), are described herein. The systems, apparatuses and methods integrate liquid handling with the DMF apparatuses, providing flexible and efficient sample reactions and sample preparation. These systems, apparatuses and methods may be used with a variety of cartridge configurations and sizes.

15 Claims, 64 Drawing Sheets

(56) References Cited

U.S. PATENT DOCUMENTS

| | | |
|---|---|---|
| 5,386,023 A | 1/1995 | Sanghvi et al. |
| 5,399,491 A | 3/1995 | Kacian et al. |
| 5,409,818 A | 4/1995 | Davey et al. |
| 5,411,876 A | 5/1995 | Bloch et al. |
| 5,455,166 A | 10/1995 | Walker |
| 5,486,337 A | 1/1996 | Ohkawa |
| 5,602,240 A | 2/1997 | De Mesmaeker et al. |
| 5,637,684 A | 6/1997 | Cook et al. |
| 5,644,048 A | 7/1997 | Yau |
| 5,681,702 A | 10/1997 | Collins et al. |
| 5,705,365 A | 1/1998 | Ryder et al. |
| 5,710,029 A | 1/1998 | Ryder et al. |
| 5,888,779 A | 3/1999 | Kacian et al. |
| 6,007,690 A | 12/1999 | Nelson et al. |
| 6,074,725 A | 6/2000 | Kennedy |
| 6,294,063 B1 | 9/2001 | Becker et al. |
| 6,352,838 B1 | 3/2002 | Krulevitch et al. |
| 6,401,552 B1 | 6/2002 | Elkins |
| 6,495,369 B1 | 12/2002 | Kercso et al. |
| 6,565,727 B1 | 5/2003 | Shenderov |
| 6,596,988 B2 | 7/2003 | Corso et al. |
| 6,723,985 B2 | 4/2004 | Schultz et al. |
| 6,773,566 B2 | 8/2004 | Shenderov |
| 6,787,111 B2 | 9/2004 | Roach et al. |
| 6,887,384 B1 | 5/2005 | Frechet et al. |
| 6,911,132 B2 | 6/2005 | Pamula et al. |
| 6,989,234 B2 * | 1/2006 | Kolar .................... B01L 3/0241 435/7.1 |
| 7,057,031 B2 | 6/2006 | Olejnik et al. |
| 7,147,763 B2 | 12/2006 | Elrod et al. |
| 7,163,612 B2 | 1/2007 | Sterling et al. |
| 7,214,302 B1 | 5/2007 | Reihs et al. |
| 7,323,345 B1 | 1/2008 | Stjernstrom |
| 7,328,979 B2 | 2/2008 | Decre et al. |
| 7,329,545 B2 | 2/2008 | Pamula et al. |
| 7,349,014 B2 | 3/2008 | Higashihara |
| 7,390,463 B2 | 6/2008 | He et al. |
| 7,391,020 B2 | 6/2008 | Bousse et al. |
| 7,439,014 B1 | 10/2008 | Pamula et al. |
| 7,445,926 B2 | 11/2008 | Mathies et al. |
| 7,531,120 B2 | 5/2009 | Van Rijn et al. |
| D599,832 S | 9/2009 | Chapin et al. |
| 7,713,456 B2 | 5/2010 | Dodd et al. |
| 7,727,723 B2 | 6/2010 | Pollack et al. |
| 7,745,207 B2 | 6/2010 | Jovanovich et al. |
| 7,763,471 B2 | 7/2010 | Pamula et al. |
| 7,815,871 B2 | 10/2010 | Pamula et al. |
| 7,816,121 B2 | 10/2010 | Pollack et al. |
| 7,822,510 B2 | 10/2010 | Paik et al. |
| 7,851,184 B2 | 12/2010 | Pollack et al. |
| 7,897,737 B2 | 3/2011 | Wu et al. |
| 7,901,947 B2 | 3/2011 | Pollack et al. |
| 7,919,330 B2 | 4/2011 | de Guzman et al. |
| 7,939,021 B2 | 5/2011 | Smith et al. |
| 7,998,436 B2 | 8/2011 | Pollack et al. |
| 8,007,739 B2 | 8/2011 | Pollack et al. |
| 8,041,463 B2 | 10/2011 | Pollack et al. |
| 8,053,239 B2 | 11/2011 | Wheeler et al. |
| 8,088,578 B2 | 1/2012 | Hua et al. |
| 8,093,062 B2 | 1/2012 | Winger |
| 8,137,917 B2 | 3/2012 | Pollack et al. |
| 8,187,864 B2 | 5/2012 | Wheeler et al. |
| 8,190,371 B2 | 5/2012 | Allawi et al. |
| 8,202,686 B2 | 6/2012 | Pamula et al. |
| 8,202,736 B2 | 6/2012 | Mousa et al. |
| 8,208,146 B2 | 6/2012 | Srinivasan et al. |
| 8,268,246 B2 | 9/2012 | Srinivasan et al. |
| 8,304,253 B2 | 11/2012 | Yi et al. |
| 8,317,990 B2 | 11/2012 | Pamula et al. |
| 8,349,276 B2 | 1/2013 | Pamula et al. |
| 8,364,315 B2 | 1/2013 | Sturmer et al. |
| 8,367,370 B2 | 2/2013 | Wheeler et al. |
| 8,389,297 B2 | 3/2013 | Pamula et al. |
| 8,394,641 B2 | 3/2013 | Winger |
| 8,399,222 B2 | 3/2013 | Siva et al. |
| 8,426,213 B2 | 4/2013 | Eckhardt et al. |
| 8,440,392 B2 | 5/2013 | Pamula et al. |
| 8,454,905 B2 | 6/2013 | Pope et al. |
| 8,460,528 B2 | 6/2013 | Pollack et al. |
| 8,470,153 B2 | 6/2013 | Feiglin et al. |
| 8,470,606 B2 | 6/2013 | Srinivasan et al. |
| 8,481,125 B2 | 7/2013 | Yi et al. |
| 8,492,168 B2 | 7/2013 | Srinivasan et al. |
| 8,562,807 B2 | 10/2013 | Srinivasan et al. |
| 8,591,830 B2 | 11/2013 | Sudarsan et al. |
| 8,592,217 B2 | 11/2013 | Eckhardt |
| 8,613,889 B2 | 12/2013 | Pollack et al. |
| 8,637,317 B2 | 1/2014 | Pamula et al. |
| 8,637,324 B2 | 1/2014 | Pollack et al. |
| 8,653,832 B2 | 2/2014 | Hadwen et al. |
| 8,658,111 B2 | 2/2014 | Srinivasan et al. |
| 8,685,344 B2 | 4/2014 | Sudarsan et al. |
| 8,685,754 B2 | 4/2014 | Pollack et al. |
| 8,702,938 B2 | 4/2014 | Srinivasan et al. |
| 8,716,015 B2 | 5/2014 | Pollack et al. |
| 8,809,068 B2 | 8/2014 | Sista et al. |
| 8,821,705 B2 | 9/2014 | Bjornson et al. |
| 8,845,872 B2 | 9/2014 | Pollack et al. |
| 8,846,414 B2 | 9/2014 | Sista et al. |
| 8,852,952 B2 | 10/2014 | Pollack et al. |
| 8,872,527 B2 | 10/2014 | Sturmer et al. |
| 8,877,512 B2 | 11/2014 | Srinivasan et al. |
| 8,888,969 B2 | 11/2014 | Soleymani et al. |
| 8,901,043 B2 | 12/2014 | Eckhardt et al. |
| 8,926,065 B2 | 1/2015 | Winger |
| 8,927,296 B2 | 1/2015 | Sista et al. |
| 8,936,708 B2 | 1/2015 | Feiglin et al. |
| 8,951,732 B2 | 2/2015 | Pollack et al. |
| 8,980,198 B2 | 3/2015 | Srinivasan et al. |
| 9,005,544 B2 | 4/2015 | Van Dam et al. |
| 9,011,662 B2 | 4/2015 | Wang et al. |
| 9,039,973 B2 | 5/2015 | Watson et al. |
| 9,046,514 B2 | 6/2015 | Sista et al. |
| 9,091,649 B2 | 7/2015 | Pollack et al. |
| 9,140,635 B2 | 9/2015 | Graham et al. |
| 9,188,615 B2 | 11/2015 | Sturmer et al. |
| 9,223,317 B2 | 12/2015 | Winger |
| 9,238,222 B2 | 1/2016 | Delattre et al. |
| 9,248,450 B2 | 2/2016 | Bauer |
| 9,377,439 B2 | 6/2016 | Lee et al. |
| 9,435,765 B2 | 9/2016 | Reimitz et al. |
| 9,446,404 B2 | 9/2016 | Bauer et al. |
| 9,476,811 B2 | 10/2016 | Mudrik et al. |
| 9,476,856 B2 | 10/2016 | Pamula et al. |
| 9,513,253 B2 | 12/2016 | Winger |
| 9,517,469 B2 | 12/2016 | Shenderov et al. |
| 9,594,056 B2 | 3/2017 | Fobel et al. |
| 9,851,365 B2 | 12/2017 | Mousa et al. |
| 10,232,374 B2 | 3/2019 | Jebrail et al. |
| 10,464,067 B2 | 11/2019 | Jebrail et al. |
| 10,596,572 B2 | 3/2020 | Hong et al. |
| 10,695,762 B2 | 6/2020 | Jebrail et al. |
| 2002/0150683 A1 | 10/2002 | Troian et al. |
| 2003/0017551 A1 | 1/2003 | Parthasarathy et al. |
| 2003/0136451 A1 | 7/2003 | Beebe et al. |
| 2003/0194716 A1 | 10/2003 | Knoll |
| 2004/0171169 A1 | 9/2004 | Kallury et al. |
| 2004/0211659 A1 * | 10/2004 | Velev ...................... B03C 5/026 204/660 |
| 2005/0115836 A1 | 6/2005 | Reihs |
| 2005/0133370 A1 | 6/2005 | Park et al. |
| 2005/0148091 A1 * | 7/2005 | Kitaguchi ............... B01L 3/523 422/562 |
| 2005/0191759 A1 | 9/2005 | Pedersen-Bjergaard et al. |
| 2005/0220675 A1 | 10/2005 | Reed et al. |
| 2006/0091015 A1 | 5/2006 | Lau |
| 2006/0132542 A1 | 6/2006 | Bruker et al. |
| 2006/0231398 A1 | 10/2006 | Sarrut et al. |
| 2006/0272942 A1 | 12/2006 | Siringhaus |
| 2007/0023292 A1 | 2/2007 | Kim et al. |
| 2007/0095407 A1 | 5/2007 | Chen et al. |
| 2007/0148763 A1 | 6/2007 | Huh et al. |
| 2007/0258864 A1 | 11/2007 | Braymer et al. |
| 2007/0269825 A1 | 11/2007 | Wang et al. |

(56) References Cited

U.S. PATENT DOCUMENTS

| | | |
|---|---|---|
| 2008/0110753 A1 | 5/2008 | Fourrier et al. |
| 2008/0131904 A1 | 6/2008 | Parce et al. |
| 2008/0156983 A1 | 7/2008 | Fourrier et al. |
| 2008/0169197 A1 | 7/2008 | McRuer et al. |
| 2008/0185339 A1 | 8/2008 | Delapierre et al. |
| 2008/0210558 A1 | 9/2008 | Sauter-Starace et al. |
| 2008/0241831 A1 | 10/2008 | Fan et al. |
| 2008/0293051 A1 | 11/2008 | Levy et al. |
| 2009/0017197 A1 | 1/2009 | Zhang et al. |
| 2009/0017453 A1 | 1/2009 | Maples et al. |
| 2009/0286297 A1 | 11/2009 | Pihl et al. |
| 2010/0022414 A1 | 1/2010 | Link et al. |
| 2010/0025250 A1 | 2/2010 | Pamula et al. |
| 2010/0032293 A1 | 2/2010 | Pollack et al. |
| 2010/0048410 A1 | 2/2010 | Shenderov et al. |
| 2010/0087012 A1 | 4/2010 | Shenderov |
| 2010/0120130 A1 | 5/2010 | Srinivasan et al. |
| 2010/0130369 A1 | 5/2010 | Shenderov et al. |
| 2010/0136544 A1 | 6/2010 | Agresti et al. |
| 2010/0206094 A1 | 8/2010 | Shenderov |
| 2010/0236927 A1 | 9/2010 | Pope et al. |
| 2010/0236928 A1 | 9/2010 | Srinivasan et al. |
| 2010/0236929 A1 | 9/2010 | Pollack et al. |
| 2010/0270156 A1 | 10/2010 | Srinivasan et al. |
| 2010/0288368 A1 | 11/2010 | Beebe et al. |
| 2010/0311599 A1 | 12/2010 | Wheeler et al. |
| 2011/0024793 A1 | 2/2011 | Jeon |
| 2011/0076685 A1 | 3/2011 | Moeller et al. |
| 2011/0097763 A1 | 4/2011 | Pollack et al. |
| 2011/0104725 A1 | 5/2011 | Pamula et al. |
| 2011/0104747 A1 | 5/2011 | Pollack et al. |
| 2011/0107822 A1 | 5/2011 | Bunner et al. |
| 2011/0147216 A1 | 6/2011 | Fan et al. |
| 2011/0220501 A1 | 9/2011 | Witkowski et al. |
| 2011/0240471 A1 | 10/2011 | Wheeler et al. |
| 2011/0247934 A1 | 10/2011 | Wang et al. |
| 2011/0293851 A1 | 12/2011 | Bollström et al. |
| 2011/0303542 A1 | 12/2011 | Srinivasan et al. |
| 2011/0311980 A1 | 12/2011 | Pollack et al. |
| 2012/0000777 A1 | 1/2012 | Garrell et al. |
| 2012/0045748 A1 | 2/2012 | Willson et al. |
| 2012/0045768 A1 | 2/2012 | Arunachalam et al. |
| 2012/0149018 A1 | 6/2012 | Dahlberg et al. |
| 2012/0190027 A1 | 7/2012 | Loeffert et al. |
| 2012/0208705 A1 | 8/2012 | Steemers et al. |
| 2012/0208724 A1 | 8/2012 | Steemers et al. |
| 2012/0259233 A1 | 10/2012 | Chan et al. |
| 2012/0261264 A1 | 10/2012 | Srinivasan et al. |
| 2012/0289581 A1 | 11/2012 | Chang et al. |
| 2012/0325665 A1 | 12/2012 | Chiou et al. |
| 2013/0017544 A1 | 1/2013 | Eckhardt et al. |
| 2013/0018611 A1 | 1/2013 | Sturmer |
| 2013/0062205 A1 | 3/2013 | Hadwen et al. |
| 2013/0068622 A1 | 3/2013 | Schertzer et al. |
| 2013/0105318 A1 | 5/2013 | Bhattacharya et al. |
| 2013/0123979 A1 | 5/2013 | Elliot et al. |
| 2013/0157259 A1 | 6/2013 | Choi et al. |
| 2013/0168250 A1 | 7/2013 | Fogleman et al. |
| 2013/0171546 A1 | 7/2013 | White et al. |
| 2013/0177915 A1 | 7/2013 | Too et al. |
| 2013/0203606 A1 | 8/2013 | Pollack et al. |
| 2013/0215492 A1 | 8/2013 | Steckl et al. |
| 2013/0217113 A1 | 8/2013 | Srinivasan et al. |
| 2013/0225450 A1 | 8/2013 | Pollack et al. |
| 2013/0270114 A1 | 10/2013 | Feiglin |
| 2013/0284956 A1 | 10/2013 | Kwon |
| 2013/0288254 A1 | 10/2013 | Pollack et al. |
| 2013/0293246 A1 | 11/2013 | Pollack et al. |
| 2013/0306480 A1 | 11/2013 | Chang et al. |
| 2014/0005066 A1 | 1/2014 | Boles et al. |
| 2014/0054174 A1 | 2/2014 | Wang |
| 2014/0124037 A1 | 5/2014 | Foley |
| 2014/0141409 A1 | 5/2014 | Foley et al. |
| 2014/0161686 A1 | 6/2014 | Bort et al. |
| 2014/0174926 A1 | 6/2014 | Bort et al. |
| 2014/0179539 A1 | 6/2014 | Lohman et al. |
| 2014/0194305 A1 | 7/2014 | Kayyem et al. |
| 2014/0216559 A1 | 8/2014 | Foley |
| 2014/0273100 A1 | 9/2014 | Saito et al. |
| 2014/0335069 A1 | 11/2014 | Graham et al. |
| 2015/0001078 A1 | 1/2015 | Feiglin |
| 2015/0021182 A1 | 1/2015 | Rival et al. |
| 2015/0075986 A1 | 3/2015 | Cyril et al. |
| 2015/0111237 A1 | 4/2015 | Graham et al. |
| 2015/0144489 A1 | 5/2015 | Hoffmeyer et al. |
| 2015/0148549 A1 | 5/2015 | Van dam et al. |
| 2015/0198604 A1 | 7/2015 | Ermantraut et al. |
| 2015/0205272 A1 | 7/2015 | Yi et al. |
| 2015/0212043 A1 | 7/2015 | Pollack |
| 2015/0258520 A1 | 9/2015 | Griffiths et al. |
| 2015/0267242 A1 | 9/2015 | Foegeding et al. |
| 2016/0068901 A1 | 3/2016 | Eckhardt et al. |
| 2016/0108432 A1 | 4/2016 | Punnamaraju et al. |
| 2016/0116438 A1 | 4/2016 | Pamula et al. |
| 2016/0129437 A1 | 5/2016 | Kayyem et al. |
| 2016/0161343 A1 | 6/2016 | Smith et al. |
| 2016/0175859 A1 | 6/2016 | Yi et al. |
| 2016/0199832 A1 | 7/2016 | Jamshidi et al. |
| 2016/0298173 A1 | 10/2016 | Wang et al. |
| 2016/0319354 A1 | 11/2016 | Tocigl et al. |
| 2016/0370317 A9 | 12/2016 | Sudarsan et al. |
| 2017/0315090 A1 | 11/2017 | Wheeler et al. |
| 2017/0354973 A1 | 12/2017 | Sustarich et al. |
| 2018/0001286 A1 | 1/2018 | Wu |
| 2018/0015469 A1 | 1/2018 | Reiter et al. |
| 2018/0059056 A1 | 3/2018 | Taylor et al. |
| 2018/0095067 A1 | 4/2018 | Huff et al. |
| 2018/0099275 A1 | 4/2018 | Wu et al. |
| 2018/0120335 A1 | 5/2018 | Mousa et al. |
| 2018/0221882 A1 | 8/2018 | Roberts et al. |
| 2018/0250672 A1 | 9/2018 | Jamshidi et al. |
| 2019/0168223 A1 | 6/2019 | Soto-Moreno et al. |
| 2019/0210026 A1 | 7/2019 | Jebrail et al. |
| 2020/0016597 A1 | 1/2020 | Jebrail et al. |
| 2020/0061621 A1 | 2/2020 | Jebrail et al. |
| 2020/0114359 A1 | 4/2020 | Jebrail et al. |
| 2020/0164367 A1 | 5/2020 | Wunsch et al. |
| 2020/0179933 A1 | 6/2020 | Jebrail et al. |
| 2020/0324290 A1 | 10/2020 | Jebrail et al. |
| 2021/0069714 A1 | 3/2021 | Jebrail et al. |
| 2021/0291175 A1 | 9/2021 | Gartner et al. |
| 2021/0370304 A1 | 12/2021 | Jebrail et al. |
| 2022/0118455 A1 | 4/2022 | Jebrail et al. |
| 2022/0161216 A1 | 5/2022 | Cervantes et al. |
| 2022/0219172 A1 | 7/2022 | Soto-Moreno et al. |
| 2022/0401957 A1 | 12/2022 | Jebrail et al. |
| 2023/0049633 A1 | 2/2023 | Jebrail et al. |

FOREIGN PATENT DOCUMENTS

| | | |
|---|---|---|
| CA | 2881783 A1 | 2/2014 |
| CN | 1668527 A | 9/2005 |
| CN | 101609063 A | 12/2009 |
| CN | 102549804 A | 7/2012 |
| CN | 102719526 A | 10/2012 |
| CN | 102836653 A | 12/2012 |
| CN | 103014148 A | 4/2013 |
| CN | 103170383 A | 6/2013 |
| CN | 103502386 A | 1/2014 |
| CN | 104144748 A | 11/2014 |
| CN | 104321141 A | 1/2015 |
| CN | 104995261 A | 10/2015 |
| CN | 105764490 A | 7/2016 |
| CN | 105849032 A | 8/2016 |
| CN | 106092865 A | 11/2016 |
| DE | 19949735 A1 | 5/2001 |
| EP | 2111554 B1 | 5/2013 |
| GB | 2533952 A | 7/2016 |
| JP | 2002321449 A | 11/2002 |
| JP | 2006220606 A | 8/2006 |
| JP | 2010500596 A | 1/2010 |
| JP | 2010098133 A | 4/2010 |
| JP | 2010515877 A | 5/2010 |
| JP | 2010180222 A | 8/2010 |

(56) References Cited

FOREIGN PATENT DOCUMENTS

| | | |
|---|---|---|
| JP | 2012525687 A | 10/2012 |
| JP | 2015529815 A | 10/2015 |
| WO | WO2000/067907 A2 | 11/2000 |
| WO | WO2001/025137 A1 | 4/2001 |
| WO | WO2003/045556 A2 | 6/2003 |
| WO | WO2004/074169 A1 | 9/2004 |
| WO | WO2005/068993 A1 | 7/2005 |
| WO | WO2005/118129 A1 | 12/2005 |
| WO | WO2006/000828 A2 | 1/2006 |
| WO | WO2006/102309 A2 | 9/2006 |
| WO | WO2007/120240 A2 | 10/2007 |
| WO | WO2007/123908 A2 | 11/2007 |
| WO | WO2007/130284 A2 | 11/2007 |
| WO | WO2007/136386 A2 | 11/2007 |
| WO | WO2008/066828 A2 | 6/2008 |
| WO | WO2009/026339 A2 | 2/2009 |
| WO | WO2009/052348 A2 | 4/2009 |
| WO | WO2009/111723 A1 | 9/2009 |
| WO | WO2009/111769 A2 | 9/2009 |
| WO | WO2009/140671 A2 | 11/2009 |
| WO | WO2010/003188 A1 | 1/2010 |
| WO | WO2010/006166 A2 | 1/2010 |
| WO | WO2010/027894 A2 | 3/2010 |
| WO | WO2010/042637 A2 | 4/2010 |
| WO | WO2010/069977 A1 | 6/2010 |
| WO | WO2010/091334 A2 | 8/2010 |
| WO | WO2010/111265 A1 | 9/2010 |
| WO | WO2011/002957 A2 | 1/2011 |
| WO | WO2011/062557 A1 | 5/2011 |
| WO | WO2012/061832 A1 | 5/2012 |
| WO | WO2012/172172 A1 | 12/2012 |
| WO | WO2013/006312 A2 | 1/2013 |
| WO | WO2013/040562 A2 | 3/2013 |
| WO | WO2013/090889 A1 | 6/2013 |
| WO | WO2013/096839 A1 | 6/2013 |
| WO | WO2013/116439 A1 | 8/2013 |
| WO | WO2013/176767 A1 | 11/2013 |
| WO | WO2014/078100 A1 | 5/2014 |
| WO | WO2014/083622 A1 | 6/2014 |
| WO | WO2014/100473 A1 | 6/2014 |
| WO | WO2014/106167 A1 | 7/2014 |
| WO | WO2014/108185 A1 | 7/2014 |
| WO | WO2014/183118 A1 | 11/2014 |
| WO | WO2015/023745 A1 | 2/2015 |
| WO | WO2015/077737 A1 | 5/2015 |
| WO | WO2015/172255 A1 | 11/2015 |
| WO | WO2015/172256 A1 | 11/2015 |
| WO | WO2016/094589 A1 | 6/2016 |
| WO | WO2016/128544 A1 | 8/2016 |
| WO | WO2016/182814 A2 | 11/2016 |
| WO | WO2016/197013 A1 | 12/2016 |
| WO | WO2017/094021 A1 | 6/2017 |
| WO | WO2017/223026 A1 | 12/2017 |
| WO | WO2018/119253 A1 | 6/2018 |
| WO | WO2018/126082 A1 | 7/2018 |
| WO | WO2019/023133 A1 | 1/2019 |
| WO | WO2019/046860 A1 | 3/2019 |
| WO | WO2019/075211 A1 | 4/2019 |
| WO | WO2019/226919 A1 | 11/2019 |
| WO | WO2020/160520 A1 | 8/2020 |
| WO | WO2020/176816 A1 | 9/2020 |
| WO | WO2021/016614 A1 | 1/2021 |
| WO | WO2021/092325 A1 | 5/2021 |
| WO | WO2021/173621 | 9/2021 |

OTHER PUBLICATIONS

Kim et al.; Automated digital microfluidic sample preparation for next-generation DNA sequencing; JALA; Journal of the Association for Laboratory Automation; 16(6); pp. 405-414; Dec. 2011.
Leriche et al.; Cleavable linkers in chemical biology; Bioorganic & Medicinal Chemistry; 20(2); pp. 571-582; Jan. 15, 2012.
Palluk et al.; De novo DNA synthesis using polymerase-nucleotide conjugates; Nature biotechnology; 36(7); pp. 645-650; Jun. 18, 2018.
Jensen et al.; Free-running enzymatic oligonucleotide synthesis for data storage applications; bioRxiv; 1:355719; 7 pages; Jan. 2018.
Soto-Moreno et al.; U.S. Appl. No. 17/630,048 entitled "Digital microfluidics devices and methods of use thereof," filed Jan. 25, 2022.
Soto-Moreno et al.; U.S. Appl. No. 17/728,952 entitled "Digital microfluidics devices and methods of using them," filed Apr. 25, 2022.
Soto-Moreno et al.; U.S. Appl. No. 17/775,373 entitled "Digital microfluidics systems, apparatus and method of using them," filed May 9, 2022.
Abdelgawad et al., All-terrain droplet actuation, Lab on a Chip, 8(5), pp. 672-677, May 2008.
Abdelgawad et al.; Low-cost, rapid-prototyping of digital microfluidics devices, Microfluidics and Nanofluidics, 4, pp. 349-355, Apr. 2008.
Abdelgawad et al.; Rapid prototyping in copper substrates for digital microfluidics, Adv. Mater., 19(1), pp. 133-137; Jan. 2007.
Abdelgawad et al.; Hybrid microfluidics: a digital-to-channel interface for in-line sample processing and chemical separations, Lab on a Chip, 9(8), pp. 1046-1051, Apr. 2009.
Abdelgawad; Digital Microfluidics for Integration of Lab-on-a-Chip Devices (Doctoral dissertation); University of Toronto; © 2009.
Albrecht et al.; Laboratory testing of gonadal steroids in children; Pediatric Endocrinology Reviews; 5(suppl 1); pp. 599-607; Oct. 2007.
Analog Devices; 24-bit Capicitance-to-Digital converter with temperature sensor, AD7745/AD7746; Analog Devices; Norwood, MA; 28 pages; (year of pub. sufficiently earlier than effective US filing date and any foreign priority date) 2005.
Analog Devices; Extending the capacitive input range of AD7745/AD7746 Capicitance-to-Digital converter; Analog Devices; Norwood, MA; 5 pages; (year of pub. sufficiently earlier than effective US filing date and any foreign priority date) 2009.
Ankarberg-Lindren et al.; A purification step prior to commercial sensitive immunoassay is necessary to achieve clinical usefulness when quantifying serum 17 ?-estradiol in prepubertal children. Eur J Endocrinol, 158, pp. 117-124, Jan. 2008.
Armstrong et al.; A study of plasma free amino acid levels. II. Normal values for children and adults, Metabolism, 22(4), pp. 561-569, Apr. 1973.
Asiello et al.; Miniaturized isothermal nucleic acid amplification, a review; Lab Chip; 11(8); pp. 1420-1430; Apr. 2011.
Au et al., Integrated microbioreactor for culture and analysis of bacteria, algae and yeast, Biomedical Microdevices, 13(1), pp. 41-50, Feb. 2011.
Au et al.; A new angle on pluronic additives: Advancing droplets and understanding in digital microfluidics; Langmuir; 27; pp. 8586-8594; Jun. 2011.
Banatvala et al., Rubella, The Lancet, 363(9415), pp. 1127-1137, Apr. 2004.
Banér et al.; Signal amplification of padlock probes by rolling circle replication; Nuc. Acids Res.; 26(22); pp. 5073-5078; Nov. 1998.
Barany; Genetic disease detection and DNA amplification using cloned thermostable ligase; PNAS; 88(1); pp. 189-193; Jan. 1991.
Barbulovic-Nad et al., A microfluidic platform for complete mammalian cell culture, Lab on a Chip, 10(12), pp. 1536-1542; Jun. 2010.
Barbulovic-Nad et al.; Digital microfluidics for cell-based assays, Lab Chip, 8(4), pp. 519-526; Apr. 2008.
Baxendale et al ; Multistep synthesis using modular flow reactors: bestmann-ohira reagent for the formation of alkynes and triazoles; Angewandle Chemie International Edition; 48(22); pp. 4017-4021; May 2009.
Beattie et al.; Endogenous sex hormones, breast cancer risk, and tamoxifen response: an ancillary study in the NSABP Breast Cancer Prevention Trial P-1, J Natl Cancer Inst, 98(2), pp. 110-115, Jan. 2006.

(56) References Cited

OTHER PUBLICATIONS

Beaucage et al., The Functionalization of Oligonucleotides via Phosphoramidite Derivatives, Tetrahedron, 49(10), pp. 1925-1963, Mar. 1993.
Belanger et al.; Omental and subcutaneous adipose tissue steroid levels in obese men. Steroids, 71(8), pp. 674-682, Aug. 2006.
Bergkvist et al., Improved chip design for integrated solid-phase microextraction in on-line proteomic sample preparation, Proteomics, 2(4), pp. 422-429, Apr. 2002.
Bi et al.; Dumbbell probe-mediated cascade isothermal amplification: A novel strategy for label-free detection of microRNAs and its application to real sample assay; Analytica Chimica Acta; 760; pp. 69-74; Jan. 2013.
Blankenstein et al.; Intratumoral levels of estrogens in breast cancer. J Steroid Biochem Mol Biol, 69(1-6), pp. 293-297, Apr.-Jun. 1999.
Bodamer et al.; Expanded newborn screening in Europe, Journal of Inherited Metabolic Disease, 30(4), pp. 439-444, Aug. 2007.
Bohlen et al.; Fluorometric assay of proteins in the nanogram range, Archives of Biochemistry and Biophysics, 155(1), pp. 213-220, Mar. 1973.
Boles et al.;Droplet-Based Pyrosequencing Using Digital Microfluidics; Analytical Chemistry; 83(22); pp. 8439-8447; Oct. 14, 2011.
Bollström et al.; A Multilayer Coated Fiber-Based Substrate Suitable for Printed Functionality; Organic Electronics; 10(5); pp. 1020-1023; Aug. 2009.
Bonneil et al., Integration of solid-phase extraction membranes for sample multiplexing: Application to rapid protein identification from gel-isolated protein extracts, Electrophoresis, 23(20), pp. 3589-3598, Oct. 2002.
Brassard et al.; Water-oil core-shell droplets for electrowetting-based digital microfluidic devices; Lab Chip; 8(8); pp. 1342-1349; Aug. 2008.
Brill et al., Synthesis of oligodeoxynucleoside phosphorodithioates via thioamidites, J. Am. Chem. Soc., 111(6), pp. 2321-2322, Mar. 1989.
Brivio et al.; Integrated microfluidic system enabling (bio)chemical reactions with on-line MALDI-TOF mass spectrometry, Anal. Chem., 74(16), pp. 3972-3976, Aug. 2002.
Burstein; Aromatase inhibitor-associated arthralgia syndrome. Breast, 16(3), pp. 223-234, Jun. 2007.
Carlsson et al., Screening for genetic mutations, Nature, 380(6571), pp. 207, Mar. 1996.
Chace et al.; A biochemical perspective on the use of tandem mass spectrometry for newborn screening and clinical testing, Clinical Biochemistry, 38(4), pp. 296-309; Apr. 2005.
Chace et al.; Rapid diagnosis of maple syrup urine disease in blood spots from newborns by tandem mass spectrometry, Clinical Chemistry, 41(1), pp. 62-68, Jan. 1995.
Chace et al.; Rapid diagnosis of phenylketonuria by quantitative analysis for phenylalanine and tyrosine in neonatal blood spots by tandem mass spectrometry, Clinical Chemistry, 39(1), pp. 66-71; Jan. 1993.
Chace et al.; Use of tandem mass spectrometry for multianalyte screening of dried blood specimens from newborns, Clinical Chemistry, 49(11), pp. 1797-1817, Nov. 2003.
Chace; Mass spectrometry in newborn and metabolic screening: historical perspective and future directions, Journal of Mass Spectrometry, 44(2), pp. 163-170, Feb. 2009.
Chang et al.; Integrated polymerase chain reaction chips utilizing digital microfluidics; Biomedical Microdevices; 8(3); pp. 215-225; Sep. 2006.
Chatterjee et al.; Droplet-based microfluidics with nonaqueous solvents and solutions, Lab Chip, 6(2), pp. 199-206, Feb. 2006.
Chen et al.; Selective Wettability Assisted Nanoliter Sample Generation via Electrowetting-Based Transportation; Proceedings of the 5th International Conference on Nanochannels, Microchannels and Minichannels (ICNMM); Puebla, Mexico; Paper No. ICNMM2007-30184; pp. 147-153; Jun. 18-20, 2007.
Chen et al.; The chemistrode: a droplet-based microfluidic device for stimulation and recording with high temporal, spatial, and chemical resolution; Proceedings of the National Academy of Sciences; 105(44); pp. 16843-16848; Nov. 2004.
Cheng et al., Paper-Based ELISA, Angewandte Chemie, 49(28), pp. 4771-4774, Jun. 2010.
Cheng et al.; Highly Sensitive Determination of microRNA Using Target-Primed and Branched Rolling-Circle Amplification; Angew. Chem.; 121(18); pp. 3318-3322; Apr. 2009.
Chetrite et al.; Estradiol inhibits the estrone sulfatase activity in normal and cancerous human breast tissues. Journal of Steroid Biochemistry and Molecular Biology, 104(3-5), pp. 289-292, May 2007.
Cho et al.; Creating, transporting, cutting, and merging liquid droplets by electrowetting-based actuation for digital microfluidic circuits, J. MEMS 2003, 12(1), pp. 70-80, Feb. 2003.
Choi et al., Automated digital microfluidic platform for magnetic-particle-based immunoassays with optimization by design of experiments, Anal. Chem., 85(20), pp. 9638-9646; Oct. 2013.
Choi et al., Digital Microfluidics, Annu. Rev. Anal. Chem., 5, pp. 413-440, (Epub) Apr. 2012.
Christiansen; Hormone Replacement Therapy and Osteoporosis; Maturitas, 23, Suppl. pp. S71-S76, May 1996.
Chuang et al.; Direct Handwriting Manipulation of Droplets by Self-Aligned Mirror-EWOO Across a Dielectric Sheet; 19th IEEE International Conf. on Micro Electro Mechanical Systems (MEMS); Instanbul, Turkey; pp. 538-541; Jan. 22-26, 2006.
Cipriano et al.: The cost-effectiveness of expanding newborn screening for up to 21 inherited metabolic disorders using tandem mass spectrometry: results from a decision-analytic model, Value in Health, 10(2), pp. 83-97, Mar.-Apr. 2007.
Cooney et al.; Electrowetting droplet microfluidics on a single planar surface, Microfluid. Nanofluid., 2(5), pp. 435-446; Sep. 2006.
CoreGenomics; How do SPRI beads work; 31 pages; retrieved from the internet (http://core-genomics.blogspot.com/2012/04/how-do-spri-beads-work.html); Apr. 28, 2012.
Cottam et al.; Accelerated synthesis of titanium oxide nanostructures using microfluidic chips; Lab on a Chip; 7(2); pp. 167-169; Feb. 2007.
Crabtree et al.; Microchip injection and separation anomalies due to pressure effects, Anal. Chem., 73(17), pp. 4079-4086, Sep. 2001.
Cunningham; Testosterone replacement therapy for late-onset hypogonadism. Nature Clinical Practice Urology, 3(5), pp. 260-267, May 2006.
Cuzick; Chemoprevention of breast cancer. Women's Health, 2(6), pp. 853-861, Nov. 2006.
Dahlin et al.; Poly(dimethyisiloxane)-based microchip for two-dimensional solid-phase extraction-capillary electrophoresis with an integrated electrospray emitter tip, Anal. Chem., 77(16), pp. 5356-5363, Aug. 2005.
Dambrot; Of microchemistry and molecules: Electronic microfluidic device synthesizes biocompatible probes; 4 pages, retrieved from the internet (https://phys.org/news/2012-01-microchemistry-molecules-electronic-microfluidic-device.html); Jan. 26, 2012.
Danton et al., Porphyrin profiles in blood, urine and faeces by HPLC/electrospray ionization tandem mass spectrometry. Biomedical Chromatography, 20(6-7), pp. 612-621, Jun.-Jul. 2006.
De Mesmaeker et al.; Comparison of rigid and flexible backbones in antisense oligonucleotides; Bioorganic & Medicinal Chem. Lett; 4(3); pp. 395-398; Feb. 1994.
Deligeorgiev et al.; Intercalating Cyanine Dyes for Nucleic Acid Detection; Recent Pat Mat Sci; 2(1); pp. 1-26; Jan. 2006.
Dempcy et al., Synthesis of a thymidyl pentamer of deoxyribonucleic guanidine and binding studies with DNA homopolynucleotides, Proc. Natl. Acad. Sci., 92(13), pp. 6097-6101, Jun. 1995.
Deng et al.; Rapid determination of amino acids in neonatal blood samples based on derivatization with isobutyl chloroformate followed by solid-phase microextraction and gas chromatography/mass spectrometry. Rapid Communications in Mass Spectrometry, 18(1), pp. 2558-2564, Nov. 2004.
Denneulin et al.; Infra-red assisted sintering of inkjet printed silver tracks on paper substrates; J Nanopart Res; 13(9); pp. 3815-3823; Sep. 2011.

(56) References Cited

OTHER PUBLICATIONS

Dibbelt et al.; Determination of natural and synthetic estrogens by radioimmunoassay: Comparison of direct and extraction methods for quantification of estrone in human serum. Clinical Laboratory, 44(3), 137-143, Mar. 1998.

Dietzen et al.; National academy of clinical biochemistry laboratory medicine practice guidelines: follow-up testing for metabolic disease identified by expanded newborn screening using tandem mass spectrometry; executive summary, Clinical Chemistry, 55(9), pp. 1615-1626, Sep. 2009.

Diver et al.; Warning on plasma oestradiol measurement. Lancet, 330(8567), p. 1097, Nov. 1987.

Divino Filho et al.; Simultaneous measurements of free amino acid patterns of plasma, muscle and erythrocytes in healthy human subjects, Clinical Nutrition, 16(6), pp. 299-305, Dec. 1997.

Dixon et al.; An inkjet printed, roll-coated digital microfluidic device for inexpensive, miniaturized diagnostic assays; Lab on a Chip; 16(23); pp. 4560-4568; Nov. 2016.

Djerassi; Chemical birth of the pill. American Journal of Obstetrics and Gynecology, 194(1), pp. 290-298, Jan. 2006.

Dobrowolski et al.; DNA microarray technology for neonatal screening, Acta Paediatrica Suppl, 88(432), pp. 61-64, Dec. 1999.

Doebler et al.; Continuous-flow, rapid lysis devices for biodefense nucleic acid diagnostic systems; Journal of the Association for Laboratory Automation; 14(3); pp. 119-125; Jun. 2009.

Dong et al.; Highly sensitive multiple microRNA detection based on flourescence quenching of graphene oxide and isothermal strand-displacement polymerase reaction; Anal Chem; 84; pp. 4587-4593; Apr. 2012.

Dryden et al.; Integrated digital microfluidic platform for voltammetric analysis; Analytical Chemistry; 85(18); pp. 8809-8816; Sep. 2013.

Duffy et al.; Rapid prototyping of microfluidic systems in Poly (dimethylsiloxane), Anal. Chem., 70(23), pp. 4974-4984, Dec. 1998.

Edgar et al.; Capillary electrophoresis separation in the presence of an immiscible boundary for droplet analysis, Anal. Chem., 78(19), pp. 6948-6954 (author manuscript, 15 pgs.), Oct. 2006.

Egholm et al., PNA hybridizes to complementary oligonucleotides obeying the Watson-Crick hydrogen-bonding rules, Nature, 365(6446), pp. 566-568, Oct. 1993.

Egholm et al., Recognition of guanine and adenine in DNA by cytosine and thymine containing peptide nucleic acids (PNA), J. Am. Chem. Soc., 114(24), pp. 9677-9678; Nov. 1992.

Ehrmann; Polycystic ovary syndrome. New England Journal of Medicine; 352(12); pp. 1223-1236; Mar. 2005.

Ekstrom et al., Miniaturized solid-phase extraction and sample preparation for MALDI MS using a microfabricated integrated selective enrichment target, Journal of Proteome Research, 5(5), pp. 1071-1081, May 2006.

Ekstrom et al., Polymeric integrated selective enrichment target (ISET) for solid-phase-based sample preparation in MALDI-TOF MS, Journal of Mass Spectrometry, 42(11), pp. 1445-1452, Nov. 2007.

Ekstrom et al.,On-chip microextraction for proteomic sample preparation of in-gel digests, Proteomics, 2(4), pp. 413-421, Apr. 2002.

El-Ali et al.; Cells on chips; Nature (2006) insight Review; 442(7101); pp. 403-411; Jul. 2006.

Fair; Digital microfluidics: Is a true lab-on-a-chip possible?; Microfuid. Nanofluid.; 3(3); pp. 245-281; Jun. 2007.

Falk et al.; Measurement of Sex Steroid Hormones in Breast Adipocytes: Methods and Implications; Cancer Epidemiol Biomarkers Prev; 17(8); pp. 1891-1895; Aug. 2008.

Fan et al.; Cross-scale electric manipulations of cells and droplets by frequency-modulated dielectrophoresis and electrowetting; Lab Chip; 8(8); pp. 1325-1331; Aug. 2008.

Fan et al.; Electrically Programmable Surfaces for Configurable Patterning of Cells; Advanced Materials; 20(8); pp. 1418-1423; Apr. 2008.

Fan et al.; Integrated barcode chips for rapid, multiplexed analysis of proteins in microliter quanties of blood; Nature Biotechnology; 26(12); pp. 1373-1378; 15 pages (Author Manuscript); Dec. 2008.

Faure et al.; Improved electrochemical detection of a transthyretin synthetic peptide in the nanomolar range with a two-electrode system integrated in a glass/PDMS microchip; Lab on a Chip; 14(15); pp. 2800-2805, Aug. 2014.

Fobel et al.; DropBot: An open-source digital microfluidic control system with precise control of electrostatic driving force and instantaneous drop velocity measurement; Applied Physics Letters; 102(19); 193513 (5 pgs.); May 2013.

Foote et al., Preconcentration of proteins on microfluidic devices using porous silica membranes, Analytical Chemistry, 77(1), pp. 57-63, Jan. 2005.

Freire et al.; A practical interface for microfluidics and nanoelectrospray mass spectrometry, Electrophoresis, 29(9), pp. 1836-1843, May 2008.

Fridley et al., Controlled release of dry reagents in porous media for tunable temporal and spatial distribution upon rehydration, Lab Chip, 12(21), pp. 4321-4327 (author manuscript, 14 pgs.), Nov. 2012.

Fu et al., Controlled Reagent Transport in Disposable 2D Paper Networks, Lab. Chip, 10(7), pp. 918-920 (author manuscript, 9 pgs.), Apr. 2010.

Gao et al.; Unusual conformation of a 3+-thioformacetal linkage in a DNA duplex; J. Biomol. NMR; 4(1); pp. 17-34; Jan. 1994.

Gentili et al.; Analysis of free estrogens and their conjugates in sewage and river waters by solid-phase extraction then liquid chromatography-electrospray-tandem mass spectrometry. Chromatographia 56(1), pp. 25-32, Jul. 2002.

Gerasimova et al.; Fluorometric method for phenylalanine microplate assay adapted for phenylketonuria screening, Clinical Chemistry, 35(10), pp. 2112-2115, Oct. 1989.

Gong et al., All-Electronic Droplet Generation On-Chip With Real-Time Feedback Control for EWOD Digital Microfluidics, Lab Chip, 8(6), pp. 898-906 (author manuscript, 20 pgs.), Jun. 2008.

Gong et al.; Portable digital microfluidics platform with active but disposable lab-on-chip; 17th IEEE International Conference on Micro Electro Mechanical Systems; Maastricht, Netherlands; pp. 355-358; Jan. 24-29, 2004.

Gong et al.; Two-dimensional digital microfluidic system by multilayer printed circuit board, 18th IEEE International Conference on Micro Electro Mechanical Systems (MEMS 2005); IEEE; pp. 726-729; Jan. 30-Feb. 3, 2005.

Goto et al.; Colorimetric detection of loop-mediated isothermal amplification reaction by using hydroxy naphthol blue; Biotechniques; 46(3); pp. 167-172; Mar. 2009.

Gottschlich et al.; Integrated microchip-device for the digestion, separation and postcolumn labeling of proteins and peptides, J. Chromatogr. B, 745(1), pp. 243-249, Aug. 2000.

Govindarajan et al., A low cost point-of-care viscous sample preparation device for molecular diagnosis in the developing world; an example of microfluidic origami, Lab Chip, 12(1), pp. 174-181, Jan. 2012.

Green et al.; Neonatal screening by DNA microarray: spots and chips, Nature Reviews Genetics, 6(2), pp. 147-151, Feb. 2005.

Hatch et al., Integrated preconcentration SDS-PAGE of proteins in microchips using photopatterned cross-linked polyacrylamide gels, Analytical Chemistry, 78(14), pp. 4976-4984, Jul. 2006.

He et al. (ed); Food microbiological inspection technology; Chapter 5: Modern food microbiological inspection technology; China Quality Inspection press; pp. 111-113; (English Translation Included) Nov. 2013.

Henderson et al.; Estrogens as a cause of human cancer: The Richard and Hinda Rosenthal Foundation award lecture. Cancer Res, 48(2), pp. 246-253, Jan. 1988.

Hennequin et al.; Synthesizing microcapsules with controlled geometrical and mechanical properties with microfluidic double emulsion technology; Langmuir; 25(14); pp. 7857-7861; Jul. 2009.

Herdewijn et al.; 2'5'-Oligoadenylates (2-5A) as Mediators of Interferon Action. Synthesis and Biological Activity of New 2-5A Analogues. E. De Clerq (ed.) Frontiers in Microbiology, 231-232, Springer, Dordrecht Jan. 1987.

(56) References Cited

OTHER PUBLICATIONS

Hertz et al.; Estrogen-progestogen combinations for contraception. Journal of the American Medical Association, 198(9), pp. 1000-1006, Nov. 1966.

Hong et al.; Three-dimensional digital microfluidic manipulation of droplets in oil medium; Scientific Reports; 5 (Article No. 10685); 5 pgs.; Jun. 2015.

Horn et al.; Oligonucleotides with alternating anionic and cationic phosphoramidate linkages: Synthesis and hybridization of stereouniform isomers; Tetrahedron Lett.; 37(6); pp. 743-746; Feb. 1996.

Hou et al.; Microfluidic devices for blood fractionation; Micromachines; 2(3); pp. 319-343; Jul. 20, 2011.

Huh et al.; Reversible Switching of High-Speed Air-Liquid Two-Phase Flows Using Electrowetting-Assisted Flow-Pattern Change, J. Am. Chem. Soc., 125, pp. 14678-14679; Dec. 2003.

Ihalainen et al; Application of paper-supported printed gold electrodes for impedimetric immunosensor development; Biosensors; 3(1); pp. 1-17; Mar. 2013.

Jacobson et al.; High-Speed Separations on a Microchip, Anal. Chem., 66(7), pp. 1114-1118, Apr. 1994.

Jacobson et al.; Precolumn Reactions with Electrophoretic Analysis Integrated on a Microchip, Anal. Chem., 66(23), pp. 4127-4132, Dec. 1994.

Jebrail et al., Combinatorial Synthesis of Peptidomimetics Using Digital Microfluidics, J. Flow Chem., 2(3), pp. 103-107; (online) Aug. 2012.

Jebrail et al., Let's get digital: digitizing chemical biology with microfluidics, Curr. Opin. Chem. Biol., 14(5), 574-581, Oct. 2010.

Jebrail et al., Synchronized synthesis of peptide-based macrocycles by digital microfluidics, Angew. Chem. Int. Ed. Eng., 49(46), pp. 8625-8629, Nov. 2010.

Jebrail et al., World-to-digital-microfluidic interface enabling extraction and purification of RNA from human whole blood, Analytical Chemistry, 86(8), pp. 3856-3862, Apr. 2014.

Jebrail et al.; A Solvent Replenishment Solution for Managing Evaporation of Biochemical Reactions in Air-Matrix Digital Microfluidics Devices, Lab on a Chip, 15(1), pp. 151-158; Jan. 2015.

Jebrail et al.; Digital Microfluidic Method for Protein Extraction by Precipitation; Analytical Chemistry; 81(1); pp. 330-335; Jan. 2009.

Jebrail et al.; Digital Microfluidics for Automated Proteomic Processing, Journal of Visualized Experiments, 33 (e1603), 5 pgs., Nov. 2009.

Jebrail et al.; Digital microfluidics: a versatile tool for applications in chemistry, biology and medicine; Lab Chip; 12 (14); pp. 2452-2463; Jul. 2012.

Jemere et al., An integrated solid-phase extraction system for sub-picomolar detection, Electrophoresis, 23(20), pp. 3537-3544, Oct. 2002.

Jenkins et al., The biosynthesis of carbocyclic nucleosides; Chem. Soc. Rev.; 24(3); pp. 169-176; Jan. 1995.

Jessome et al.; Ion Suppression: A Major Concern in Mass Spectrometry. LC-GC North America, 24(5), pp. 498-510, May 2006.

Jia et al.; Ultrasensitive detection of microRNAs by exponential isothermal amplification; Angew. Chem. Int. Ed. Engl.; 49(32); pp. 5498-5501; Jul. 2010.

Jung et al.; Hybridization of Alternating Cationic/Anionic Oligonucleotides to RNA Segments; Nucleosides & Nucleotides; 13(6-7); pp. 1597-1605; Jul. 1994.

Kaaks et al.; Postmenopausal serum androgens, oestrogens and breast cancer risk: The European prospective investigation into cancer and nutrition. Endocrine-Related Cancer, 12(4), pp. 1071-1082, Dec. 2005.

Keng et al., Micro-chemical synthesis of molecular probes on an electronic microfluidic device, PNAS, 109(3), pp. 690-695; Jan. 2012.

Kiedrowski et al., Parabolic Growth of a Self-Replicating Hexadeoxynucleotide Bearing a 3'-5'-Phosphoamidate Linkage; Angew. Chemie Intl. Ed.; 30(4); pp. 423-426; Apr. 1991.

Kim et al., A Microfluidic DNA Library Preparation Platform for Next-Generation Sequencing, PLoS ONE, 8(7), Article ID: e68988; 9 pgs., Jul. 2013.

Kim et al.; Microfabricated Monolithic Multinozzle Emitters for Nanoelectrospray Mass Spectrometry; Anal Chem; 79(10); pp. 3703-3707; May 2007.

Koster et al.; Drop-based microfluidic devices for encapsulation of single cells; Lab on a Chip; 8(7); pp. 1110-1115; Jul. 2008.

Kralj et al.; Integrated continuous microfluidic liquid-liquid extraction. Lab on a Chip, 7(2), pp. 256-263, Feb. 2007.

Kutter et al., Solid phase extraction on microfluidic devices, Journal of Microcolumn Separations, 12(2), pp. 93-97, Jan. 2000.

Kutter et al., Solvent-Programmed Microchip Open-Channel Electrochromatography, Analytical Chemistry, 70(15), pp. 3291-3297, Aug. 1998.

Labrie et al.; Androgen glucuronides, instead of testosterone, as the new markers of androgenic activity in women. The Journal of Steroid Biochemistry and Molecular Biology, 99(4-5), pp. 182-188, Jun. 2006.

Labrie; Intracrinology. Molecular and Cellular Endocrinology, 78(3), pp. C113-C118, Jul. 1991.

Lamar et al.; Serum sex hormones and breast cancer risk factors in postmenopausal women. Cancer Epidemiol Biomarkers Prev, 12(4), pp. 380-383, Apr. 2003.

Langevin et al., A rapid and unbiased method to produce strand-specific RNA-Seq libraries from small quantities of starting materiaRNA Biol., 10(4), pp. 502-515, (online) Apr. 2013.

Lawyer et al.; High-level expression, purification, and enzymatic characterization of full-length Thermus aquaticus DNA polymerase and a truncated form deficient in 5' to 3' exonuclease activity; Genome Res; 2(4); pp. 275-287; May 1993.

Lawyer et al.; Isolation, characterization, and expression in *Escherichia coli* of the DNA polymerase gene from Thermus aquaticus; J. Biol. Chem.; 264; pp. 6427-6437; Apr. 1989.

Lebrasseur et al.; Two-dimensional electrostatic actuation of droplets using a single electrode panel and development of disposable plastic film card; Sensors and Actuators A; 136(1); pp. 368-386; May 2007.

Lee et al.; Electrowetting and electrowetting-on-dielectric for microscale liquid handling, Sens. Actuators A, 95(2), pp. 259-268, Jan. 2002.

Lee et al.; Removal of bovine serum albumin using solid-phase extraction with in-situ polymerized stationary phase in a microfluidic device; Journal of Chromatography A; 1187(1-2); pp. 11-17; Apr. 2008.

Lee et al.; Surface-Tension-Driven Microactuation Based on Continuous Electrowetting; J. Microelectromechanical Systems; 9(2); pp. 171-180; Jun. 2000.

Letsinger et al., Cationic oligonucleotides, J. Am. Chem. Soc., 110(13), pp. 4470-4471, Jun. 1988.

Letsinger et al., Effects of pendant groups at phosphorus on binding properties of d-ApA analogues, Nucl. Acids Res., 14(8), pp. 3487-3499, Apr. 1986.

Letsinger et al., Phosphoramidate analogs of oligonucleotides. J. Org. Chem., 35(11), pp. 3800-3803, Nov. 1970.

Lettieri et al., A novel microfluidic concept for bioanalysis using freely moving beads trapped in recirculating flows, Lab on a Chip, 3(1), pp. 34-39, Feb. 2003.

Levy et al.; Genetic screening of newborns, Annual Review of Genomics and Human Genetics, 1, pp. 139-177, Sep. 2000.

Li et al., A perspective on paper-based microfluidics: Current status and future trends, Biomicrofluidics, 6(1), pp. 011301 (13 pgs), Mar. 2012.

Li et al., Application of microfluidic devices to proteomics research: identification of trace-level protein digests and affinity capture of target peptides, Molecular & cellular Proteomics, 16(2), pp. 157-168, Feb. 2002.

Li et al., Paper-based microfluidic devices by plasma treatment, Anal. Chem., 80(23), pp. 9131-9134, Nov. 2008.

Li et al.; A Low-Cost and High resolution droplet position detector for an intelligent electrowetting on dielectric device; Journal of Lab. Automation 2015; 20(6); pp. 663-669; Dec. 2015.

(56) References Cited

OTHER PUBLICATIONS

Li et al.; One-step ultrasensitive detection of microRNAs with loop-mediated isothermal amplification (LAMP); Chem Commun; 47(9); pp. 2595-2597; Mar. 2011.
Li et al.; Test structure for characterizing low voltage coplanar EWOD system; IEEE Transaction on Semiconductor Manufacturing; IEEE Service Center; Piscataway, NJ.; 22(1); pp. 88-95; Feb. 4, 2009.
Liana et al.; Recent Advances in Paper-Based Sensors; Sensors; 12(9); pp. 11505-11526; Aug. 2012.
Link et al.; Electric Control of Droplets in Microfluidic Devices; Angew Chem Int Ed Engl; 45(16); pp. 2556-2560; Apr. 2006.
Liu et al., Three-dimensional paper microfluidic devices assembled using the principles of origami, JACS, 133(44), pp. 17564-17566, Nov. 2011.
Liu et al.; Attomolar ultrasensitive microRNA detection by DNA-scaffolded silver-nanocluster probe based on isothermal amplification; Anal Chem; 84(12); pp. 5165-5169; Jun. 2012.
Lizardi et al.; Mutation detection and single-molecule counting using isothermal rolling-circle amplification; Nat. Genet.; 19(3); pp. 225-232; Jul. 1998.
Locascio et al.; Surface chemistry in polymer microfluidic systems; in Lab-on-a-Chip; Elsevier Science; 1st Ed.; pp. 65-82; Oct. 2003.
Loeber; Neonatal screening in Europe; the situation in 2004, Journal of Inherited Metabolic Disease, 30(4), pp. 430-438, Aug. 2007.
Lohman et al.; Efficient DNA ligation in DNA-RNA hybrid helices by Chlorella virus DNA ligase; Nucleic Acids Research; 42(3); pp. 1831-1844; Nov. 2013.
Luk et al.; Pluronic Additives: A Solution to Sticky Problems in Digital Microfluidics, Langmuir, 24(12), pp. 6382-6389, Jun. 2008.
Luk et al; A digital microfluidic approach to proteomic sample processing; Analytical Chemistry; 81(11); pp. 4524-4530; Jun. 2009.
Mag et al., Synthesis and selective cleavage of an oligodeoxynucleotide containing a bridged internucleotide 5'-phosphorothioate linkage, Nucleic Acids Res., 19(7), pp. 1437-1441, Apr. 1991.
Mais et al.; A solvent replenishment solution for managing evaporation of biochemical reactions in air-matrix digital microfluidics devices; Lab on a Chip; 15(1); pp. 151-158; Jan. 2015.
Makamba et al.; Surface modification of poly(dimethyisiloxane) microchannels; Electrophoresis; 24(21); pp. 3607-3619; Nov. 2003.
Malloggi et al.; Electrowetting—A versatile tool for controlling microdrop generation, Eur. Phys. J. E, 26(1), pp. 91-96, May 2008.
Mandl et al.; Newborn screening program practices in the United States: notification, research, and consent, Pediatrics, 109(2), pp. 269-273, Feb. 2002.
Maroney et al.; A Rapid, quantitative assay for direct detection of microRNAs and other small RNAs using splinted ligation; RNA; 13(6); pp. 930R936; Jun. 2007.
Maroney et al.; Direct detection of small RNAs using splinted ligation; Nat. Protocols3(2); pp. 279-287; Jan. 2008.
Marre et al.; Synthesis of micro and nanostructures in microfluidic systems; Chemical Society Reviews; 39(3); pp. 1183-1202; Mar. 2010.
Martinez et al., Simple Telemedicine for Developing Regions: Camera Phones and Paper-Based Microfluidic Devices for Real-Time, Off-Site Diagnosis, Anal. Chem., 80(10), pp. 3699-3707, May 2008.
Martinez et al., Three-dimensional microfluidic devices fabricated in layered paper and tape, PNAS, 105(50), pp. 19606-19611, Dec. 2008.
Martinez et al.; Patterned paper as a platform for inexpensive low-volume, portable bioassays, Angewandte Chemie, 46(8), pp. 1318-1320, Feb. 2007.
Martinez-Sanchez et al.; MicroRNA Target Identification— Experimental Approaches; Biology; 2; pp. 189-205; Jan. 2013.
Matern et al.; Reduction of the false-positive rate in newborn screening by implementation of MS/MS-based second-tier tests: the Mayo Clinic experience (2004-2007), Journal of Inherited Metabolic Disease, 30(4), pp. 585-592, Aug. 2007.

Mauney, Thermal Considerations for Surface Mount Layouts, in Texas Instruments Portable Power Supply Design Seminar, 16 pgs., 2006.
Mega; Heterogenous ion-exchange membranes RALEX; 3 pgs.; retrieved Mar. 1, 2016 from the internet: http://www.mega.cz/heterogenous-ion-exchange-membranes-ralex.html.
Meier et al., The photochemistry of stilbenoid compounds and their role in materials technology, Chem. Int. Ed. Engl., 31(11), pp. 1399-1420, Nov. 1992.
Mellors et al.; Fully Integrated Glass Microfluidic Device for Performing High-Efficiency Capillary Electrophoresis and Electrospray Ionization Mass Spectrometry, Analytical Chemistry, 80(18), pp. 6881-6887 (Author Manuscript, 18 pgs.), Sep. 2008.
Michigan Dept. of Community Health; Specimen collection procedure from Michigan Newborn Screening Program, 37 pgs., (retrieved Feb. 9, 2017 online: http://web.archive.org/web/20100715000000*http://www.michigan.gov/documents/Bloodco2_60773_7.pdf) Jul. 2009.
Miller et al.; A digital microfluidic approach to homogeneous enzyme assays, Anal. Chem., 80(5), pp. 1614-1619, Mar. 2008.
Millington et al.; Digital Microfluidics: A Future Technology in the Newborn Screening Laboratory?, Seminars in Perinatology, 34(2), pp. 163-169 (Author Manuscript, 14 pgs.), Apr. 2010.
Millington et al.; Digital Microfluidics: A novel platform for multiplexed detection of LSDs with potential for newborn screening (conference presentation); Oak Ridge Conference; 15 pgs.; 2009.
Millington et al.; Tandem mass spectrometry a new method for acylcarnitine profiling with potential for neonatal screening for inborn errors of metabolism, Journal of Inherited Metabolic Disease, 13(3), pp. 321ỳ324, May 1990.
Millington et al.; The Analysis of Diagnostic Markers of Genetic Disorders in Human Blood and Urine Using Tandem Mass Spectrometry With Liquid Secondary Ion Mass Spectrometry, International Journal of Mass Spectrometry, 111, pp. 211-228, Dec. 1991.
Miralles et al.; A Review of Heating and Temperature Control in Microfluidic Systems: Techniques and Applications; Diagnostics; 3; pp. 33-67; Jan. 2013.
Mitchell et al.; Circulating microRNAs as stable blood-based markers for cancer detection; Proc Nat Acad Sci; 105(30); pp. 10513-10518; Jul. 2008.
Moon et al.; An integrated digital microfluidic chip for multiplexed proteomic sample preparation and analysis by MALDI-MS. Lab Chip, 6(9), pp. 1213-1219, Sep. 2006.
Moqadam et al.; The Hunting of Targets: Challenge in miRNA Research; Leukemia; 27(1); pp. 16-23; Jan. 2013.
Mousa et al.; Droplet-scale estrogen assays in breast tissue, blood, and serum, Science Translational Medicine, 1(1), 6 pgs., Oct. 2009.
Murran et al.; Capacitance-based droplet position estimator for digital microfluidic devices; Lab Chip; 12(11); pp. 2053-2059; May 2012.
Nakamura et al.; Simple and accurate determination of CYP2D6 gene copy number by a loop-mediated isothermal amplification method and an electrochemical DNA chip; Clinica Chimica Acta; 411(7-8); pp. 568-573; Apr. 2010.
Nelson et al., Incubated protein reduction and digestion on an EWOD digital microfluidic chip for MALDI-MS, Analytical Chemistry, 82(23), pp. 9932-9937, Dec. 2010.
Newborn Screening Ontario, The newborn screening ontario unsatisfactory sample indicator (educational resource), 3 pgs , retrieved online: https://www.newbornscreening.on.ca/en/health-care-providers/submitters/report-cards/nso_unsatisfatory_sample_indicator_jan_2017, (web address was available to applicant(s) at least as of Jan. 2016).
Ng et al., Digital microfluidic magnetic separation for particle-based immunoassays, Anal. Chem., 84(20), 8805-8812, Oct. 2012.
Nilsson et al.; RNA-templated DNA ligation for transcript analysis; Nucl. Acid Res.; 29(2); pp. 578-581; Jan. 2001.
Njiru; Loop-Mediated Isothermal Amplification Technology: Towards Point of Care Diagnostics; PLoS; 6(6); pp. e1572 (4 pgs.); Jun. 2012.
Notomi et al.; Loop-mediated isothermal amplification of DNA; Nucleic Acid Research; 28(12); p. e63 (7 pgs.); Jun. 2000.

(56) References Cited

OTHER PUBLICATIONS

Okubo et al.; Liquid-liquid extraction for efficient synthesis and separation by utilizing micro spaces. Chemical Engineering Science, 63(16), pp. 4070-4077, Aug. 2008.
Oleschuk et al., Trapping of bead-based reagents within microfluidic systems: On-chip solid-phase extraction and electrochromatography, Analytical Chemistry, 72(3), pp. 585-590, Feb. 2000.
Padilla et al.; Newborn screening in the Asia Pacific region, Journal of Inherited Metabolic Disease, 30(4), pp. 490-506, Aug. 2007.
Paik et al., Coplanar digital microfluidics using standard printed circuit board processes, in Proceedings 9th Int'l Conf Miniaturized Systems for Chemistry and Life Sciences (MicroTAS 2005), Boston, MA, USA, pp. 566-568, Oct. 9-13, 2005.
Paneri et al.; Effect of change in ratio of electrode to total pitch length in EWOD based microfluidic system; InComputer Applications and Industrial Electronics (ICCAIE); 2010 International Conference; pp. 25-28; Dec. 5, 2010.
Parida et al.; Rapid detection and differentiation of Dengue virus serotypes by a real-time reverse transcription-loop-mediated isothermal amplification assay; J Clinical Microbiology; 43(6); pp. 2895-2903; Jun. 2005.
Pauwels et al., Biological-Activity of New 2-5a Analogs, Chemica Scripta, 26(1), pp. 141-145, Mar. 1986.
Peltonen et al.; Printed electrodes on tailored paper enable electrochemical functionalization of paper; TAPPI Nanotechnology Conference; Espoo, Finland; 20 pgs.; Sep. 2010.
Peterschmitt et al.; Reduction of false negative results in screening of newborns for homocystinuria, New England Journal of Medicine, 341(21), 1572-1576, Nov. 1998.
Petersen et al., On-chip electro membrane extraction, Microfluidics and Nanofluidics, 9(4), pp. 881-888, Oct. 2010.
Pitt et al.; Hormone replacement therapy for osteoporosis. Lancet, 335(8695), p. 978, Apr. 1990.
Pollack et al.; Electrowetting-based actuation of droplets for integrated microfluidics; Lab on a Chip; 2(2); pp. 96-101; May 2002.
Pollack et al.; Electrowetting-based actuation of liquid droplets for microfluidic applications, Appl. Phys. Lett., 77(11), pp. 1725-1726, Sep. 2000.
Provincial Health Services Authority (British Columbia Perinatal Health Program), Perinatal Services BC Neonatal Guideline 9; Newborn Screening, 29 pgs., (retrieved Feb. 9, 2017 online: http://www.perinatalservicesbc.ca/health-professionals/guidelines-standards/newborn) guideline revised: Dec. 2010.
Rahhal et al.; The impact of assay sensitivity in the assessment of diseases and disorders in children. Steroids, 73(13), pp. 1322-1327, Dec. 2008.
Rashad; Clinical applications of tandem mass spectrometry: ten years of diagnosis and screening for inherited metabolic diseases, Journal of Chromatography B: Biomedical Sciences and Applications, 758(1), pp. 27-48, Jul. 2001.
Rashed et al.; Diagnosis of inborn errors of metabolism from blood spots by acylcarnitines and amino acids profiling using automated electrospray tandem mass spectrometry, Pediatric Research, 38(3), 324-331, Sep. 1995.
Rawls, Optimistic About Antisense: Promising clinical results and chemical strategies for further improvements delight antisense drug researchers: Chemical & Engineering News; 75(22); pp. 35-39; Jun. 2, 1997.
Ren et al., Automated on-chip droplet dispensing with volume control by electro-wetting actuation and capacitance metering, Sens. Actuator B Chem., 98(2-3), pp. 319-327, Mar. 2004.
Ren et al.; Design and testing of an interpolating mixing architecture for electrowetting-based droplet-on-chip chemical dilution: 12th International Conference on Transducers, Solid-State Sensors, Actuators and Microsystems; vol. 2; Boston, MA, USA; pp. 619-622; Jun. 8-12, 2003.
Ro et al.; Poly (dimethylsiloxane) microchip for precolumn reaction and micellar electrokinetic chromatography of biogenic amines, Electrophoresis, 23(7-8), pp. 1129-1137, Apr. 2002.
Roman et al.; Fully integrated microfluidic separations systems for biochemical analysis, J. Chromatogr. A, 1168(1-2), pp. 170-188, Oct. 2007.
Roman et al.; Sampling and Electrophoretic Analysis of Segmented Flow Streams in a Microfluidic Device, Anal. Chem., 80(21), pp. 8231-8238 (author manuscript, 19 pgs.), Nov. 2008.
Sabourin et al.; Interconnection blocks: a method for providing reusable, rapid, multiple, aligned and planar microfluidic interconnections; Journal of Micromechanics and Microengineering; 19(3); 10 pages; doi:10.1088/0960-1317/19/3/035021; Feb. 18, 2009.
Sadeghi et al.; On Chip Droplet Characterization: A Practical, High-Sensitivity Measurement of Droplet Impedance in Digital Microfluidics; Anal. Chem.; 84(4); pp. 1915-1923; Feb. 2012.
Sahai et al.; Newborn screening, Critical Reviews in Clinical Laboratory Sciences, 46(2), pp. 55-82, (online) Mar. 2009.
Samsi et al.; A Digital Microfluidic Electrochemical Immunoassay; Lab on a Chip; 14(3); pp. 547-554; Feb. 2014.
Sanghvi & Cook (Ed.); Carbohydrate Modifications in Antisense Research; Chapters 2 and 3, American Chemical Society, Washington DC; (207th National Meeting of the American Chemical Society Mar. 13-17, 1994, San Jose, CA); Dec. 1994.
Sanghvi & Cook (Ed.); Carbohydrate Modifications in Antisense Research; Chapters 6 and 7, American Chemical Society, Washington DC; (207th National Meeting of the American Chemical Society Mar. 13-17, 1994, San Jose, CA); Dec. 1994.
Santen et al.; Superiority of gas chromatography/tandem mass spectrometry assay (GC/MS/MS) for estradiol for monitoring of aromatase inhibitor therapy. Steroids. 72(8), pp. 666-671, Jul. 2007.
Sasano et al.; From Endocrinology to Intracrinology. Endocr Pathol, 9(1), pp. 9-20, Spring 1998.
Satoh et al.; Electrowetting-based valve for the control of the capillary flow, J. Appl. Phys., 103(3), 034903, Feb. 2008.
Satoh et al.; On-chip microfluidic transport and mixing using electrowetting and incorporation of sensing functions, Anal. Chem., 77(21), pp. 6857-6863, Nov. 2005.
Sawai et al., Synthesis and properties of oligoadenylic acids containing 2?-5? phosphoramide linkage, Chem. Lett., 13(5), pp. 805-808, May 1984.
Schertzer et al.; Using capacitance measurements in EWOD devices to identify fluid composition and control droplet mixing; Sens. Actuators B; 145(1); pp. 340-347; Mar. 2010.
Scriver_Commentary; A Simple Phenylalanine Method for Detecting Phenylketonuria in Large Populations of Newborn Infants by Guthrie et al., Pediatrics, 32(3), 338-343, Sep. 1963.
Shah et al., On-demand droplet loading for automated organic chemistry on digital microfluidics, Lab Chip, 13(14), pp. 2785-2795, Jul. 2013.
Shamsi et al; A digitai microfluidic electrochemical immunoassay; Lab on a Chip; 14(3); pp. 547-554; (year of pub. sufficiently earlier than effective US filing date and any foreign priority date) 2014.
Shih et al., A feedback control system for high-fidelity digital microfluidics, Lab Chip, 11(3), pp. 535-540, Feb. 2011.
Simpson et al.; Estrogen—the Good, the Bad, and the Unexpected. Endocr Rev, 26(3), pp. 322-330; May 2005.
Sinha et al., A Versatile Automated Platform for Micro-scale Cell Stimulation Experiments, J. Vis. Exp., e50597, 8 pgs., Aug. 2013.
Sinton et al.; Electroosmotic velocity profiles in microchannels, Colloids Surf. A, 222(1-3), pp. 273-283, Jul. 2003.
Skendzel, Rubella immunity; Defining the level of protective antibody, Am. J. Clin. Pathol., 106(2), 170-174, Aug. 1996.
Smith et al; Diagnosis and Management of Female Infertility. Journal of the American Medical Association 290(13), pp. 1767-1770, Oct. 2003.
Sooknanan et al., Nucleic Acid Sequence-Based Amplification, Ch. 12; Molecular Methods for Virus Detection (1st Ed.), Academic Press, Inc., pp. 261-285; Jan. 1995.
Sprinzl et al., Enzymatic incorporation of ATP and CTP analogues into the 3' end of tRNA, Eur. J. Biochem., 81(3), pp. 579-589, Dec. 1977.
Srinivasan et al.; An integrated digital microfluidic lab-on-a-chip for clinical diagnostics on human physiological fluids, Lab Chip, 4(4), pp. 310-315, Aug. 2004.

(56) References Cited

OTHER PUBLICATIONS

Stanczyk et al.; Standardization of Steroid Hormone Assays Why, How, and When?, Cancer Epidemiol Biomarkers Prev, 16(9), pp. 1713-1719, Sep. 2007.

Steckl et al.; Flexible Electrowetting and Electrowetting on Flexible Substrates; Proc. SPIE 7956; Advances in Display Technologies; and E-papers and Flexible Displays: 795607 (6 pgs.); Feb. 2011.

Stegink et al.; Plasma amino acid concentrations and amino acid ratios in normal adults and adults heterozygous for phenylketonuria ingesting a hamburger and milk shake meal, American Journal of Clinical Nutrition, 53(3), pp. 670-675, Mar. 1991.

Sun et al.; Rapid and direct microRNA quantification by an enzymatic luminescence assay; (author manuscript; 17 pgs.) Analytical Biochemistry; 429(1); pp. 11-17; Oct. 2012.

Svoboda et al.; Cation exchange membrane integrated into a microfluidic device; Microelectronic Engineering; 86; pp. 1371-1374; Apr.-Jun. 2009.

Szarewski et al.; Contraception. Current state of the art. British Medical Journal, 302(6787), pp. 1224-1226, May 1991.

Szymczak et al.; Concentration of Sex Steroids in Adipose Tissue after Menopause. Steroids, 63(5-6), pp. 319-321, May/Jun. 1998.

Tachibana et al.; Application of an enzyme chip to the microquantification of L-phenylalanine, Analytical Biochemistry, 359(1), pp. 72-78, Dec. 2006.

Tan et al.; A lab-on-a-chip for detection of nerve agent sarin in blood; Lab Chip; 8(6); pp. 885-891; Jun. 2008.

Tang et al.; Mechano-regulated surface for manipulating liquid droplets; Nature Communications; 10 pages; DOI: 10.1038/ncomms14831; ; Apr. 4, 2017.

Teh et al.; Droplet microfluidics, Lab Chip, 8(2), pp. 198-220, Feb. 2008.

Theberge et al.; Microdroplets in microfluidics: an evolving plarform for discoveries in chemistry and biology; Angewandte Chemie International Edition; 49(34); pp. 5846-5868; Aug. 2010.

Therrell et al.; Newborn screening in North America, Journal of Inherited Metabolic Disease, 30(4), pp. 447-465, Aug. 2007.

Tian et al., Printed two-dimensional micro-zone plates for chemical analysis and ELISA, Lab on a Chip, 11(17), pp. 2869-2875, Sep. 2011.

Tobjörk et al., IR-sintering of ink-jet printed metal-nanoparticles on paper, Thin Solid Films, 520(7), pp. 2949-2955, Jan. 2012.

Tomita et al.; Loop-mediated isothermal amplification (LAMP) of gene sequences and simple visual detection of products; Nature Protocols; 3(5); pp. 877-882; (online) Apr. 2008.

Torkkeli; Droplet microfluidics on a planar surface; VTT Technical Research Centre of Finland; Publications 504; 214 pages (Dissertation); Oct. 2003.

Turgeon et al.; Combined Newborn Screening for Succinylacetone, Amino Acids, and Acylcarnitines in Dried Blood Spots, Clinical Chemistry, 54(4), pp. 657-664, Apr. 2008.

Udenfriend et al.; Fluorescamine: a reagent for assay of amino acids, peptides, proteins, and primary amines in the picomole range, Science, 178(4063), pp. 871-872, Nov. 1972.

Unger et al.; Monolithic microfabricated valves and pumps by multilayer soft lithography, Science, 288(5463), pp. 113-116, Apr. 2000.

Univ. of Maryland—Baltimore Washington Medical Center; Plasma amino acids, 6 pgs., retrieved Feb. 10, 2017 from: http://www.mybwmc.org/library/1/003381, Web address available to applicant(s) at least as of Jan. 2010.

Verkman; Drug Discovery in Academia; Am J Physiol Cell Physiol; 286(3); pp. C465-C474; Feb. 2004.

Walker et al.; A Chemiluminescent DNA Probe Test Based on Strand Displacement Amplification (Chapter 15); Molecular Methods for virus Detection (1st Ed.), Academic Press, Inc., pp. 329-349; Jan. 1995.

Walker et al.; A passive pumping method for microfluidic devices, Lab Chip, 2(3), pp. 131-134, Aug. 2002.

Wang et al., Paper-based chemiluminescence ELISA: lab-on-paper based on chitosan modified paper device and, Biosens. Bioelectron., 31(1), pp. 212-218, Jan. 2012.

Wang et al., Simple and covalent fabrication of a paper device and its application in sensitive chemiluminescence immunoassay, Analyst, 137(16), pp. 3821-3827, Aug. 2012.

Wang et al.; An integrated microfluidic device for large-scale in situ click chemistry screening; Lab on a Chip; 9(16); 9(16); pp. 2281-2285; 9 pages (Author Manuscript); Aug. 2009.

Wang et al.; Highly sensitive detection of microRNAs based on isothermal exponential amplification-assisted generation of catalytic G-quadruplexDNAzyme; Biosensors and Bloelectronics, 42; pp. 131-135; Apr. 2013.

Washburn et al.; Large-scale analysis of the yeast proteome by multidimensional protein identification technology, Nat. Biotechnol., 19(3), pp. 242-247, Mar. 2001.

Watson et al.; Multilayer hybrid microfluidics: a digital-to-channel interface for sample processing and separations; Anal. Chem.; 82(15); pp. 6680-6686; Aug. 2010.

Wheeler et al.; Electrowetting-Based Microfluidics for Analysis of Peptides and Proteins by Matrix-Assisted Laser Desorption/Ionization Mass Spectrometry; Anal Chem; 76(16); pp. 4833-4838; Aug. 2004.

Wheeler; Chemistry. Putting electrowetting to work; Science; 322(5901); pp. 539-540; Oct. 2008.

Wlodkowic et al.; Tumors on chips: oncology meets microfluidics; Current opinion in Chemical Biology; 14(5); pp. 556-567; Oct. 2010.

Wu et al.; Design, Simulation and Fabrication of Electrowetting-Based Actuators for Integrated Digital Microfluidics; Proceedings of the 1st IEEE International Conference on Nano/Mioro Engineered and Molecular Systems; Zhuhai, China; pp. 1097-1100; Jan. 18-21, 2006.

Wu et al.; Electrophoretic separations on microfluidic chips, J. Chromatogr. A, 1184(1-2), pp. 542-559, Mar. 2008.

Yan et al., A microfluidic origami electrochemiluminescence aptamer-device based on a porous Au-paper electrode and a phenyleneethynylene derivative, Chem. Commun. (Camb), 49(14), pp. 1383-1385, Feb. 2013.

Yan et al., Paper-based electrochemiluminescent 3D immunodevice for lab-on-paper, specific, and sensitive point-of-care testing, Chem.-Eur. J., 18(16), pp. 4938-4945, Apr. 2012.

Yi et al.; Spangler et al., Eds; Channel-to-droplet extractions for on-chip sample preparation, in Proceedings of Solid-State Sensor, Actuator and Microsystems Workshop, pp. 128-131, Jun. 2006.

Yin et al.; One-step, multiplexed fluorescence defection of microRNAs based on duplex-specific nuclease signal amplification; J. American Chem. Soc.; 134(11); pp. 5064-5067; Mar. 2012.

Yoon et al.; Preventing Biomolecular Adsorption in Electrowetting-Based Biofluidic Chips; Anal Chem; 75; pp. 5097-5102; Aug. 2003.

Yoon; Open-Surface Digital Microfluidics; The Open Biotechnology Journal; 2(1); pp. 94-100; Apr. 2008.

Young et al.; Calculation of DEP and EWOD Forces for Application in Digital Microfluidics, J. Fluids Eng., 130(8), pp. 081603-1-081603-9, Jul. 2008.

Yu et al., Monolithic porous polymer for on-chip solid-phase extraction and preconcentration prepared by photoinitiated in situ polymerization within a microfluidic device, Analytical Chemistry , 73(21), pp. 5088-5096, Nov. 2001.

Yu et al., Preparation of monolithic polymers with controlled porous properties for microfluidic chip applications using photoinitiated free-radical polymerization, Journal of Polymer Science, Part A: Polymer Chemistry, 40(6), pp. 755-769, Mar. 2002.

Yu et al.; A plate reader-compatible microchannel array for cell biology assays; Lab Chip; 7(3); pp. 388-391; Mar. 2007.

Yu et al.; Microfabrication of a digital microfluidic platform integrated with an on-chip electrochemical cell; Journal of Micromechanics and Microengineering; 23(9); pp. 10 pages; doi: 10.1088/0960-1317/23/9/095025; Aug. 2013.

Yu et al.; Microfabtrication of a digital microfluidic platform integrated with an on-chip electrochemical cell; Journal of Micromechanics and Microengineering; 23(9); doi:10.1088/0960-1317/23/9/095025, 10 pages; Aug. 28, 2013.

(56) References Cited

OTHER PUBLICATIONS

Yu et al.; Parallel-plate lab-on-chip electrochemical analysis; Journal of Micromechanics and Microengineering; 24(1); 7 pages; doi: 10.1088/0960-1317/24/1/015020; Dec. 16, 2013.

Yue; Undergraduate Chemistry experiment (11); Hunan Normal University Press; First Edition; p. 96; (Machine Translation included); Oct. 2008.

Yung et al.; Micromagnetic-microfluidic blood cleansing devices; Lab on a Chip; 9(9); pp. 1171-1177; May 2009.

Zaffanello et al.; Multiple positive results during a neonatal screening program a retrospective analysis of incidence, clinical implications and outcomes, Journal of Perinatal Medicine, 33(3), pp. 246-251, May 2005.

Zhang et al.; Multiplexed detection of microRNAs by tuning DNA-scaffolded silver nanoclusters; Analyst; 138(17); pp. 4812-4817; Sep. 2013.

Zhang et al.; The permeability characteristics of silicone rubber; In Proceedings of 2006 SAMPE Fall Technical Conference; 10 pages; Nov. 6, 2006.

Zhao et al., Lab on Paper, Lab Chip, 8(12), pp. 1988-1991, Dec. 2008.

Znidarsic-Plazl et al.; Steroid extraction in a microchannel system—mathematical modelling and experiments. Lab Chip, 7(7), pp. 883-889, Jul. 2007.

Zuker; Mfold Web Server for Nucleic Acid Folding and Hybridization Prediction; Nucleic Acid Research ; 31(13); pp. 3406-3415; Jul. 2003.

Zytkovicz et al.; Tandem mass spectrometric analysis for amino, organic, and fatty acid disorders in newborn dried blood spots: a two-year summary from the New England Newborn Screening Program, Clinical Chemistry, 47(11), pp. 1945-1955, Nov. 2001.

Fobel et al.; U.S. Appl. No. 15/457,930 entitled "Printed Digital Microfluidic Devices Methods of Use and Manufacture Thereof", filed Mar. 13, 2017.

Hong et al.; U.S. Appl. No. 16/726,740 entitled "Feedback system for parallel droplet control in a digital microfluidic device," filed Dec. 24, 2019.

\* cited by examiner

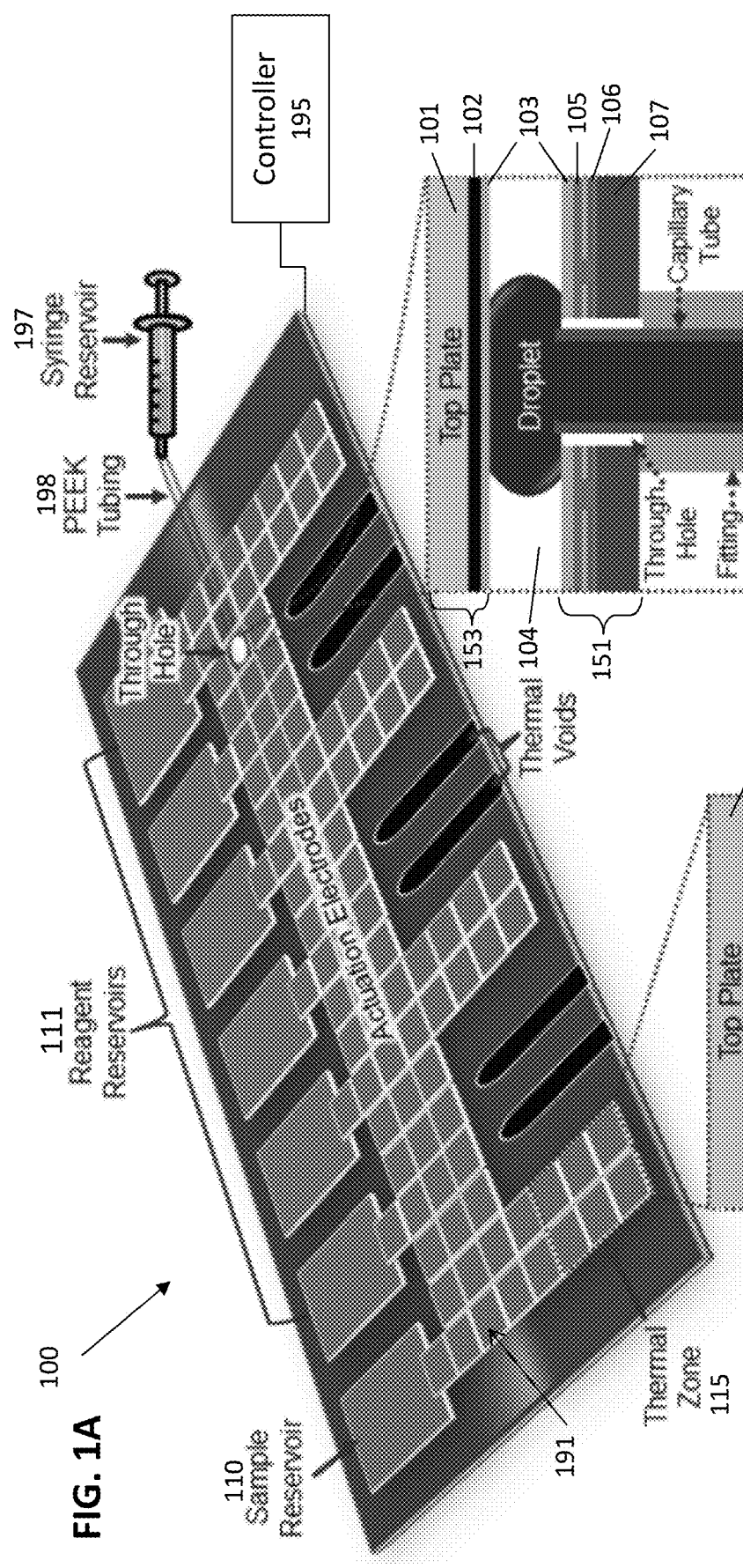
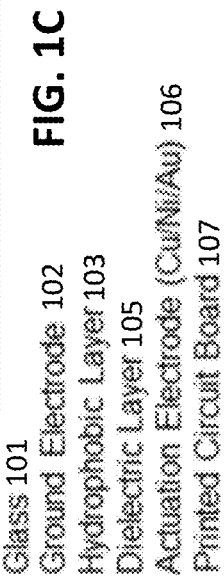
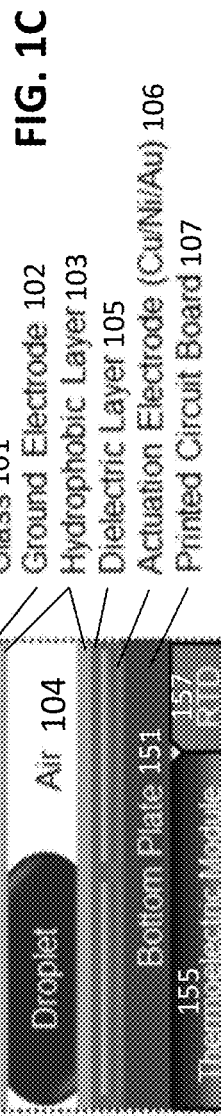
FIG. 1A
FIG. 1B
FIG. 1C

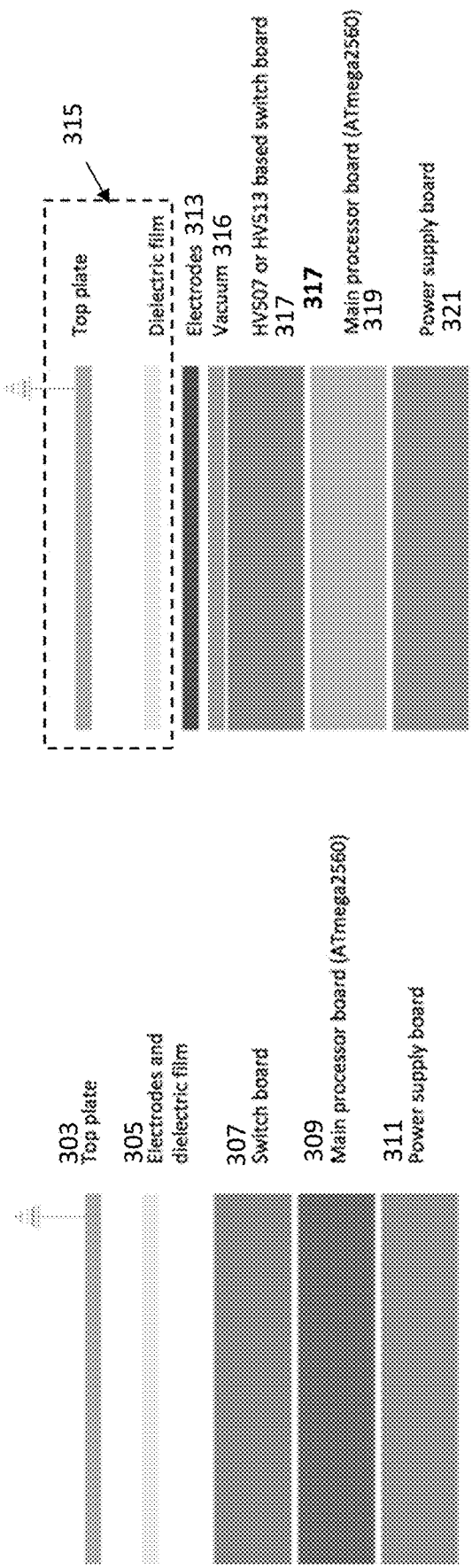

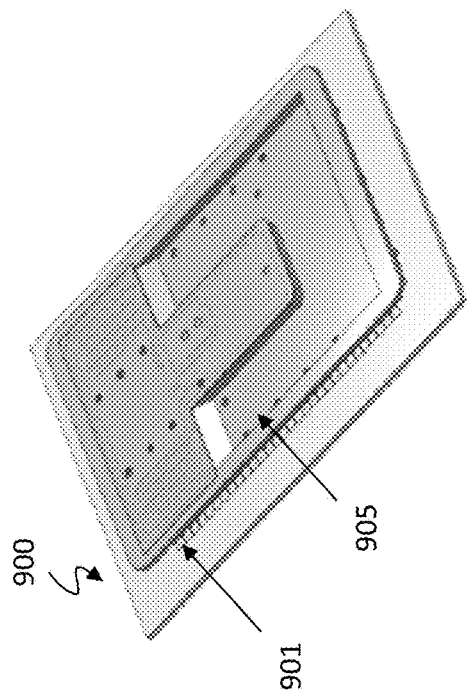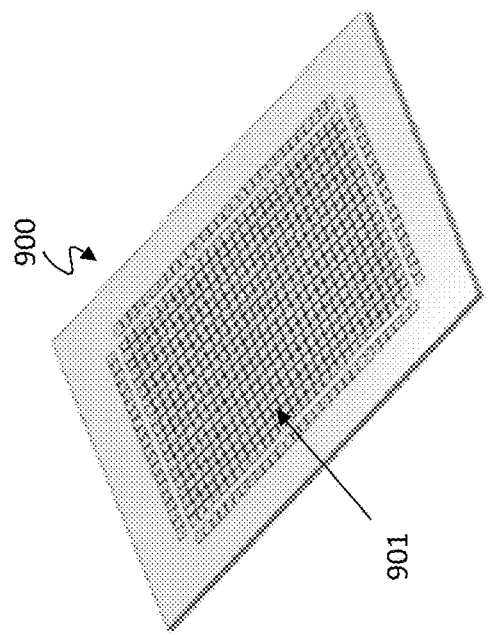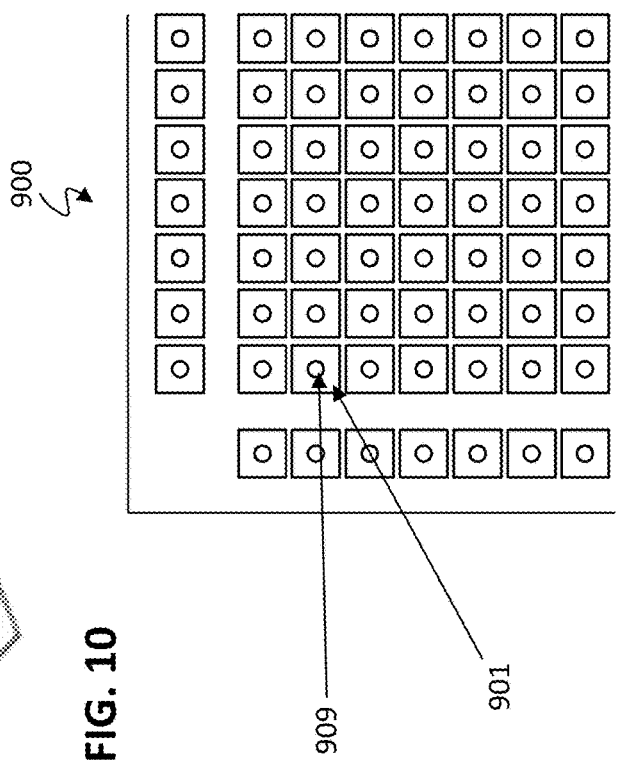
FIG. 11
FIG. 10
FIG. 12

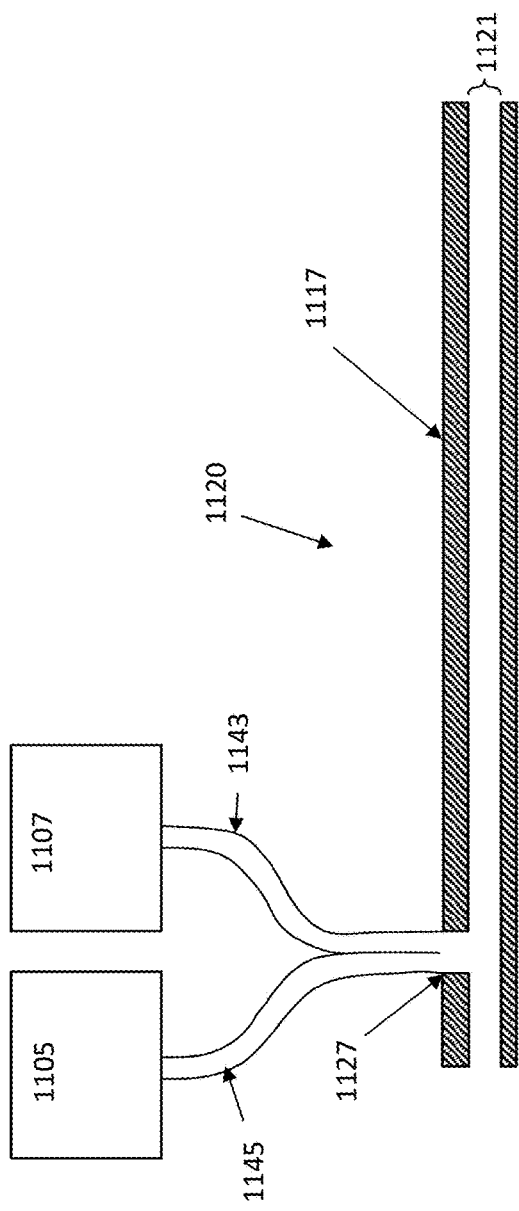
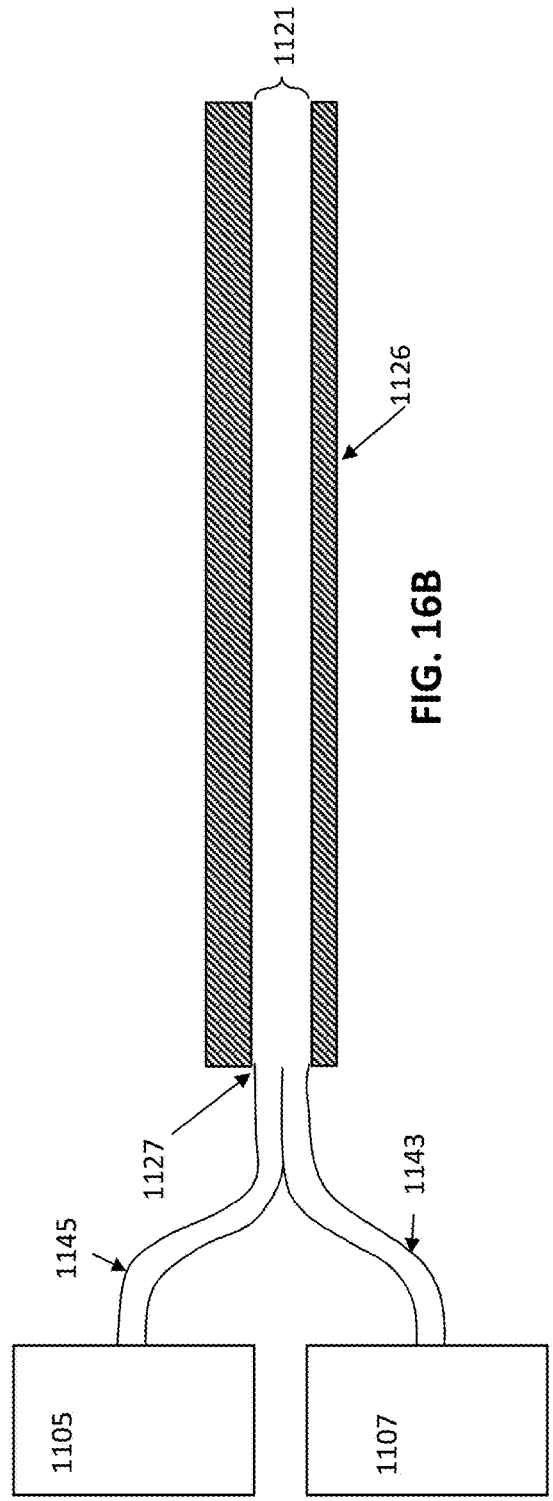
FIG. 16A
FIG. 16B

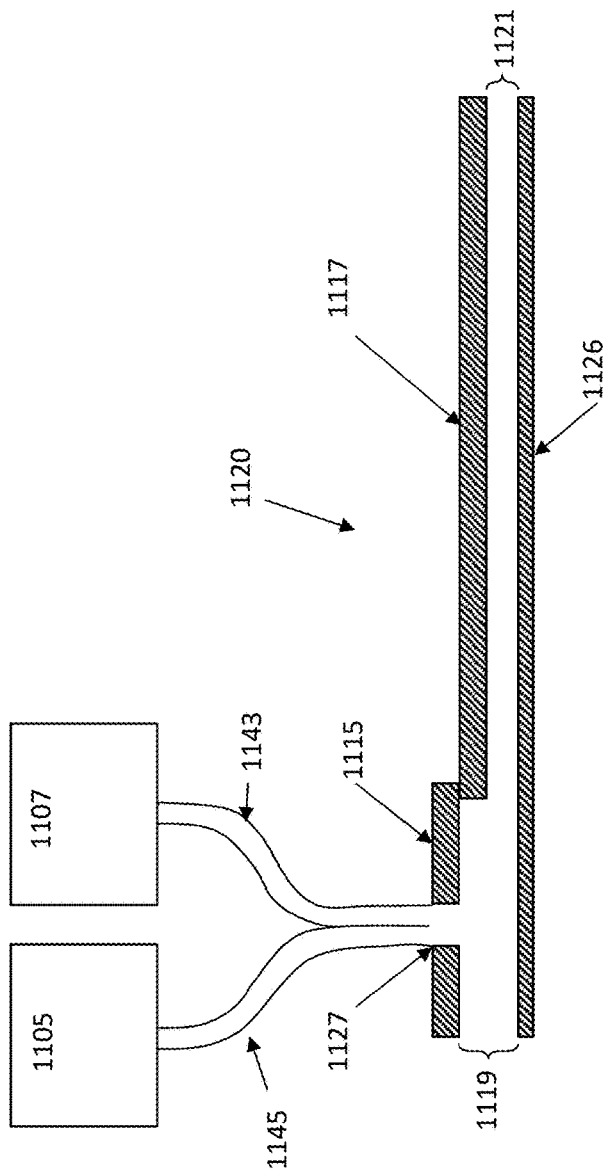
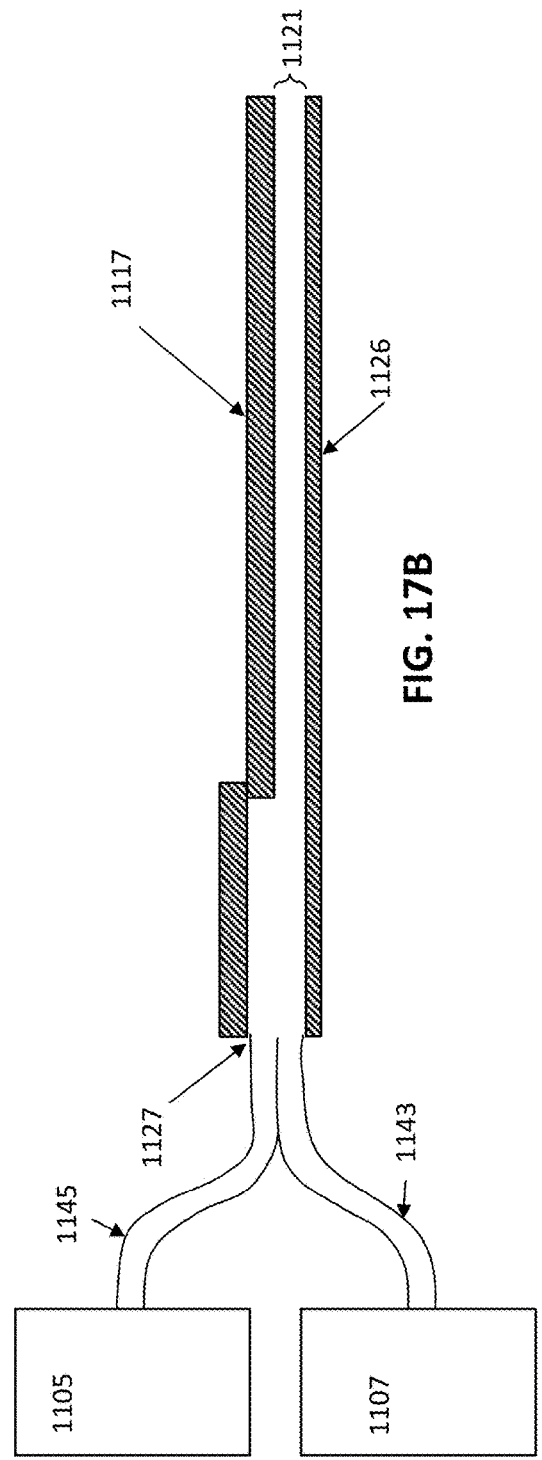
FIG. 17A
FIG. 17B

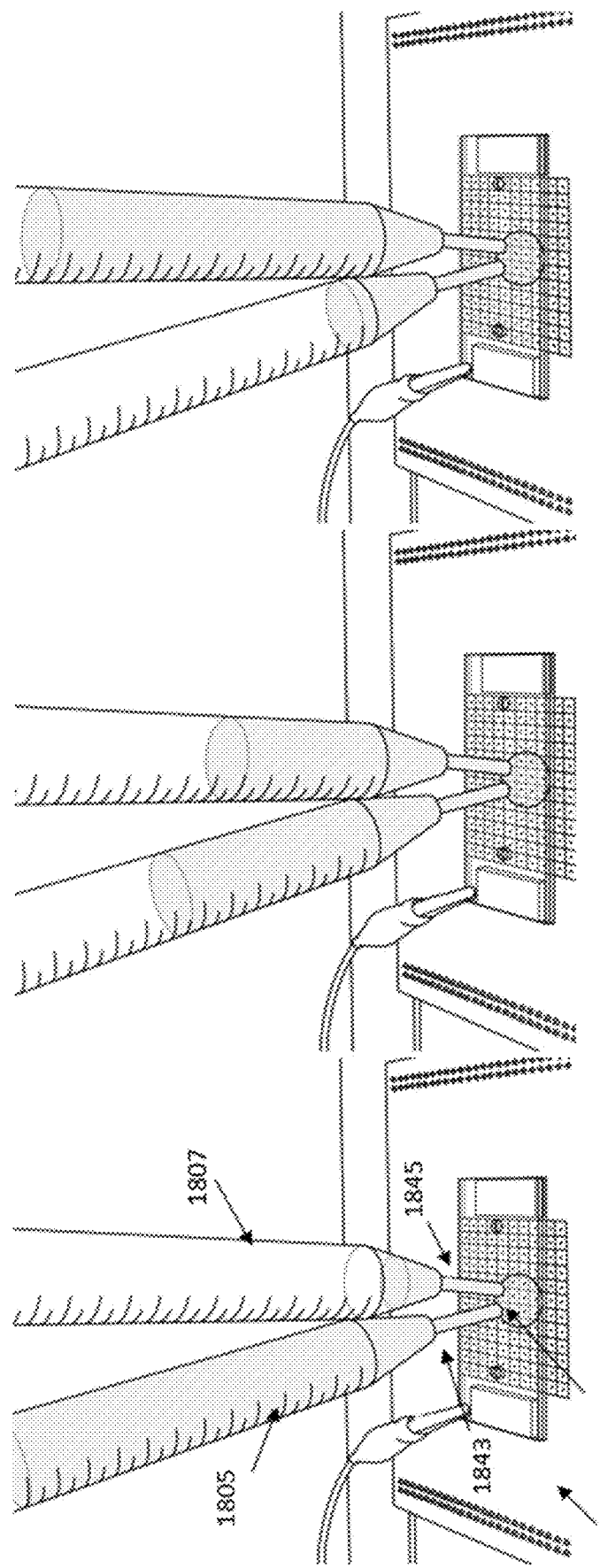

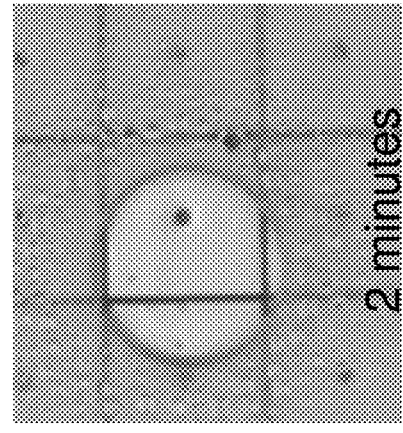
FIG. 19A 0 minutes
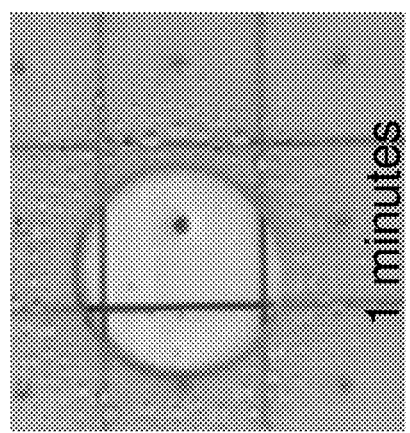
FIG. 19B 1 minutes
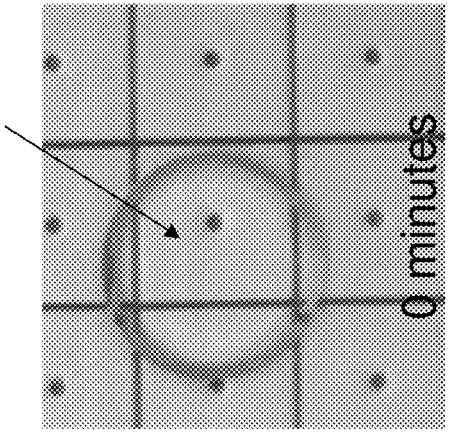
FIG. 19C 2 minutes
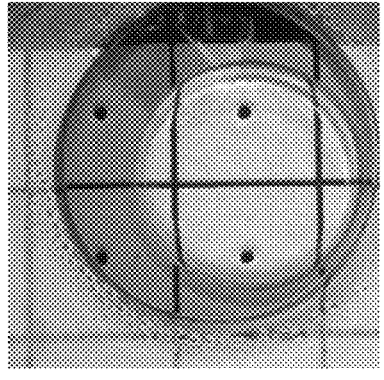
FIG. 20A 0 minutes
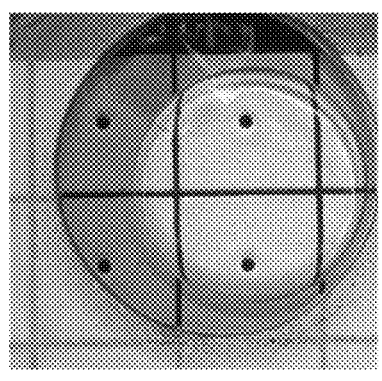
FIG. 20B 60 minutes
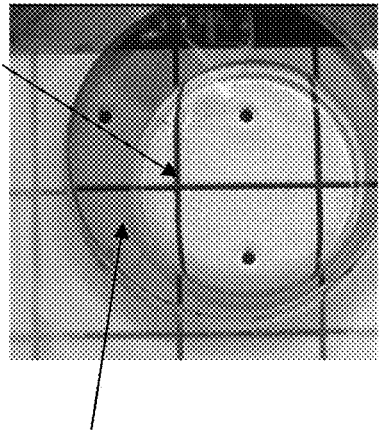
FIG. 20C 120 minutes

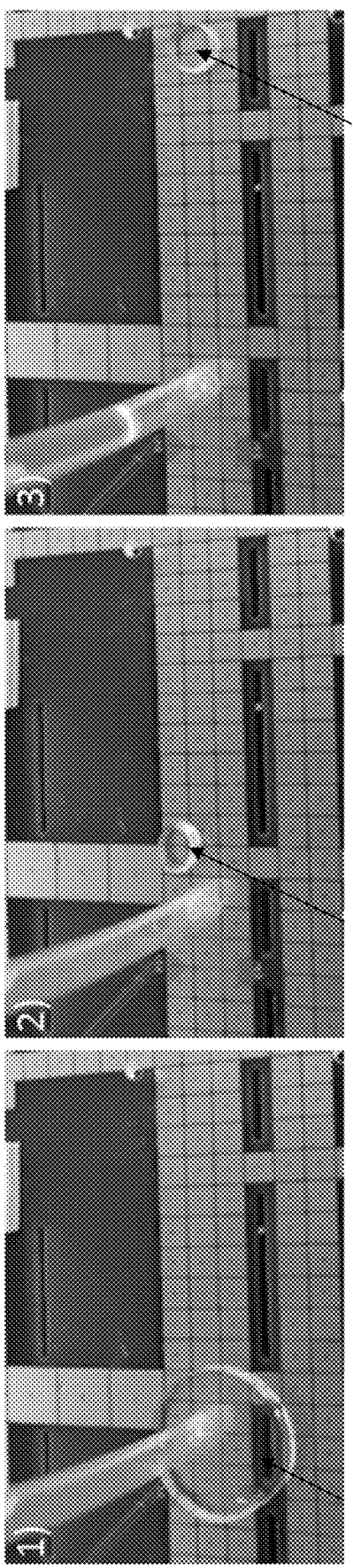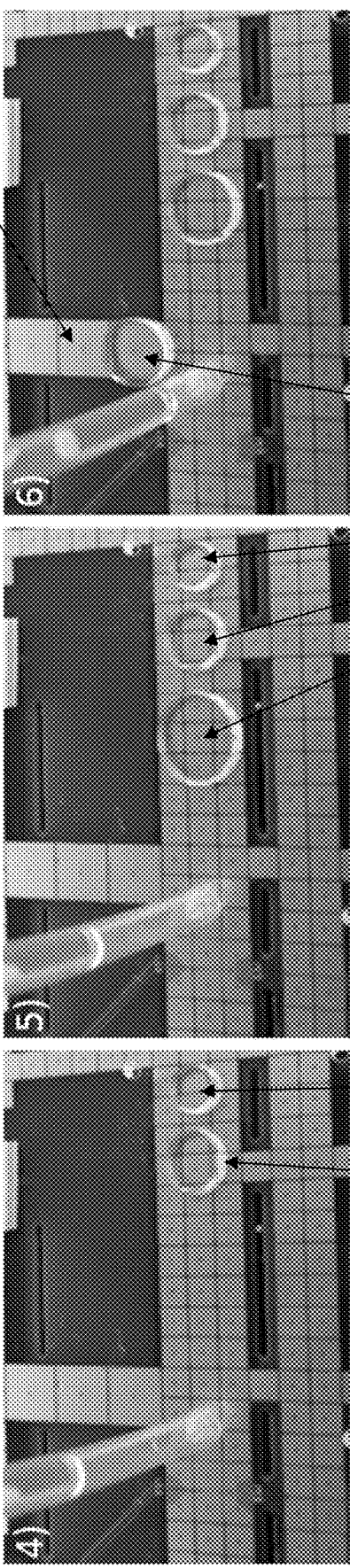
FIG. 23A  FIG. 23B  FIG. 23C
FIG. 23D  FIG. 23E  FIG. 23F

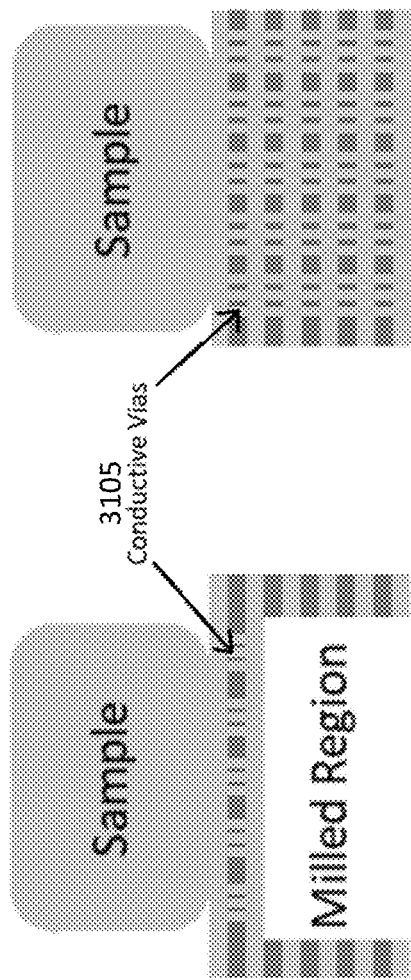
FIG. 30
FIG. 31B
FIG. 31A
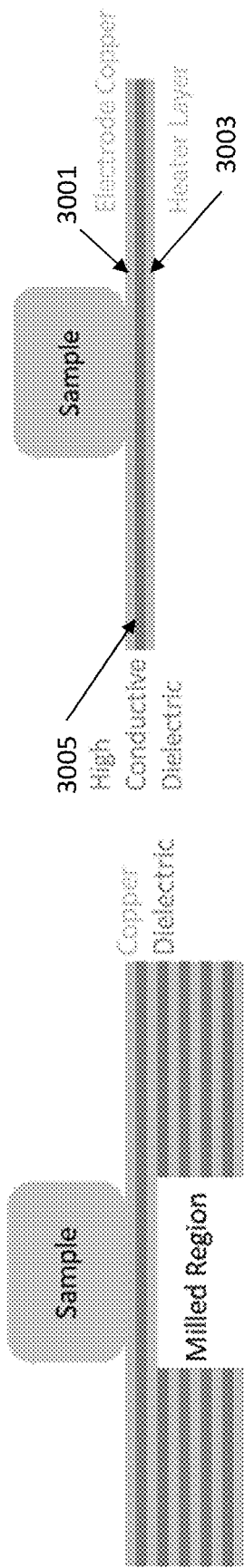
FIG. 29

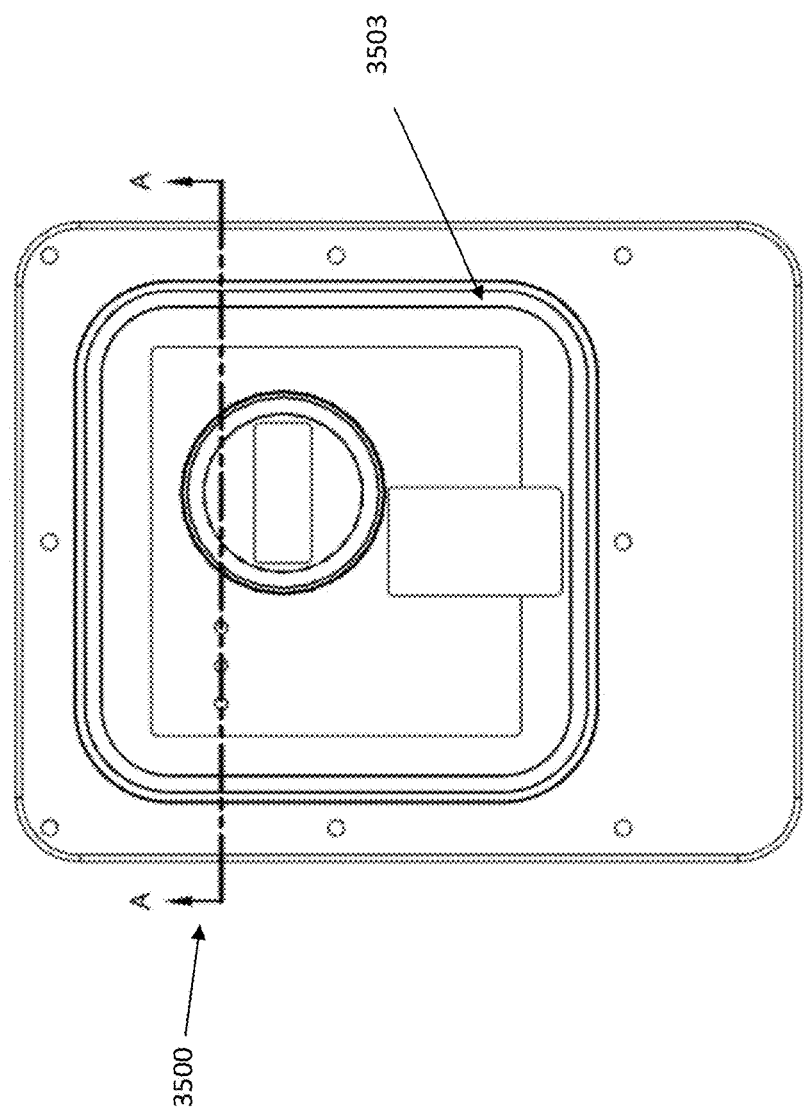
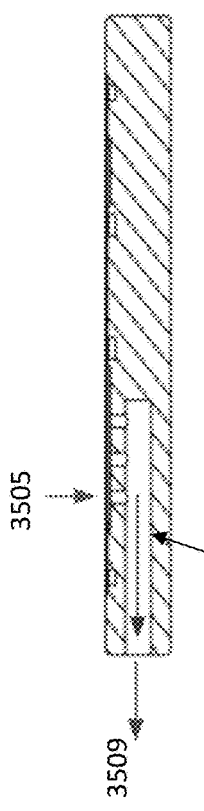
FIG. 35A
FIG. 35B
SECTION A-A

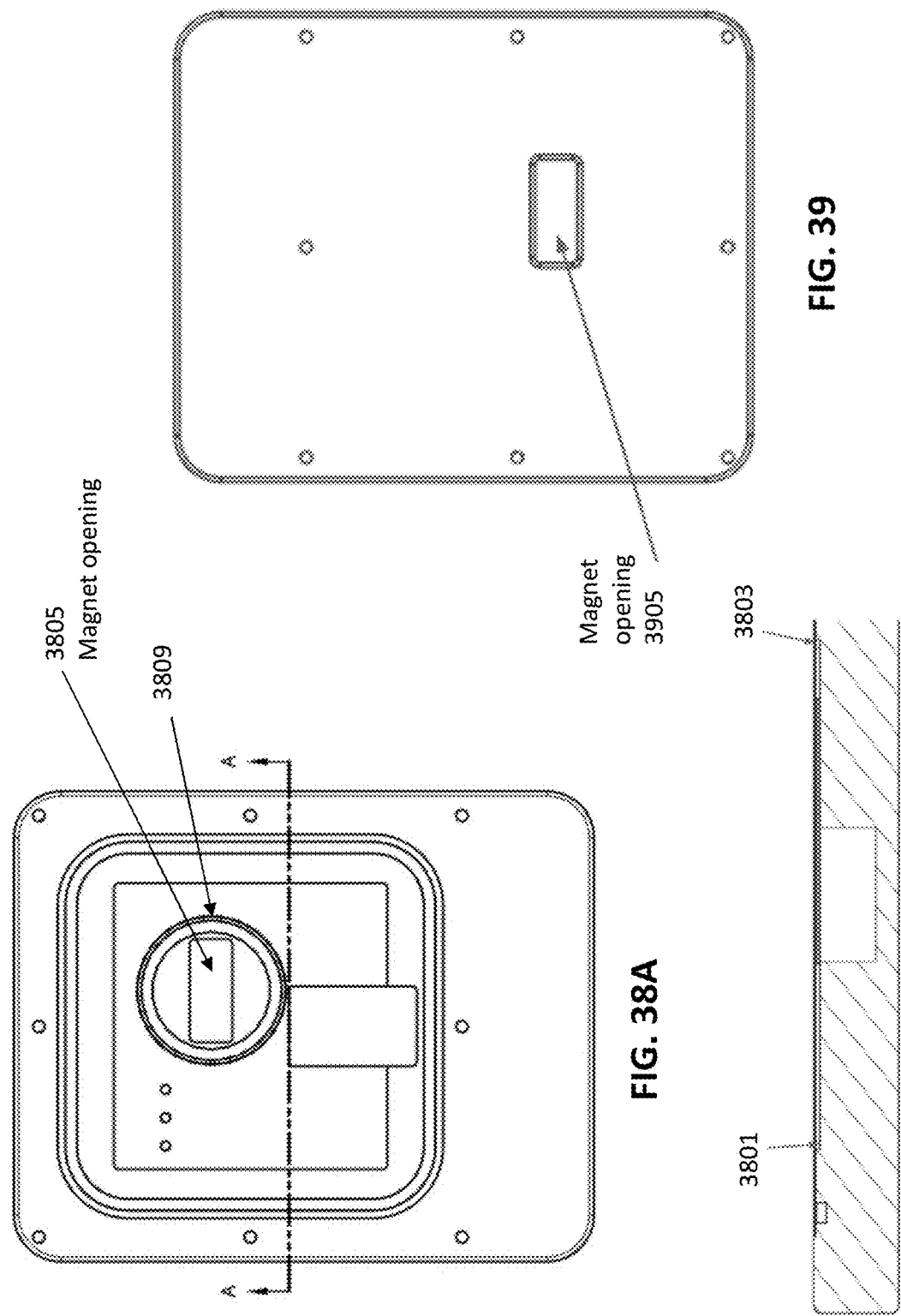

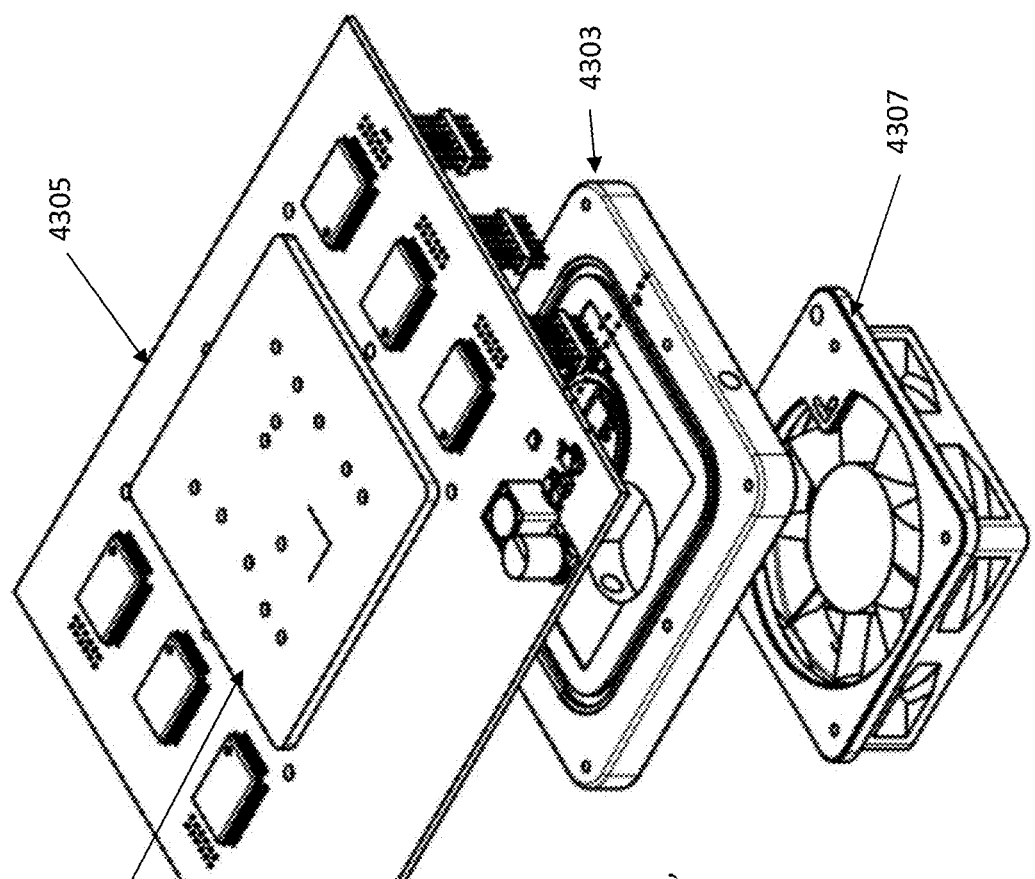
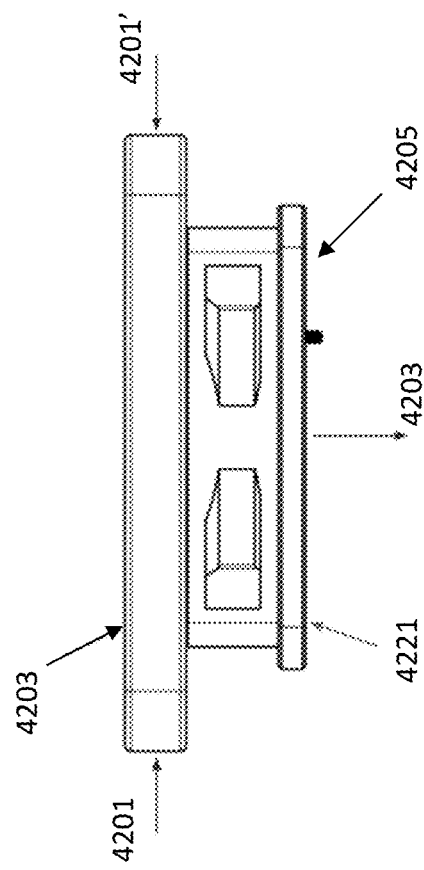
FIG. 43
FIG. 42

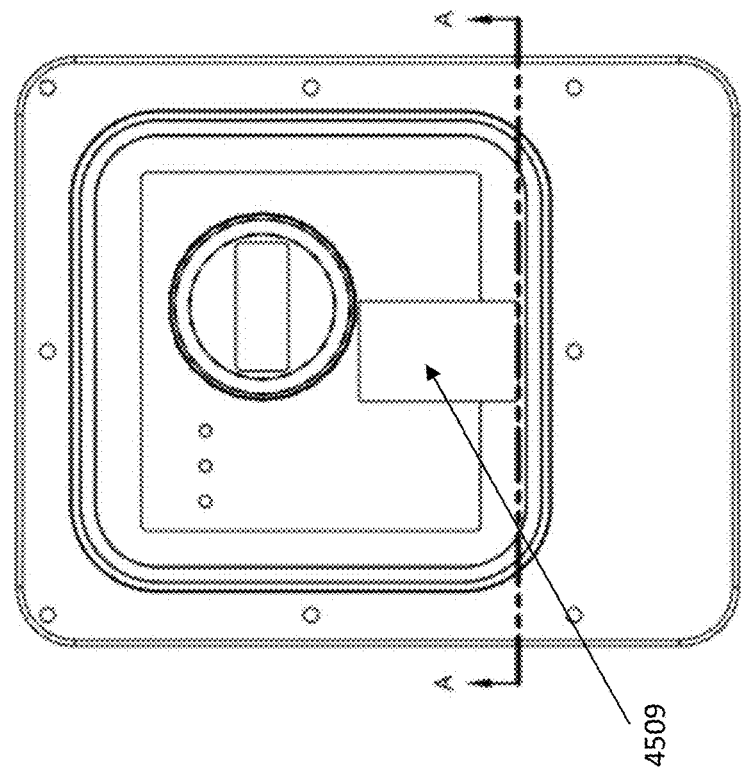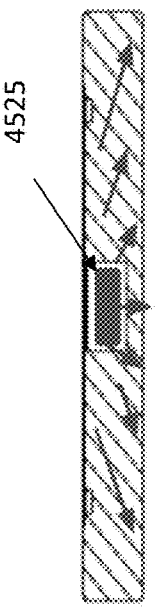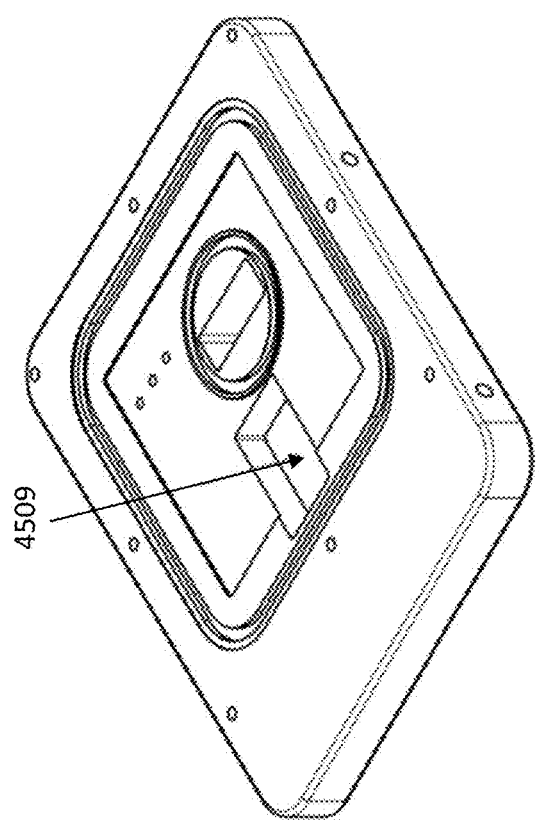
FIG. 45A
FIG. 45B
FIG. 44

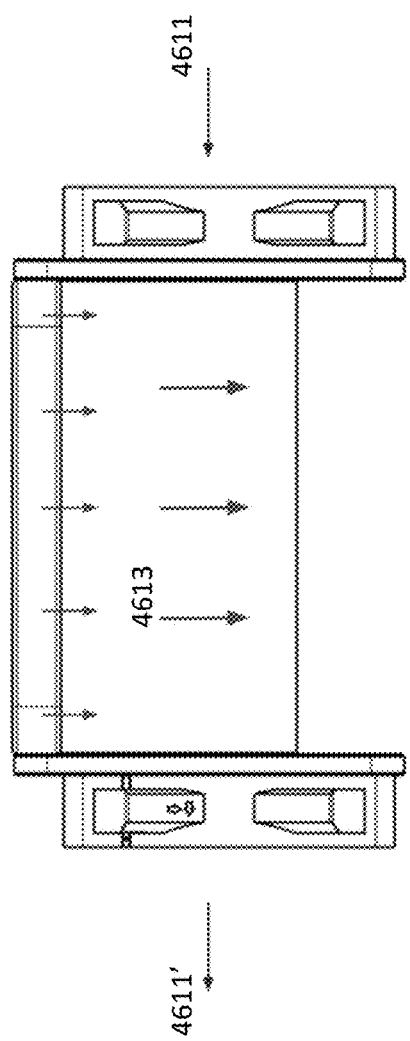
FIG. 46
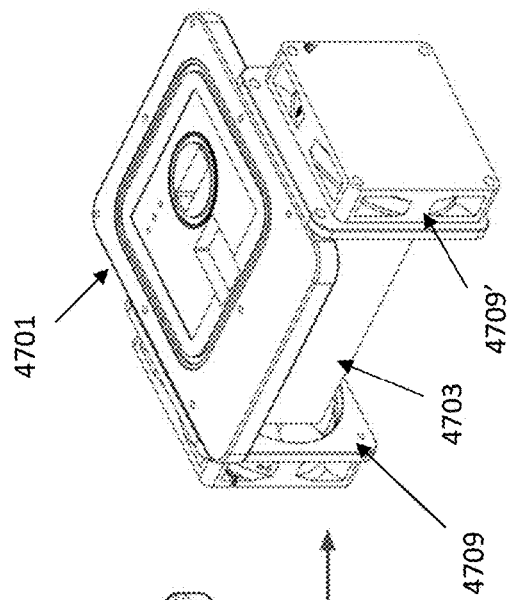
FIG. 47C
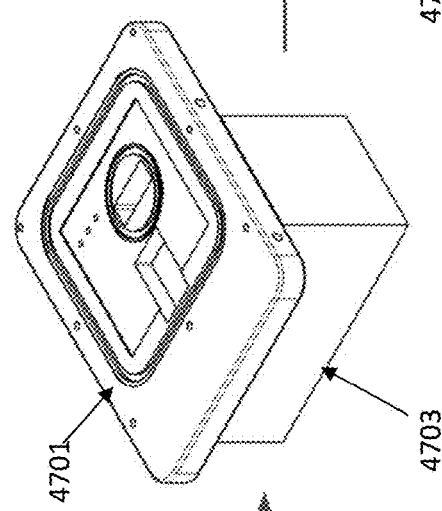
FIG. 47B
FIG. 47A

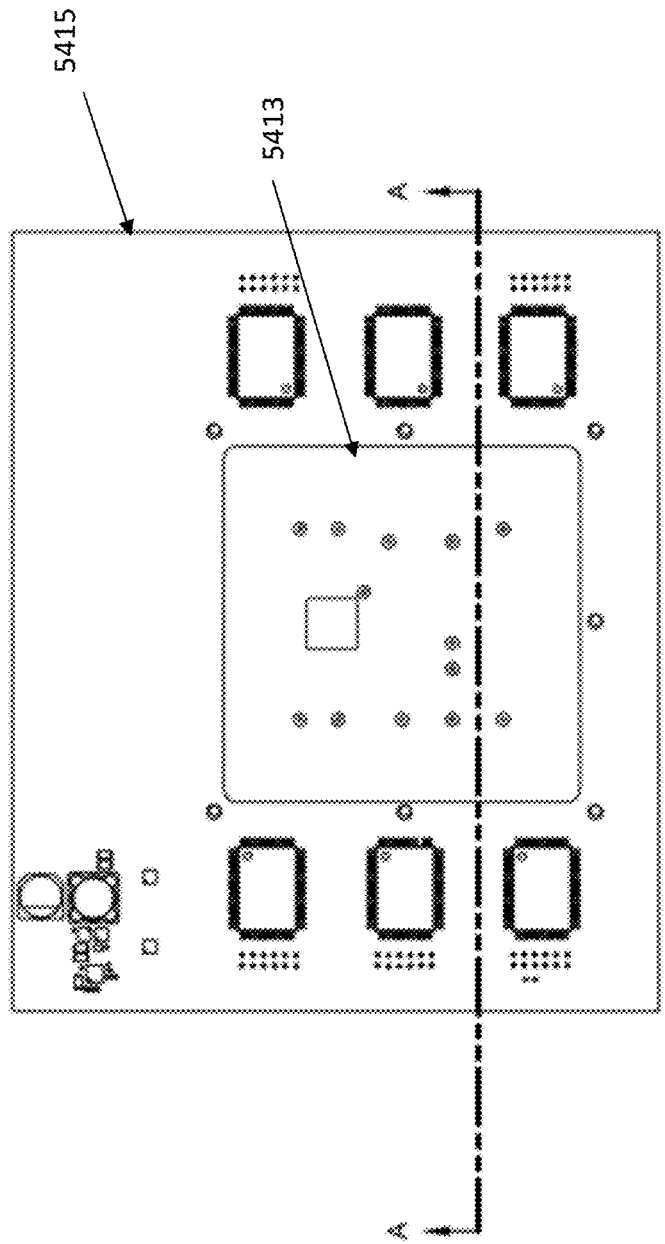
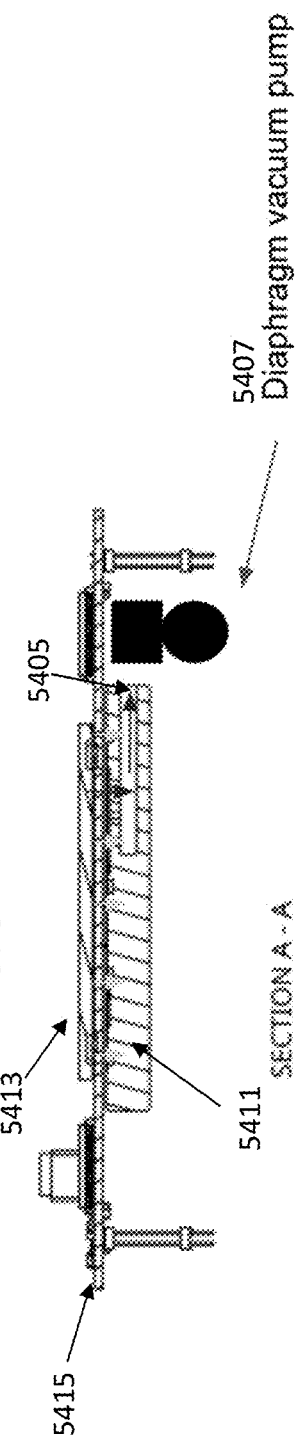
FIG. 54A
FIG. 54B

Protocol selection

Timeline, reagents and time
required review

MULTI-CARTRIDGE DIGITAL MICROFLUIDICS APPARATUSES AND METHODS OF USE

CROSS REFERENCE TO RELATED APPLICATIONS

This application claims the benefit of U.S. Provisional Application No. 62/831,171, filed Apr. 8, 2019, which disclosure is incorporated herein by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This application generally relates to digital microfluidic (DMF) apparatuses and methods. In particular, the systems, apparatuses and methods described herein are directed to air-gap DMF apparatuses that include a cartridge including the air matrix and ground electrodes and a durable component including the drive electrodes.

BACKGROUND

Digital microfluidics (DMF) has is a powerful preparative technique for a broad range of biological and chemical applications. DMF enables real-time, precise, and highly flexible control over multiple samples and reagents, including solids, liquids, and harsh chemicals, without need for pumps, valves, or complex arrays of tubing. DMF may be referred to as (or may include) so-called electrowetting-on-demand (EWOD). In DMF, discrete droplets of nanoliter to microliter volumes are dispensed from reservoirs onto a planar surface coated with a hydrophobic insulator, where they are manipulated (transported, split, merged, mixed) by applying a series of electrical potentials to an array of electrodes. Complex reaction series can be carried out using DMF alone, or using hybrid systems in which DMF is integrated with channel-based microfluidics.

It would be highly advantageous to have a high-throughput air-matrix DMF apparatuses (e.g., devices and/or systems) which can perform multiplexed assays and/or sample preparations on multiple cartridges of the same or different configurations currently. An apparatus including a DMF apparatus integrated with a robotic arm and liquid handling subsystem capable of running workflows on one or more cartridges disposed on a DMF electrode array may provide reliable and cost-effective sample processing. The high-throughput air-matrix DMF apparatus employs disposable cartridges, which are inexpensive to manufacture and provide flexible configurations, as needed. Described herein are methods and apparatuses, including systems and devices, which may address these issues.

SUMMARY OF THE DISCLOSURE

Described herein are high-throughput digital microfluidic (DMF) methods and apparatuses (including devices and systems, such as cartridges, DMF readers, etc.). Although the methods and apparatuses described herein may be specifically adapted for air matrix DMF apparatuses (also referred to herein as air gap DMF apparatuses), these methods and apparatus may be configured for use in other DMF apparatuses (e.g., oil gap, etc.). The methods and apparatuses described herein may be used to handle relatively larger volumes than have been possible with traditional DMF apparatuses, in part because the air gap of the DMF apparatus may be larger (e.g., greater than 280 micrometers, 300 micrometers or more, 350 micrometers or more, 400 micrometers or more, 500 micrometers or more, 700 micrometers or more, 1 mm or more, etc.). In addition, any of the apparatuses and methods described herein may be configured to include or to work with one or more disposable cartridges that have a dielectric layer forming the bottom of the cartridge; the driving electrodes do not have to be a part of the cartridge. These apparatuses may be adapted to allow the dielectric to be securely held to the electrodes during operation, which has proven very challenging, particularly when the dielectric layer is slightly flexible. The term "cartridge" may refer to a container forming the region in which the droplet moves by electrowetting forces, which may include the air gap, and may be inserted into a DMF reading/driving apparatus. The cartridge may be disposable (e.g., single use or limited use). The cartridge may be a two-plate cartridge (e.g., having a top and a bottom plates forming surfaces) or a one-plate cartridge (having a bottom plate/surface that is open on the top). The cartridge may be configured to allow visualization of fluid (droplets) in the air gap.

The larger air gap of the apparatuses described herein may be provided by use of a two-plate cartridge where the separation between the plates form the air gap. Alternatively, the larger air gap may be provided by use of a one-plate cartridge, having only the bottom dielectric layer overlaying the electrode array of the DMF apparatus. Finally, the apparatuses and methods described herein may provide multiplexed capabilities, which may be easier and faster to use. The apparatuses may include a more efficient and intuitive user interface as well as the ability to create, modify, store, and/or transfer a large variety of microfluidics control protocols.

For example, a two-plate cartridge for a digital microfluidics (DMF) apparatus may have a bottom and a top, and may include: a sheet of dielectric material having a first side and a second side, the first side forming an exposed bottom surface on the bottom of the cartridge, wherein at least the second side of the sheet of dielectric material comprises a first hydrophobic surface; a top plate having first side and a second side; a ground electrode on first side of the top plate. The ground electrode may comprise a grid pattern forming a plurality of open cells. The cartridge may also include a second hydrophobic surface on the first side of the top plate covering the ground electrode; and an air gap separating the first hydrophobic layer and the second hydrophobic layer, wherein the air gap comprises a separation of greater than 280 micrometers (e.g., greater than 300 micrometers, greater than 400 micrometers, etc.). The top plate may be formed of any appropriate material, including in particular, clear or transparent materials, (e.g., an acrylic, etc.).

The top plate of the two-plate cartridge may include one or more ports or openings into the air gap, which may provide a fluidic input or fluidic output for access by a liquid handling tip of the robotic arm/liquid handling subsystem.

In any of the two-plate cartridges described herein the top plate may include a plurality of cavities within the thickness of the top plate; these cavities may be closed (e.g., sealed) and/or filled with a thermally insulating material having a low thermal mass and low thermal conductivity. In some variations, the insulating material comprises air. The cavities may be positioned over the air gap regions that will correspond to heating and/or cooling regions (e.g., thermally controlled regions); the lower thermal mass in these regions may allow for significantly more rapid heating/cooling of a droplet in the air gap under the cavity/cavities. The thickness of the top plate in these regions may therefore include the cavity; the cavity bottom (corresponding to the bottom surface of the top plate) may be less than 1 mm thick (e.g., less than 0.9 mm, 0.8 mm, 0.7 mm, 0.6 mm, 0.5 mm, 0.4 mm, 0.3 mm, 0.2 mm, 0.1 mm, 90 microns, 80 microns, 70 microns, 60 microns, 50 microns, 40 microns, 30 microns, etc.). The cavity bottom may preferably be as thin as possible while providing structural support for the electrode and any dielectric coating on the bottom surface of the top plate. The cavity upper surface may be substantially thicker (e.g., 1.5×, 2×, 3×, 4×, 5×, etc.) than the cavity bottom surface.

Alternatively, a one-plate cartridge may be used in the high-throughput DMF apparatuses and methods described herein. A one-plate cartridge may be formed similarly to the two-plate cartridge, while having no upper plate. The one-plate cartridge also may have no integral electrode grid, and may be operated in a one-sided electrowetting mode on the DMF apparatuses.

In either of the one-plate cartridge or two-plate cartridge, dielectric material forming the bottom surface may be made hydrophobic (e.g., by coating, including dip-coating, etc., impregnating with a hydrophobic material, etc.) and/or it may itself be hydrophobic. For example, the bottom surface (e.g., the bottom surface of a cartridge) may be formed of a film that is both a dielectric and a hydrophobic material. For example, the bottom surface may be a Teflon film (which may include an adhesive or an adhesive portion, such as a Teflon tape) that is both hydrophobic and acts as a dielectric. Other films may include plastic paraffin films (e.g., "Parafilm" such as PARAFILM M). However, in particular, films (such as Teflon films) that are able to withstand a high temperature (e.g., 100 degrees C. and above) are preferred.

In any of the cartridges described herein, the sheet of dielectric material may be flexible. This flexibility may be helpful for securing the dielectric to the drive electrodes to ensure complete contact between the dielectric and the drive electrode(s). Typically, the sheet of dielectric material may be sufficiently compliant so that it may bend or flex under a relatively low force (e.g., 50 kPa of pressure or more). The sheet of dielectric may be any appropriate thickness; for example, the sheet may be less than 30 microns thick (e.g., less than 20 microns thick, etc.).

As mentioned, the sheet of dielectric material may be flexible, and may form the bottom-most surface of the cartridge. The sheet may generally be flat (planar) through it may be flexible. The outer surface may be protected with a removable (e.g., peel-off) cover. The dielectric properties may be those generally consistent with a DMF (and particularly an air-matrix DMF) apparatus. The dielectric may be coated on the inner (second) side with the first hydrophobic layer. The hydrophobic layer may be a coating of a hydrophobic material that is relatively inert (e.g., non-reactive with the aqueous droplets that are moved in the air gap).

Any of the two-plate cartridges may also include a window from the top of the cartridge to the air gap through which the air gap is visible. This may allow imaging into the air gap. A one-plate cartridge offers imaging anywhere within the one-plate cartridge. This imaging may be used to detect output (e.g., reaction outputs, such as binding, colorimetric assays, RT-PCR, etc.). Additionally, the window of a two-plate cartridge or the open air gap of a one-plate cartridge may afford access for photoactivation of a reagent present in a droplet within the cartridge. The window may be any appropriate size; for example, the window may form between 2 and 50% of the top of the cartridge. The window may be on one side of the cartridge and/or at one end of the cartridge. Multiple imaging windows may be used. Alternatively, the top plate of a two-plate cartridge may be transparent or substantially translucent, permitting imaging through the top plate.

A cartridge may include one or more reagent reservoirs. For example, the cartridge, in either a reservoir or within the air gap, may include one or more reagents, including in particular lyophilized (e.g., "freeze dried") reagents. For example, a two-plate cartridge may include one or more freeze-dried reagent reservoirs on the second side of the top plate. Alternatively, a two-plate cartridge or a one-plate cartridge may include one or more freeze-dried reagent reservoirs on the bottom plate of the cartridge.

Also described herein are DMF apparatuses for use with any of the cartridges described herein to perform assays on them, including detecting outcomes of the assays. These apparatuses may be referred to herein as DMF driver apparatuses. For example, the DMF driver apparatuses may be configured to apply a vacuum across the dielectric bottom surface of a cartridge (and in particular a subset of the ports underlying a particular cartridge or multiple cartridges) so that the electrodes are in uniformly intimate contact with the dielectric forming each of the unit cells form moving a droplet of fluid within the air gap. The applicant have surprisingly found that simply adhesively securing the dielectric material to the electrodes is not sufficient, as it result in un-equal contact and variations in the power required to move droplets as well as inefficiencies in droplet movement, control and consistency. Further, the use of vacuum, even in combination with an adhesive, has similar problems, particularly when the dielectric is flexible. Described herein are apparatuses and methods of using them in which a vacuum is used to secure the dielectric bottom of a cartridge through a plurality of openings within the drive electrodes themselves, or surrounding/immediately adjacent to the drive electrodes. In variations in which the vacuum is applied through all or the some of the drive electrodes (e.g., spaced in a pattern on the seating surface, e.g., at the corners), the dielectric is consistently held onto the drive electrodes in a uniform manner, even when using a relatively low negative pressure for the vacuum. This configuration may also allow the formation of partitions or barriers within the cartridge by including protrusions on the cartridge-holding surface (onto which the cartridge is held).

In particular, described herein are digital microfluidic (DMF) apparatuses that control and drive movement of one or more droplets across one or more, and in particularly a plurality of DMF cartridge, concurrently. As used herein concurrently driving electrowetting and other reactions in multiple different cartridges (or in some variations within a single cartridge) may include simultaneous operation of electrowetting operations (DMF control) in multiple different cartridges and/or within a single cartridge, or sequential operation of electrowetting operations in multiple different cartridges and/or within a single cartridge, e.g., by rapidly cycling through multiple different operations.

For example described herein are digital microfluidics apparatuses that include: a seating surface configured to concurrently seat one or more cartridges; a plurality of drive electrodes disposed on the seating surface, wherein the driving electrodes are configured to apply a voltage to move a droplet within a cartridge when the cartridge is seated on the seating surface; a plurality of vacuum ports distributed across the seating surface; a vacuum control configured to selectively apply vacuum through a subset of the vacuum ports under the one or more cartridges seated on the seating surface when the one or more cartridges are seated on the seating surface; an electrical control for applying energy to the drive electrodes to move a droplet within an air gap of the one or more cartridges when the one or more cartridges are seated on the seating surface; and a liquid handling subsystem for dispensing or removing liquid to the one or more cartridges when the one or more cartridges are seated on the seating surface.

In general, any of these apparatuses (e.g., systems, devices, etc.) may include a robotic arm. For example, the liquid handling subsystem may comprise a robotic arm. The liquid handling subsystem may include a liquid handling head and at least one liquid handling tip. In some variations, the liquid handling head is configured to dispense or withdraw volumes of about 1 microliter to about 100 milliliters.

In any of these apparatuses, the vacuum control may further comprise a vacuum pump for applying a vacuum to the plurality of vacuum ports. In any of these variations, the vacuum ports of the plurality of vacuum port may each be coupled to an opening through a drive electrode of the plurality of drive electrodes. The vacuum control may be configured to determine which vacuum ports underlie the one or more cartridges. The vacuum control may further comprise a manifold and a plurality of valves.

The plurality of drive electrodes may comprises between about 408 to about 20,000 drive electrodes.

In general, any of these apparatuses may include a master control subsystem for coordinating activation of the plurality of driving electrodes, the plurality of vacuum ports and the liquid handling subsystem. In some variations, the vacuum control and/or the electrical control may be part of the master control subsystem, or may be coupled to the mater control subsystem and/or to each other. The master control subsystem may include non-transitory instructions for controlling the plurality of vacuum ports, the plurality of drive electrodes, and the liquid handling subsystem. The master control subsystem may be configured to concurrently move droplets the air gaps of the two or more cartridges when the cartridges are loaded onto the seating surface.

The apparatuses described herein may also include one or more temperature-controlled regions within the driving electrode array. Alternatively or additionally, any of these apparatuses may include one or more magnetic control regions within the driving electrode array, each comprising a magnet configured to deliver a magnetic field.

In general, these digital microfluidic apparatuses may include one or more cartridge alignment features on the seating surface.

Also described herein are methods, including methods of operating any of these apparatuses. For example, described herein are methods of selectively immobilizing one or more cartridges in a digital microfluidics apparatus having a plurality of driving electrodes, the method comprising: disposing one or more cartridges on a seating surface of a digital microfluidics apparatus, thereby creating one or more respective seating locations of the one or more cartridges, wherein each of the one or more cartridge sits on a sub-region of the seating surface; sensing each respective seating locations of the one or more cartridges; determining a sub-set of the plurality of driving electrodes underlying the respective seating locations of the one or more cartridges; selectively applying a vacuum to the respective seating locations of the one or more cartridges to immobilize the one or more cartridges to the seating surface of the digital microfluidics apparatus.

Selectively applying the vacuum may include applying vacuum through a sub-set of vacuum ports underlying the respective seating locations. In some variations, applying vacuum may include applying vacuum through an opening through all or some of the driving electrode underlying the respective seating locations. Sensing each respective seating locations may include sensing an electrical difference in the plurality of driving electrodes underlying the respective seating locations. Alternatively or additionally, sensing each respective seating locations may include sensing a resistance to airflow through a subset of vacuum ports on the seating surface in the respective seating locations.

Each of the one or more cartridges may comprise a bottom plate configured to deform when vacuum is applied, thereby adhering to the seating surface.

In some variations, each respective seating locations of the one or more cartridges may have a respective area corresponding to a size of each cartridge. At least one of the one or more cartridges may have a size that is different from others of the one or more cartridges.

For example, described herein are digital microfluidics (DMF) driver apparatuses configured to operate with one or more cartridges having a bottom dielectric surface, an optional top plate with a ground electrode, and an air gap (between the bottom dielectric and the top plate (in the instance of a two-plate cartridge), the apparatus comprising: a seating surface for seating the one or more cartridges; a plurality of drive electrodes on the seating surface, wherein each drive electrode comprises an opening therethrough; a vacuum pump for applying a vacuum to the vacuum ports; a control for applying energy to sequentially activate and de-activate one or more selected drive electrodes to move a droplet within the air gap of the cartridge along a desired path within the air gap, wherein the DMF apparatus is configured to apply the vacuum to the vacuum manifold to secure each drive electrode to the bottom dielectric of the disposable cartridge when the disposable cartridge is placed on the seating surface; and a robotic arm and a liquid handling subsystem.

In some variations, the apparatus includes a vacuum manifold that couples the vacuum pump to a plurality of vacuum ports for applying a vacuum.

The DMF driver apparatuses described herein may be configured to operate with any of the cartridges described herein, and may be adapted for use with such cartridges. However, it should be understood that cartridges are not a necessary part of the DMF driver apparatus. In general, these apparatuses may operate with one or more cartridges (e.g., reusable or disposable cartridges) that have a bottom dielectric surface, an optional top plate with a ground electrode, and a gap (e.g., typically but not necessarily an air gap, and in the case of a two-plate cartridge, the air gap is disposed between the bottom dielectric and the top plate).

The DMF driver apparatuses may also generally include a seating surface for seating the one or more cartridges. The seating surface may have a width of about 50, 60, 70, 90, 100, 150, 200, 250, 400, 500, 600, 700, 780, or about 800 millimeters, or a width having any value therebetween. The seating surface may have a length of about 80, 100, 110, 150, 200, 400, 600, 800, 1000, 1300, 1500, 1750, 1800, 2000, 2050, or about 2100 millimeters. The seating surface may include the drive electrodes, which may be flush or substantially flush with the seating surface, and/or any protrusions that may be used to form a partition within the gap region (e.g., air gap) of the cartridge by predictably deforming the dielectric into the gap region. The plurality of drive electrodes on the seating surface may be formed on the seating surface or milled into the seating surface. For example, the seating surface may be a substrate such as a printed circuit board (e.g., an electrically insulating surface), onto which the drive electrodes are attached or formed. There may be about 300, 400, 500, 600, 800, 900, 1000, 1500, 2000, 5000, 10,000, 20,000, 30,000, 40,000, 50,000, 60,000, or about 70,000 drive electrodes.

In general, as mentioned above, all or a majority of the drive electrodes in the electrode array, e.g., >50%, >60%, >70%, >80%, >90%, >95%, etc.) may include an opening that passes through the drive electrode and connects to the vacuum source. The vacuum source may be a vacuum manifold that connects these openings through the drive electrodes to a source of vacuum, such as a vacuum pump that is part of the apparatus, or a separate vacuum pump that is connected (e.g., wall vacuum) to the apparatus. The openings through the electrodes may be the same sizes, and they may be located anywhere on/through the drive electrodes. For example, they may pass through the centers of the drive electrodes, and/or through an edge region of the drive electrodes, etc. The openings may be any shape (e.g., round, oval, square, etc.). In some variations, the size of the openings may be about 1 mm in diameter (e.g., 1.2 mm diameter, 1.1 mm diameter, 1.0 mm diameter, 0.9 mm diameter, 0.8 mm diameter, etc.).

Typically, the vacuum manifold may be coupled to and/or may include a plurality of vacuum ports that each couple to one (or in some variations, more than one) of the openings in the drive electrodes. The vacuum manifold may be located beneath the seating surface. For example, a vacuum manifold may be tubing or other channels beneath the seating surface that connects to the openings in the drive electrodes.

The amount of negative pressure (vacuum) applied by the vacuum manifold to retain the cartridge(s) may be adjusted, selected and/or adapted to prevent deforming the film (and therefore the bottom surface of the air gap) of each cartridge. The apparatus may apply vacuum only to retain cartridges where the cartridges are present, and may avoid applying vacuum to region where a cartridge may be seated but is not currently seated. This may also help maintain pressure for retaining cartridges that are seated in the DMF reader apparatus. For example, the pressure may be maintained between −0.5 inches mercury (in Hg) and −25 in Hg (e.g., between a lower limit of about −0.5, 1, 1.5, 2, 2.5, 3, 3.5, 4, 4.5, 5, 5.5, 6, 6.5, 7, 8, 9, 10, 11, 12, 13, 14, 15, etc., in Hg and an upper limit of about 5, 6, 7, 8, 9, 10, 11, 12, 13, 14, 15, 16, 17, 18, 19, 20, 21, 22, etc. in Hg, including, e.g., less than about 4 in Hg, less than about 5 in Hg, less than about 6 in Hg, less than about 7 in Hg, less than about 8 in Hg, less than about 9 in Hg, less than about 10 in Hg, less than about 12 in Hg, less than about 15 in Hg, less than about 17 in Hg, less than about 19 in Hg, less than about 20 in Hg, less than about 22 in Hg, etc.).

A high throughput DMF apparatus may therefore include a robotic arm and liquid handling subsystem (or a liquid handling subsystem including a robotic arm). The robotic arm may be a three axis robotic arm, permitting access to any position on the seating surface. The robotic arm may further include a metal probe configured to electroporate a biological cell within a droplet within at least one of the one or more cartridges seated on the seating surface. The robotic arm may be fully integrated into the process of controlling operations in the DMF driver apparatus, including dispensing, mixing, adding, removing, reacting and otherwise engaging with the fluid in the one or more cartridges. In some variations, the robotic arm is part of the liquid handling subsystem or may be separate from it. The term "robotic arm" is intended to be used broadly here as any mechanical positioning subsystem that may operate within 3D space.

The liquid handling subsystem may further include a liquid handling head. The liquid handling head may be configured to dispense and/or remove any appropriate volume (e.g., volume from about 1 microliter to about 100 microliters) through one or more liquid handling tips. Thus, the liquid handling subsystem may further include at least one liquid handling tip. The liquid handling subsystem may further include a plurality of liquid handling tips such as 4, 8, 12, or 96 liquid handling tips. The liquid handling subsystem may deliver or withdraw a droplet of liquid from within the one or more cartridges seating upon the seating surface. The liquid handling subsystem may deliver or withdraw a droplet of liquid via a fluidic input or output (e.g., a port) on the top plate of a two-plate cartridge. The liquid handling subsystem may deliver or withdraw a droplet of liquid from any location within the one-plate cartridge, through the air gap. The liquid handling subsystem may further include a reagent/sample storage subsystem, which may be temperature-controlled. The reagent/sample storage subsystem may further include a wellplate containment region, which may contain any of a 24 well, 48 well, 96 well and 384 well wellplate. The liquid handling subsystem may retrieve a reagent or a sample from the reagent/sample storage subsystem and deliver the reagent or sample to one or more of the cartridges. The sample may contain a biological cell. The liquid handling subsystem may further withdraw a product droplet from one or more cartridges and dispose the product droplet into a well of the wellplate in the wellplate containment region.

The high throughput DMF apparatuses may include an enclosure surrounding the DMF electrode array and seating surface, the robotic arm and liquid handling subsystem, where the enclosure controls one or more of humidity, temperature and gaseous environments.

The DMF driver apparatuses described herein may include a master controller for coordinating the electrode array and the robotic arm/liquid handling subsystem. The master controller may modulate the enclosure to modulate one of humidity, temperature or gaseous environment. This controller may include one or more processors, memory, and any other circuitry necessary or useful for operating the device, including coordinating the application of energy to activate/inactivate the drive electrodes, directing the robotic arm/liquid handling subsystem to dispense or withdraw a droplet; operating the pump(s) for vacuum and/or microfluidic control, one or more valves (e.g., for microfluidic control, vacuum control), temperature control (e.g., resistive heater, Peltier cooling, etc.), the motor(s) (e.g., for the robotic arm, liquid handling subsystem, the optics, etc.), one or more displays, etc.

As mentioned, any of these devices may include one or more projections extending from the seating surface, wherein the one or more projections are configured to form partitions in the air of the cartridge when the vacuum is applied through the openings in the drive electrodes.

Any of these apparatuses may include an optical subsystem. The optical subsystem may include one or more illumination sources, e.g., visible, infrared, and/or ultraviolet illumination sources for visualization and excitation light sources. The optical subsystem may further include an imaging device configured to detect an optical signal from a cartridge seated on the seating surface. The optical subsystem may be movable or fixed. The optical subsystem may be used to detect (e.g., sense) a feed or change due to one or more interactions (e.g., binding, enzymatic reactions, etc.) in the droplet. The optical subsystem can be configured to detect an optical signal from a cartridge seated on the seating surface. Thus, the optical sensor(s) may provide a detection of a readout from the apparatus. Any of these devices may include one or more motors, e.g., configured to move the optical apparatus. In some variations, the optical subsystem may be coupled to or included as part of the robotic arm.

The apparatuses described herein may also include one or more temperature sensors (e.g., thermistors, etc.). For example, the device may include one or more temperature sensors coupled to the seating surface. In some variations, the thermistor may project from the seating surface and form a barrier or chamber within the air gap of the cartridge. Alternatively or additionally, the one or more temperature sensors may be within the substrate of the seating surface and in thermal contact with the seating surface, e.g., via a thermally conductive material, such as copper.

As mentioned, the devices described herein may include one or more heaters, including in particular resistive heaters. For example, the device may include a resistive heater underlying (or overlying) at least some of the drive electrodes; this may allow for temperature-regulated sub-regions of the apparatus. The entire driving electrode surface may also be cooled (e.g., by circulation of a cooling fluid) to slightly below room temperature (e.g., between 15 degrees C. and 25 degrees C., between 15 degrees C. and 22 degrees C., between 15 degrees C. and 20 degrees C., between 15 degrees C. and 18 degrees C., etc.).

The apparatus may also include one or more magnets above or underneath one or more of the drive electrodes configured to be activated to apply a magnetic field. Thus, magnetic beads may be used for binding material or other reactions within the DMF apparatus, and the magnetic beads may be selectively held within one or more regions of the device. For example, one or more neodymium magnets may be used, e.g., by moving the magnet closer or farther from the cartridge to hold magnetic particles in position (e.g., moving it up towards the electrodes by 3 mm, 4 mm, 5 mm, 6 mm, 7 mm, 8 mm, etc.). An electromagnet may be selectively activated or deactivated to hold/release magnetic particles. The robotic arm may include one or more magnets for selectively applying a magnetic field.

Any of the apparatuses described herein may also include one or more Peltier coolers underlying at least some of the drive electrodes configured to cool to 10 degrees C. or less (e.g., 5 degrees C. or less, 7 degrees C. or less, 11 degrees C. or less, 12 degrees C. or less, 15 degrees C. or less, 20 degrees C. or less, etc.).

In general, any of these devices may include an outer housing, a front panel display, and one or more inputs (such as a touchscreen display, dial, button, slider, etc.), and/or a power switch. The apparatus may be configured to operate in conjunction with a one or more other DMF apparatuses. In some variations, a single housing may enclose multiple cartridge seating surfaces, each having a separately addressable/controllable (by a single or multiple controllers) drive electrode arrays, allowing parallel processing of multiple cartridges; in these variations, all of some of the components (pumps, motors, optical subsystems, controller(s), etc.) may be shared between the different cartridge seating surfaces.

Any of these devices may include an output configured to output signals detected by the device. The output may be on one or more displays/screens, and/or they may be electronic outputs transmitted to a memory or remote processor for storage/processing and/or display. For example, any of these apparatuses may include a wireless output.

Also described herein are methods of preventing or reducing evaporation in any of these apparatuses. For example, described herein are methods of preventing droplet evaporation within an air-matrix digital microfluidic (DMF) apparatus, the method comprising: introducing an aqueous reaction droplet into an air gap of the air-matrix DMF apparatus which is formed between a first plate and a second plate of the air-matrix DMF apparatus; sequentially energizing driving electrodes on or in the first plate to move the aqueous reaction droplet within the air gap of the air-matrix DMF apparatus so that it combines with a droplet of nonpolar fluid within the air gap of the air-matrix DMF apparatus, forming a coated reaction droplet in which that the nonpolar fluid coats the aqueous reaction droplet and protects the reaction droplet from evaporation; and sequentially energizing the driving electrodes to move the coated reaction droplet within the air gap of the air-matrix DMF apparatus.

The volume of the nonpolar fluid may be less than the volume of the aqueous reaction droplet. Any of these methods may include combining, within the air gap of the air-matrix DMF apparatus, the coated droplet with one or more additional aqueous droplets. Any of these methods may also include removing the coating of nonpolar fluid by at least partially withdrawing the coated droplet out of the air gap of the air-matrix DMF apparatus into a microfluidic channel. The method may also include adding the droplet of nonpolar fluid into the air gap of the air-matrix DMF apparatus through an opening in the first or second plate. Generally, the droplet of nonpolar fluid may be liquid at between 10 degrees C. and 100 degrees C.

For example, a method of preventing droplet evaporation within an air-matrix digital microfluidic (DMF) apparatus may include: introducing an additional aqueous material into the aqueous reaction droplet into an air gap of the air-matrix DMF apparatus, including from the robotic arm, and/or fluid dispensing subsystem.

The methods and apparatuses described herein may be particularly well suited for the use with large-volume droplets and processing. Typically, most unit droplets of DMF apparatuses, and particularly air-matrix DMF apparatuses, are limited to about 4 microliters or less of aqueous fluid, and the air gap is limited to less than about 250 or 300 micrometers separation between the driving electrodes and the ground electrode (top and bottom plates of the air gap region). Described herein are methods of operating on larger volumes, in which the separation between the drive electrodes (e.g., bottom plate) and the ground electrodes (e.g., top plate) may be much larger (e.g., between about 280 micrometers and 3 mm, between about 300 micrometers and 3 mm, between about 400 micrometers and 1.5 mm, e.g., between 400 micrometers and 1.2 mm, etc., or 400 micrometers or more, 500 micrometers or more, 1 mm or more, etc.). Thus, the unit droplet size (the droplet on a single unit cell driven by a single drive electrode may be much larger, e.g., 5 microliters or more, 6 microliters or more, 7 microliters or more, 8 microliters or more, 9 microliters or more, 10 microliters or more, 11 microliters or more, 12 microliters or more, 13 microliters or more, 14 microliters or more, 15 microliters or more, etc., e.g., between 5-20 microliters, between 5-15 microliters, between 7 and 20 microliters, between 7 and 15 microliters, etc.).

Dispensing large droplets using electrowetting is routinely done with smaller volume (e.g., less than 5 microliters), however, dispensing larger volumes as a single unit has proven difficult, particularly with a high degree of accuracy and precision. Described herein are methods of dispensing a predetermined volume of liquid using electrowetting. For example, described herein are methods of dispensing a predetermined volume of fluid into an air gap of an air-matrix digital microfluidics (DMF) apparatus, wherein the air gap is greater than 280 micrometers (e.g., 300 micrometers or more, 400 micrometers or more, etc.) wide, further wherein the DMF apparatus comprises a plurality of driving electrodes adjacent to the air gap, the method comprising: flooding a portion of the air gap with the fluid from a port in communication with the air gap; applying energy to activate a first driving electrode adjacent to the portion of the air gap that is flooded; and applying suction to withdraw the fluid back into the port while the first electrode is activated, leaving a droplet of the fluid in the air gap adjacent to the activated first electrode.

Applying energy to activate the first driving electrode may include applying energy to activate one or more driving electrodes that are contiguous with the first driving electrode, and further wherein applying suction to withdraw the fluid back into the port while the first driving electrode is activated comprises withdrawing the fluid while the first driving electrode and the one or more driving electrodes that are contiguous with the first driving electrode are active, leaving a droplet of the fluid in the air gap adjacent to the activated first driving electrode and the one or more driving electrodes that are contiguous with the first driving electrode.

The first driving electrode may be separated from the port by a spacing of at least one driving electrode. Any of these methods may further comprise inactivating one or more driving electrodes adjacent a second portion of the air gap that is within the flooded portion of the air gap, and that is between the port and the first driving electrode. The air gap may be greater than 500 micrometers.

Flooding the portion of the air gap may comprise applying positive pressure to expel fluid from the port. The method may further comprise sequentially energizing driving electrodes adjacent to the air gap to move the droplet within the air gap of the air-matrix DMF apparatus.

Applying suction to withdraw the fluid back into the port while the first electrode is activated may comprise leaving a droplet of the fluid having a volume that is 10 microliters or greater in the air gap adjacent to the activated first electrode.

For example, a method of dispensing a predetermined volume of fluid into an air gap of an air-matrix digital microfluidics (DMF) apparatus, wherein the air gap is greater than 280 micrometers wide (e.g., 300 micrometers or more, 400 micrometers or more, etc.) further wherein the DMF apparatus comprises a plurality of driving electrodes adjacent to the air gap, may include: flooding a portion of the air gap with the fluid from a port in communication with the air gap; applying energy to activate a first driving electrode or a first group of contiguous driving electrodes adjacent to the portion of the air gap that is flooded, wherein the first driving electrode or the first group of contiguous driving electrodes are spaced apart from the port by one or more driving electrodes that are not activated; and applying suction to withdraw the fluid back into the port while the first electrode or first group of contiguous electrodes are activated, leaving a droplet of the fluid in the air gap adjacent to the first electrode or first group of contiguous electrodes.

Also described herein are control systems for DMF apparatuses, such as those described herein. In particular, described herein are control systems including graphical user interfaces for operating any of these apparatuses. These control systems (subsystems) may include software, hardware and/or firmware. Thus, any of these apparatuses may be configured as instructions stored in a non-transient medium (e.g., memory) for performing any of them methods and procedures described herein.

For example, described herein are methods for controlling a digital microfluidics (DMF) apparatus, the method comprising: providing a graphical user interface comprising a menu of fluid handling control commands, including one or more of: move, heat, remove, cycle, wait, breakoff, mix and dispense; receiving a fluid handling protocol comprising user-selected fluid handling control commands; calculating a path for moving fluid within an air gap of the DMF apparatus based on the fluid handling protocol, wherein the path minimizes the amount of overlap in the path to avoid contamination; and executing the fluid handling protocol using the DMF apparatus based on the calculated path. As described in greater detail below, any of these methods may also or alternatively include controlling (as part of the master controller) the operation of the robotic arm in conjunction with the DMF and/or suction).

The fluid handling control commands may include at least one of: move, heat, remove, wait, and mix. For example, the fluid handling commands may include all: move, heat, remove, wait, and mix. A user may select icons corresponding to each of these commands, and may enter them in an order and/or may indicate incubation timing and temperature conditions. The apparatus may automatically determine the optimal path within the air-gap region of the cartridge in order to perform each of these steps (e.g., by moving the droplet(s) to the appropriate region of the cartridge including the heater, magnets, microfluidic ports, etc., so that the droplet(s) may be manipulated as required. For example, receiving the fluid handling protocol may comprise receiving a string of fluid handling control commands. Calculating the path may comprise calculating the path based on the arrangement of heating and cooling zones in the DMF apparatus. Calculating the path may comprise determining the shortest path that does not cross over itself. In general, executing the fluid handling protocol on the DMF apparatus may comprise executing the fluid handling protocol in a disposable cartridge coupled to the DMF apparatus.

Also described herein are digital microfluidics (DMF) apparatuses configured to operate with one or more removable and/or disposable cartridge having a bottom dielectric surface, a (optional) top plate with a ground electrode, and an air gap between the bottom dielectric and the top plate, the device comprising: a seating surface for seating the disposable cartridge on an upper surface; a first plurality of drive electrodes on the seating surface, wherein all or some of the drive electrodes comprises an opening therethrough; a thermal control for applying thermal energy to a first region of the seating surface; a plurality of thermal vias, wherein the thermal vias comprise a thermally conductive material and are in thermal communication with the first region of the seating surface but are electrically isolated from the subset of electrodes and further wherein the thermal vias are in thermal communication with the thermal control; a plurality of vacuum ports, wherein each vacuum port is coupled to one or more of the openings through the drive electrodes; a vacuum pump for applying a vacuum to the vacuum ports; and a control for applying energy to sequentially activate and de-activate one or more selected drive electrodes to move a droplet within the air gap of the cartridge along a desired path within the air gap.

As described in greater detail below, the seating surface may be configured to separately seat a plurality of different cartridges, including cartridges of different types and configurations.

The thermal vias may have any appropriate dimensions. For example, each thermal via may have a diameter of between about 0.5 and about 2 mm (e.g., between about 0.5 mm and about 1.8 mm, between about 0.5 mm and about 1.5 mm, between about 0.5 mm and 1.2 mm, between about 0.8 mm and 1.2 mm, etc.). Any number of thermal vias may be used per cell (e.g., there may be between about 5-15 thermal vias associated with a region corresponding to a single electrode in the first region).

The thermal vias may each be filled with a thermally conductive material; the material may be electrically conductive or electrically insulative. In some variations, the thermally conductive material is a metal. The DMF driver apparatus may further include one or more resistive heaters underlying at least some of the drive electrodes.

The seating surface may be formed or at least partially formed on a printed circuit board (PCB), including on an array of electrodes formed on the PCB. As mentioned above, any of the apparatuses described herein may include one or more magnets; in some variations, the magnet(s) may be underneath one or more of the drive electrodes configured to be activated to apply a magnetic field. For example, the magnetic field may pass through an opening in the drive electrode. The apparatus may include one or Peltier coolers underlying at least some of the drive electrodes configured to cool to less than 10 degrees C.

Also described herein are methods of detecting the location and/or identity of a material in an air gap of a digital microfluidics (DMF) cartridge. The material may include a droplet (e.g., aqueous droplet) a wax, a droplet coated/ensheathed in a wax (e.g., liquid wax), an oil droplet, a droplet with magnetic particles, etc. The identity may be determined for a material at a specific location in the air gap, e.g., between the upper and lower surfaces forming the air gap in the cartridge. The cartridge may be divided up into cells (e.g., regions above individual drive electrodes).

In the apparatuses and method described herein adjacent drive electrodes may be configured as a reference electrodes, even in variations in which the cartridge may include a reference electrode on, e.g., a top plate. Thus, the apparatuses described herein may not use a built-in reference electrode in the cartridge.

For example a method of detecting the location and/or identity may include: designating an electrode adjacent to a drive electrode as a reference electrode and disconnecting the reference electrode from a driving circuit; setting the voltage of one or more drive electrodes of an array of drive electrodes to a high voltage while setting all other drive electrodes of the array of drive electrodes to ground; sensing the voltage at the reference electrode; determining a capacitance based on the voltage sensed at the reference electrode; and identifying the material in the air gap adjacent to the one or more drive electrodes based on the determined capacitance.

The method may also include reconnecting the reference electrode to the driving circuit, and driving a droplet within the air gap by applying a voltage between the reference electrode and the drive electrodes. These steps may be repeated iteratively, to track movement of material in the air gap, and the various drive and reference electrodes (and grounded reference electrodes) may be changed to scan through the cartridge(s).

Disconnecting the reference electrode may comprise allowing the reference electrode to float (e.g., not ground). The reference electrode may be the entire upper electrode (on the first side of the air gap, opposite from the array of drive electrodes). Disconnecting the reference electrode from the drive circuitry (e.g., from the controller driving movement of a droplet in the air gap by digital microfluidics) may include connecting the reference electrode to sensing circuitry for detecting the voltage at the reference electrode and therefore the capacitance of the air gap. The reference circuitry may include on or more reference capacitors arranged to allow measurement of the air gap capacitance.

Setting the voltage of the one or more of drive electrodes to a high voltage may comprises setting the one or more of the drive electrodes to between 10 and 400V (e.g., between 100V and 500V, e.g., about 300V, etc.).

Any of these methods may include determining a total capacitance for the air gap. The method may further include determining the total capacitance using one or more reference capacitors connected to the reference electrode when the reference electrode is disconnected from the driving circuit. For example, determining the capacitance between the first side of the air gap and the second side of the air gap based on the voltage sensed at the reference electrode may further comprise using the total capacitance.

Identifying the material in the air gap may comprise using a reference database comprising a plurality of ranges of capacitance to identify the material in the air gap based on the determined capacitance.

Also described herein are cartridges (e.g., disposable and/or removable cartridges) for a digital microfluidics (DMF) apparatus that include a tensioning frame to keep the bottom dielectric material in tension and therefore flat. For example, any of the cartridge described herein may include: a sheet of dielectric material having a first side and a second side, the first side forming an exposed bottom surface on the bottom of the cartridge, wherein at least the second side of the sheet of dielectric material comprises a first hydrophobic surface; a tensioning frame holding the sheet of dielectric material in tension so that it is substantially flat. In the instance of a two-plate cartridge, the cartridge also includes a top plate having a first side and a second side and a thickness therebetween; a ground electrode on the first side of the top plate; a second hydrophobic surface on the first side of the top plate covering the ground electrode; and an air gap separating the first hydrophobic layer and the second hydrophobic layer, wherein the air gap comprises a separation of greater than 280 micrometers. Any of the other cartridge features described herein may be included with these cartridges.

Any of these cartridges may also include a lip extending at least partially (including completely) around, and proud of, the sheet of dielectric material. This lip may engage with a channel or trough on the seating surface. Alternatively or additionally, the cartridge may include a peripheral channel or trough into which a projection on the seating surface of the apparatus engages.

The tensioning frame may include an outer frame and an inner frame. The sheet may be held between the outer and inner frames. These cartridges may include any of the other cartridge features mentioned herein.

In a first aspect, a digital microfluidics apparatus is provided, the apparatus including: a seating surface configured to concurrently seat one or more cartridges; a plurality of drive electrodes disposed on the seating surface, where the driving electrodes are configured to apply a high voltage to move a droplet within a cartridge when the cartridge is seated on the seating surface, and where all or some of the drive electrodes includes an opening therethrough; a plurality of vacuum ports, where each vacuum port is coupled to one or more of the openings through the drive electrodes; a vacuum control configured to selectively apply vacuum through a subset of the vacuum ports under the one or more cartridges seated on the seating surface when the one or more cartridges are seated on the seating surface; an electrical control for applying energy to sequentially activate and de-activate one or more selected drive electrodes to move a droplet within an air gap of the one or more cartridges are seated on the seating surface; a vacuum pump for applying a vacuum to the plurality of vacuum ports; and a robotic arm and a liquid handling subsystem for dispensing or removing liquid to the one or more cartridges when the one or more cartridges are seated on the seating surface.

The digital microfluidics apparatus may be configured to seat one or more one-plate cartridges and/or two-plate cartridges. A mixture of both one-plate cartridges and two-plate cartridges may be used at the same time on the digital microfluidics apparatus.

In some embodiments, the apparatus may include about 408 to about 20,000 drive electrodes in the plurality of drive electrodes on the seating surface. In some embodiments, the robotic arm of the apparatus may be a 3-axis robotic arm.

In some embodiments, the liquid handling subsystem may include a liquid handling head and at least one liquid handling tip. In some embodiments, the liquid handling subsystem may include a plurality of liquid handling tips. The liquid handling head may be configured to dispense or withdraw volumes of about 1 microliter to about 100 milliliters. In some embodiments, the liquid handling head is further configured to dispense a biological cell suspended in a liquid. In some embodiments, the at least one liquid handling tip may further be configured to mix fluids within a droplet within the one or more cartridges when the one or more cartridges are seated on the seating surface.

In various embodiments of the apparatus, the robotic arm may further include a metal probe configured to electroporate a biological cell within a droplet within the one or more cartridges when the one or more cartridges are seated on the seating surface.

In some embodiments, the apparatus may further include a master control subsystem for coordinating activation of the plurality of driving electrodes, the plurality of vacuum ports, the robotic arm and the liquid handling subsystem. In some embodiments, the master control subsystem may include non-transitory instructions for performing a method for controlling the plurality of vacuum ports and the plurality of drive electrodes, a method for controlling liquid handling or a combination thereof.

In various embodiments of the apparatus, the apparatus may further include one or more temperature-controlled regions within the driving electrode array. The temperature-controlled regions may be configured to heat and/or cool. In some embodiments, the apparatus may further include one or more regions within the driving electrode array, each including a magnetic field. In some embodiments, the apparatus may further include including one or more cartridge alignment features on the seating surface.

In another aspect, a method of selectively immobilizing one or more cartridges in a digital microfluidics apparatus having a plurality of driving electrodes is provided, the method including: disposing one or more cartridges on a seating surface of a digital microfluidics apparatus, thereby creating one or more respective seating locations of the one or more cartridges, wherein each of the one or more cartridge sits on a sub-region of the seating surface; sensing each respective seating locations of the one or more cartridges; determining a sub-set of the plurality of driving electrodes underlying the respective seating locations of the one or more cartridges; and selectively applying a vacuum to the respective seating locations of the one or more cartridges to immobilize the one or more cartridges to the seating surface of the digital microfluidics apparatus.

In some embodiments, each of the one or more cartridges may include a bottom plate configured to deform when vacuum is applied, thereby adhering to the seating surface. Each respective seating locations of the one or more cartridges may have a respective area corresponding to a size of each cartridge. In some variations, at least one of the one or more cartridges may have a size that is different from others of the one or more cartridges.

In another aspect, a method of coordinating droplet movement and liquid handling in a cartridge within a digital microfluidics apparatus is provided, the method including: disposing one or more cartridges on a seating surface of a digital microfluidics apparatus, thereby creating one or more respective seating locations of the one or more cartridges, where each of the one or more cartridge sits on a sub-region of the seating surface; sensing each respective seating locations of the one or more cartridges; determining a sub-set of the plurality of driving electrodes underlying the respective seating locations of the one or more cartridges; selectively applying a vacuum to the respective seating locations of the one or more cartridges to immobilize the one or more cartridges to the seating surface of the digital microfluidics apparatus; identifying a location of a fluidic input of each of the one or more cartridges; disposing a droplet from a liquid handling subsystem within each of the one or more cartridges via the respective fluidic input; and activating a first selected driving electrode underlying each of the one or more cartridges to drive each respective droplet to a respective second location within each of the one or more cartridges by electrowetting.

In some variations, each second location within the one or more cartridges may include a fluidic output.

In some variations, the method may further include withdrawing a respective droplet of fluid at each respective second location within the one or more cartridges, wherein withdrawing includes applying suction via the at least one liquid handling tip. In some embodiments, when the liquid handling subsystem includes a plurality of liquid handling tips, withdrawing the respective droplet of fluid may be performed in parallel.

In some variations, activating the at least first selected driving electrode of each respective region of the plurality of driving electrodes may further include grounding the first driving electrode to an adjacent second driving electrode of each respective region.

In another aspect, a method of concurrently operating a one-plate cartridge and a two-plate cartridge within a digital microfluidics apparatus having a plurality of driving electrodes is provided, the method including: disposing a one-plate cartridge at a first seating location upon a seating surface and a two-plate cartridge at a second seating location upon the seating surface; selectively immobilizing the one-plate cartridge and the two-plate cartridge to the seating surface of the digital microfluidics apparatus; identifying a first sub-set of the plurality of driving electrodes underlying the first seating location and a second region including a second sub-set of the plurality of driving electrodes underlying the second seating location; disposing, via a robotic arm, a first droplet from a liquid handling subsystem within the one-plate cartridge and a second droplet within the two-plate cartridge; and activating at least a first selected driving electrode of each respective sub-set to drive each respective droplet to a respective second location within each of the one or more cartridges by electrowetting.

In some variations, disposing the first droplet may include disposing through an air gap of the one-plate cartridge to any location within an inner surface of the cartridge. In some embodiments, disposing the second droplet within the two-plate cartridge may include disposing the second droplet through a port at one or more predefined locations on an upper plate of the two plate cartridge. In some variations, disposing the first droplet within the one-plate cartridge and disposing the second droplet within the two-plate cartridge may include disposing the first droplet and the second droplet substantially at a same time.

In some variations, activating the least the first selected driving electrode of each respective sub-set to drive each respective droplet to a respective second location may further include grounding the first selected driving electrode to an adjacent second driving electrode of each respective sub-set of the plurality of driving electrodes. In some embodiments, activating the least the first selected driving electrode of each respective sub-set to drive each respective droplet to a respective second location may be performed substantially at a same time.

In some variations, each respective second location may further include a fluidic output. In some variations, the fluidic output at the second location of the one-plate cartridge may include withdrawing a droplet through an air gap of the one-plate cartridge from any location within an inner surface of the cartridge; and further wherein the fluidic output at the second location within the two-plate cartridge may include a port at one or more predefined locations on an upper plate of the two plate cartridge.

In some variations, the method may further include withdrawing a respective droplet of fluid at each respective second location within the one-plate cartridge and the two-plate cartridge, wherein withdrawing includes applying suction via at least one liquid handling tip of the liquid handling subsystem. In some embodiments, when the liquid handling subsystem includes a plurality of liquid handling tips, withdrawing the respective droplet of fluid may be performed in parallel.

In another aspect, a digital microfluidics apparatus is provided including: a seating surface configured to concurrently seat one or more cartridges; a plurality of drive electrodes disposed on the seating surface, where the driving electrodes are configured to apply a high voltage to move a droplet within a cartridge when the cartridge is seated on the seating surface, and where all or some of the drive electrodes includes an opening there through; a plurality of vacuum ports, where each vacuum port is coupled to one or more of the openings through the drive electrodes; a vacuum control configured to selectively apply vacuum through a subset of the vacuum ports under the one or more cartridges seated on the seating surface when the one or more cartridges are seated on the seating surface; an electrical control for applying energy to sequentially activate and de-activate one or more selected drive electrodes to move a droplet within an air gap of the one or more cartridges are seated on the seating surface; a vacuum pump for applying a vacuum to the plurality of vacuum ports; a robotic arm and a liquid handling subsystem for dispensing or removing liquid to/from the one or more cartridges when the one or more cartridges are seated on the seating surface; and a master control for coordinating activation and deactivation of the one or more selected drive electrodes with dispensing or removal of liquid to/from the one or more cartridges when the one or more cartridges are seated on the seating surface.

In some embodiments, the liquid handling subsystem may further include a liquid handling head. In some embodiments, the liquid handling head may be configured to dispense a volume from about 1 microliter to about 100 microliters. In some embodiments, the liquid handling subsystem may further include at least one liquid handling tip. In some embodiments, the liquid handling subsystem may further include a plurality of liquid handling tips. In some embodiments, the robotic arm may be a three axis robotic arm.

In some embodiments, the master control may be configured to direct the robotic arm and liquid handling subsystem to dispense a droplet at a selected location within at least one of the one or more cartridges seated on the seating surface based at least in part on a location of each of the one or more cartridges seated on the seating surface. In some embodiments, the master control may be configured to direct the robotic arm and liquid handling subsystem to dispense a droplet at a selected location within at least one of the one or more cartridges seated on the seating surface based at least in part on a location of a pre-spotted reagent within at least one of the one or more cartridges seated on the seating surface. In some embodiments, the master control may be configured to direct the robotic arm and liquid handling subsystem to dispense a droplet at a selected location within at least one of the one or more cartridges seated on the seating surface based at least in part on whether the at least one of the one or more cartridges is a one-plate cartridge or a two-plate cartridge. When the at least one cartridge is a one-plate cartridge, the selected location may be any location within the one-plate cartridge and when the at least one cartridge is a two-plate cartridge, the selected location may be a location of a fluidic input/output port on the upper plate of the two-plate cartridge.

In some embodiments, the master control may be further configured to sequence mixing of the droplet by the liquid handling tip at the selected location within the at least one cartridge of the one or more cartridges seated on the seating surface. In some embodiments, the master control may be configured to select the one or more selected drive electrodes based in part on a location of each of the one or more cartridges seated on the seating surface. In some embodiments, the master control may be configured to select the one or more selected drive electrodes based in part on a location of a droplet within each of the one or more cartridges seated on the seating surface.

In some embodiments, the master control may be configured to sequence activation and deactivation of the one or more selected drive electrodes based in part on a location of each of the one or more cartridges seated on the seating surface. In some embodiments, the master control may be configured to sequence activation and deactivation of the one or more selected drive electrodes based in part on a location of a droplet within each of the one or more cartridges seated on the seating surface. In some embodiments, the master control may be configured to sequence activation and deactivation of the one or more selected drive electrodes based in part on detecting dispensing completion of a droplet within each of the one or more cartridges seated on the seating surface.

In some embodiments, the master control may be configured to sequence dispensing or withdrawal of a droplet to/from each of the one or more cartridges based at least in part on determining that the one or more selected drive electrodes in each of the one or more cartridges seated on the seating surface are not activated to drive a droplet during the dispensing or withdrawal of the droplet.

In some embodiments, the digital microfluidics apparatus may further include a temperature controlled reagent/sample storage subsystem.

In some embodiments, the master control may further be configured to identify and dispense a selected reagent or sample in a droplet to at least one of the one or more cartridges, when the one or more cartridges are seated on the seating surface. In some embodiments, the selected reagent or sample may be different for each of the one or more cartridges.

In some embodiments, the reagent/sample storage subsystem includes a wellplate containment region. In some embodiments, the wellplate containment region may be configured to contain any of a 24 well, 48 well, 96 well and 384 well wellplate. In some embodiments, the master control may further be configured to withdraw a sample from a well plate in the wellplate containment region when dispensing the sample in a droplet to at least one of the one or more cartridges, when the one or more cartridges are seated on the seating surface.

In some embodiments, the master control may further be configured to deliver a droplet to a well plate in the wellplate containment region when withdrawing a droplet from at least one of the one or more cartridges, when the one or more cartridges are seated on the seating surface.

In some embodiments, the robotic arm may further include a metal tip configured to electroporate a biological cell within a droplet at a location within one of the one or more cartridges, when the one or more cartridges are seated on the seating surface. In some embodiments, the master control may be configured to direct the robotic arm to deliver the metal tip to the location of the droplet within the cartridge. In some embodiments, the master control may be configured to schedule electroporation of a biological cell based at least in part on determining that the one or more selected drive electrodes in the cartridge are not activated to drive a droplet during the electroporation.

In another aspect, a system is provided including; a digital microfluidics apparatus, the apparatus including: a seating surface configured to concurrently seat one or more cartridges; a plurality of drive electrodes disposed on the seating surface, where the driving electrodes are configured to apply a high voltage to move a droplet within a cartridge when the cartridge is seated on the seating surface, and where all or some of the drive electrodes includes an opening there through; a plurality of vacuum ports, where each vacuum port is coupled to one or more of the openings through the drive electrodes; a vacuum control configured to selectively apply vacuum through a subset of the vacuum ports under the one or more cartridges seated on the seating surface when the one or more cartridges are seated on the seating surface; an electrical control for applying energy to sequentially activate and de-activate one or more selected drive electrodes to move a droplet within an air gap of the one or more cartridges are seated on the seating surface; a vacuum pump for applying a vacuum to the plurality of vacuum ports; and a robotic arm and a liquid handling subsystem for dispensing or removing liquid to the one or more cartridges when the one or more cartridges are seated on the seating surface. In some embodiments, the system further comprises an enclosure, where the enclosure controls one or more of humidity, temperature and gaseous environments.

In some embodiments, a seating location of the one or more cartridges upon the seating surface may not be pre-defined. In some embodiments, a size of the seating location for at least one of the one or more cartridges is not the same as a size of the seating location for another of the one or more cartridges.

In some embodiments, the digital microfluidics apparatus may be configured to seat one or more one-plate cartridges and/or two-plate cartridges.

In some embodiments, the liquid handling subsystem may include at least one liquid handling tip. In some embodiments, the liquid handling subsystem may include a plurality of liquid handling tips. In some embodiments, the at least one liquid handling tip or the plurality of liquid handling tips may further be configured to mix a droplet within at least one of the one or more cartridges seated on the seating surface.

In some embodiments, the liquid handling subsystem may include a liquid handling head. In some embodiments, the liquid handling head may be configured to dispense volumes of about 1 microliter to about 100 milliliters. In some embodiments, the liquid handling head may further be configured to dispense a biological cell suspended in a liquid.

In some embodiments, the robotic arm may be a 3-axis robotic arm. In some embodiments, the robotic arm may further include a metal probe configured to electroporate a biological cell within a droplet within at least one of the one or more cartridges seated on the seating surface.

In some embodiments, the system may further include a temperature controlled reagent/sample storage subsystem. In some embodiments, the reagent/sample storage subsystem may include a wellplate containment region. In some embodiments, the wellplate containment region may be configured to contain any of a 24 well, 48 well, 96 well and 384 well wellplate.

In some embodiments, the system may further include a master control subsystem configured to coordinate activation of the plurality of driving electrodes, the plurality of vacuum ports, the robotic arm and the liquid handling tip. In some embodiments, the master control subsystem may include non-transitory instructions for performing a method for controlling the plurality of vacuum ports and the plurality of drive electrodes, a method for controlling liquid handling or a combination thereof.

In some embodiments, the master control subsystem may further be configured to control at least one of the humidity, temperature and gaseous environments of the enclosure. In some embodiments, the master control subsystem may include non-transitory instructions for performing a method for controlling at least one of the humidity, temperature and gaseous environments of the enclosure.

In some embodiments, the system may further include an optical subsystem. In some embodiments, the optical subsystem may include an illumination source. In some embodiments, the illumination source may include one or more of a visible light source or an ultraviolet light source. In some embodiments, the optical subsystem may further include an imaging device configured to detect brightfield images, fluorescent images, or luminescent images. In some embodiments, the optical subsystem may be configured to control the one or more illumination sources and the imaging device when present.

In some embodiments, the optical subsystem may further be configured to communicate with a master control subsystem. In some embodiments, non-transitory instructions of the master control subsystem may further include instructions for sequencing activation of the driving electrodes and activation of liquid handling based upon imaging communications received from the optical subsystem. In some embodiments, the master control subsystem may further include non-transitory instructions for performing a method for controlling the optical sub-system. In some embodiments, the non-transitory instructions may include instructions for activating and deactivating brightfield and/or fluorescent illumination and/or capturing an image of a selected region of the seating surface of the digital microfluidic apparatus.

In some embodiments, the digital microfluidic apparatus may further include one or more regions within the driving electrode array, where the one or more regions further includes magnets. In some embodiments, the digital microfluidic apparatus may further include one or more regions within the driving electrode array including heating and/or cooling controllability. In some embodiments, the system may further include more than one digital microfluidic apparatus.

In yet another aspect, a method of operating a system including a digital microfluidics apparatus is provided, the method including: identifying, for each of one or more cartridges, a respective sub-set of driving electrodes underlying each of the one or more cartridges; determining, for each of the one or more cartridges, a plurality of associated ground electrodes adjacent to the respective sub-set of driving electrodes; selectively immobilizing each of the one or more cartridges on the seating surface of the digital microfluidic apparatus; and coordinating, for each of the one or more cartridges: determining a type of reaction to be performed in each of the one or more cartridges; dispensing a sample to each of the one or more cartridges, thereby forming a respective sample droplet within each of the one or more cartridges; dispensing one or more reagents/buffers to each of the one or more cartridges, thereby forming a respective reagent/buffer droplet within each of the one or more cartridges; optionally, driving the respective reagent droplet/sample droplet to a reaction location within each of the one or more cartridges; merging the respective sample droplet with its respective reagent droplet, thereby forming a respective reaction droplet within each of the one or more cartridges; performing the respective reaction in the respective reaction droplet, thereby forming a respective product droplet in each of the one or more cartridges; determining, when the respective reaction in the respective reaction droplet of the one or more cartridges is an assay, an assay result for the respective reaction droplet of the one or more cartridges; and exporting, when the respective reaction in the one or more cartridges is a sample preparation reaction, a respective product droplet.

In some variations, forming the respective reagent/buffer droplet may further include mixing the dispensed reagent/buffer with a pre-spotted reagent disposed at a selected location within the one or more cartridges. In some variations, forming the respective reaction droplet may further include mixing the sample droplet with a pre-spotted reagent disposed at a selected location within the one or more cartridges.

In some variations, when the system further includes one or more illumination sources, forming the respective reagent droplet or forming the respective reaction droplet may further include photoactivating a reagent within the respective reagent droplet or respective reaction droplet.

In some embodiments, dispensing the respective sample droplet, dispensing the respective reagent/buffer or withdrawing the respective product droplet may be performed when driving electrodes are not activated. In some embodiments, forming the respective sample droplet, the respective reagent/buffer droplet, the respective reaction droplet, or respective product droplet may be performed when driving electrodes are not activated. In some embodiments, forming the respective sample droplet may further include electroporating a biological cell within a sample droplet.

In some variations, performing the reaction may further include driving the respective reaction droplet to a respective reaction location within the one or more cartridges, wherein the respective reaction location includes magnets and/or temperature control.

In some variations, the method may further include modulating at least one of the temperature, humidity or gaseous environments.

In some variations, when the system includes a master control subsystem, coordinating a respective process including: determining, dispensing, mixing, merging, driving, performing a reaction, or exporting may be performed automatically. In some embodiments, coordinating the respective process for the one or more cartridges may be performed independently. In some variations, coordinating the respective process for the one or more cartridges may further include scheduling the robotic arm and/or liquid handling subsystem and scheduling the respective plurality of electrodes, thereby reducing a conflicting instruction for the robotic arm, liquid handling subsystem, and/or respective plurality of electrodes in the one or more cartridges.

In some variations, when the system includes an imaging device, scheduling the robotic arm and/or liquid handling subsystem and scheduling the respective plurality of electrodes for the one or more cartridges may further include receiving imaging information from the imaging device confirming completion of a previous respective process within the one or more cartridges. In some variations, when the system includes an imaging device, determining an assay result for the respective reaction droplet of the one or more cartridges may further include detecting a visible, fluorescent, or luminescent signal from the respective reaction droplet.

In some variations, when the system includes a master control subsystem, the master control system may modulate at least one of the temperature, humidity or gaseous environments of the enclosure.

In some variations, when the system further includes a reagent/sample storage subsystem including a wellplate containment region, exporting the respective product droplet may further include depositing the exported product droplet within a well of the wellplate.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1A is a schematic of one example of an air-matrix digital microfluidic (DMF) apparatus, from a top perspective view.

FIG. 1B shows an enlarged view through a section through a portion of the air-matrix DMF apparatus shown in FIG. 1A, taken through a thermally regulated region (thermal zone).

FIG. 1C shows an enlarged view through a second section of a region of the air-matrix DMF apparatus of FIG. 1A; this region includes an aperture through the bottom plate and an actuation electrode, and is configured so that a replenishing droplet may be delivered into the air gap of the air-matrix DMF apparatus from the aperture (which connects to the reservoir of solvent, in this example shown as an attached syringe).

FIG. 3A shows an example of a typical DMF arrangement, e.g., using a rigid cartridge; FIG. 3B shows an example of a DMF configuration in which the cartridge 315 is a disposable portion that does not include the electrodes but that is held onto the reusable electrodes by a plurality of localized vacuum ports (adjacent to or passing through the electrodes).

In FIG. 4A, 18 rows and 10 columns are shown; larger or smaller arrays may be used.

In FIG. 4B, a temperature sensor (e.g., thermistor) is shown.

In FIG. 5D, the vacuum is off, and the dielectric is not secured against the electrodes. The dielectric may wrinkle, and may include regions of poor contact, including poor electrical contact. By comparison, FIG. 5E shows the dielectric held against the electrodes by a plurality of openings through the electrodes, which holds the dielectric uniformly against the electrodes, and results in surprisingly uniform electrical properties between the removable cartridge and the electrodes.

In FIG. 6, the removable cartridge has been made transparent (a microfluidics region above the top plate, air-gap and dielectric forming the DMF portion of the cartridge has been made transparent). The different regions are indicated by different boxes, and may be distributed in a particular arrangement over the array. For example, in FIG. 6, seven of the electrodes are configured as magnetic regions 605, which can apply a local (to that electrode) magnetic force to retain a magnetic bead or particle within a droplet on the electrode. Eight of the peripheral regions (each spanning six electrodes) are configured as cooling zones, which may be in thermal contact with a Peltier device or other thermal cooling region. In addition, in FIG. 6, six 16-electrode regions on the left side are configured as cooling zones which may also be in thermal contact with the same or different Peltier device (e.g., holding them below 10 deg. C.). Two central heating zones (one spanning five electrodes, the other spanning 32 electrodes) are also included, and may be thermally cycled over the entire zone or over regions of the zone(s). Four optically read zones (each spanning four electrodes) are spaced apart from each other on the right side perimeter of the device. In general, the heating and/or thermally cycling regions are centrally located, apart from the peripheral cooling/storage regions. There may be overlap between the zones, such as the magnetic zones and the heating/cooling zones.

FIG. 6 also shows, in a transparent view, a microfluidics portion that may be formed above (and in the top plate, as described) the air gap. For example, in FIG. 6, the microfluidics portion 611 includes a pair of serpentine microfluidics channels 615, 616 that each connect to an opening (which may be regulated by a valve) into the air gap. The microfluidics portion may also include valves. In FIG. 6, the microfluidics channel also includes a pair of ports 617, 618 through which positive and/or negative pressure may be applied to modulate (along with any valves) the movement of fluid in the microfluidics region and (in some variations) into or out of the air gap. The microfluidics portion may also include one or more waste chambers 621.

The right side of the cartridge includes a window region, allowing optical viewing through the cartridge.

Figure 7A:
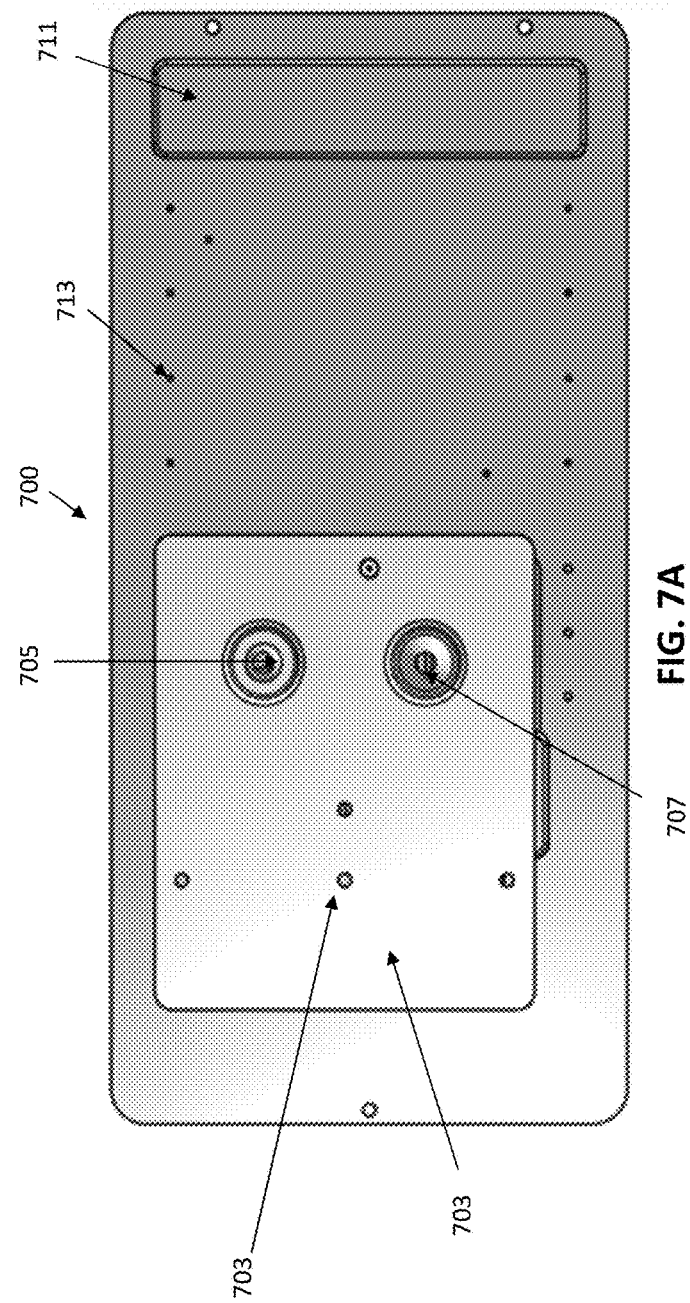
FIG. 7A is a top view of an exemplary cartridge as described herein. In this example, the cartridge includes a DMF portion, including a top plate and dielectric, separated by an air gap, and a microfluidics portion that connects into the air gap, and may externally connect to a channel input and/or output. Fluid may be applied into the cartridge through one or more openings into the air gap (shown as small openings) and/or through the channel input/outputs.
Figure 7B:
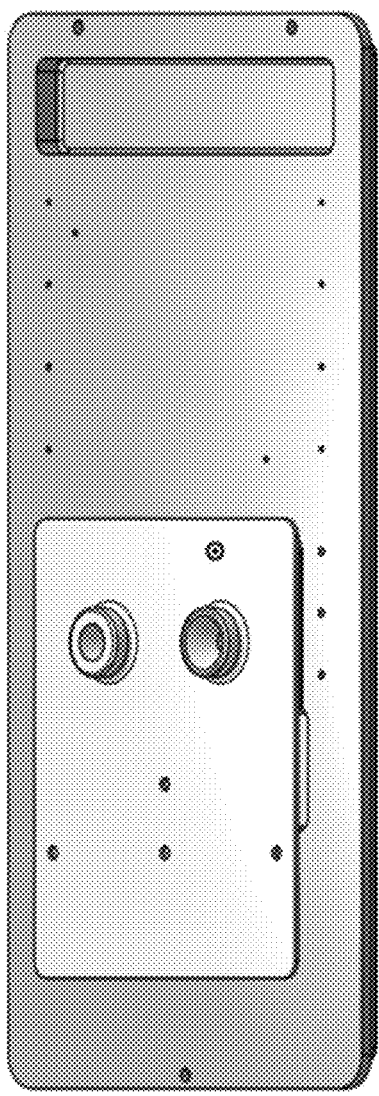

FIG. 7B shows a top perspective view of the cartridge of FIG. 7A.

Figure 7C:
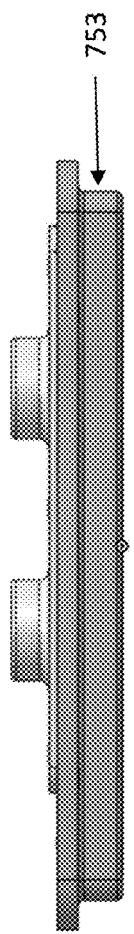

FIG. 7C is an end or side view from the left side of the cartridge of FIGS. 7A and 7B, showing the upper microfluidics channels and the lower DMF portion (showing the spacing between the top, ground, plate and the dielectric, forming the air gap.

Figure 7D:
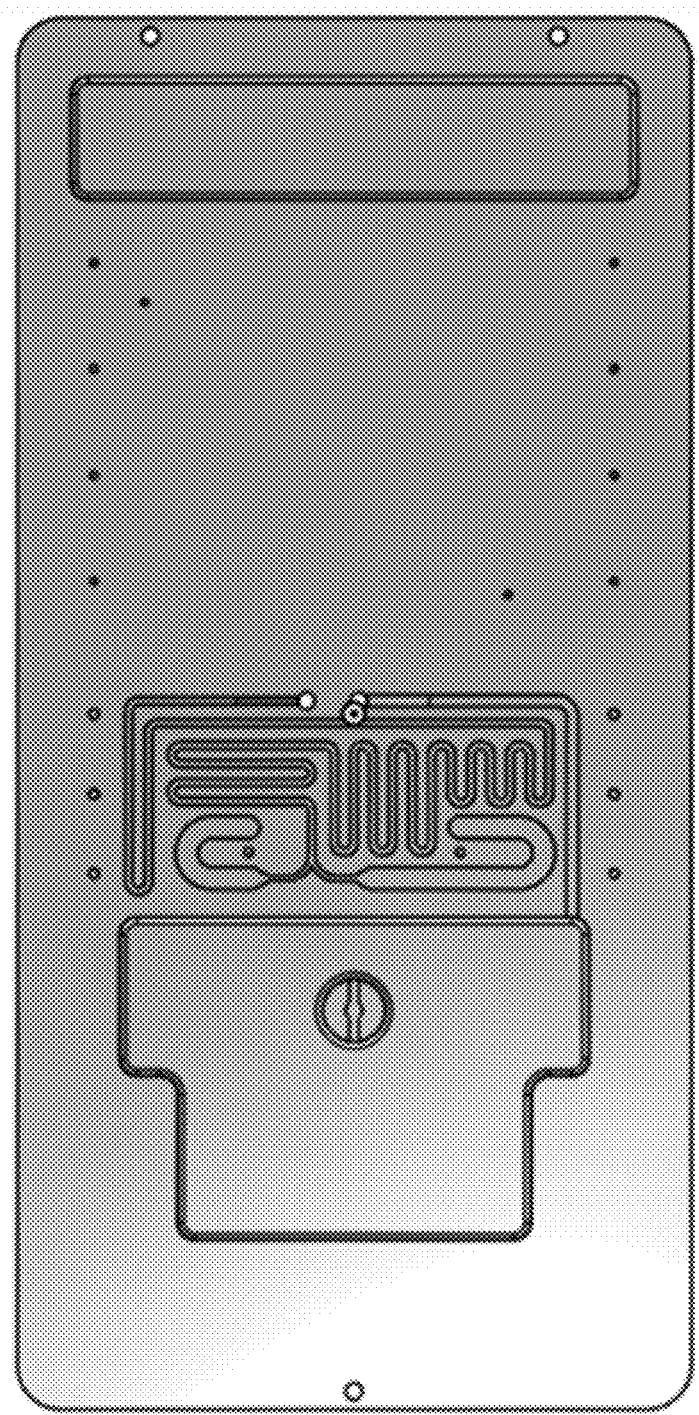

FIG. 7D is a top view of the cartridge of FIGS. 7A-7C, with the cover for the microfluidics channels removed, showing the channels.

Figure 8:
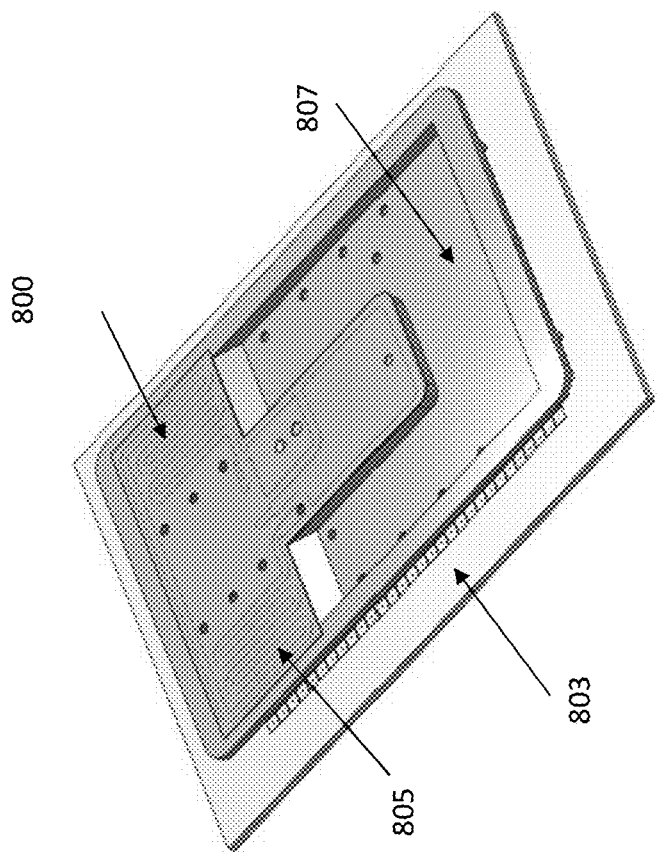

FIG. 8 is an example of a disposable cartridge, including a plastic top plate and a dielectric.

Figure 9:
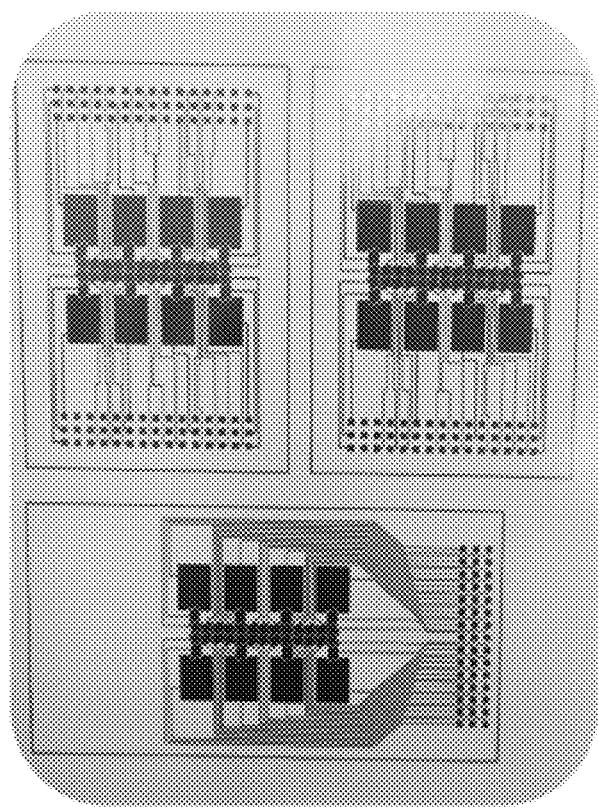

FIG. 9 shows paper digital microfluidics that may be used as part of a cartridge.

FIG. 10 shows an example of an open array of electrodes under a disposable plastic top plate and a dielectric.

FIG. 11 shows a two-plate cartridge over the open array, held in place by a vacuum to keep it rigidly attached over the electrodes.

FIG. 12 illustrates the use of openings through the electrode array; these openings may be used to apply suction (e.g., vacuum) sufficient to hold the cartridge (e.g., the bottom, dielectric layer) aligned and secured to the apparatus. Positive pressure may be applied to release the cartridge.

Figure 15:
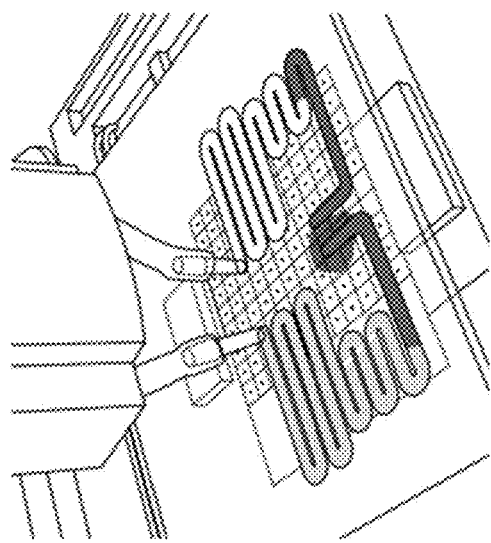
Figure 14:
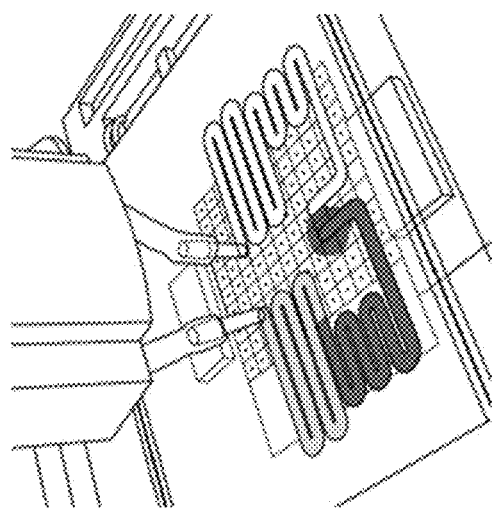
Figure 13:
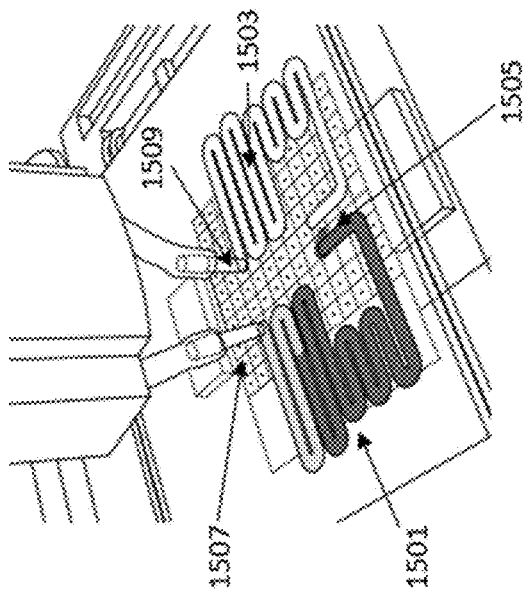

FIGS. 13-15 illustrate one example of a microfluidics channel interfacing with a DMF air gap region as described herein. In FIG. 13, the microfluidics portion of a cartridge is shown as a pair of channels each connected to an inlet/outlet, and each ending in a bridging region forming an opening into the air gap of the DMF portion of the cartridge (in this example, below the microfluidics portion). Fluid may be removed, added, washed, etc. into/out of the air gap of the DMF portion. In FIGS. 14 and 15, fluid washed through the bridging droplet and into the air gap by alternating and applying suction between the inlet/outlet, as shown. In this example, external fluidic components (e.g., tubing and reservoirs) are integrated into the top plate of the DMF portion, allowing a compact form factor. The microfluidics channels may be used for adding/removing reagent (e.g., removing waste, washing, etc.). The bridging droplet may be an electrode or group of electrodes and the size of the droplet may be regulated by DMF.

FIGS. 16A and 16B illustrate extraction and mixing of fluid in a DMF apparatus (e.g., cartridge) as described herein, using a fluid application and extraction technique that includes a bifurcated channel, allowing a large volume of fluid to be exchanged between two reservoirs. In FIG. 16A, the fluid application and extraction device is connected through the top plate. In FIG. 16B, the fluid application and extraction device is connected from the side plate.

FIG. 17A is another example of a DMF cartridge configured for mixing, extraction, adding, etc. fluid with one or more droplets in the air gap of the DMF cartridge. In FIG. 17A, the interface 1127 for the fluid lines, which may be microfluidic channels, including microfluidic channels formed in part by the top plate 1117, interfaces through the top plate, and (unlike FIG. 16A) the air gap in this interface region may be larger than the air gap in other portions of the DMF cartridge.

In FIG. 17B, the interface 1127 for the fluid line(s) is at the edge of the air gap, similar to FIG. 17B; in FIG. 17B, the air gap region is larger than in other regions of the cartridge.

In any of the FIGS. 16A-16B, 17A-17B, the fluid lines (e.g., 1143, 1145) and reservoirs (1105, 1107) may form part of the DMF apparatus, and may interface with a port on the cartridge, e.g., the top surface of the cartridge, and/or one or more valves.

FIGS. 18A-18C illustrate operation of a fluid application and extraction device similar to the one shown in FIG. 17A.

FIGS. 19A-19C illustrates the effect of evaporation on a droplet over 2 minutes in an air-gap DMF apparatus held at 95 degrees C., showing substantial evaporation.

FIGS. 20A-20C show the resistance to evaporation when using a jacketing of nonpolar material (e.g., liquid paraffin) after one hour (FIG. 20B) and two hours (FIG. 20C), showing little or no evaporation.

Figure 21A:
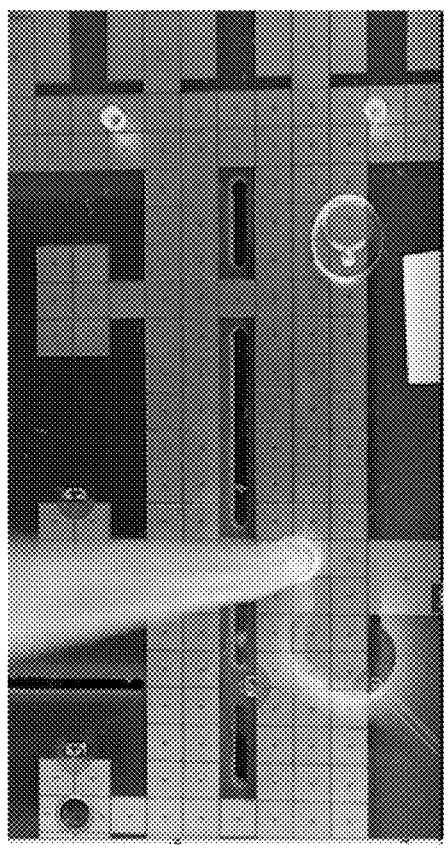
Figure 21B:
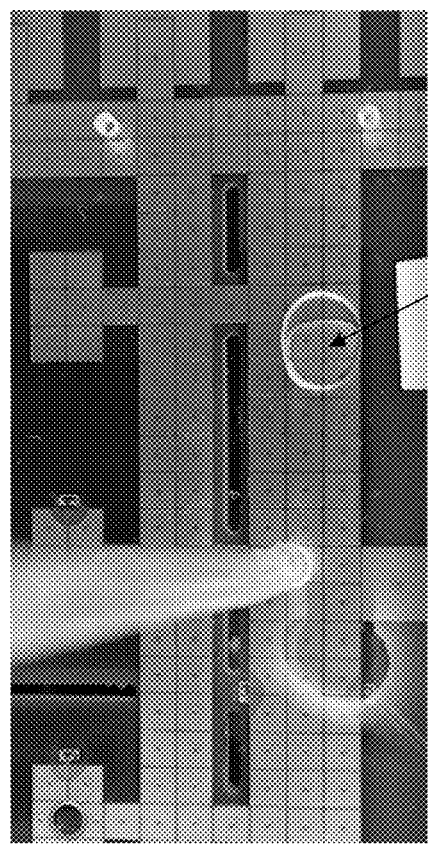
Figure 21C:
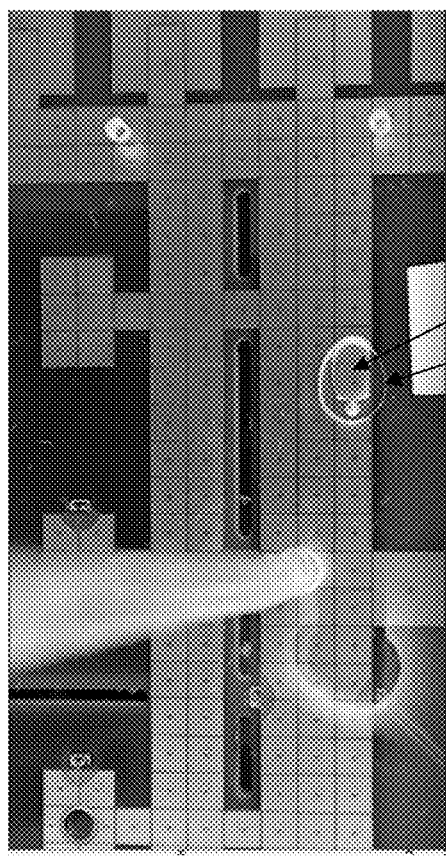
Figure 21D:
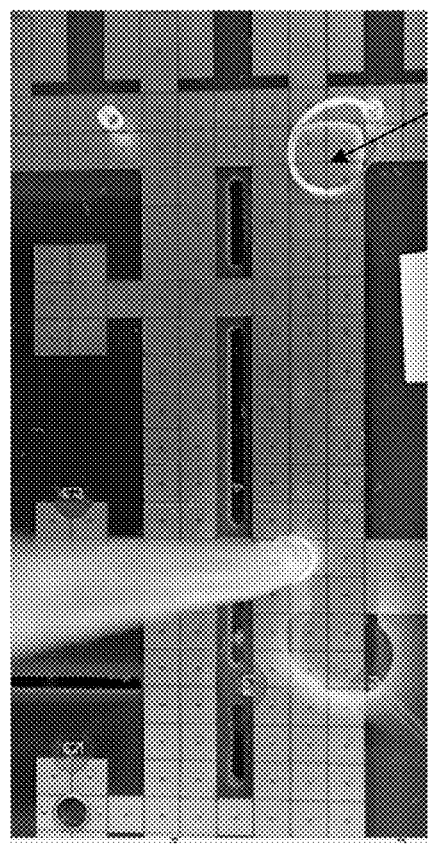

FIGS. 21A-21D illustrate the use of a non-polar jacketing material in an air-matrix DMF apparatus. FIGS. 21A-21B show the movement of the aqueous (polar) droplet while coated with a non-polar jacketing material that is moved along with the droplet. FIGS. 21C-21D illustrate adding additional polar material to the droplet, which expands to include the additional polar material.

FIG. 21E-21I illustrate adding a large sample to a jacketing material, and mixing the sample.

Figure 22A:
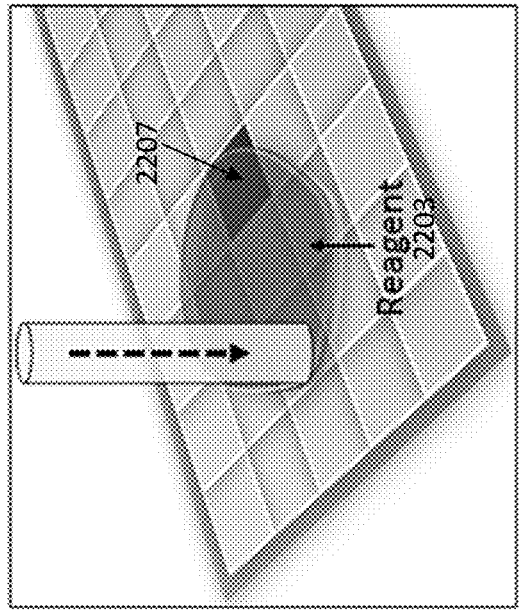
Figure 22B:
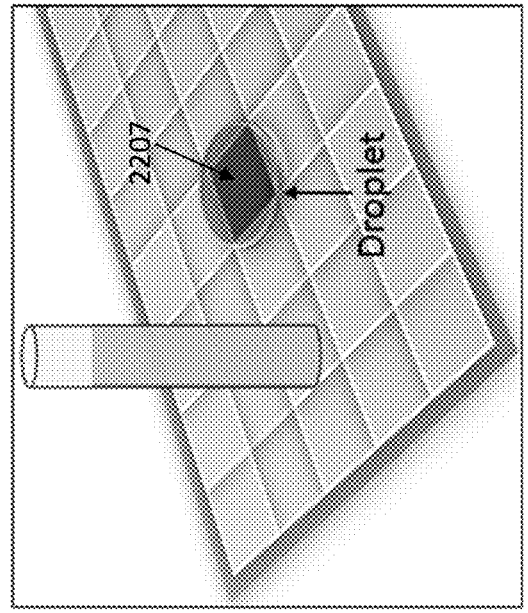
Figure 22C:
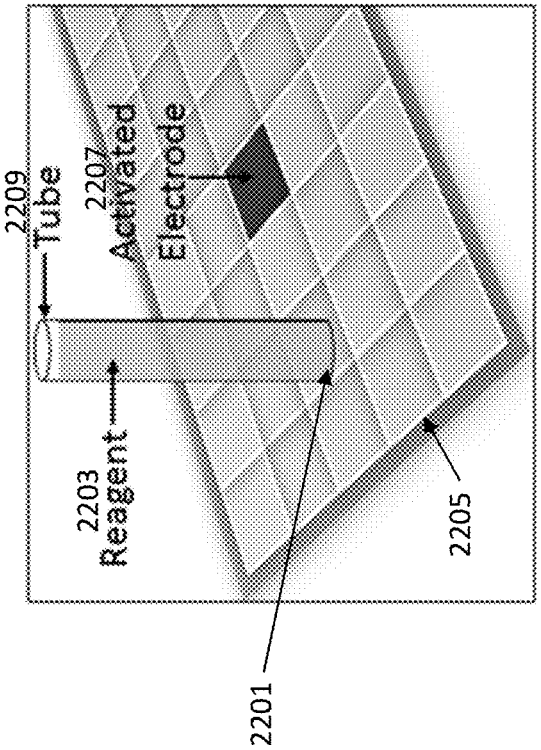
Figure 22D:
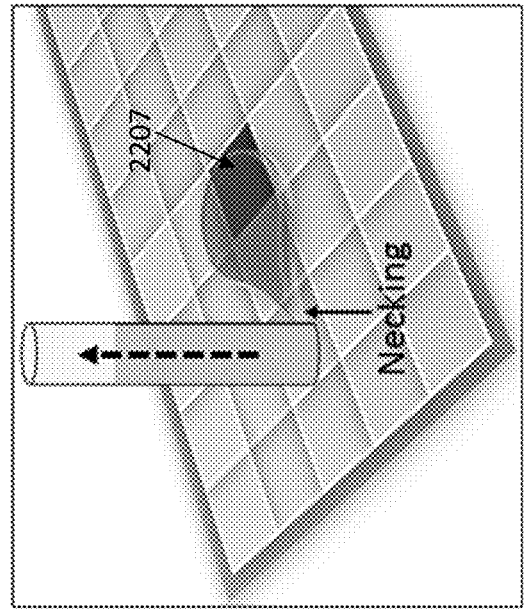

FIGS. 22A-22D illustrate the control of droplet volume when dispensing droplets (e.g., reagents) into an air-gap of a DMF apparatus. In particular, the air-gaps described herein may be large air-gaps (e.g., greater than 280 micrometers, greater than 300 micrometers, >400 micrometers, >500 micrometers, >600 micrometers, etc. separation between the top and bottom dielectrics). In such cases, the electrowetting forces alone may not be sufficient to dispense droplets of a predetermined volume. As shown in FIGS. 22A-22D, droplet break off from a large volume may be used to dispense a predetermined volume. In FIG. 22A, a dispensing electrode is activated, spaced from the dispensing port (tube). In FIG. 22B, the reagent to be dispensed is applied into the air gap, flooding the region including the dispensing electrode that is separated from the dispensing port by at least one electrode. In FIG. 22C the reagent is then sucked back into the dispensing port, while the dispensing electrode(s) is/are active, but the electrode(s) between the dispensing port and the dispensing electrode(s) is/are not active, forming a neck, which (as shown in FIG. 22D) eventually breaks off, leaving the droplet of a predetermined volume on the dispensing electrode(s).

FIGS. 23A-23F illustrate example of dispensing droplets of predefined volumes using the technique described in FIGS. 22A-22D, above.

Figure 24:
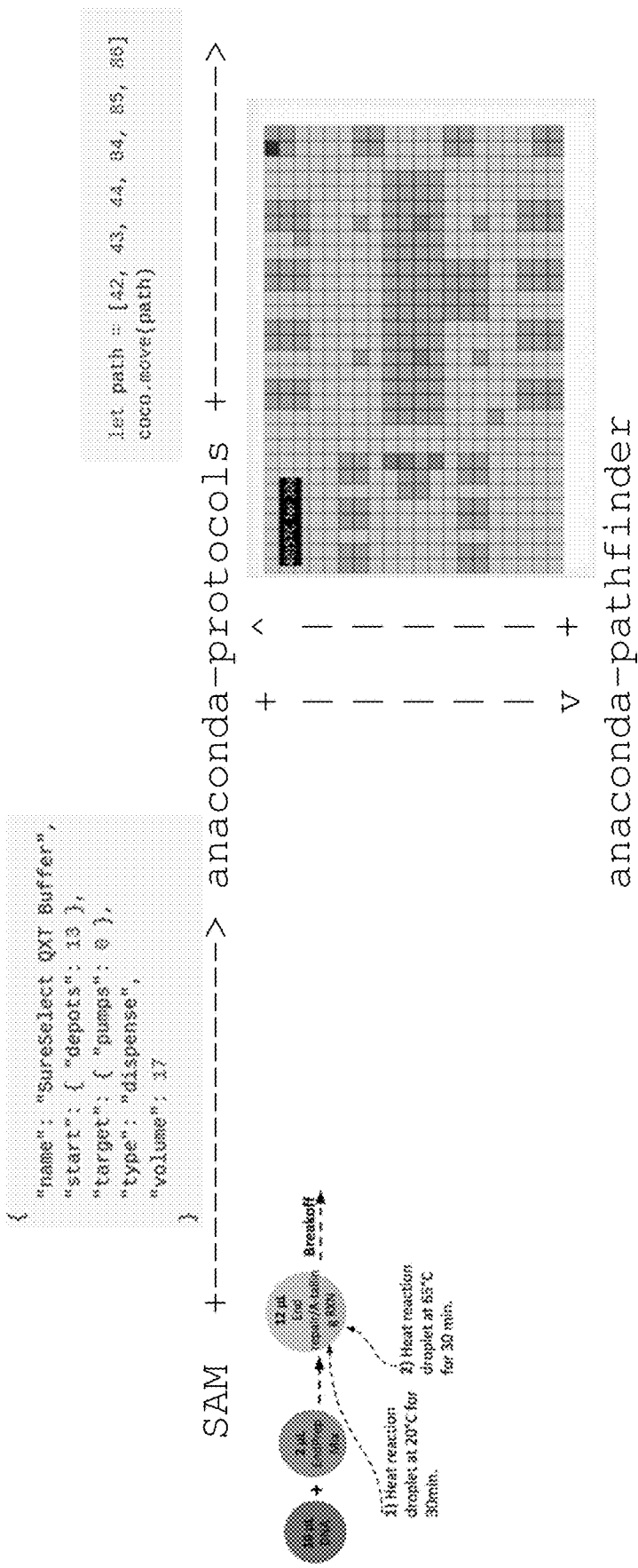

FIG. 24 shows an example of a method of controlling a DMF apparatus as described herein, including programming the apparatus using a graphical user interface.

Figure 25A:
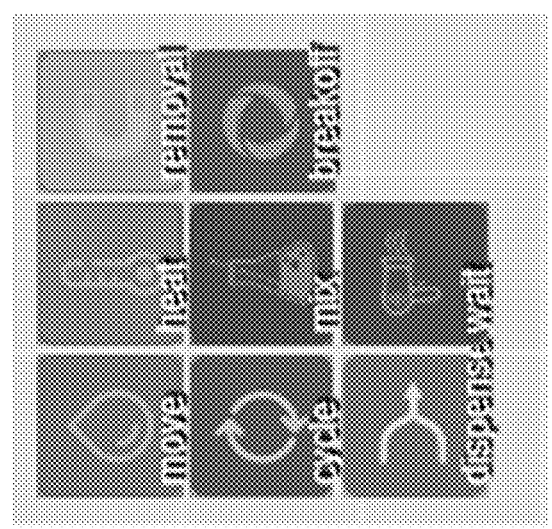
Figure 25B:
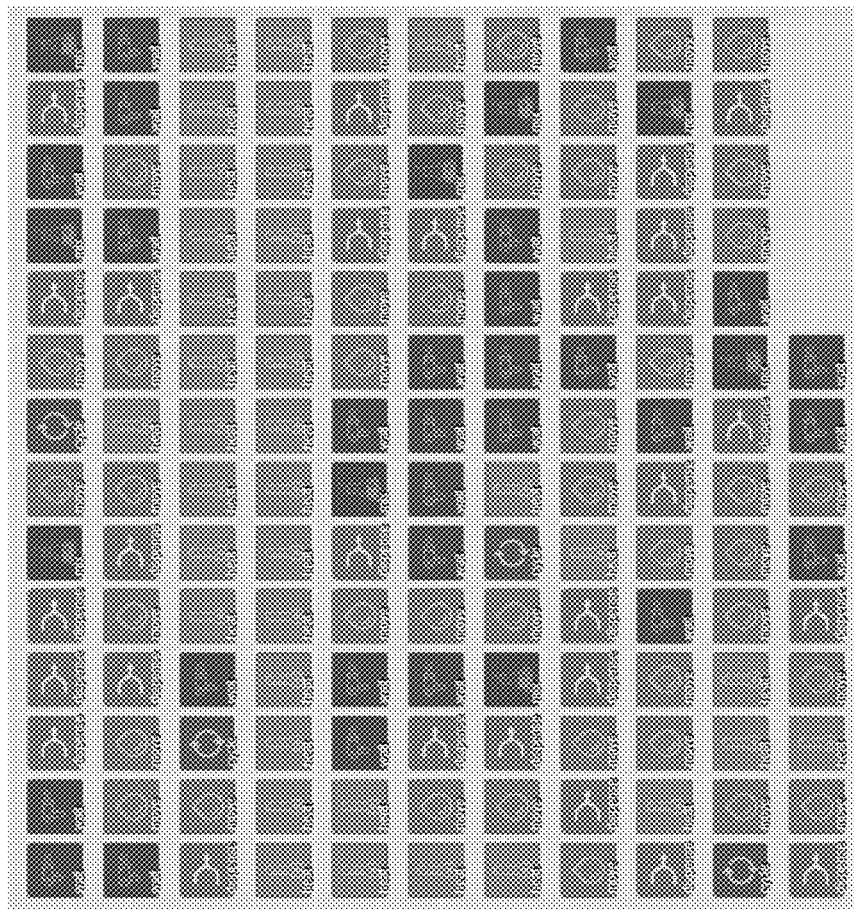

FIG. 25A-25B illustrates an example of visual controls or commands (FIG. 25A) and a protocol describes using these visual controls/commands (FIG. 25B).

FIGS. 26A-26H illustrate an example of a user interface for controlling a DMF apparatus as described herein.

Figure 27A:
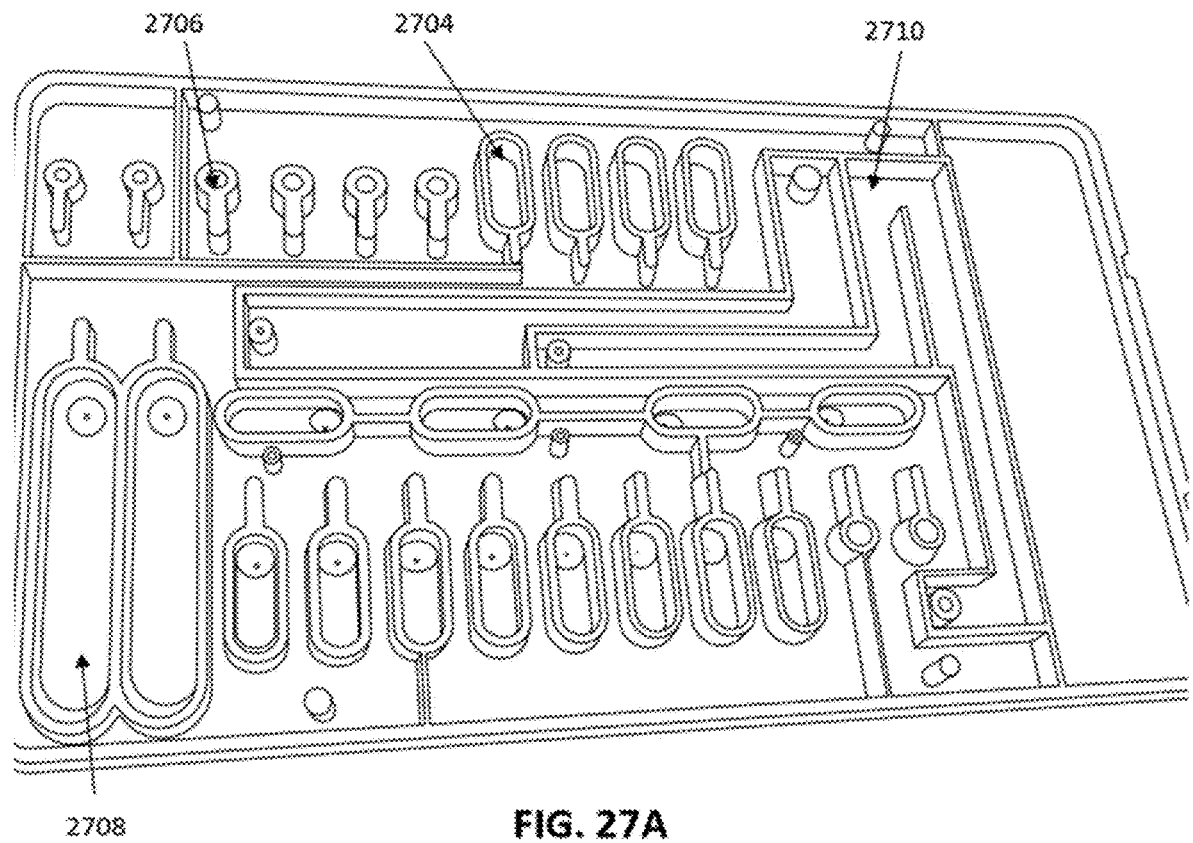
Figure 27B:
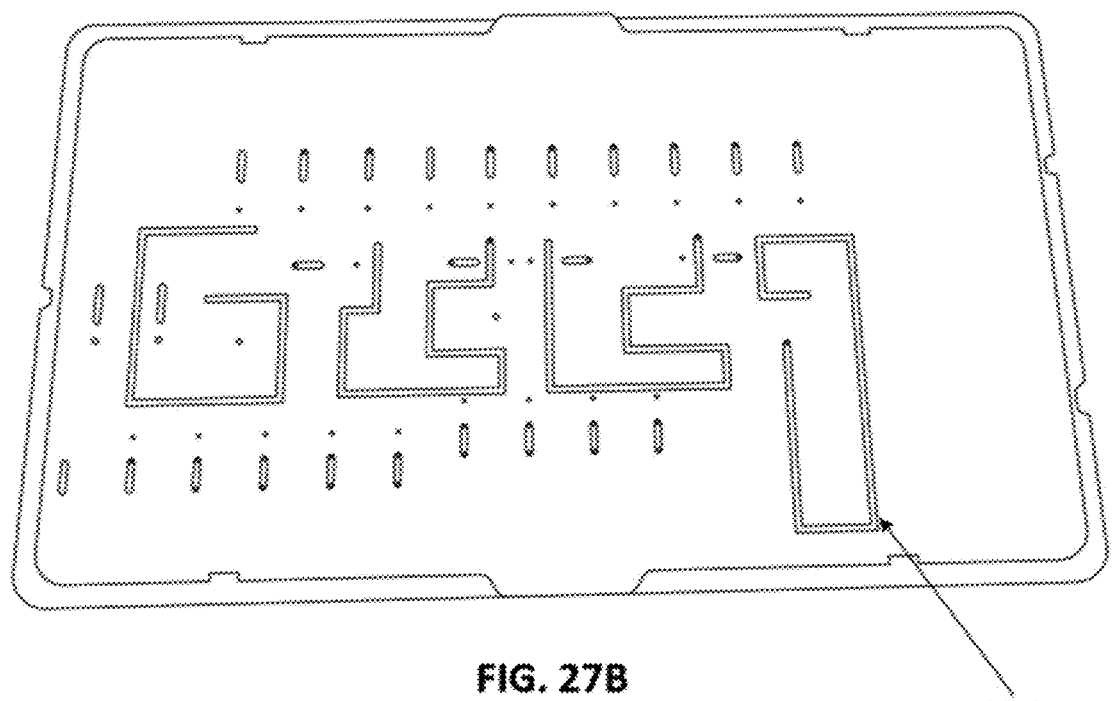

FIGS. 27A and 27B illustrate top and bottom perspective views, respectively of one example of a top portion of digital microfluidics cartridge as described herein.

Figure 28:
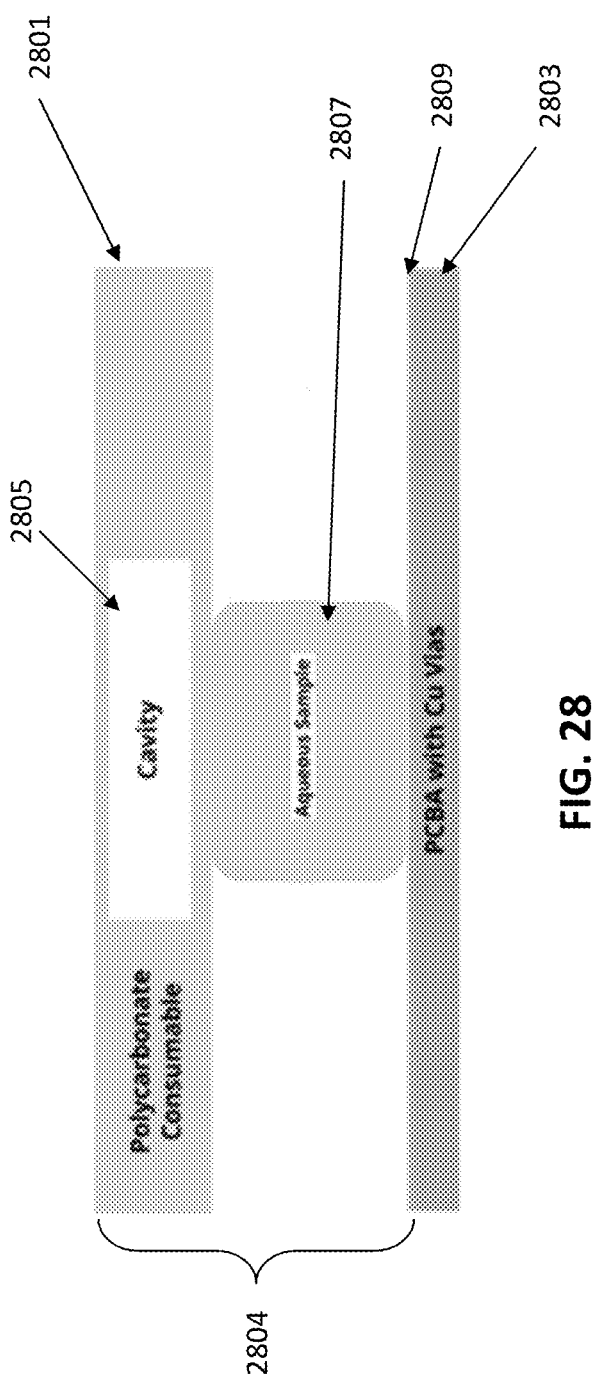

FIG. 28 illustrates an example of a portion of a cartridge showing a thermally controlled region.

FIG. 29 is an example of a portion of an apparatus (e.g., cartridge seat portion) having a reduced thermal mass to enhance the rate of temperature regulation of cartridge held on the seat portion.

FIG. 30 is another example of a portion of an apparatus (e.g., cartridge seat portion) having a reduced thermal mass to enhance the rate of temperature regulation of cartridge held on the seat portion.

FIGS. 31A and 31B illustrate examples of apparatuses include thermal vias for helping control the temperature of a cartridge (e.g., of one or more cells of an air gap of a cartridge).

Figure 32:
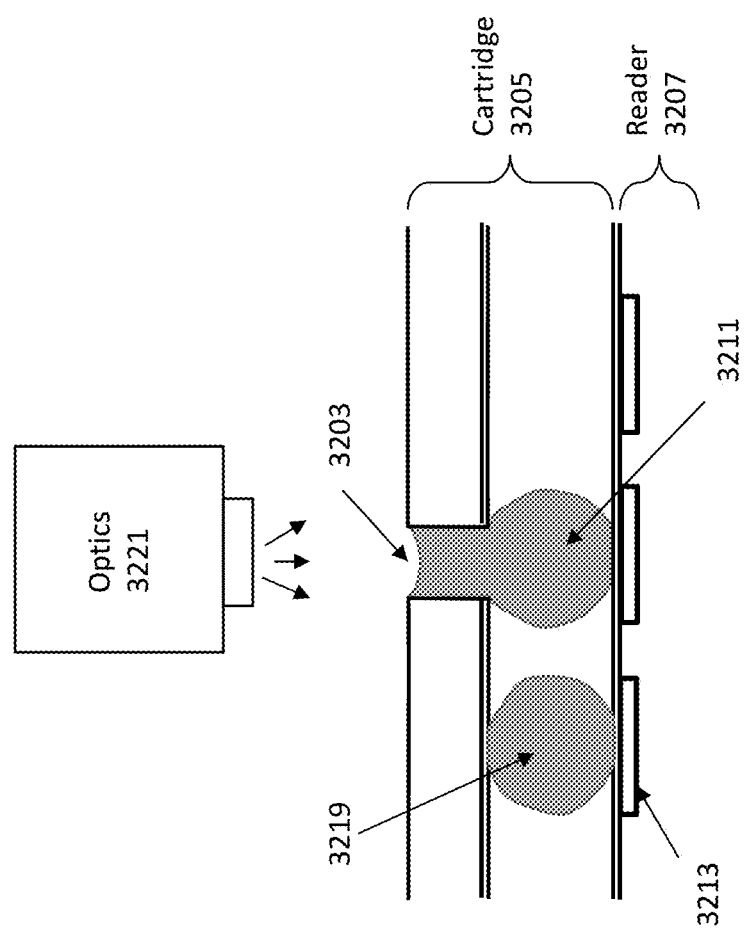

FIG. 32 is an example of a cartridge including an opening in the top plate for sampling or adding fluid to a droplet in the cartridge.

Figure 33A:
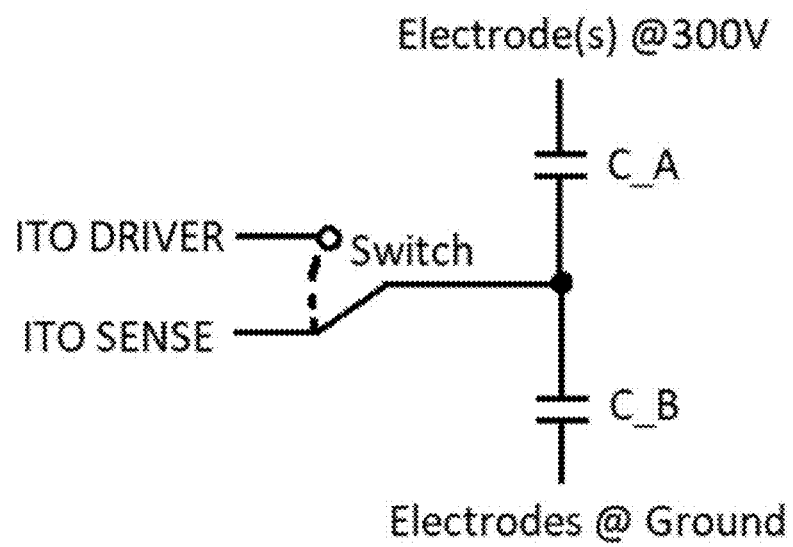

FIG. 33A shows an ITO sensing circuit with a switch.

Figure 33B:
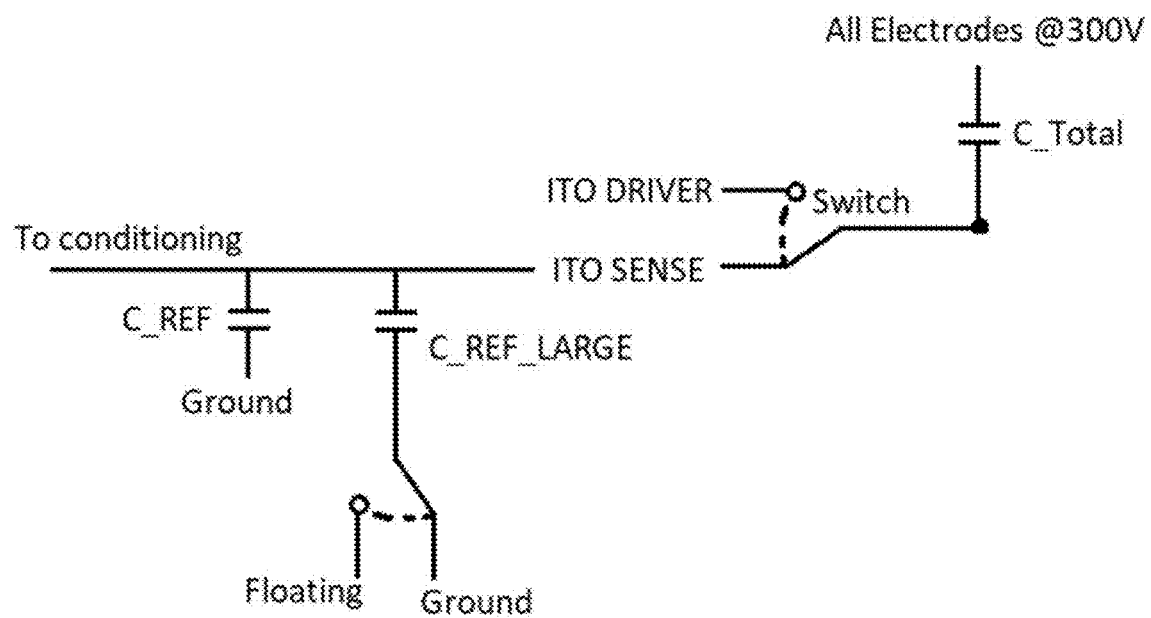

FIG. 33B illustrates another example of a capacitive sensing circuit that includes multiple reference capacitors.

Figure 34A:
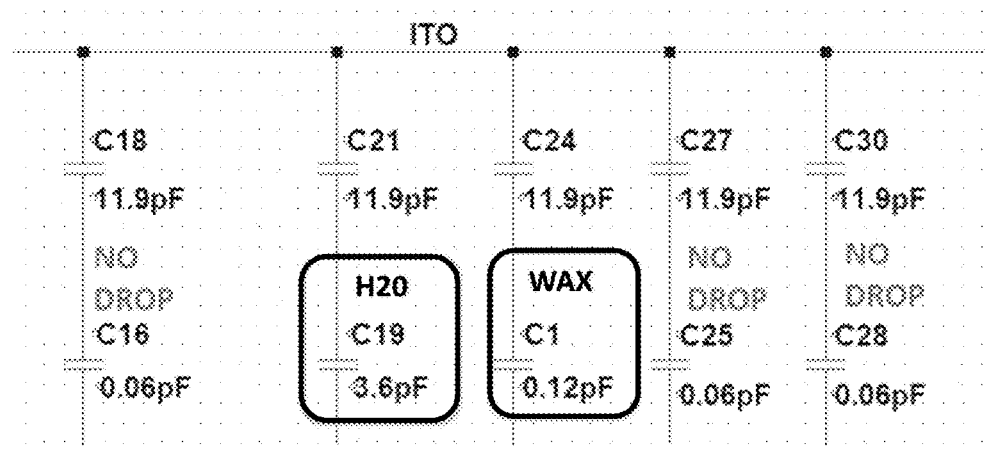
Figure 34B:
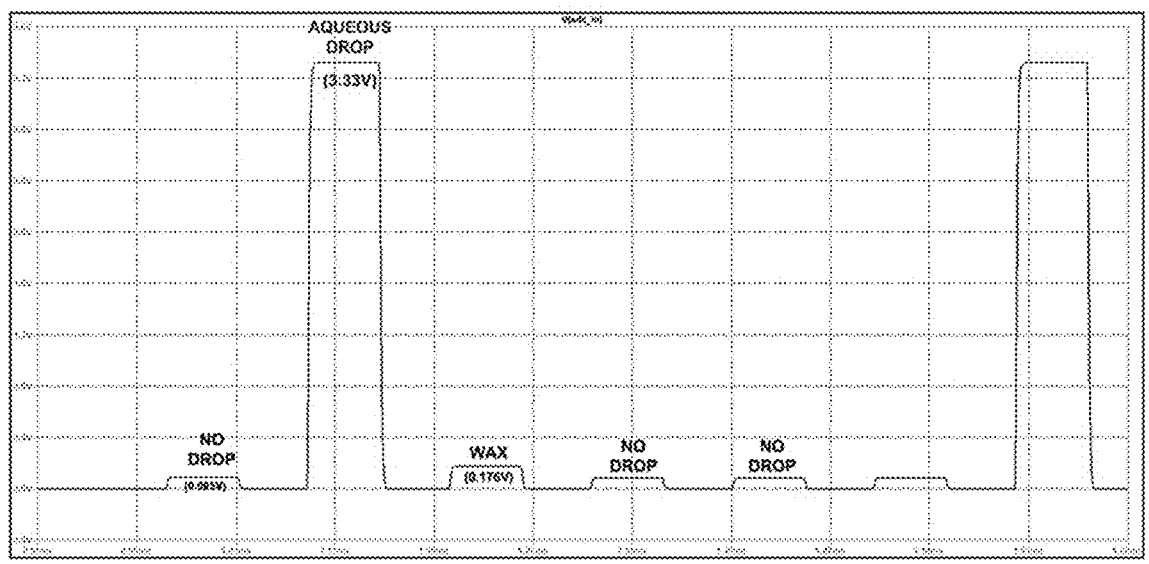
Figure 34C:
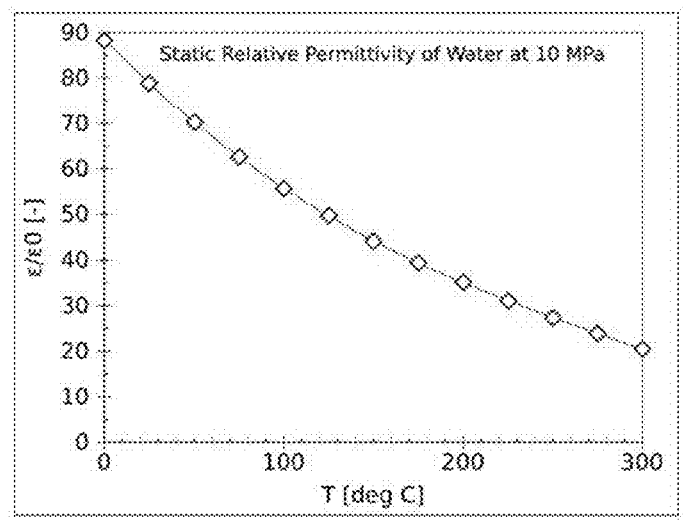

FIGS. 34A-34C illustrate one method of identifying and/or locating a droplet in the air gap as described herein. FIG. 34A shows one example of a range of capacitances corresponding to the presence or absence of various materials (e.g., aqueous droplet, wax, etc.) in the air gap at a particular cell. FIG. 34B is a graph showing exemplary voltage measurements from the sensing electrode (top electrode). FIG. 34C is a graph showing an example of the change in electrical permittivity of water as a function of temperature.

FIG. 35A is a top view of one example of a vacuum chuck.

FIG. 35B is a cross sectional view of the vacuum chuck of FIG. 35A.

Figure 36:
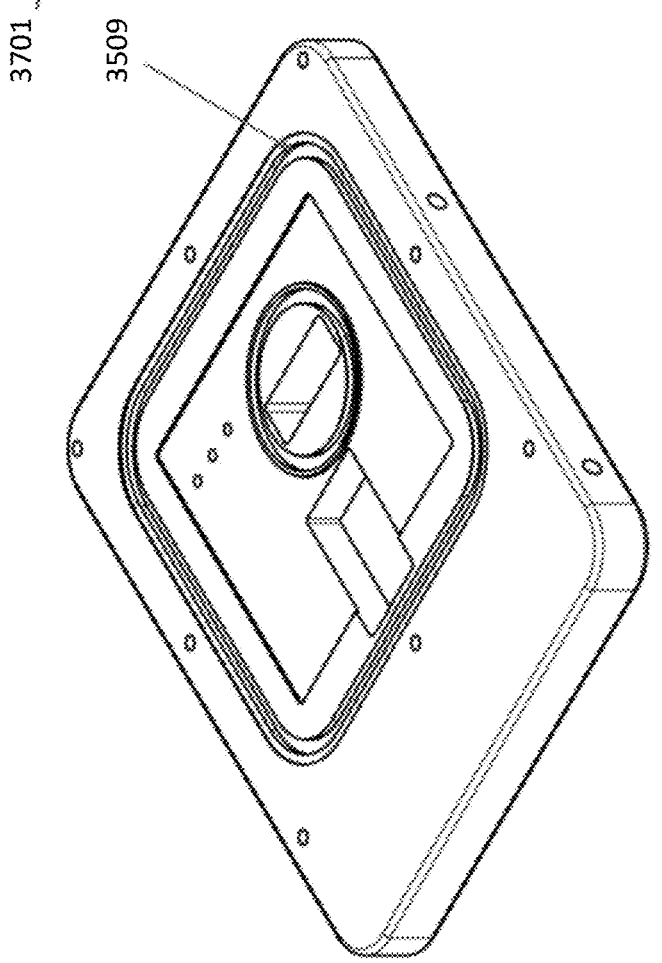

FIG. 36 shows an isometric view of the chuck shown in FIGS. 35A-35B.

Figure 37:
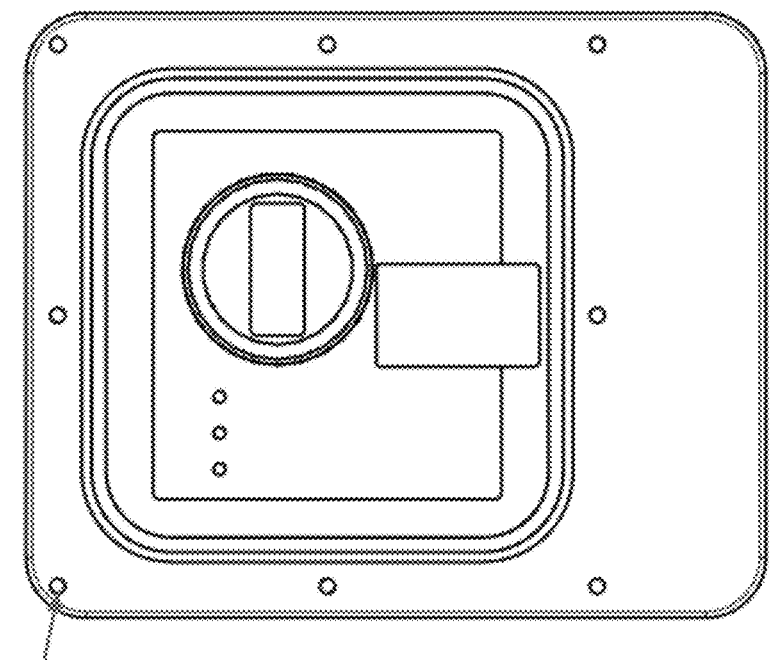

FIG. 37 shows a top view of a chuck similar to the one shown in FIGS. 35A-35B.

FIG. 38A shows another example of a vacuum chuck.

FIG. 38B shows a cross sectional and zoomed-in view of this chuck.

FIG. 39 shows a bottom view of a chuck similar to that shown in FIGS. 35A-35B.

Figure 40:
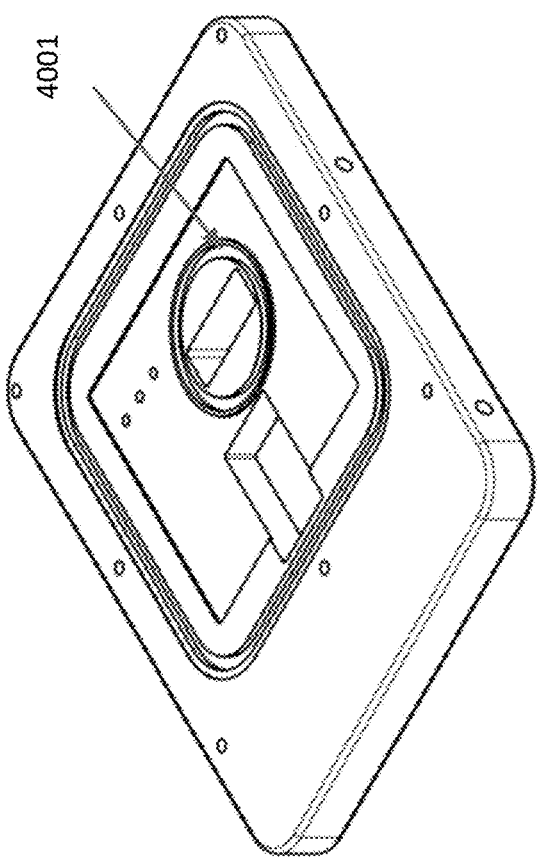

FIG. 40 shows an isometric view of a chuck similar to that shown in FIG. 35A.

Figure 41A:
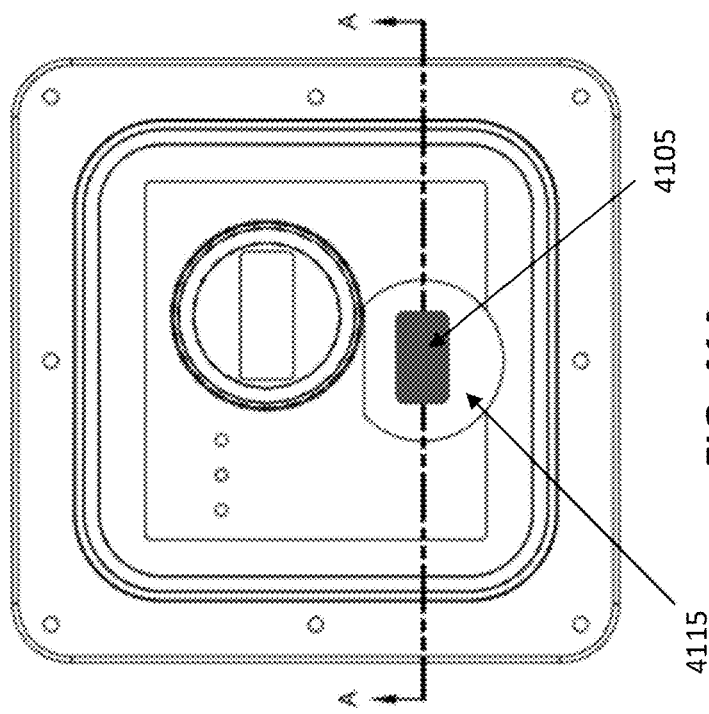

FIG. 41A shows one example of a heat dissipation system that may be included in any of the apparatuses described herein.

Figure 41B:
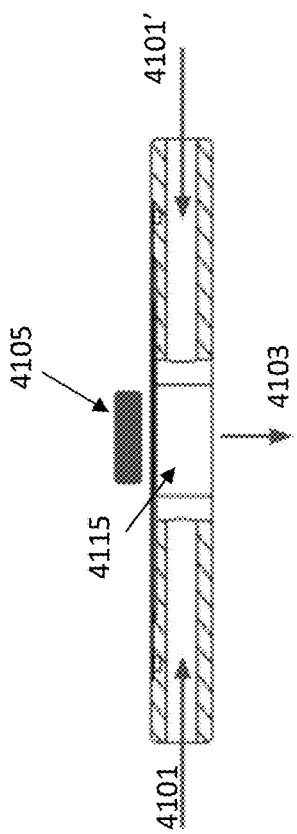

FIG. 41B is a sectional view through the chuck of FIG. 41A.

FIG. 42 shows a front view of a chuck and a fan.

FIG. 43 shows an example of an arrangement of a chuck, a fan and a PCB (part of a seating surface).

FIG. 44 is a perspective view of a chuck that may include a thermal (e.g., heat) dissipation system for regulating temperature of a cartridge.

FIG. 45A is a top view of the chuck of FIG. 44.

FIG. 45B is a sectional view through the chuck of FIG. 45A.

FIG. 46 shows a side view of an assembly of a chuck, a heat sink and a pair of cooling fans, with arrows indicating the flow of temperature (cooling the chuck and therefore the cartridge when loaded onto the apparatus).

FIGS. 47A-47C illustrate the assembly of a vacuum chuck and cooling subsystem (e.g., heat sink block and cooling fans).

Figure 48:
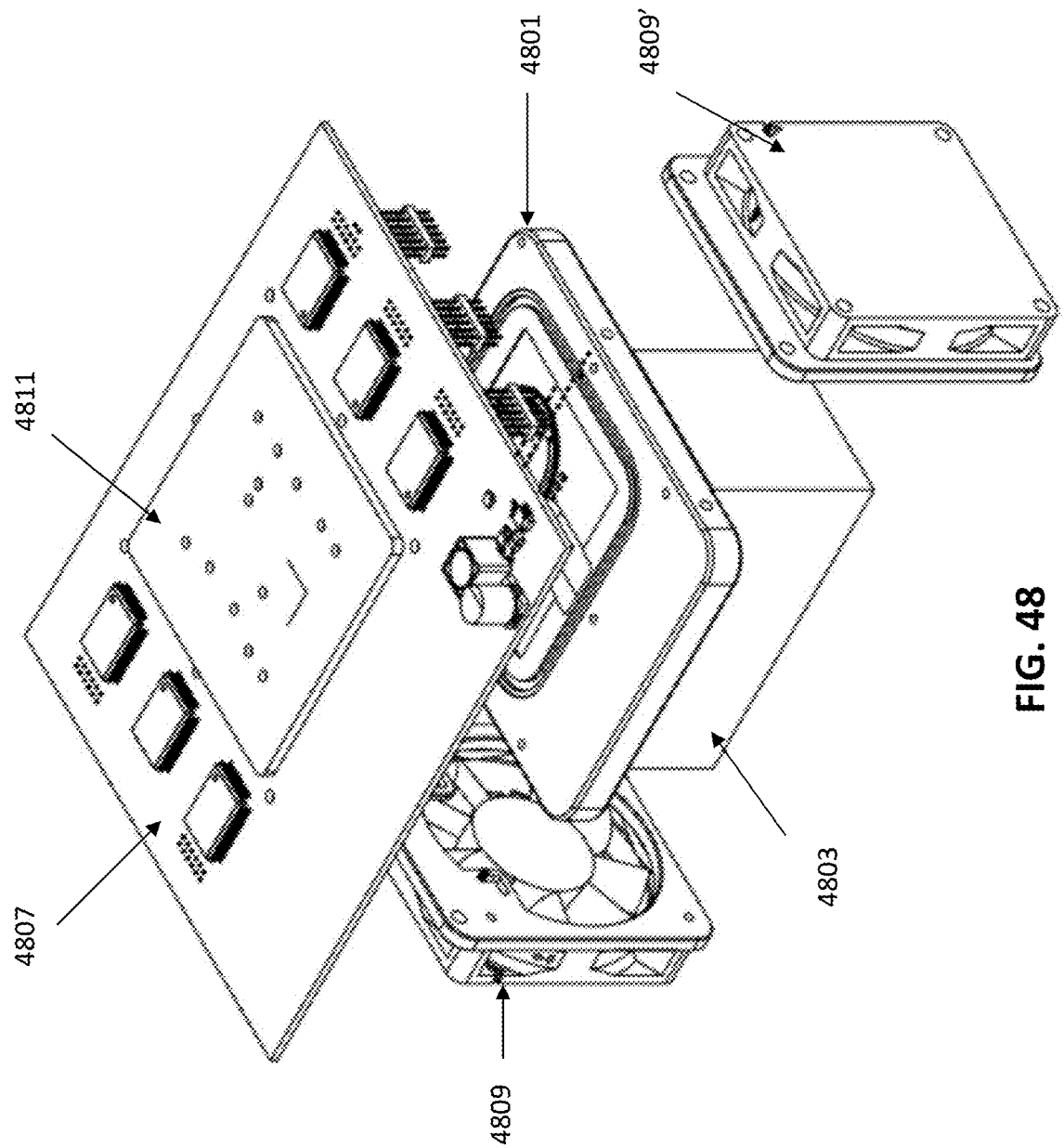

FIG. 48 illustrates one example of an assembly for an apparatus including a PCB with an array of electrodes for applying DMF to a cartridge (not shown), a vacuum block for holding the cartridge bottom onto the PCB and a thermal regulator subsystem including a heat sink/heat block and a pair of cooling fans.

Figure 49B:
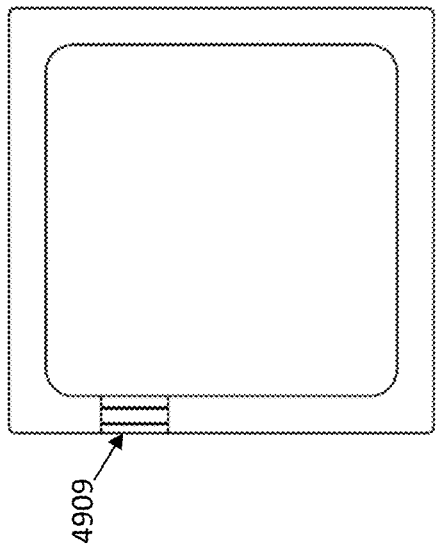
Figure 49D:
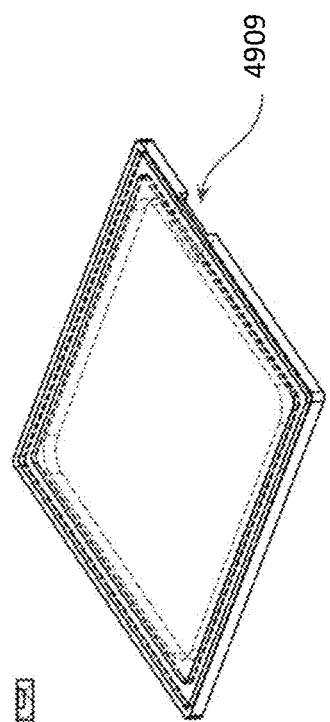
Figure 49A:
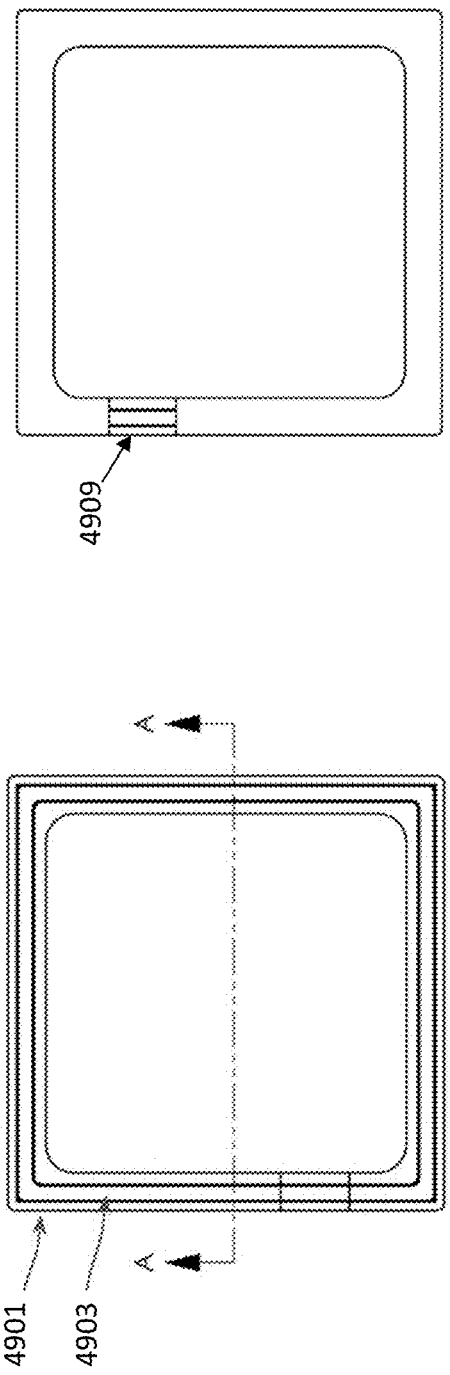

FIGS. 49A and 49B illustrate a tensioning frame and a film frame, respectively, for securing and holding smooth a film (e.g., dielectric film) that may form the bottom of a cartridge.

Figure 49C:
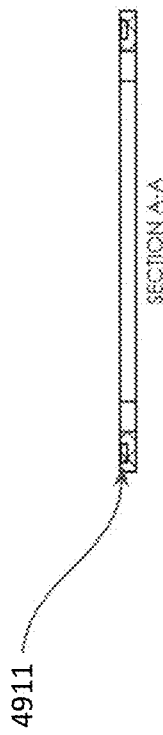

FIG. 49C is a side view of an assembled tensioning frame.

FIG. 49D is a perspective view of an assembled tensioning frame.

Figure 50A:
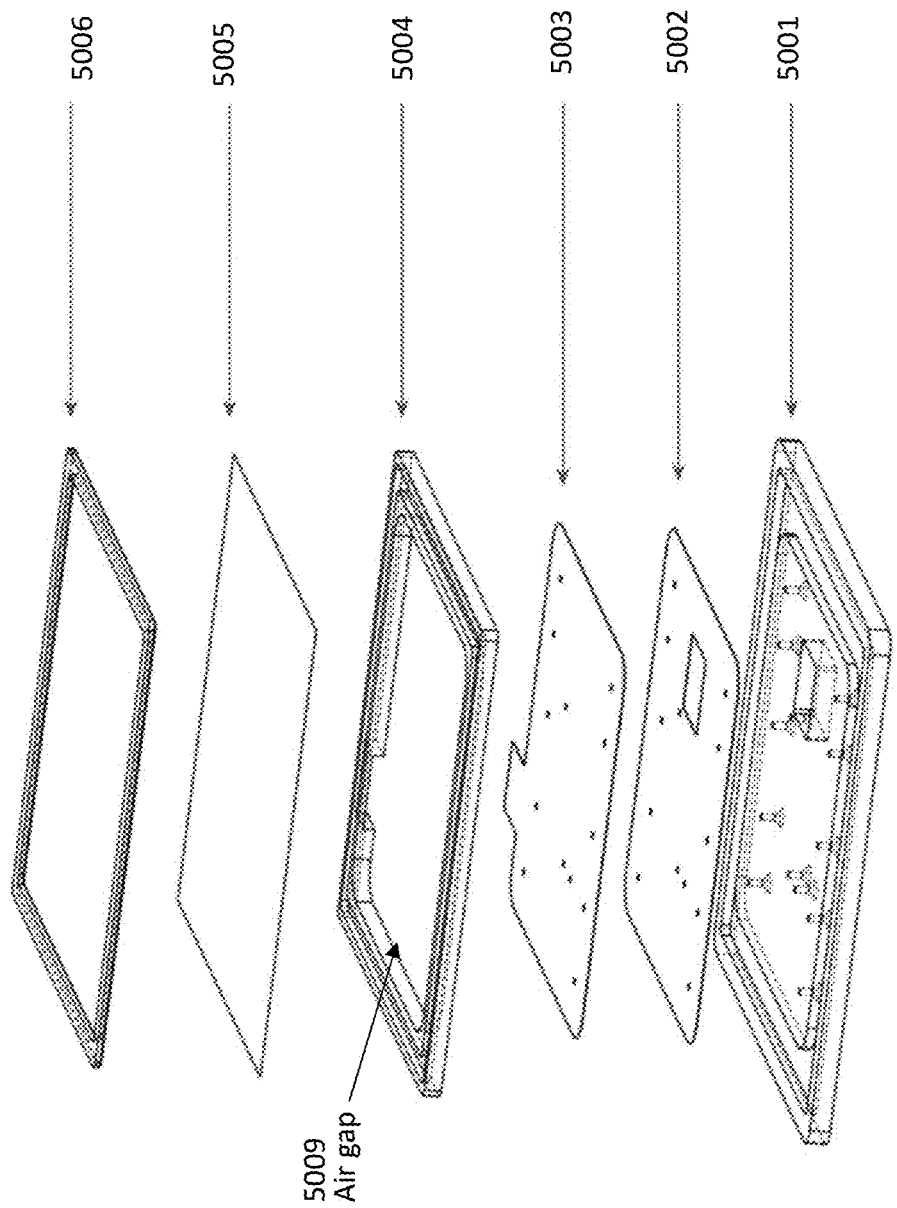

FIG. 50A is an example of an exploded view of a two-plate cartridge.

Figure 50B:
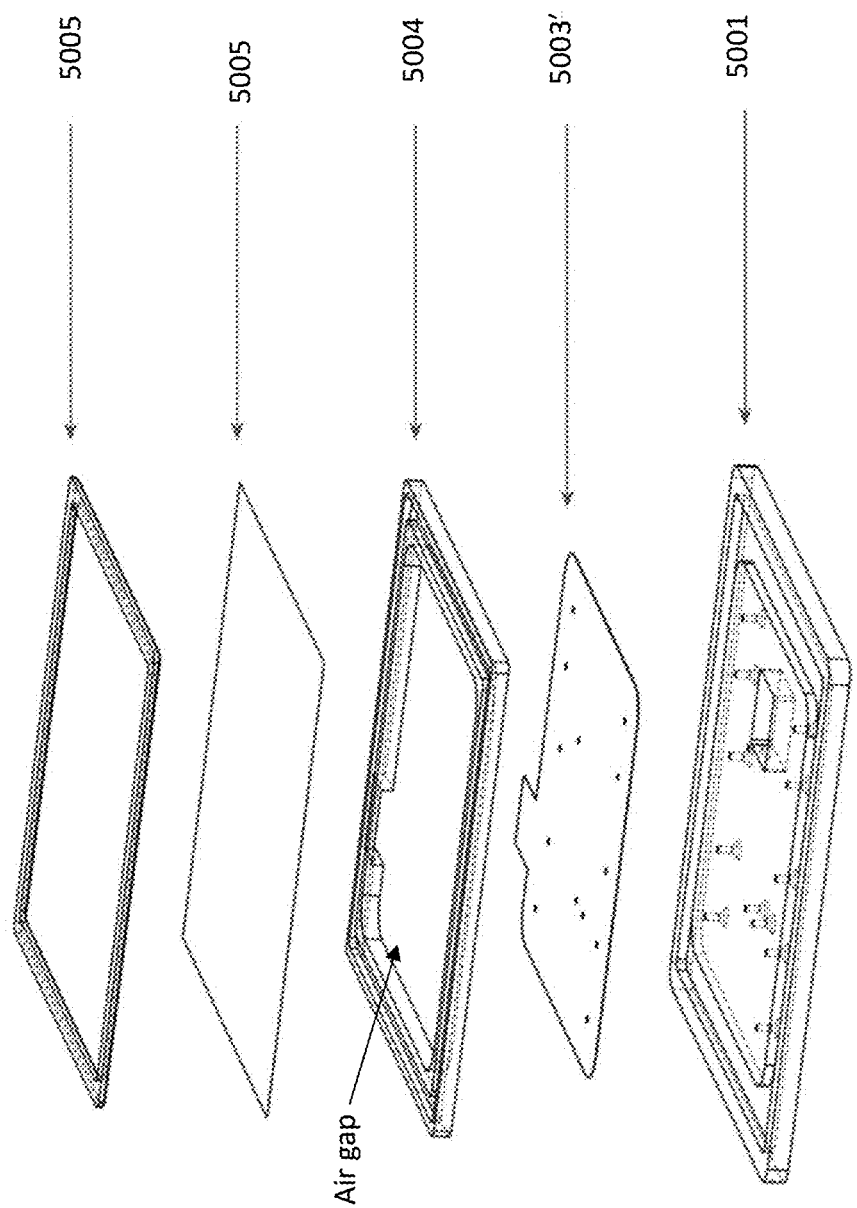

FIG. 50B is another example of an exploded view of a two-plate cartridge.

Figure 51:
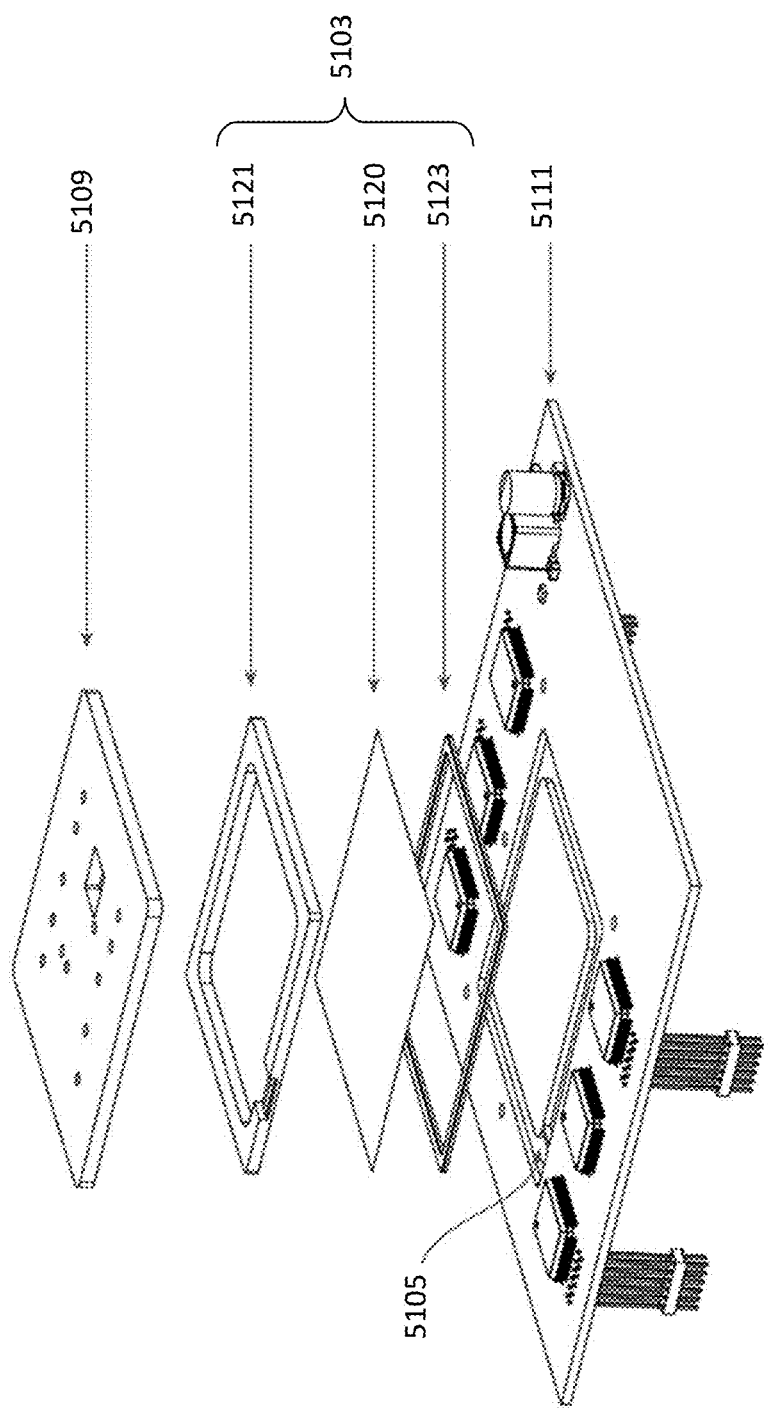

FIG. 51 is an exploded view of an example of a cartridge and a cartridge seating portion of an apparatus.

Figure 52A:
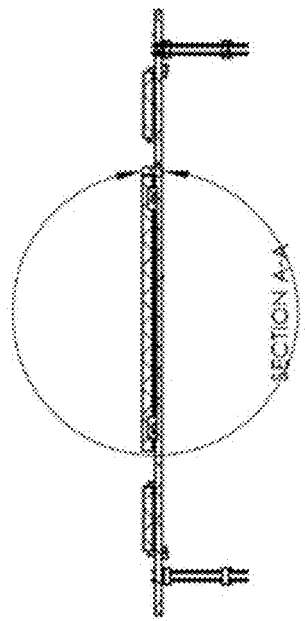

FIG. 52A is a top view of a PCB of an apparatus to which a cartridge may be seated on.

Figure 52C:
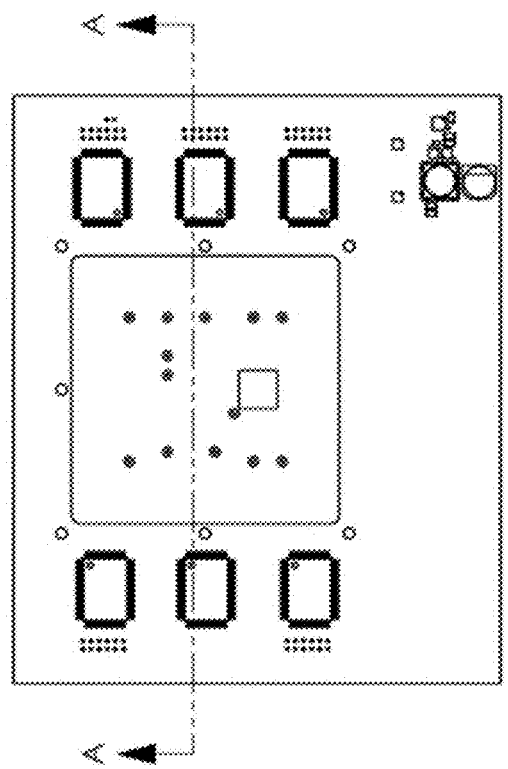
Figure 52B:
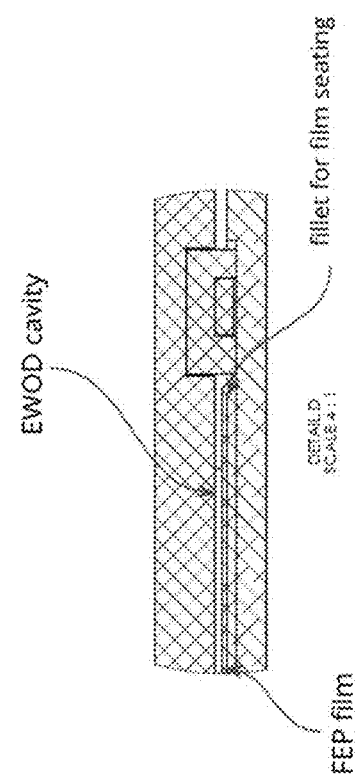

FIG. 52B is a side view of the PCB portion shown in FIG. 52A

FIG. 52C is an example of a side view of a cartridge shown on a seating surface of an apparatus.

Figure 52D:
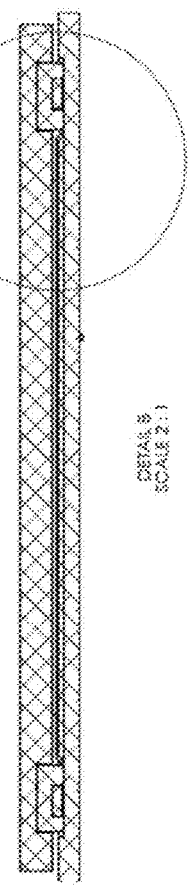

FIG. 52D is an enlarged view from FIG. 52C.

Figure 53:
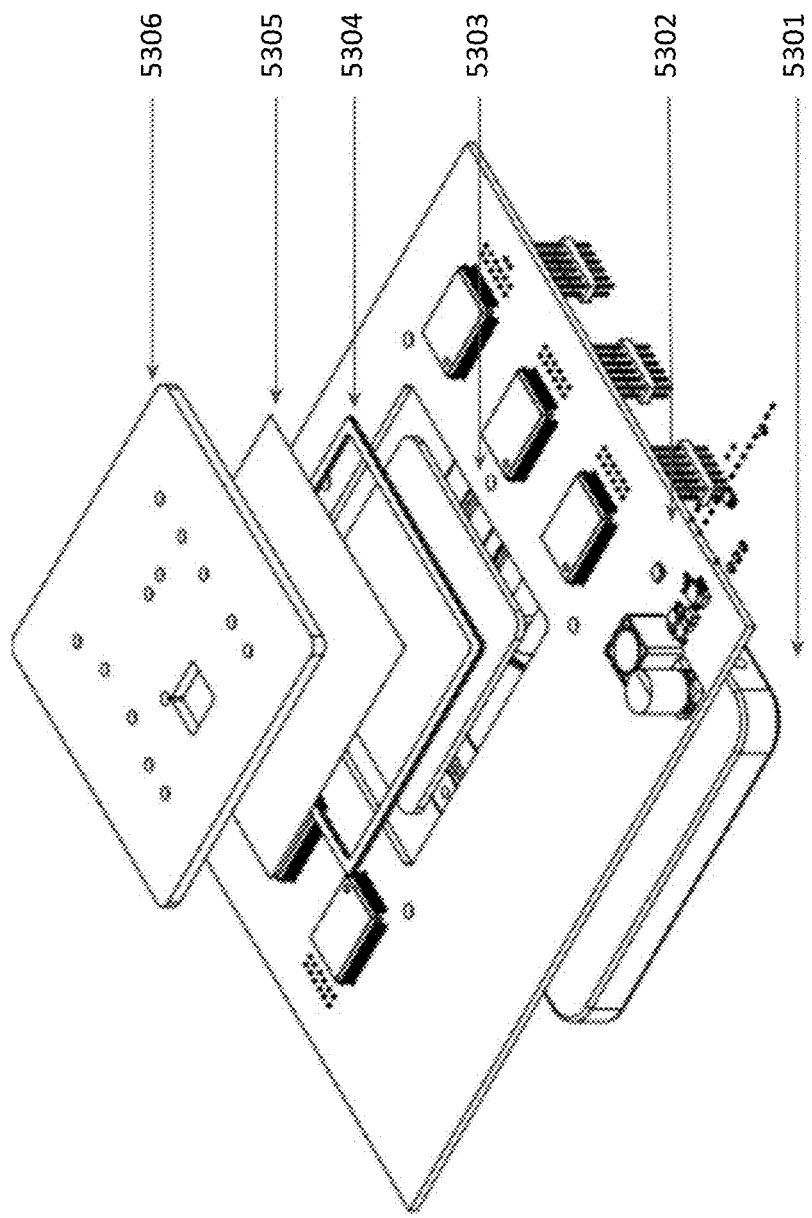

FIG. 53 is an exploded view of a cartridge and seating surface/region of an apparatus.

FIG. 54A is a top view of a PCB (that may form the seating surface) of an apparatus.

FIG. 54B is a side sectional view through the portion of the apparatus shown in FIG. 54A.

Figure 55A:
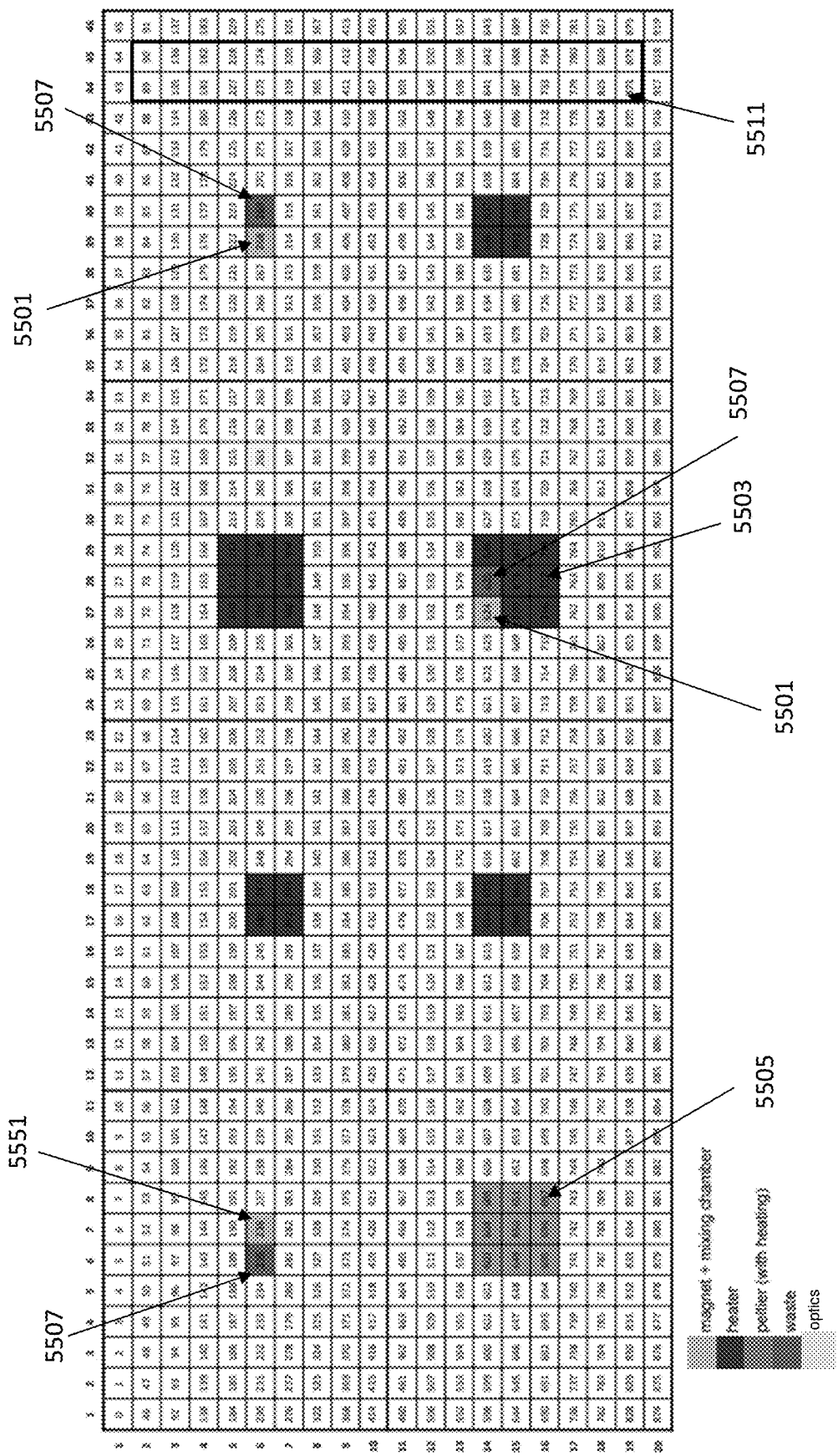

FIG. 55A shows an example of an electrode grid setup with independent action zones.

Figure 55B:
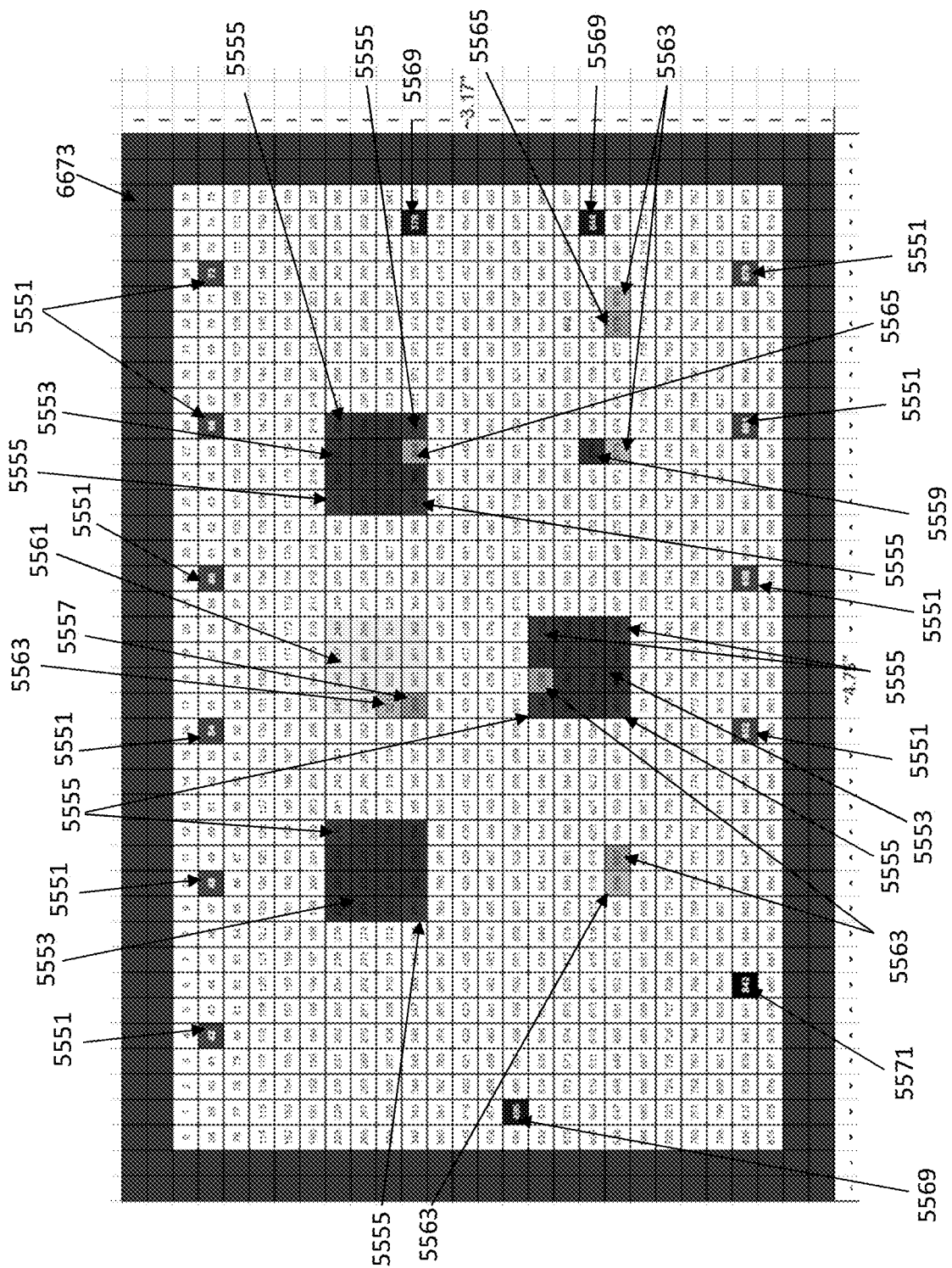

FIG. 55B shows another example of an electrode grid setup with independent action zones.

FIGS. 56A-56D illustrate examples of a thermal regulation subsystem of an apparatus as described herein.

Figure 57A:
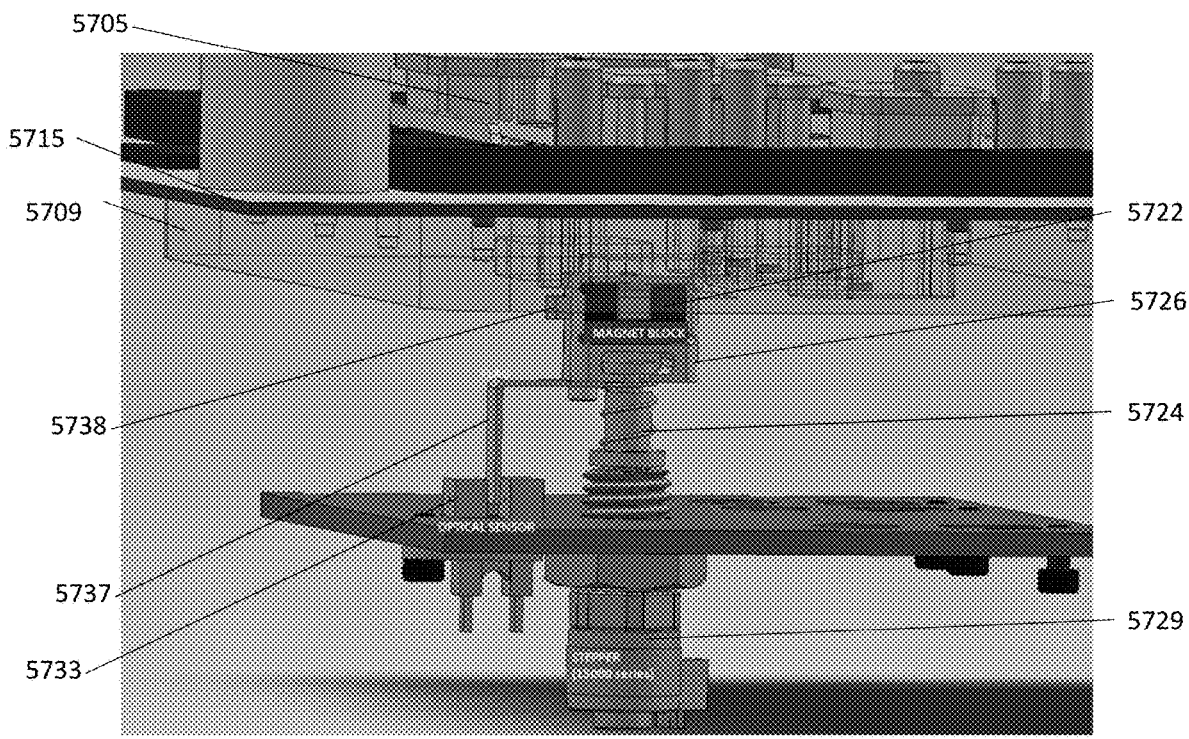
Figure 57B:
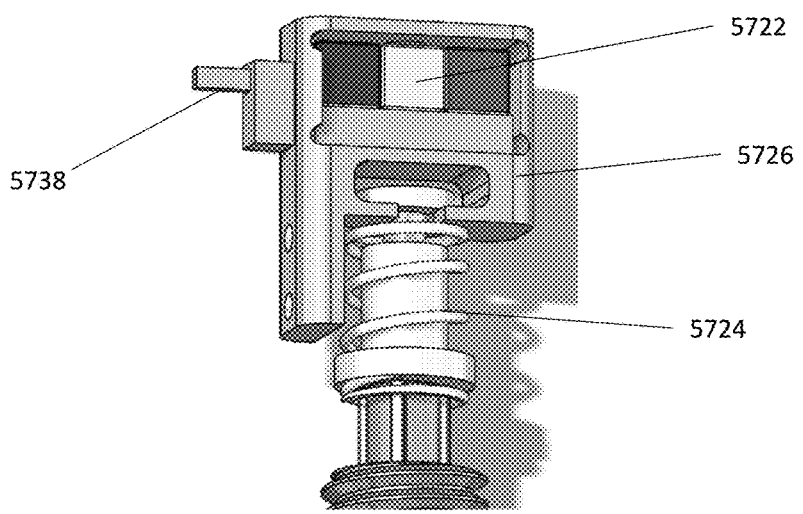

FIGS. 57A-57B illustrate examples of a magnetic subsystem of an apparatus as described herein.

Figure 58A:
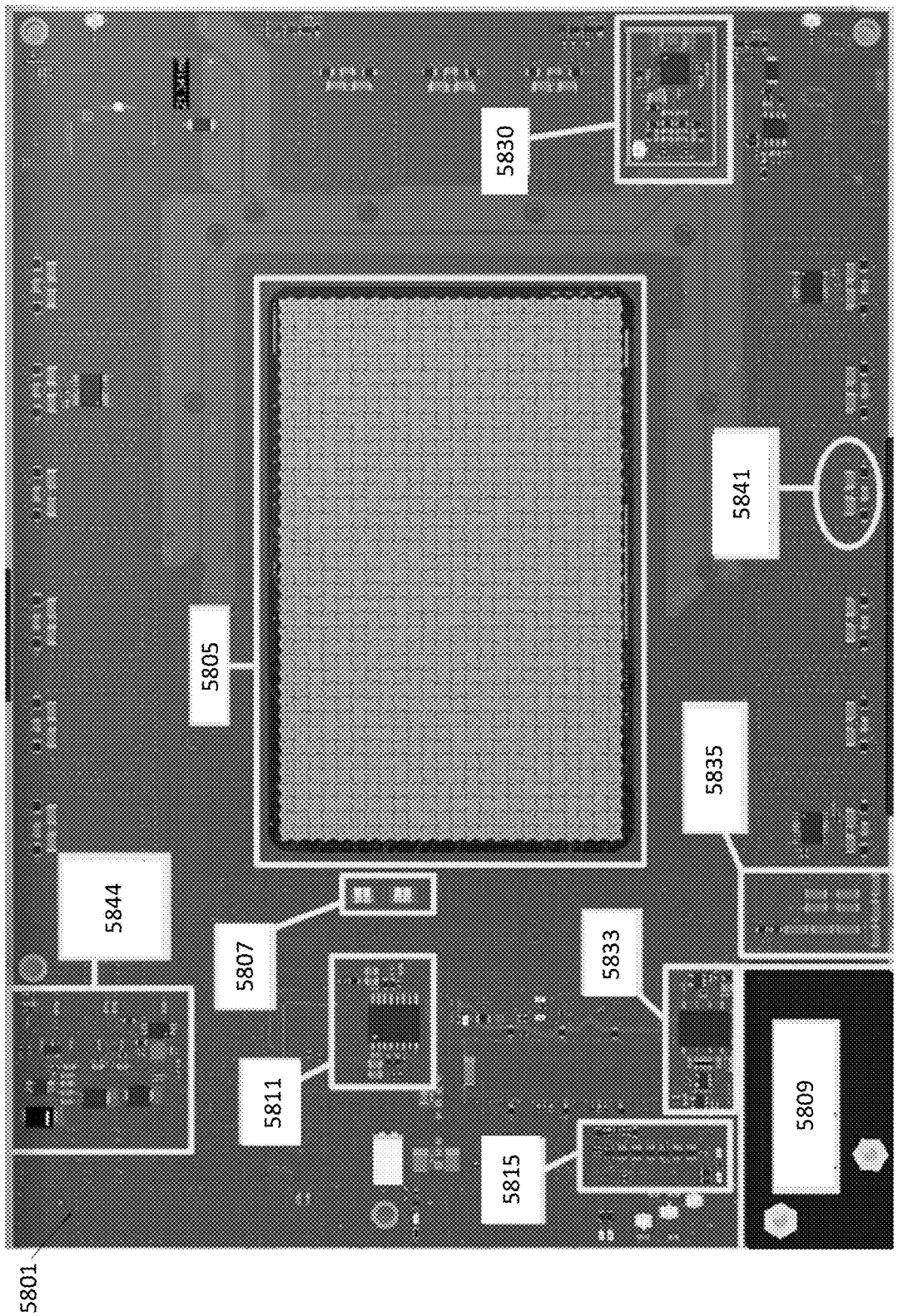
Figure 58B:
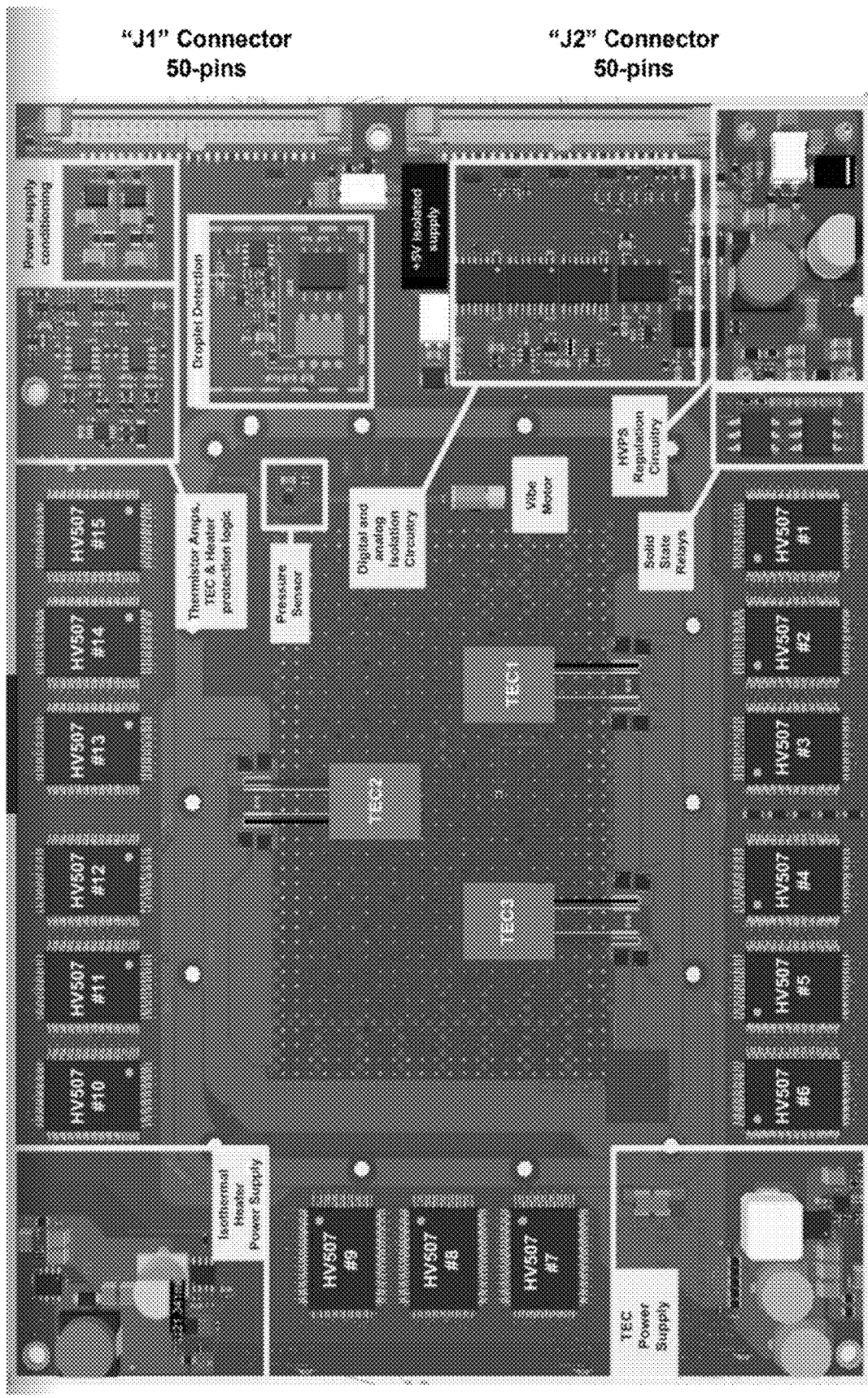

FIGS. 58A-58B illustrate an example of an electrode subsystem of an apparatus as described herein.

Figure 59:
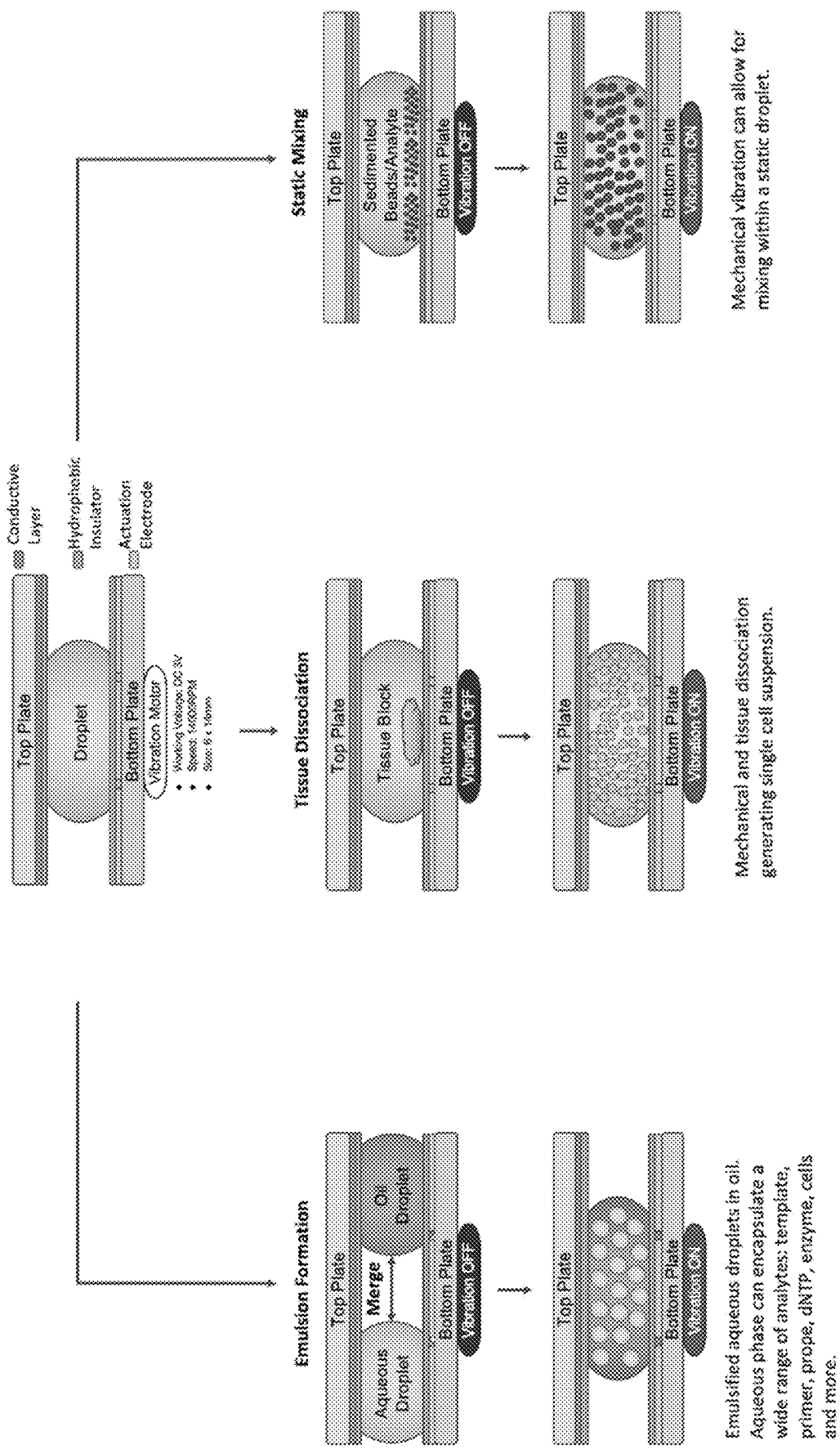

FIG. 59 illustrates, schematically, an example of an apparatus including a vortex (mechanical vibration) subassembly.

Figure 60A:
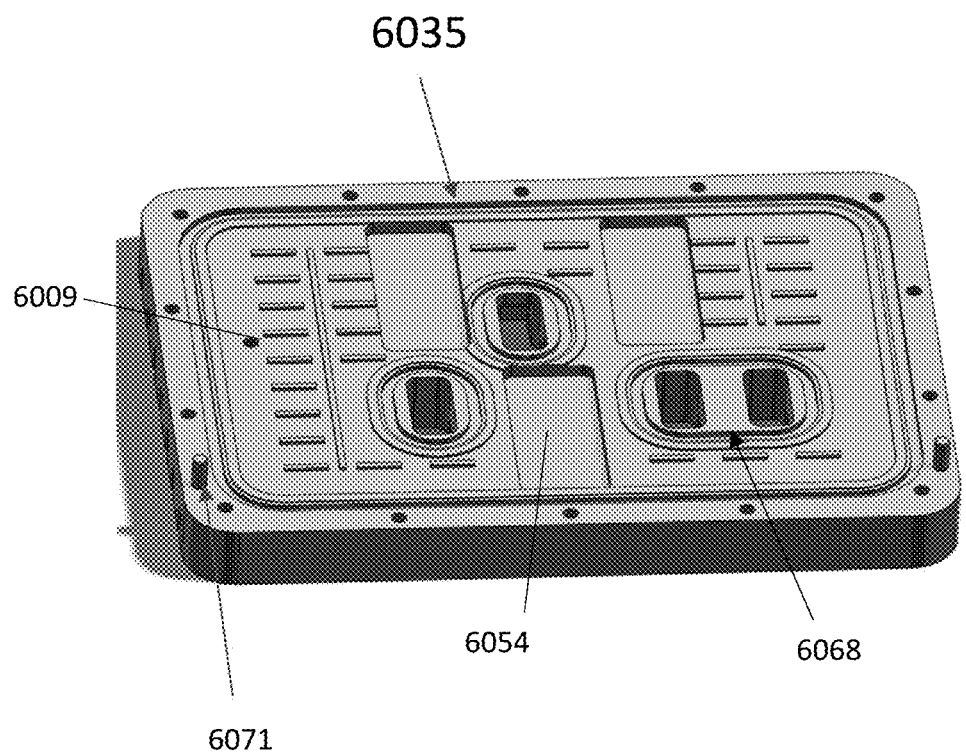
Figure 60B:
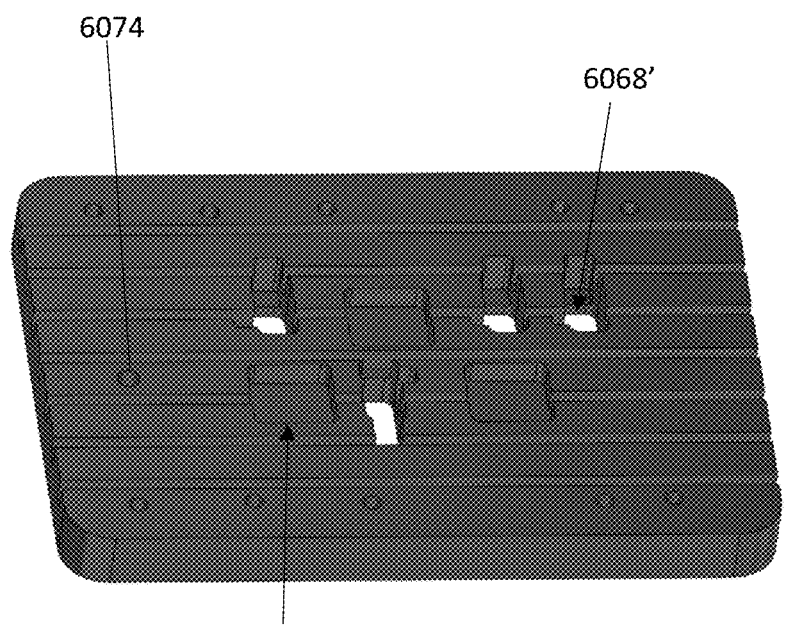

FIGS. 60A-60B illustrate an example of a vacuum chuck for an apparatus as descried herein.

Figure 61:
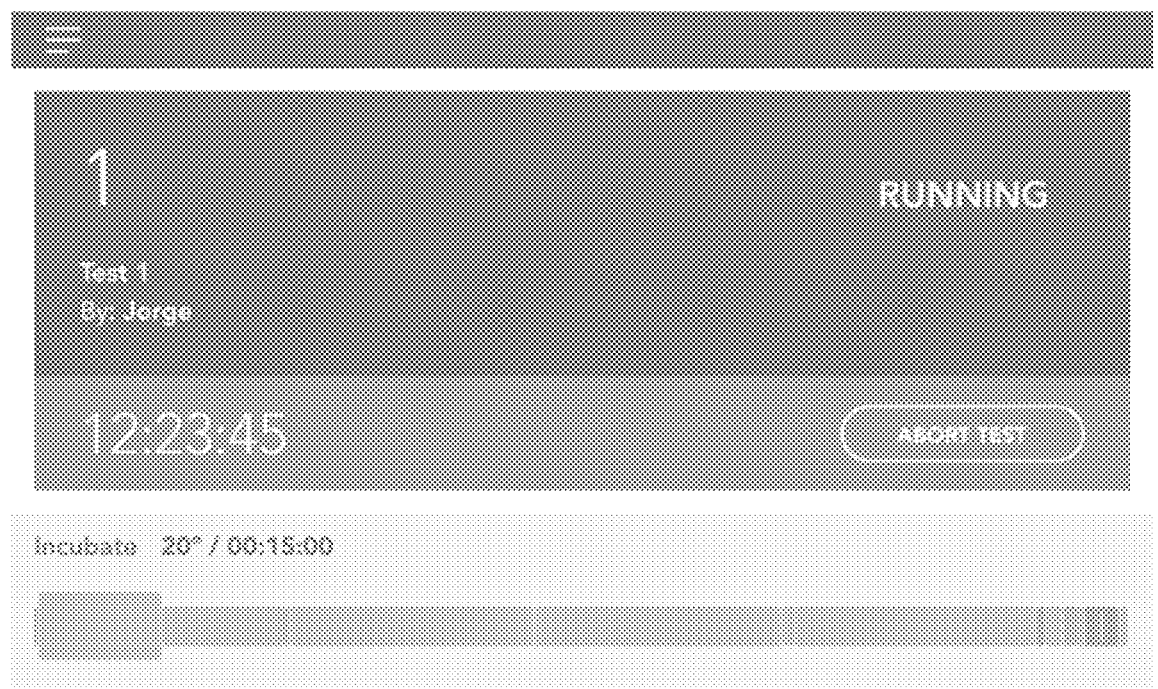

FIG. 61 is a user interface for an apparatus.

Figure 62:
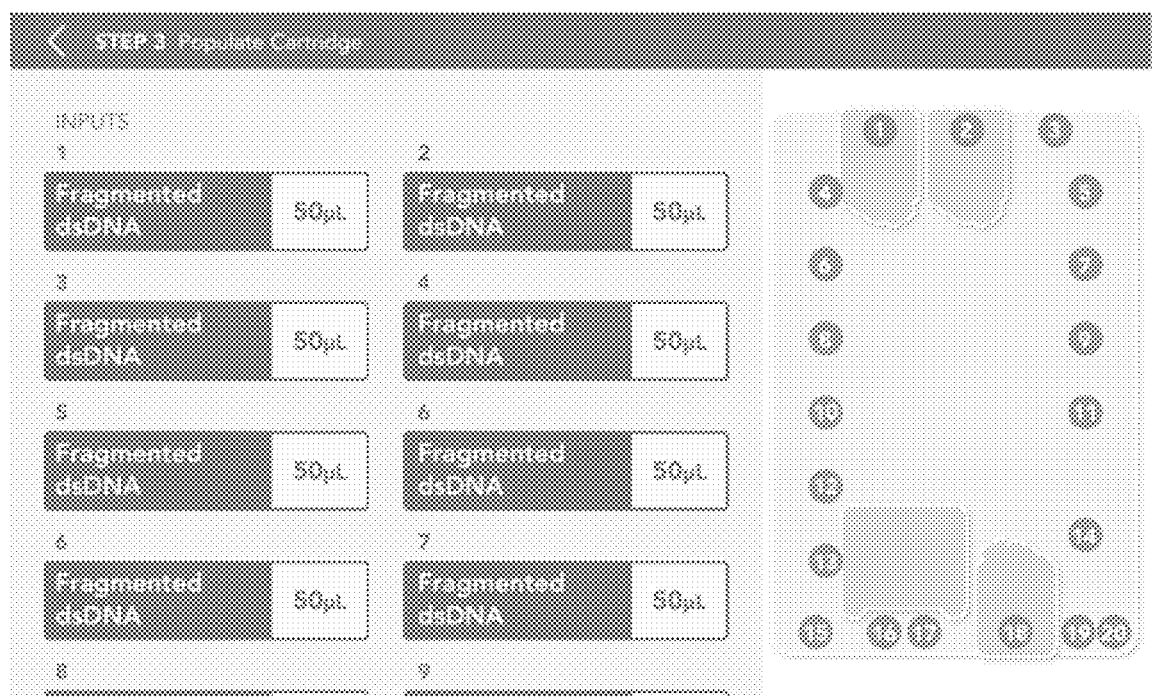

FIG. 62 is an example of a user interface for guiding use of an apparatus as described herein.

Figure 63:
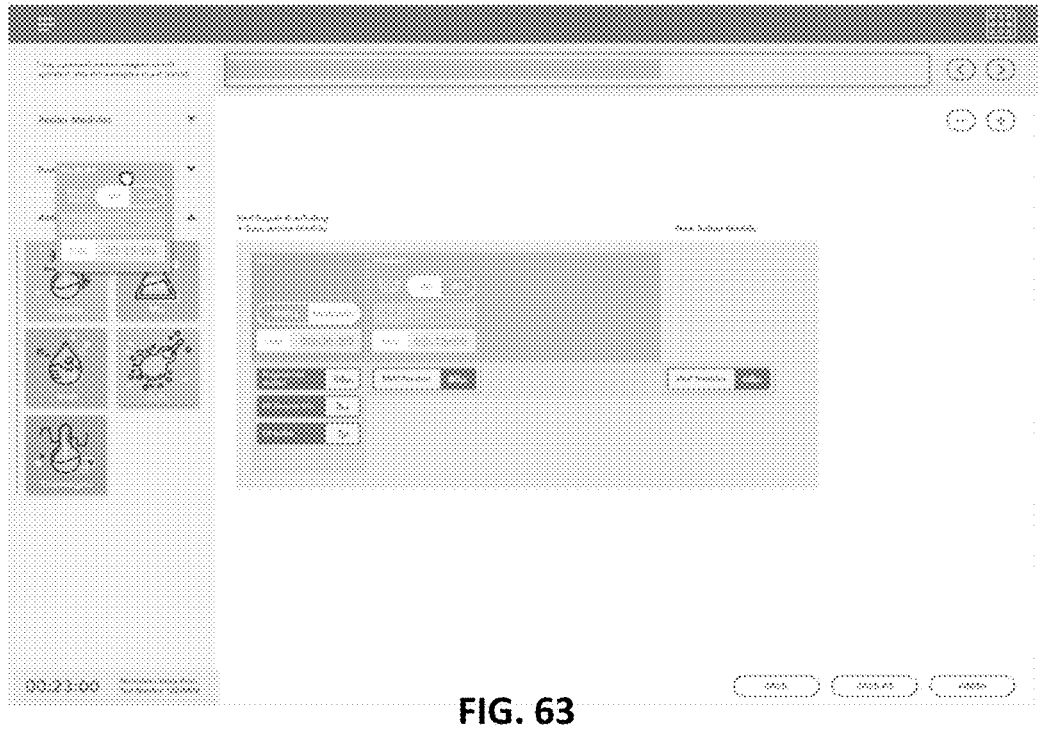

FIG. 63 is another example of a user interface for an apparatus.

Figure 64:
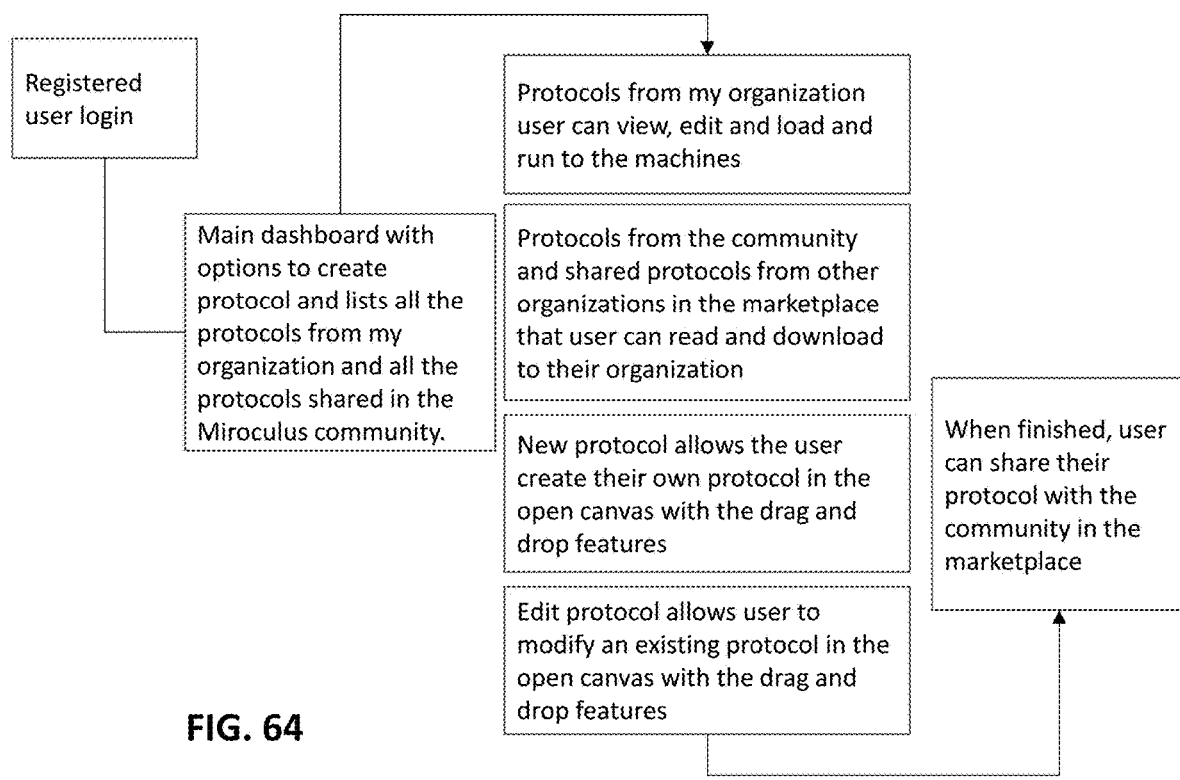

FIG. 64 schematically illustrates the use of a marketplace for laboratory protocols for the devices described herein.

FIGS. 65-68 illustrate example of user interfaces for controlling operation of the apparatuses described herein.

Figure 69:
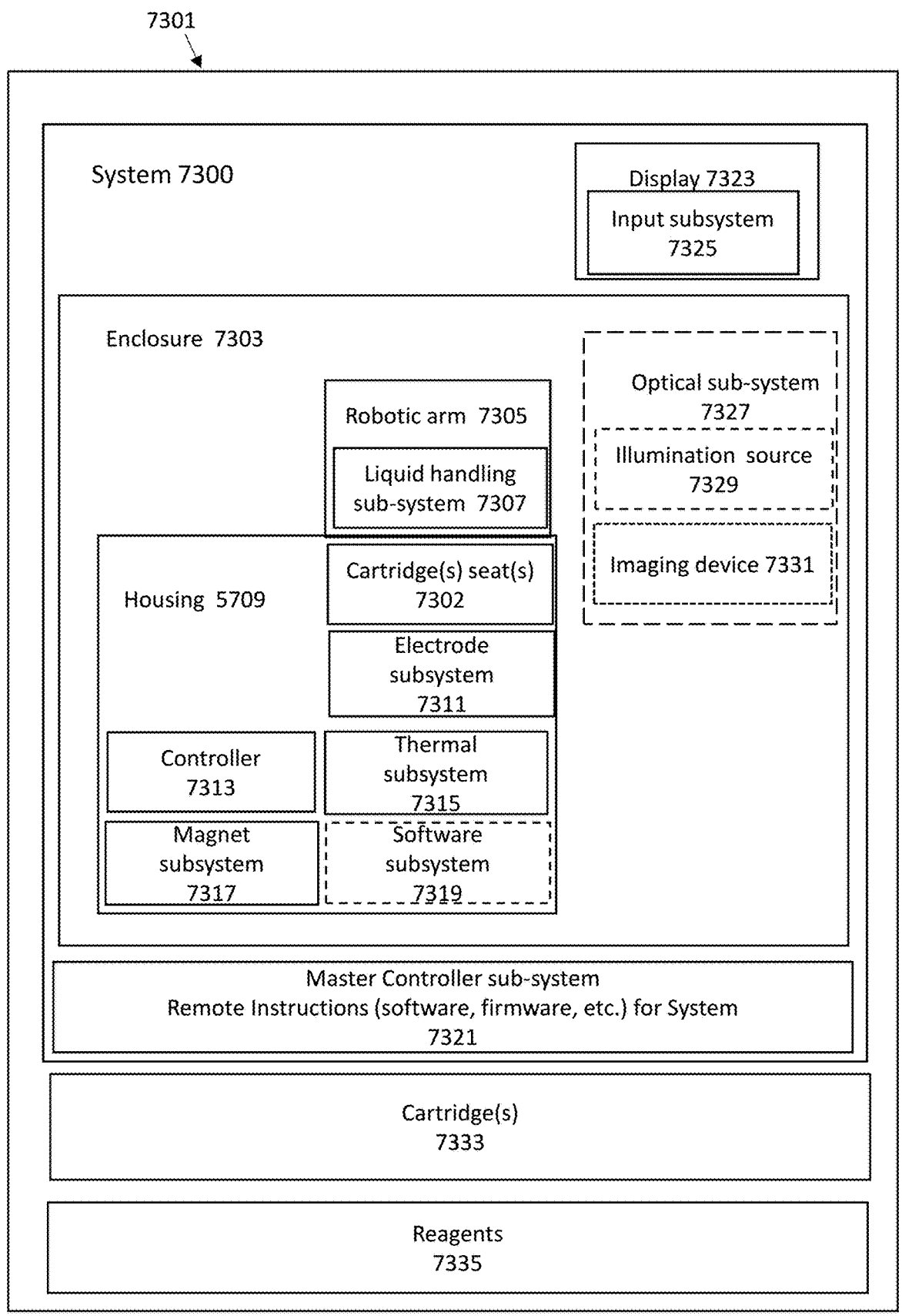

FIG. 69 is a schematic representation of a system according to some embodiments of the disclosure.

Figure 70A:
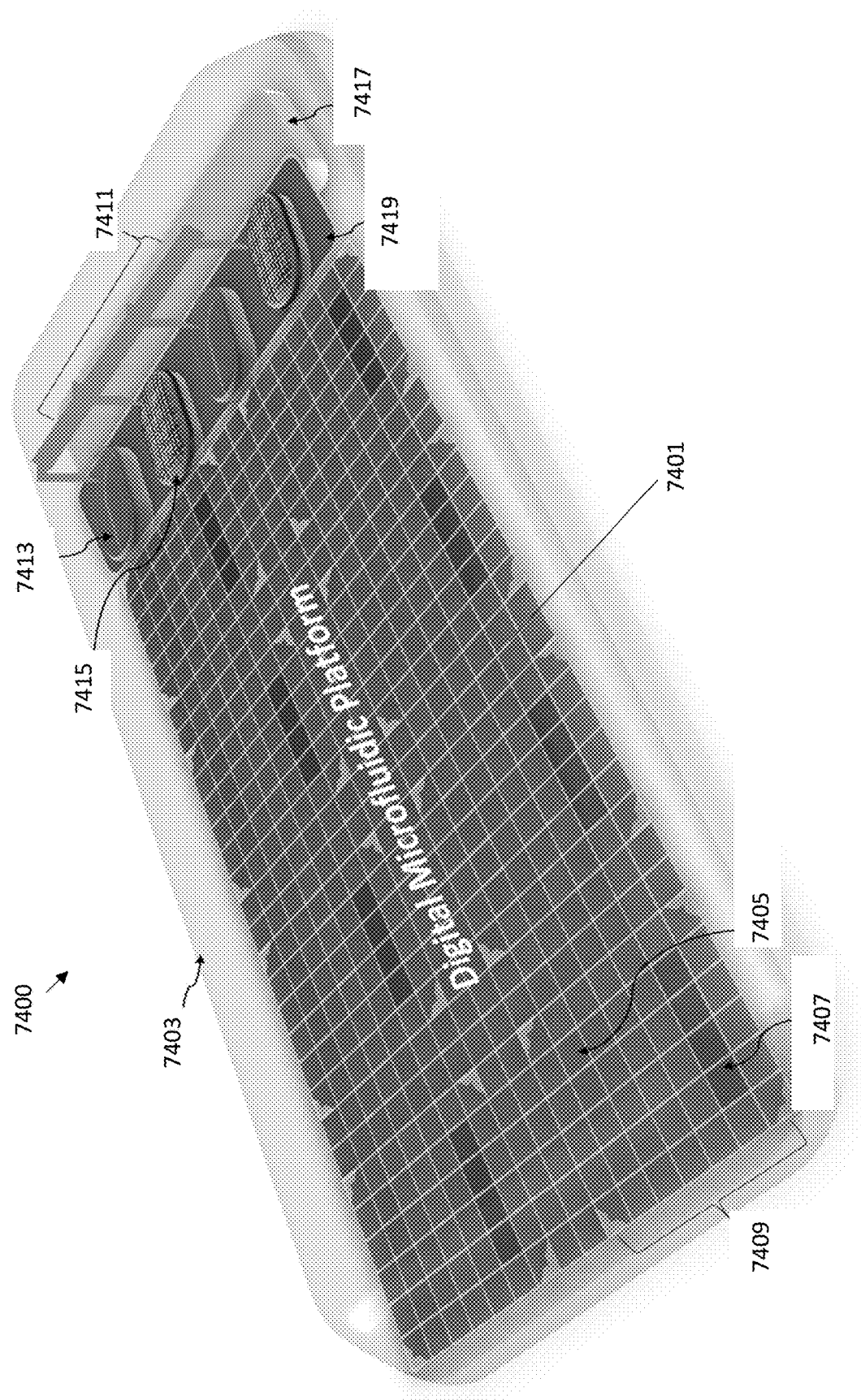
Figure 70B:
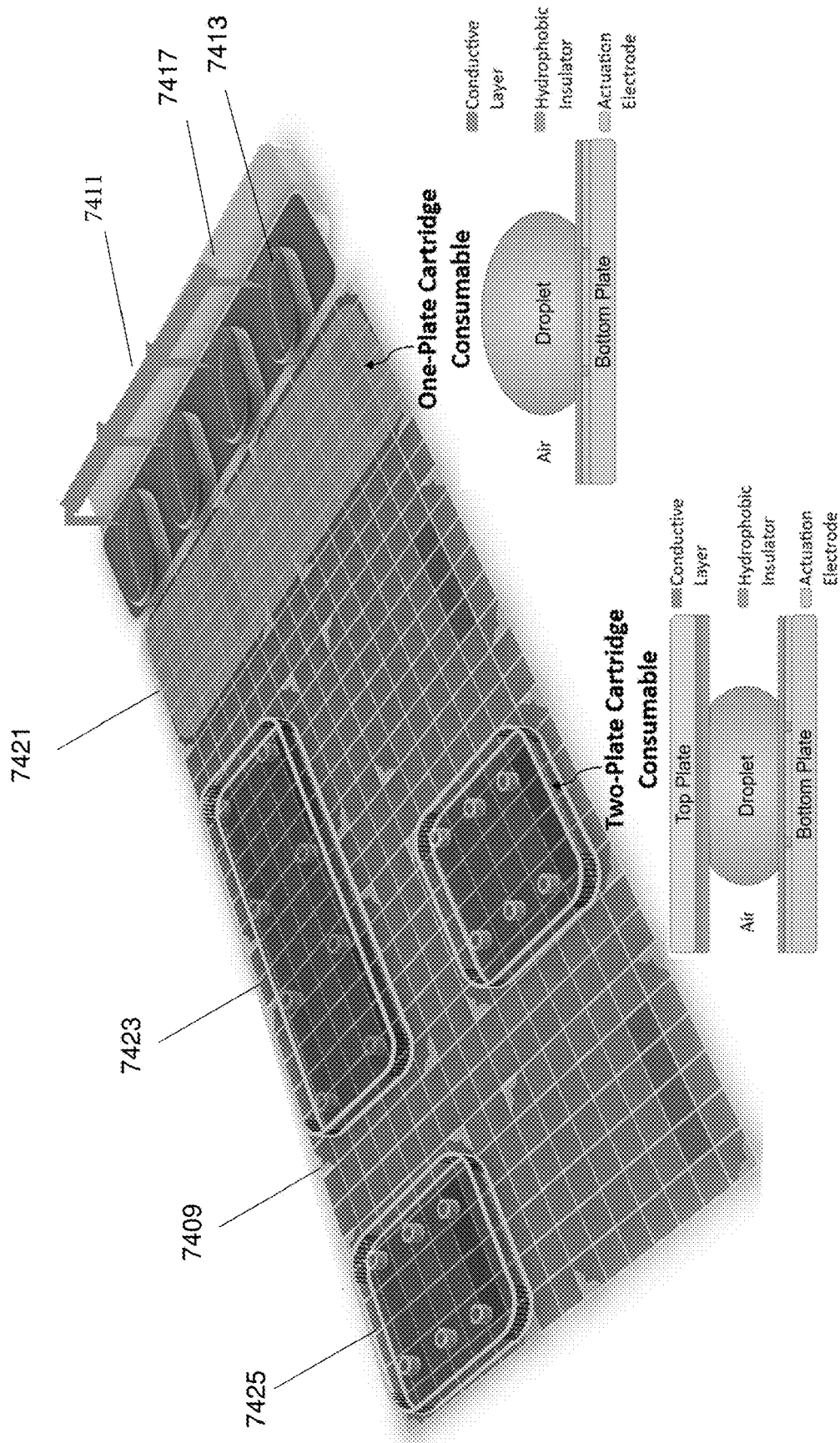
Figure 70C:
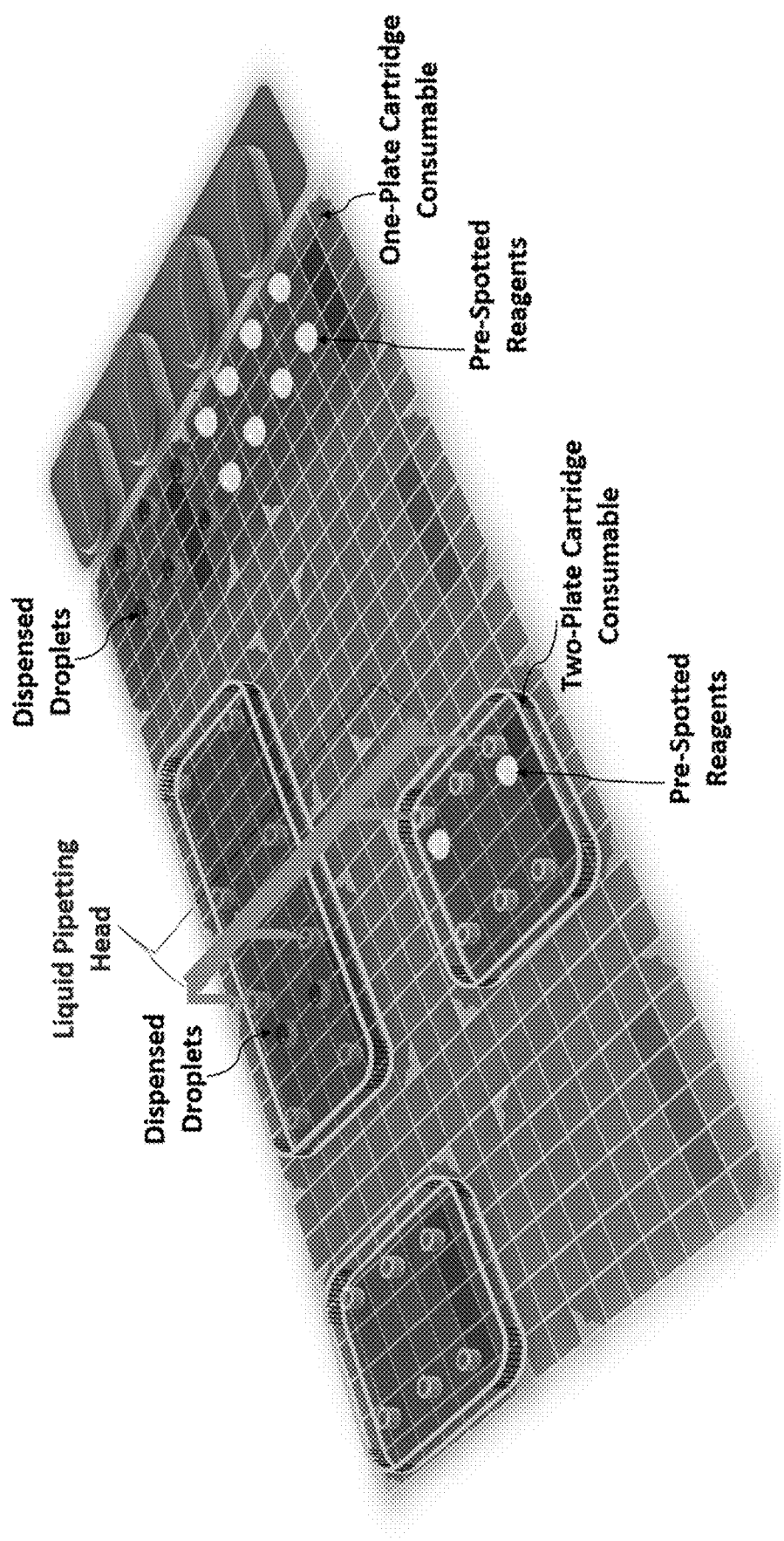

FIGS. 70A-C are graphical representations of a system according to some embodiments of the disclosure.

Figure 71:
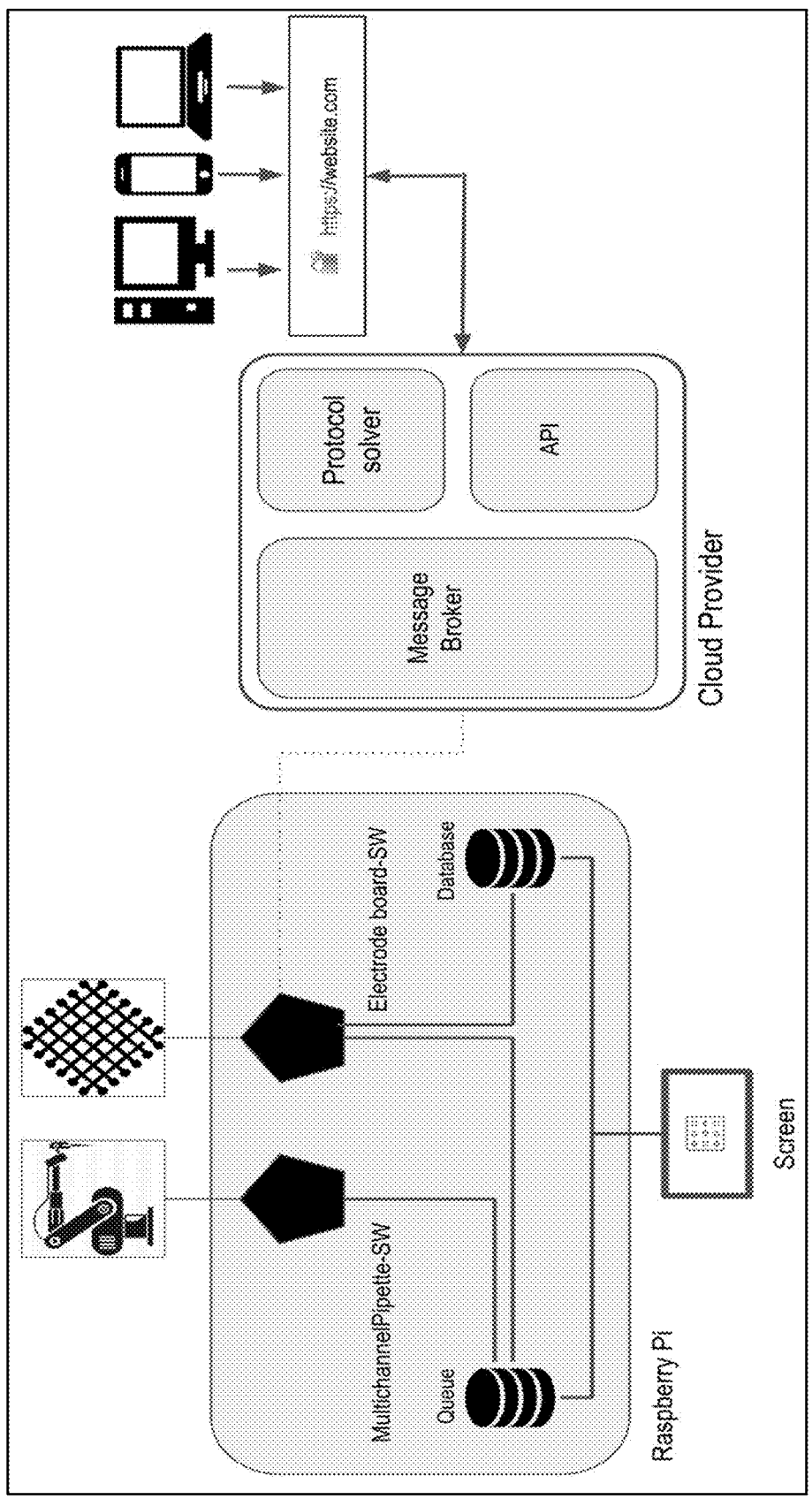

FIG. 71 is a schematic representation of a software architecture for use in a system according to some embodiments of the disclosure.

DETAILED DESCRIPTION

Digital microfluidics (DMF) has become a popular technology for a wide range of applications in chemistry, biology and medicine. Like microchannel-based fluidics, DMF is being used to miniaturize a wide range of applications, with the advantages of reduced reagent and solvent consumption, faster reaction rates and the capacity for integration (i.e., the lab-on-a-chip concept). In DMF, nanoliter to microliter droplets containing samples and reagents are controlled (i.e., moved, merged, mixed, and dispensed from reservoirs) by applying a series of electrical potentials to an array of electrodes coated with a hydrophobic insulator. DMF is distinct from microchannel-based fluidics as it allows for precise control over multiple reagent phases (liquid and solid) in heterogeneous systems with no need for complex networks of microvalves.

For many applications, it can be most convenient to carry out DMF on an open surface, such that the matrix surrounding the droplets is ambient air. FIG. 1A illustrates one example of an air-matrix DMF apparatus. In general, the air-matrix DMF apparatus such as the one shown in FIG. 1A includes a plurality of unit cells 191 that are adjacent to each other and defined by having a single actuation electrode 106 opposite from a ground electrode 102; each unit cell may any appropriate shape, but may generally have the same approximate surface area. In FIG. 1A, the unit cells are rectangular. One or more droplets to be manipulated by the actuation electrodes may be isolated from the electrodes by a hydrophobic insulator. When an electrical potential is applied, charge accumulates on either side of the insulator, a phenomenon that can be exploited to make droplets move, merge, mix, split, and dispense. Other example of DMF apparatuses and/or cartridges, that may be adapted for use as described herein are described, e.g., in International Application no. PCTUS2018049415, filed on Sep. 4, 2018 and titled "DIGITAL MICROFLUIDICS DEVICES AND METHODS OF USING THEM" (which claims priority to U.S. Provisional Patent Application No. 62/553,743, filed on Sep. 1, 2017, and U.S. Provisional Patent Application No. 62/557,714, filed on Sep. 12, 2017), and International Application no. PCT/US2020/020255, filed on Feb. 28, 2020, and titled "DIGITAL MICROFLUIDICS DEVICES AND METHODS OF USING THEM" (claiming priority to U.S. provisional patent application No. 62/811,540, filed on Feb. 28, 2019), each of these applications is herein incorporated by reference in its entirety.

Despite the enthusiasm for the simplicity that digital microfluidics can offer, the low-throughput capability for systems/apparatuses such as that illustrated in FIG. 1A, has limited its adoption for technical problems requiring high throughput automation of complex processes such as DNA library preparation for next generation sequencing (NGS), DNA assembly for synthetic biology, assays of all types, (including, but not limited to, cell culture assays, qPCR, and the like) and drug discovery. Applicant describes the first system architecture combining reaction capabilities and processing by digital microfluidics, with liquid handling robot capability to provide DMF systems and apparatuses which can address these requirements for burgeoning analysis and sample preparation processes. The apparatuses described herein can dispense a selected quantity of reagent, samples or other liquid to a designated area on a DMF-enabled cartridge seating surface, providing multiplexed capabilities. The apparatuses can provide fast and inexpensive high-throughput processing and analysis in a digital microfluidic environment.

A new architecture mating digital microfluidics to a liquid handling robot is described herein. The new multilayer architecture system is formed by integrating a DMF platform into commercially available or custom-built liquid handling robots. As shown in FIG. 70A, the two fluid manipulation paradigms, the electromechanical droplet manipulation platform and the liquid handling subsystem (including a liquid handling head, liquid handling tip(s)) are orthogonal and independent. Not shown in the FIG. 70A, a robotic arm directs liquid dispensing to/withdrawal of fluid from a plurality of locations upon the DMF electrode array surface (e.g., the seating surface for one or more cartridges), providing maximum flexibility for multiplexing experiments, both in number and kind. The DMF apparatus may further include additional features/components to implement the range of assay/sample preparation described below. Additionally, both fluid manipulation paradigms may be enclosed with a chamber (e.g., an enclosure) providing precise humidity-, temperature- and gas-control.

As shown in FIG. 70B, a novel feature of these open-array DMF systems/apparatuses is the ability to accommodate one- and two-plate cartridge formats of different sizes simultaneously. In the two-plate format, droplets are sandwiched between two substrates, and in the one-plate format, the droplets are positioned on top of a single substrate. In both configurations, the droplets to be manipulated are isolated from the electrodes by a hydrophobic insulator. A key feature of the integrated system includes high throughput and automated delivery of reagent droplets onto the DMF platform using a liquid pipetting head having 3 axis delivery capability (e.g., a robotic arm is used to access the delivery point). Further description of the systems, apparatuses and methods of use thereof are provided.

Apparatus. A digital microfluidics apparatus or a system incorporating a digital microfluidics apparatus may include a seating surface configured to concurrently seat one or more cartridges. The seating surface may have a width of about 50, 60, 70, 90, 100, 150, 200, 250, 400, 500, 600, 700, 780, or about 800 millimeters, or a width having any value therebetween. The seating surface may have a length of about 80, 100, 110, 150, 200, 400, 600, 800, 1000, 1300, 1500, 1750, 1800, 2000, 2050, or about 2100 millimeters. A plurality of drive electrodes may be disposed on the seating surface, where the driving electrodes are configured to apply a high voltage to move a droplet within a cartridge when the cartridge is seated on the seating surface. There may be about 300, 400, 500, 600, 800, 900, 1000, 1500, 2000, 5000, 10,000, 20,000, 30,000, 40,000, 50,000, 60,000, or about 70,000 drive electrodes, or there may be a number of drive electrodes of any value therebetween. In some variations, there may be from about 300 to about 65000, about 350 to about 50,000, about 400 to about 25,000, or about 400 to about 20,000 electrodes within an electrode array of the apparatus. The electrodes may have any shape and may be made of any materials as described herein. All or some of the drive electrodes includes an opening there through, and the opening may be configured in any suitable size and placement within the drive electrode, as described below. The apparatus may further include a plurality of vacuum ports, where each vacuum port is coupled to one or more of the openings through the drive electrodes. A vacuum control included within the apparatus is configured to selectively apply vacuum through a subset of the vacuum ports under cartridges seated on the seating surface to selectively immobilize the one or more cartridges to the seating surface. A vacuum pump for applying a vacuum to the plurality of vacuum ports may be incorporated within the apparatus or system containing the apparatus. The apparatus may further include an electrical control for applying energy to sequentially activate and de-activate one or more selected drive electrodes to move a droplet within an air gap of the cartridge(s) seated on the seating surface. The apparatus includes a robotic arm and a liquid handling subsystem for dispensing or removing liquid to the cartridge(s) on the seating surface.

In some variations of the apparatuses, the robotic arm of the apparatus may be a 3-axis robotic arm. The 3-axis functionality will permit dispensing or withdrawing to/from any suitable location upon the seating surface, e.g., the robotic arm may access any cartridge seated on the seating surface and may further access any suitable location within the upper surface of a two-plate cartridge or any suitable location within the air gap of a one-plate cartridge. This capability to direct dispensing or withdrawing of fluids to any desired position on the seating surface may further permit a size of a cartridge to be reduced compared to a size of a cartridge used within a DMF apparatus having no robotic delivery/withdrawal, as a droplet may not need to be driven to a second or additional location in order to add reagents or buffers to the droplet.

In some variations, the robotic arm may further include a metal probe configured to electroporate a biological cell within a droplet within the one or more cartridges when the one or more cartridges are seated on the seating surface. The metal probe may be energized to prove electroporation energy to the selected droplet, thereby electroporating a biological cell present within the droplet.

The liquid handling subsystem of the apparatuses may include a liquid handling head and at least one liquid handling tip. In some embodiments, the liquid handling subsystem may include a plurality of liquid handling tips, which may be about 4, 8 12 or 96 liquid handling tips. The liquid handling head may be configured to dispense or withdraw volumes of about 0.1 microliter to about 500 milliliters, about 0.5 microliters to about 250 milliliters, about 1 microliter to about 100 milliliters, or any value therebetween in any of the ranges. The fluid to be dispensed may be a reagent, a reagent mixture, a sample or any combination thereof. In some instances, the liquid handling head may be further configured to dispense a biological cell suspended in a liquid, such as for example, a sample including a biological cell to be processed or assayed. Processing, as used herein, refers to manipulation or treatment of a biological cell, such as but not limited to, breaching the cell wall or membrane(s) to access contents of a cell. The contents of the biological cell to be accessed for processing may include, but is not limited to nucleic acids or proteins. In some variations, the at least one liquid handling tip may further be configured to mix fluids within a droplet within the one or more cartridges seated on the seating surface. The robotic arm or liquid handling head may be provided with a gaseous stream that may be directed via the liquid handling tip to mix fluids within the droplet.

The digital microfluidics apparatus may be configured to seat one or more one-plate cartridges and/or two-plate cartridges. A mixture of both one-plate cartridges and two-plate cartridges may be used at the same time on the digital microfluidics apparatus. The cartridges may be all the same size (width×length) or may have one or more differing sizes. As mentioned above, a size of a cartridge, for a particular reaction or sample preparation workflow, may be reduced relative to a cartridge used on a DMF apparatus having no robotic dispensing, as additional movement of, for instance, a droplet to merge with a reagent or buffer droplet is not required. The seating locations on the seating surface for the one or more cartridges may be non-defined. That is, a cartridge may be placed at a seating location in any suitable location based on the requirements for the reaction or preparation to be performed, such that the cartridge overlays any required heating zones or magnetically controlled zones. Areas on the seating surface may be used for a one-plate cartridge or a two-plate cartridge at will, and permit placing a one-plate cartridge proximal to a two-plate cartridge in any arrangement.

The seating surface of the apparatus may also include alignment features as described herein, to assist in placing the cartridge(s) on the seating surface. Alignment features may be any alignment feature as described herein, and may include one or more of alignment pins, camera-based vision algorithms and/or radio-frequency identification.

In some variations, the apparatus may further include a master control subsystem for coordinating activation of the plurality of driving electrodes, the plurality of vacuum ports, the robotic arm and the liquid handling subsystem. The master control subsystem may further include non-transitory instructions for performing a method for controlling the plurality of vacuum ports and the plurality of drive electrodes, a method for controlling liquid handling or a combination thereof, as described more fully below.

In some variations, the apparatus may further include one or more temperature-controlled regions within the driving electrode array, as described herein. The temperature-controlled regions may be configured to heat and/or cool. Selected regions of the seating surface may be operated at temperatures between about 4° C. to about 100° C., about 10° C. to about 100° C., about 15° C. to about 100° C., about 20° C. to about 100° C., about 25° C. to about 100° C., about 30° C. to about 100° C., about 37° C. to about 100° C., or any temperature therebetween. There may be one or more such temperature-controlled regions in the seating surface. In some variations, there may be 1, 4, 8, 10, 16, 20, 32 or more temperature-controlled regions in the seating surface. The apparatus may further include one or more regions within the driving electrode array, each including a magnetic field.

The digital microfluidics apparatus may further include a temperature controlled reagent/sample storage subsystem. In some variations, the reagent/sample storage subsystem may include a wellplate containment region. In some embodiments, the wellplate containment region may be configured to contain any one of a 24 well, 48 well, 96 well or 384 well wellplate.

In some variations, the master control of the apparatus may be configured to direct the robotic arm and liquid handling subsystem to dispense a droplet at a selected location within at least one of the one or more cartridges seated on the seating surface based at least in part on a location of each of the one or more cartridges seated on the seating surface. The master control may further or alternatively be configured to direct the robotic arm and liquid handling subsystem to dispense a droplet at a selected location within at least one of the one or more cartridges seated on the seating surface based at least in part on a location of a pre-spotted reagent within at least one of the one or more cartridges seated on the seating surface. In some variations, the master control may be configured to direct the robotic arm and liquid handling subsystem to dispense a droplet at a selected location within at least one of the one or more cartridges seated on the seating surface based at least in part on whether the at least one of the one or more cartridges is a one-plate cartridge or a two-plate cartridge. When the at least one cartridge is a one-plate cartridge, the selected location may be any location within the one-plate cartridge and when the at least one cartridge is a two-plate cartridge, the selected location may be a location of a fluidic input/output port on the upper plate of the two-plate cartridge.

In some variations, the master control of the apparatus may be further configured to sequence mixing of the droplet by the liquid handling tip at the selected location within the at least one cartridge of the one or more cartridges seated on the seating surface. Mixing capability may be as described above, provided by a gas stream included within the robotic arm, and gas, such as nitrogen or atmospheric air, may be jetted through the liquid handling tip to cause agitation and mixing of the droplet. The master controller may sequence mixing at the one or more cartridges to be performed serially, e.g., one mixing event at a time, or may sequencing mixing at one or more of the cartridges to be performed in parallel, e.g., all mixing events are performed at the same time.

In some variations, the master control may be configured to select the one or more selected drive electrodes to drive a droplet within one or more of the cartridges seated on the seating surface based in part on a location of each of the one or more cartridges seated on the seating surface. Alternatively or in addition, the master control may be configured to select the one or more selected drive electrodes based in part on a location of a droplet within each of the one or more cartridges seated on the seating surface.

In some variations, the master control may be configured to sequence activation and deactivation of the one or more selected drive electrodes. Sequencing of activation and deactivation may be based, at least in part, on a location of each of the one or more cartridges seated on the seating surface. In addition or alternatively, the master control may be configured to sequence activation and deactivation of the one or more selected drive electrodes based in part on a location of a droplet within each of the one or more cartridges seated on the seating surface. In some variations, the master control may be further configured to sequence activation and deactivation of the one or more selected drive electrodes based in part on detecting completion of dispensing or withdrawing of a droplet within each of the one or more cartridges seated on the seating surface.

In some variations, the master control may be configured to sequence dispensing or withdrawal of a droplet to/from each of the one or more cartridges based at least in part on determining that the one or more selected drive electrodes in each of the one or more cartridges seated on the seating surface are not activated to drive a droplet during the dispensing or withdrawal of the droplet.

In some variations, the master control may further be configured to identify and dispense a selected reagent or sample in a droplet to at least one of the one or more cartridges, when the one or more cartridges are seated on the seating surface. The selected reagent or sample may be different for each of the one or more cartridges, or a same reaction or sample preparation may be performed in multiple cartridges at the same time, and the master controller may control the multiplexed additions or withdrawals.

When the reagent/sample storage subsystem includes a wellplate containment region, the master control may further be configured to withdraw a sample from a well plate in the wellplate containment region when dispensing the sample in a droplet to at least one of the one or more cartridges, when the one or more cartridges are seated on the seating surface. In some variations, the master control may further be configured to deliver a droplet to a well plate in the wellplate containment region when withdrawing a droplet from at least one of the one or more cartridges seated on the seating surface.

When the robotic arm further includes a metal tip configured to electroporate a biological cell within a droplet at a location within one of the one or more cartridges seated on the seating surface, the master control may be configured to direct the robotic arm to deliver the metal tip to the location of the droplet within the cartridge. Additionally or alternatively, the master control may be configured to schedule electroporation of a biological cell based at least in part on determining that the one or more selected drive electrodes in the cartridge are not activated to drive a droplet during the electroporation.

Based on the foregoing, another exemplary a digital microfluidics apparatus may include a seating surface configured to concurrently seat one or more cartridges; a plurality of drive electrodes disposed on the seating surface, where the driving electrodes are configured to apply a high voltage to move a droplet within a cartridge when the cartridge is seated on the seating surface, and where all or some of the drive electrodes includes an opening there through; a plurality of vacuum ports, where each vacuum port is coupled to one or more of the openings through the drive electrodes; a vacuum control configured to selectively apply vacuum through a subset of the vacuum ports under the one or more cartridges seated on the seating surface when the one or more cartridges are seated on the seating surface; an electrical control for applying energy to sequentially activate and de-activate one or more selected drive electrodes to move a droplet within an air gap of the one or more cartridges are seated on the seating surface; a vacuum pump for applying a vacuum to the plurality of vacuum ports; a robotic arm and a liquid handling subsystem for dispensing or removing liquid to/from the one or more cartridges when the one or more cartridges are seated on the seating surface; and a master control for coordinating activation and deactivation of the one or more selected drive electrodes with dispensing or removal of liquid to/from the one or more cartridges when the one or more cartridges are seated on the seating surface.

Systems. A system for high-throughput digital microfluidics, as shown in FIGS. 70A-C, may include a digital microfluidics apparatus, the apparatus including: a seating surface configured to concurrently seat one or more cartridges; a plurality of drive electrodes disposed on the seating surface, where the driving electrodes are configured to apply a high voltage to move a droplet within a cartridge when the cartridge is seated on the seating surface, and where all or some of the drive electrodes includes an opening there through; a plurality of vacuum ports, where each vacuum port is coupled to one or more of the openings through the drive electrodes; a vacuum control configured to selectively apply vacuum through a subset of the vacuum ports under the one or more cartridges seated on the seating surface when the one or more cartridges are seated on the seating surface; an electrical control for applying energy to sequentially activate and de-activate one or more selected drive electrodes to move a droplet within an air gap of the one or more cartridges are seated on the seating surface; a vacuum pump for applying a vacuum to the plurality of vacuum ports; a robotic arm and a liquid handling subsystem for dispensing or removing liquid to the one or more cartridges when the one or more cartridges are seated on the seating surface. In some variations, the system may further include an enclosure, where the enclosure controls one or more of humidity, temperature and gaseous environments. The controlled humidity, temperature and gaseous environments may be useful to limit desiccation of droplets within the cartridges seated on the seating surface. The gaseous environment may further include atmospheric air and a 5% addition of carbon dioxide, which may be useful to maintain the viability of a cell within the enclosed system. The humidity may be a relative humidity reducing evaporation from a liquid droplet which, at the same time, does not condense moisture in the gaseous environment to surfaces of the housing or other surfaces of components of the system.

The system may include any feature of a digital microfluidic apparatus for high-throughput digital microfluidics as described herein, and in any combination, as one of skill may devise. Some exemplary, but non-limiting features are described in the following paragraphs.

Accordingly, a system may include a seating surface where a seating location of the one or more cartridges upon the seating surface may not be pre-defined. In some variations, a size of the seating location for at least one of the one or more cartridges is not the same as a size of the seating location for another of the one or more cartridges. In some variations, the system may be configured to seat one or more one-plate cartridges and/or two-plate cartridges.

In some variations, the liquid handling subsystem of the system may include at least one liquid handling tip. The liquid handling subsystem may include a plurality of liquid handling tips, which may be 4, 8, 12, or 96 liquid handling tips. In some variations, the at least one liquid handling tip or the plurality of liquid handling tips may further be configured to mix a droplet within at least one of the one or more cartridges seated on the seating surface.

The liquid handling subsystem of the system may include a liquid handling head. In some variations, the liquid handling head may be configured to dispense volumes of about 1 microliter to about 100 milliliters, but other volumes are possible as well, as described above. The liquid handling head may further be configured to dispense a biological cell suspended in a liquid.

In some variations, the robotic arm may be a 3-axis robotic arm. In some variations, the robotic arm may further include a metal probe configured to electroporate a biological cell within a droplet within at least one of the one or more cartridges seated on the seating surface.

The system may further include a temperature controlled reagent/sample storage subsystem. In some variations, the reagent/sample storage subsystem may include a wellplate containment region. The wellplate containment region may be configured to contain any of a 24 well, 48 well, 96 well and 384 well wellplate.

The system for high-throughput digital microfluidics may further include a master control subsystem configured to coordinate activation of the plurality of driving electrodes, the plurality of vacuum ports, the robotic arm and the liquid handling tip. In some embodiments, the master control subsystem may include non-transitory instructions for performing a method for controlling the plurality of vacuum ports and the plurality of drive electrodes, a method for controlling liquid handling or a combination thereof.

In some variations, the master control subsystem may further be configured to control at least one of the humidity, temperature and gaseous environments of the enclosure. The master control subsystem may include non-transitory instructions for performing a method for controlling at least one of the humidity, temperature and gaseous environments of the enclosure.

Optical subsystem. In some variations, the system for high-throughput digital microfluidics may further include an optical subsystem. In some embodiments, the optical subsystem may include an illumination source. In some embodiments, the illumination source may include one or more of a visible light source or an ultraviolet (UV) light source. The light sources may be LEDs or any other light source capable of providing light in the wavelength range desired. The illumination sources may be used for imaging the seating surface and/or the one or more cartridges seated thereupon. An illumination source having an appropriate wavelength, such as, but not limited to, UV, may also be used to photoactivate a reagent within a droplet upon the surface of one or more cartridges on the seating surface. In another example, a caged fluorescent dye may be uncaged using photoactivation in the UV range. The optical subsystem may further include an imaging device configured to detect brightfield images, fluorescent images, or luminescent images. In some variations, the optical subsystem may be configured to control the one or more illumination sources and the imaging device when present.

The optical subsystem may further be configured to communicate with a master control subsystem. In some variations, non-transitory instructions of the master control subsystem may further include instructions for sequencing activation of the driving electrodes and activation of liquid handling based upon imaging communications received from the optical subsystem. The master control subsystem may further include non-transitory instructions for performing a method for controlling the optical sub-system. In some variations, the non-transitory instructions may include instructions for activating and deactivating brightfield and/or fluorescent illumination and/or capturing an image of a selected region of the seating surface of the digital microfluidic apparatus.

In some variations of the system for high-throughput digital microfluidics, the digital microfluidic apparatus may further include one or more regions within the driving electrode array, where the one or more regions further includes magnets. In some variations, the digital microfluidic apparatus of the system may further include one or more regions within the driving electrode array including heating and/or cooling controllability. In some variations of the systems, the system may further include more than one digital microfluidic apparatus.

Methods of using the apparatus. A method of selectively immobilizing one or more cartridges in a digital microfluidics apparatus for high-throughput digital microfluidics is provided for a digital microfluidics apparatus including: a seating surface configured to concurrently seat one or more cartridges; a plurality of drive electrodes disposed on the seating surface, where the driving electrodes are configured to apply a high voltage to move a droplet within a cartridge when the cartridge is seated on the seating surface, and where all or some of the drive electrodes include an opening there through; a plurality of vacuum ports, where each vacuum port is coupled to one or more of the openings through the drive electrodes; a vacuum control configured to selectively apply vacuum through a subset of the vacuum ports under the one or more cartridges seated on the seating surface when the one or more cartridges are seated on the seating surface; an electrical control for applying energy to sequentially activate and de-activate one or more selected drive electrodes to move a droplet within an air gap of the one or more cartridges are seated on the seating surface; a vacuum pump for applying a vacuum to the plurality of vacuum ports; a robotic arm and a liquid handling subsystem for dispensing or removing liquid to the one or more cartridges when the one or more cartridges are seated on the seating surface. The method includes disposing the one or more cartridges upon the seating surface, thereby creating a respective seating location of the one or more cartridges; sensing each seating location of one or more seating locations; and determining a region including a sub-set of the plurality of driving electrodes underlying each seating location, thereby identifying one or more regions of driving electrodes underlying the plurality of seating locations. Activation of the vacuum control to apply the vacuum to the one or more regions of driving electrodes; and the one or more cartridges are selectively immobilized to the seating surface of the digital microfluidics apparatus.

In some variations, each of the one or more cartridges may include a bottom plate configured to deform when vacuum is applied, thereby adhering to the seating surface. Each respective seating location may have a respective area corresponding to a size of each cartridge. In some embodiments, at least one of the one or more cartridges has a size that is different from others of the one or more cartridges.

The digital microfluidics apparatus for high-throughput digital microfluidics may include any other feature of a digital microfluidics apparatus as described herein in this method. Further, this method for selectively immobilizing the one or more cartridges may be combined with any other method described herein, as one of skill may devise. In some variations, the apparatus may include a master control subsystem, and the method may be performed by the master control subsystem. In some variations the method performed by the master control subsystem may be performed automatically.

A method of coordinating droplet movement and liquid handling in a cartridge within digital microfluidics apparatus for high-throughput digital microfluidics is provided for a digital microfluidics apparatus including: a seating surface configured to concurrently seat one or more cartridges; a plurality of drive electrodes disposed on the seating surface, where the driving electrodes are configured to apply a high voltage to move a droplet within a cartridge when the cartridge is seated on the seating surface, and where all or some of the drive electrodes includes an opening there through; a plurality of vacuum ports, where each vacuum port is coupled to one or more of the openings through the drive electrodes; a vacuum control configured to selectively apply vacuum through a subset of the vacuum ports under the one or more cartridges seated on the seating surface when the one or more cartridges are seated on the seating surface; an electrical control for applying energy to sequentially activate and de-activate one or more selected drive electrodes to move a droplet within an air gap of the one or more cartridges are seated on the seating surface; a vacuum pump for applying a vacuum to the plurality of vacuum ports; a robotic arm and a liquid handling subsystem for dispensing or removing liquid to the one or more cartridges when the one or more cartridges are seated on the seating surface. The method includes disposing each of the one or more cartridges upon the seating surface; determining a seating location of each of the one or more cartridges upon the seating surface; determining a region including a sub-set of the plurality of driving electrodes underlying each seating location, thereby identifying one or more regions of driving electrodes underlying the plurality of seating locations; selectively immobilizing each of the one or more cartridges upon the seating surface of the digital microfluidics apparatus; identifying a location of a fluidic input of each of the one or more cartridges; and disposing a droplet from the liquid handling subsystem within each of the one or more cartridges via the respective fluidic input; Identifying a fluidic input of each of the one or more cartridges may include determining, for each of the one or more cartridges, whether each cartridge is a one-plate cartridge or a two-plate cartridge. A fluidic input for a one-plate cartridge may be any location on the surface facing the air gap of the one-plate cartridge, as the entire upper surface of the bottom plate of the one-plate cartridge is open to the robotic arm and liquid handling subsystem. A fluidic input for a two-plate cartridge may be a port or other opening in the upper plate of the two-plate cartridge, and a two-plate cartridge may have one or more fluidic inputs, and may, in some variations, have a plurality of fluidic inputs. Identifying a fluidic input for a two-plate cartridge may include identifying a location of the one or more ports or openings on the upper plate of the two-plate cartridge. Dispensing a droplet within each of the one or more cartridges may include serially dispensing, e.g., a one drop at a time to each of the one or more cartridges in turn. Dispensing may alternatively include dispensing a droplet within each of the one or more cartridges on the seating surface in parallel, e.g., all droplets are dispensed at substantially the same time. The method may include correlating a location of each respective droplet within each of the one or more cartridges with a respective first selected driving electrode of the respective region of the plurality of driving electrodes; and activating the first selected driving electrode of each respective region to drive each respective droplet to a respective second location within each of the one or more cartridges by electrowetting. In some variations, activating the at least first selected driving electrode of each respective region of the plurality of driving electrodes may further include grounding the first driving electrode to an adjacent second driving electrode of each respective region.

In some variations, each second location within the one or more cartridges may include a fluidic output. The method may further include withdrawing a respective droplet of fluid at each respective second location within the one or more cartridges, where withdrawing includes applying suction via the at least one liquid handling tip. When the liquid handling subsystem includes a plurality of liquid handling tips, withdrawing the respective droplet of fluid may be performed in parallel (e.g., at the same time for each of the one or more cartridges). In some variations, withdrawing the respective droplet of fluid may be performed serially.

The digital microfluidics apparatus for high-throughput digital microfluidics may include any other feature of a digital microfluidics apparatus as described herein for use in this method. Further, this method for coordinating droplet movement and liquid handling in a cartridge within a digital microfluidics apparatus may be combined with any other method described herein, as one of skill may devise. In some variations, the apparatus may include a master control subsystem, and the method may be performed by the master control subsystem. In some variations, the method performed by the master control subsystem may be performed automatically.

A method of concurrently operating a one-plate cartridge and a two-plate cartridge within a digital microfluidics apparatus is provided, where the digital microfluidics apparatus includes a seating surface configured to concurrently seat one or more cartridges; a plurality of drive electrodes disposed on the seating surface, where the driving electrodes are configured to apply a high voltage to move a droplet within a cartridge when the cartridge is seated on the seating surface, and where all or some of the drive electrodes includes an opening there through; a plurality of vacuum ports, where each vacuum port is coupled to one or more of the openings through the drive electrodes; a vacuum control configured to selectively apply vacuum through a subset of the vacuum ports under the one or more cartridges seated on the seating surface when the one or more cartridges are seated on the seating surface; an electrical control for applying energy to sequentially activate and de-activate one or more selected drive electrodes to move a droplet within an air gap of the one or more cartridges are seated on the seating surface; a vacuum pump for applying a vacuum to the plurality of vacuum ports; a robotic arm and a liquid handling subsystem for dispensing or removing liquid to the one or more cartridges when the one or more cartridges are seated on the seating surface. The method includes disposing a one-plate cartridge at a first seating location upon the seating surface and a two-plate cartridge at a second seating location upon the seating surface; identifying a first region including a first sub-set of the plurality of driving electrodes underlying the first seating location and a second region including a second sub-set of the plurality of driving electrodes underlying the first seating location; selectively immobilizing the one-plate cartridge and the two-plate cartridge to the seating surface of the digital microfluidics apparatus; identifying a location of a first fluidic input within the one-plate cartridge at the first seating location and a location of a second fluidic input within the two-plate cartridge at the second seating location; disposing a first droplet from the liquid handling subsystem within the one-plate cartridge and a second droplet within the two-plate cartridge; correlating a location of the first droplet with a first selected driving electrode of the first sub-set of the plurality of driving electrodes; correlating a location of the second droplet with a first selected driving electrode of the second sub-set of the plurality of driving electrodes; activating at least the first selected driving electrode of each respective sub-set to drive each respective droplet to a respective second location within each of the one or more cartridges by electro wetting.

Selectively immobilizing the one-plate cartridge and the two-plate cartridge to the seating surface may further include activating vacuum control in the regions of electrodes underlying the cartridges. In some variations, the first fluidic input within the one-plate cartridge may include any location within an inner surface of the cartridge as the droplet is dispensed through an air gap of the one-plate cartridge. In some variations, the first fluidic input within the two-plate cartridge may be a port at one or more predefined locations on an upper plate of the two-plate cartridge. Disposing the first droplet within the one-plate cartridge and disposing the second droplet within the two-plate cartridge may include disposing the first droplet and the second droplet substantially at a same time, e.g., in parallel or may include disposing the first droplet and the second droplet consecutively.

In some variations, activating the least the first selected driving electrode of each respective sub-set to drive each respective droplet to a respective second location may further include grounding the first selected driving electrode to an adjacent second driving electrode of each respective sub-set of the plurality of driving electrodes. Activating the least the first selected driving electrode of each respective sub-set to drive each respective droplet to a respective second location may be performed substantially at a same time. Alternatively, activating the least the first selected driving electrode of each respective sub-set to drive each respective droplet to a respective second location may be performed serially.

In some variations, each respective second location may further include a fluidic output. The fluidic output at the second location of the one-plate cartridge may be any location within an inner surface of the cartridge and withdrawing is performed through an air gap of the one-plate. The fluidic output at the second location within the two-plate cartridge may be a port at one or more predefined locations on an upper plate of the two-plate cartridge. The method may further include withdrawing a respective droplet of fluid at each respective second location within the one-plate cartridge and the two-plate cartridge, where withdrawing may include applying suction via at least one liquid handling tip of the liquid handling subsystem. In some variations, when the liquid handling subsystem includes a plurality of liquid handling tips, withdrawing the respective droplet of fluid may be performed in parallel.

The digital microfluidics apparatus for high-throughput digital microfluidics may include any other feature of digital microfluidics apparatus as described herein for use in this method. Further, this method for concurrently operating a one-plate cartridge and a two-plate cartridge within a digital microfluidics apparatus may be combined with any other method described herein, as one of skill may devise. In some variations, the apparatus may include a master control subsystem, and the method may be performed by the master control subsystem. In some variations, the method performed by the master control subsystem may be performed automatically.

A method for operating a system including a digital microfluidics apparatus is provided where the digital microfluidics apparatus includes: a seating surface configured to concurrently seat one or more cartridges; a plurality of drive electrodes disposed on the seating surface, where the driving electrodes are configured to apply a high voltage to move a droplet within a cartridge when the cartridge is seated on the seating surface, and where all or some of the drive electrodes includes an opening there through; a plurality of vacuum ports, where each vacuum port is coupled to one or more of the openings through the drive electrodes; a vacuum control configured to selectively apply vacuum through a subset of the vacuum ports under the one or more cartridges seated on the seating surface when the one or more cartridges are seated on the seating surface; an electrical control for applying energy to sequentially activate and de-activate one or more selected drive electrodes to move a droplet within an air gap of the one or more cartridges are seated on the seating surface; a vacuum pump for applying a vacuum to the plurality of vacuum ports; a robotic arm and a liquid handling subsystem for dispensing or removing liquid to the one or more cartridges when the one or more cartridges are seated on the seating surface. In some embodiments, the system further includes an enclosure configured to control one or more of humidity, temperature and gaseous environments. The method includes identifying, for each of the one or more cartridges a respective sub-set of driving electrodes underlying each of the one or more cartridges; determining, for each of the one or more cartridges, a plurality of associated ground electrodes adjacent to the respective sub-set of driving electrodes; and selectively immobilizing each of the one or more cartridges on the seating surface of the digital microfluidic apparatus. The method includes coordinating, for each of the one or more cartridges, activities to be performed in each cartridge and includes sequencing the activities. Sequencing the activities may include allocating resources such as the robotic arm and the liquid handling subsystem for efficient and non-overlapping actions. Efficient actions of the robotic arm may include designing a series of paths traveled by the robotic arm/liquid handling subsystem to minimize the length of overall travel. Sequencing activities may include determination of a suitable reaction period for a particular workflow in each cartridge, and planning initiation of each workflow to permit timely dispensing, mixing, heating, and cooling events across the multiplexed seating surface of the digital microfluidics surface. The method coordinates activities such as determining a type of reaction to be performed in each of the one or more cartridges; dispensing a sample to each of the one or more cartridges to form a respective sample droplet within each of the one or more cartridges; and dispensing one or more reagents/buffers to each of the one or more cartridges to form a respective reagent/buffer droplet within each of the one or more cartridge. The method may further include coordinating, for each of the one or more cartridges on the seating surface; driving the respective reagent droplet and/or sample droplet to a reaction location within each of the one or more cartridges. Coordinating driving of the respective reagent droplet and/or sample droplet may include, for each of the one or more cartridges, identifying the location of the respective reagent droplet and/or sample droplet; identifying the one or more drive electrodes underlying the location of the respective reagent droplet and/or sample droplet; activating the drive electrodes underlying the respective reagent droplet and/or sample droplet and grounding the one or more drive electrodes to respective adjacent electrodes, thereby driving by electrowetting the respective reagent droplet and/or sample droplet to a next position, and repeating these processes to reach the reaction location for the respective reagent droplet and/or sample droplet.

The method may further include coordinating, for each of the one or more cartridges, merging the respective sample droplet with its respective reagent droplet, thereby forming a respective reaction droplet within each of the one or more cartridges; and performing the respective reaction in the respective reaction droplet, thereby forming a respective product droplet in each of the one or more cartridges. In some variations, coordinating may further include, for each of the one or more cartridges, coordinating driving the reaction droplet to a reaction location within the one or more cartridges, where the respective reaction location includes magnets and/or temperature control.

The method may further include coordinating for each of the one or more cartridges, determining, when the respective reaction in the respective reaction droplet of the one or more cartridges is an assay, an assay result for the respective reaction droplet of the one or more cartridges. The method may further include, for each of the one or more cartridges, when the respective reaction in the one or more cartridges is a sample preparation reaction, exporting a respective product droplet.

In some variations, coordinating may further include for each of the one or more cartridges, coordinating mixing the dispensed reagent/buffer with a pre-spotted reagent disposed at a selected location within each of the one or more cartridges to form the respective reagent/buffer droplet. In some variations, coordinating may further include for each of the one or more cartridges, coordinating mixing the sample droplet with a pre-spotted reagent disposed at a selected location within the one or more cartridges, to form the respective reaction.

In some variations, when the system further includes one or more illumination sources, coordinating forming the respective reagent droplet or forming the respective reaction droplet may further include coordinating photoactivating a reagent within the respective reagent droplet or respective reaction droplet. When imaging is performed for the one or more cartridges seated on the seating surface, a two-plate cartridge may have a transparent or translucent upper plate, permitting imaging. When photoactivation is performed in for the one or more cartridges seated on the seating surface, a two-plate cartridge may have a transparent or translucent upper plate that does not absorb the activating wavelength significantly, permitting photoactivation illumination to sufficiently pass the upper plate to reach the photoactivatable reagent. In other variations, a two-plate cartridge may include a window cut into the upper plate, which permits photoactivating illumination to reach the photoactivatable reagent within the cartridge.

In some variations, dispensing the respective sample droplet, dispensing the respective reagent/buffer or withdrawing the respective product droplet may be coordinated to be performed when driving electrodes are not activated. In some variations, forming the respective sample droplet, the respective reagent/buffer droplet, the respective reaction droplet, or respective product droplet may be coordinated to be performed when driving electrodes are not activated.

In some variations, forming the respective sample droplet may further include coordinating electroporating a biological cell within a sample droplet.

In some variations, the method may further include modulating at least one of the temperature, humidity or gaseous environments in the enclosure of the system.

In some variations, when the system includes a master control subsystem, coordinating a respective process such as determining, dispensing, mixing, merging, driving, performing a reaction, or exporting may be performed automatically. In some embodiments, coordinating the respective process for each of the one or more cartridges may be performed independently, e.g., the workflow for each of the one or more cartridges is run without synchronizing the workflow activities to workflow activities of the other cartridges on the seating surface.

In some variations, coordinating the respective process for the one or more cartridges may further include scheduling the robotic arm and/or liquid handling subsystem and scheduling the respective plurality of electrodes, thereby reducing a conflicting instruction for the robotic arm, liquid handling subsystem, and/or respective plurality of electrodes in the one or more cartridges.

In some variations, when the system includes an imaging device, scheduling the robotic arm and/or liquid handling subsystem and scheduling the respective plurality of electrodes for the one or more cartridges may further include receiving imaging information from the imaging device confirming completion of a previous respective process within the one or more cartridges. In some variations, when the system includes an imaging device, determining an assay result for the respective reaction droplet of the one or more cartridges may further include detecting a visible, fluorescent, or luminescent signal from the respective reaction droplet.

In some variations, when the system includes a master control subsystem, the master control system may modulate at least one of the temperature, humidity or gaseous environments of the enclosure.

In some variations, when the system further includes a reagent/sample storage subsystem including a wellplate containment region, exporting the respective product droplet may further include depositing the exported product droplet within a well of the wellplate.

The digital microfluidics apparatus for high-throughput digital microfluidics further may include any other feature of a digital microfluidics apparatus as described herein for use in this method for operating a system including a digital microfluidics apparatus. Further this method may be combined with any other method described herein, as one of skill may devise. In some variations, the apparatus may include a master control subsystem, and the method may be performed by the master control subsystem. In some variations, the method performed by the master control subsystem may be performed automatically.

DMF apparatus. A better understanding of the invention may be had by returning to the figures. In FIGS. 1A-1C, droplets (e.g., reaction droplets) fit within the air gap between the first 153 and second 151 plates (shown in FIGS. 1A-1C as top and bottom plates). The overall air-matrix DMF apparatus may have any appropriate shape, and thickness. FIG. 1B is an enlarged view of a section through a thermal zone of the air-matrix DMF shown in FIG. 1A, showing layers of the DMF device (e.g., layers forming the bottom plate). In general, the DMF device (e.g., bottom plate) includes several layers, which may include layers formed on printed circuit board (PCB) material; these layers may include protective covering layers, insulating layers, and/or support layers (e.g., glass layer, ground electrode layer, hydrophobic layer; hydrophobic layer, dielectric layer, actuation electrode layer, PCB, thermal control layer, etc.). Any of these surfaces may be rigid (e.g., glass, PCB, polymeric materials, etc.). The air-matrix DMF apparatuses described herein also include both sample and reagent reservoirs, as well as a mechanism for replenishing reagents.

In the example shown in FIGS. 1A-1C, a top plate 101, in this case a glass material (although plastic/polymeric materials, including PCB, may be used) provides support and protects the layers beneath from outside particulates as well as providing some amount of insulation for the reaction occurring within the DMF device. The top plate may therefore confine/sandwich a droplet between the plates, which may strengthen the electrical field when compared to an open air-matrix DMF apparatus (without a plate). The upper plate (first plate in this example) may include the ground electrode and may be transparent or translucent; for example, the substrate of the first plate may be formed of glass and/or clear plastic. However, although it is transparent, it may be coated with a conductive material and/or may include a ground electrode adjacent to and beneath the substrate for the DMF circuitry (ground electrode layer 102). In some instances, the ground electrode is a continuous coating; alternatively, multiple, e.g., adjacent, ground electrodes may be used. Beneath the grounding electrode layer is a hydrophobic layer 103. The hydrophobic layer 103 acts to reduce the wetting of the surfaces and aids with maintaining the reaction droplet in one cohesive unit.

The second plate, shown as a lower or bottom plate 151 in FIGS. 1A-1C, may include the actuation electrodes defining the unit cells. In this example, as with the first plate, the outermost layer facing the air gap 104 between the plates also includes a hydrophobic layer 103. The material forming the hydrophobic layer may be the same on both plates, or it may be a different hydrophobic material. The air gap 104 provides the space in which the reaction droplet is initially contained within a sample reservoir and moved for running the reaction step or steps as well as for maintaining various reagents for the various reaction steps. Adjacent to the hydrophobic layer 103 on the second plate is a dielectric layer 105 that may increase the capacitance between droplets and electrodes. Adjacent to and beneath the dielectric layer 105 is a PCB layer containing actuation electrodes (actuation electrodes layer 106). The actuation electrodes may form each unit cell. The actuation electrodes may be energized to move the droplets within the DMF device to different regions so that various reaction steps may be carried out under different conditions (e.g., temperature, combining with different reagents, magnetic regions, pump inlet regions, etc.). A support substrate 107 (e.g., PCB) may be adjacent to and beneath (in FIGS. 1B and 1C) the actuation electrode layer 106 to provide support and electrical connection for these components, including the actuation electrodes, traces connecting them (which may be insulated), and/or additional control elements, including the thermal regulator 155 (shown as a TEC), temperature sensors, optical sensor(s), magnets, pumps, etc. One or more controllers 195 for controlling operation of the actuation electrodes and/or controlling the application of replenishing droplets to reaction droplets may be connected but separate from the first 153 and second plates 151, or it may be formed on and/or supported by the second plate. In FIGS. 1A-1C, the first plate is shown as a top plate and the second plate is a bottom plate; this orientation may be reversed. A source or reservoir 197 of solvent (replenishing fluid) is also shown connected to an aperture in the second plate by tubing 198.

As mentioned, the air gap 104 provides the space where the reaction steps may occur, providing areas where reagents may be held and may be treated, e.g., by mixing, heating/cooling, combining with reagents (enzymes, labels, etc.). In FIG. 1A the air gap 104 includes a sample reservoir 110 and a series of reagent reservoirs 111. The sample reservoir may further include a sample loading feature for introducing the initial reaction droplet into the DMF device. Sample loading may be loaded from above, from below, or from the side and may be unique based on the needs of the reaction being performed. The sample DMF device shown in FIG. 1A includes six sample reagent reservoirs where each includes an opening or port for introducing each reagent into the respective reservoirs. The number of reagent reservoirs may be variable depending on the reaction being performed. The sample reservoir 110 and the reagent reservoirs 111 are in fluid communication through a reaction zone. The reaction zone 112 is in electrical communication with actuation electrode layer 106 where the actuation electrode layer 106 site beneath the reaction zone 112.

The actuation electrodes 106 are depicted in FIG. 1A as a grid or unit cells. In other examples, the actuation electrodes may be in an entirely different pattern or arrangement based on the needs of the reaction. The actuation electrodes are configured to move droplets from one region to another region or regions of the DMF device. The motion and to some degree the shape of the droplets may be controlled by switching the voltage of the actuation electrodes. One or more droplets may be moved along the path of actuation electrodes by sequentially energizing and de-energizing the electrodes in a controlled manner. In the example of the DMF apparatus shown, a hundred actuation electrodes (forming approximately a hundred unit cells) are connected with the seven reservoirs (one sample and six reagent reservoirs). Actuation electrodes may be fabricated from any appropriate conductive material, such as copper, nickel, gold, or a combination thereof.

In the example device shown in FIGS. 1A-1C, the DMF apparatus is typically integrated so that the electrodes (e.g., actuation electrodes and ground electrode(s)) are part of the same structure that may be loaded with sample and/or fluid. The electrode may be part of a cartridge, which may be removable. Although cartridges have been described (see, e.g., US20130134040), such cartridges have proven difficult to use, particularly when imaging through the device and when operating in an air-matrix apparatus.

In general, described herein are digital microfluidics apparatuses and methods. In particular, described herein are air-matrix digital microfluidics apparatuses, including systems and devices, and methods of operating them to process fluid samples. For example, a DMF apparatus may include a compact DMF driver/apparatus that is configured to work with a removable/disposable cartridge. The DMF driver/apparatus may include an array of drive electrodes that are adapted to align and secure a cartridge in position by applying negative and/or positive pressure at multiple points, and specifically at the electrode-contact points, on the cartridge. The cartridge may include an air gap that is open to the environment (e.g., to the air) via openings such as side (lateral) openings and/or top openings. The air gap may be formed between two dielectric layers. An upper, top, region may include one or more ground electrodes. The ground electrode may be advantageously formed of a non-transparent material that is patterned to include one or more windows that allow imaging through the top. These windows may be arranged over the electrode, so that the ground region extends opposite the drive electrodes and around and/or between the drive electrodes.

Any of the apparatuses described herein may also include a fluid application and extraction component (e.g., a fluid application and/or extraction device) that is connected through the top, or through the side of the cartridge, into the air gap. Any of the apparatuses described herein may include or use a non-polar jacketing material (e.g., a non-polar liquid such as a room temperature wax) that forms a protective jacket around the aqueous droplet(s) in the apparatus, and may be moved with the droplet. Also described herein are user interfaces for interacting with the apparatus, including user interfaces for controlling the apparatus to move, mix, combine, wash, magnetically concentrate, heat, cool, etc. These user interfaces may allow manual, automatic or semi-automatic entering, control and/or execution of a protocol.

Figure 2:
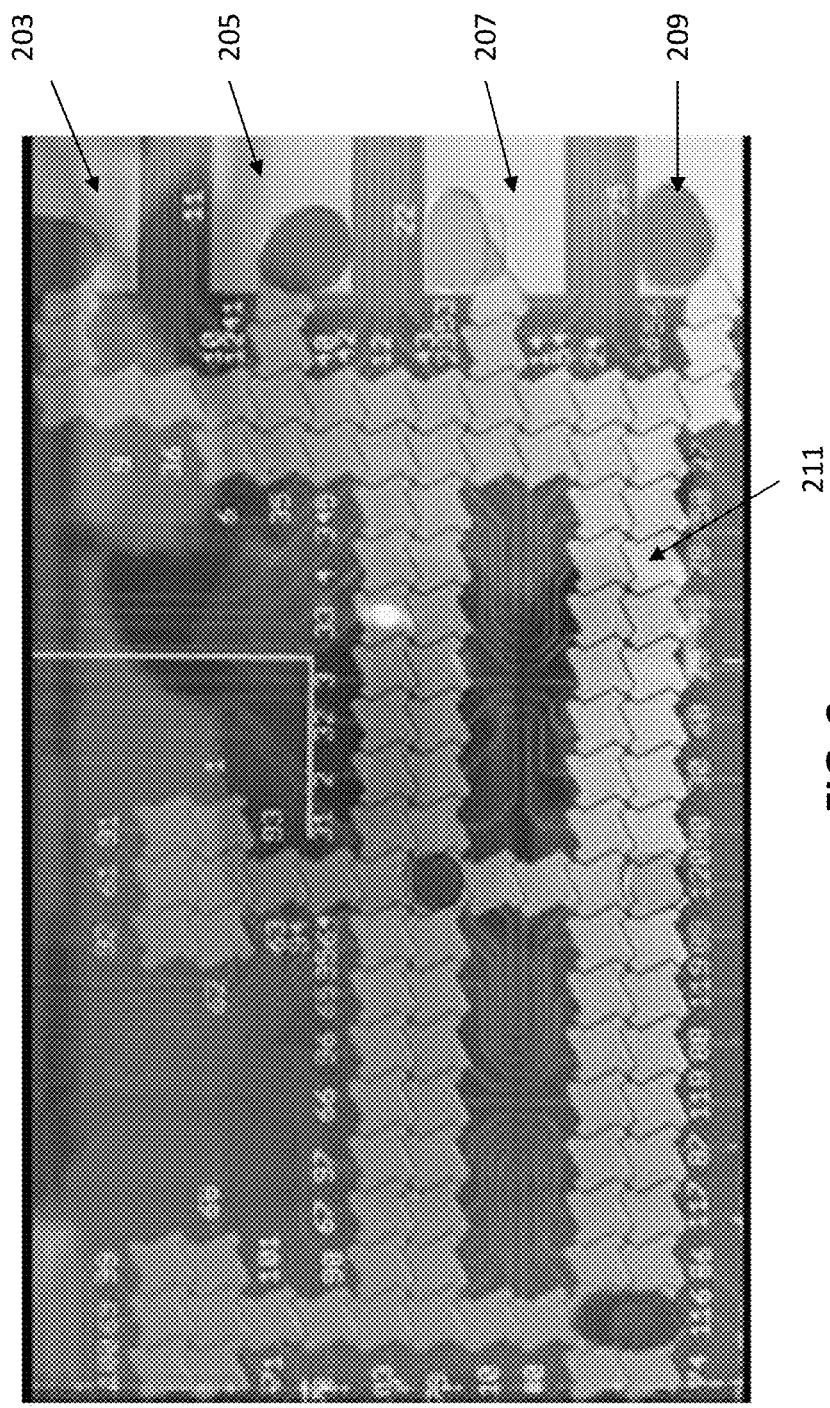
FIG. 2 is an example of a DMF surface using a rigid cartridge including the electrodes and an air-gap region, similar to that shown in FIGS. 1A-1C.

FIG. 2 illustrates an example of a DMF apparatus that is similar to the one shown in FIGS. 1A-1C. In FIG. 2, the DMF apparatus includes a plurality of drive electrodes 201 (which are shaped into non-square/non-rectangular shapes and positioned adjacent to each other in rows or lines. In FIG. 2, four reservoir regions 203, 205, 207, 209 are positioned on the right side, and may be preloaded or otherwise hold droplets of materials to be added during operation of the DMF apparatus. Some or all of the electrodes may be heated or cooled.

In the apparatus of FIG. 2, the DMF driving electrodes 211 are solid, planar electrodes. The application of energy between the driving electrodes and the ground or reference electrode result in movement of an aqueous (e.g. polar) droplet. In FIG. 2, the ground or reference electrode is formed as a conductive, transparent coating (e.g., ITO) on the upper plate, which is also clear (transparent). This allows the device to be monitored, including monitoring any of the cells, e.g., unit cells, from above the air matrix/air gap.

However, it would be beneficial to provide DMF apparatus apparatuses (e.g., devices, systems, etc.) that may be used with disposable cartridges that do not include the drive electrodes. FIGS. 3A and 3B show the different configurations of a DMF system that includes integrated drive electrodes (FIG. 3A) and a system in which the drive electrodes are part of the apparatus, but the cartridge includes only the ground electrodes (e.g., top plate), air gap and the dielectric bottom. For example, in FIG. 3A, the air gap is formed between the grounded top plate 303, and the drive electrodes and dielectric film 305 (e.g., a Teflon film). The drive electrodes and dielectric film may be part of a cartridge that includes the top plate, and may be separately attached onto the substrate (switch board 307) that connects to a main processor 309 and a power supply board 311.

In contrast, in FIG. 3B, the cartridge does not include the drive electrodes 313, but instead includes the top plate/ground electrode, dielectric and an air gap between them 315. As will be described in greater detail herein, a vacuum (e.g., vacuum manifold) may be positioned beneath the electrodes 313 to apply pressure (e.g., between 50 kPa and 250 kPa, 50 kPa or greater, 60 kPa or greater, 70 kPa or greater, 80 kPa or greater, 90 kPa or greater, 100 kPa or greater, 110 kPa or greater, etc.) to fully secure the dielectric, and therefore the rest of the cartridge, to the apparatus. The electrodes may be supported on a substrate, such as a printed circuit board or switch board 317, which may also be connected to the main processor 319 and power supply 321. As shown in FIG. 3B, the dielectric film may also be hydrophobic (e.g., a Teflon film may be used) or may be treated, coated, sprayed, dipped into, etc., a hydrophobic material to make at least the side facing the air-gap hydrophobic.

Figure 4A:
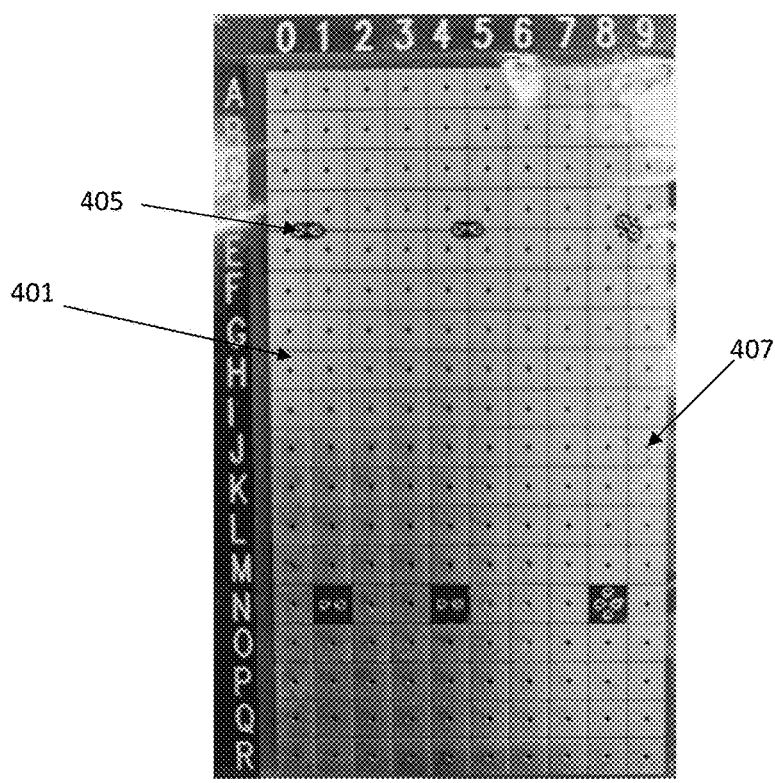
FIG. 4A shows a top view of the electrodes (e.g., electrode array) formed as part of the apparatus. The electrodes may include a plurality of vacuum openings through them, as shown. The electrodes may define different regions, including thermally controlled regions (e.g., regions having a thermistor and/or cooling and/or heating.
Figure 4B:
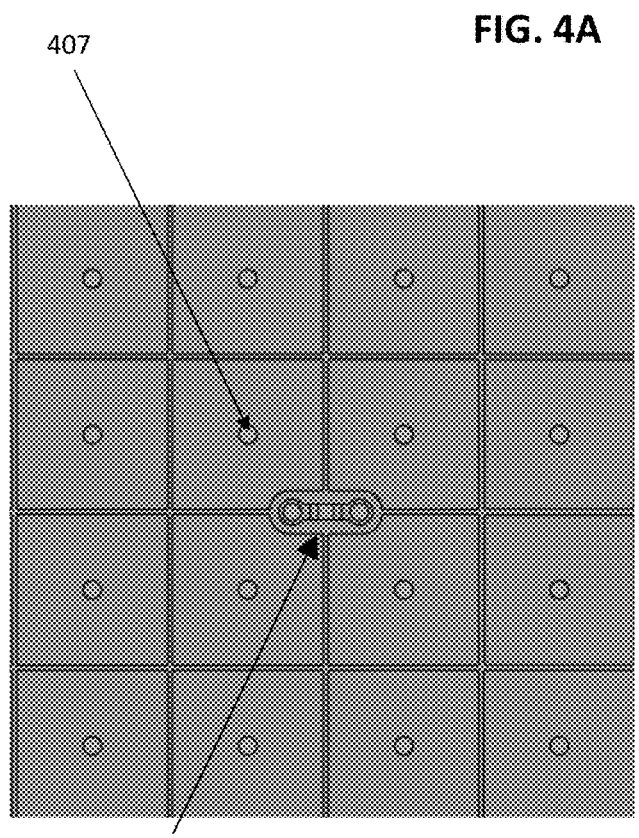
FIG. 4B shows an enlarged region of the electrodes, forming the upper electrode layer, showing the vacuum openings through most (e.g., >50%, 55%, 60%, 65%, 70%, 75%, 80%, 85%, 90%, 95%, etc.) or all of the electrodes. Although square electrodes are shown (with centered vacuum openings), other electrode shapes, e.g., interlocking, rectangular, circular, etc., or vacuum opening locations (off-centered, etc.) through the electrodes may be used.

The seating surface of an exemplary DMF apparatus is shown in greater detail in FIGS. 4A-4C and FIGS. 10-12. In FIG. 4A, the seating surface includes an array of driving electrodes 401 (labeled in rows 0-9 and columns A-R). Each of these driving electrodes includes a central hole or opening through the electrode, through which a vacuum can be applied to hold the dielectric of the cartridge against the drive electrodes. In FIG. 4A, the seating surface also includes temperature sensors (thermistors 405) positioned between the electrodes in different orientations. FIG. 4B shows a slightly enlarged view of the seating surface, including the driving electrodes, showing a thermistor 405 between the driving electrodes. The vacuum openings 407 are more clearly visible in FIG. 4B. Any shape and size of driving electrodes may be used, including interlocking driving electrodes. In addition, the pattern of driving electrodes may be formed that is not monolithic; for example the electrode pattern may include open regions that do not include driving electrodes (e.g., regions surrounding driving electrodes, etc.) as shown in FIGS. 1A and 2.

Figure 4C:
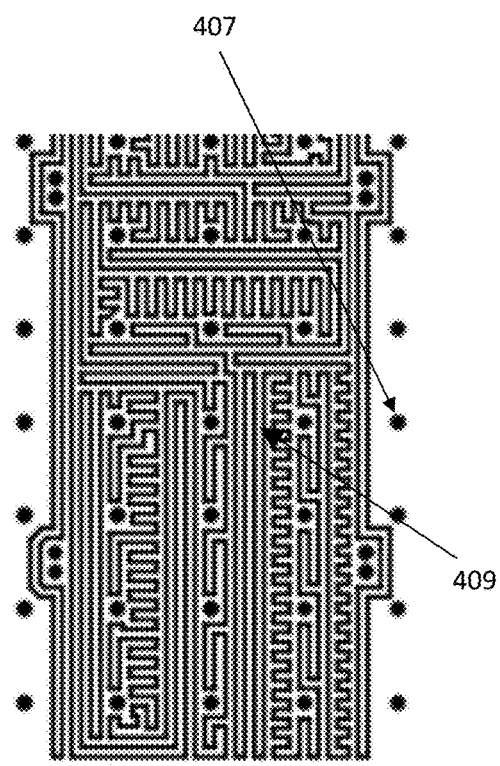
FIG. 4C illustrates a resistive heating layer that may be present beneath the electrode layer (such as is shown in FIG. 4B). One continuous, or multiple separate, trace(s) of resistive material may be used beneath the array. The black dots indicate the vacuum manifold (forming the plurality of vacuum openings through the electrodes. The resistive heating layer may be electrically isolated from the electrodes above them; the current applied through the resistive heating layer may be regionally controlled, by a controller. The controller may include PID control.

FIG. 4C shows an example of a heater that may be positioned underneath some of the drive electrodes, such as the sub-set of drive electrodes shown in FIG. 4B. In this example, resistive heating circuitry 409 may underlie the drive electrodes (e.g., embedded at any layer of the PCB forming the seating surface). In general, resistive heating and thermistors may be embedded at any layer of the electrode PCB board. The heater may be part of the PCB with the electrodes and thermistor, as shown in FIGS. 4A-4C. The current, and therefore the temperature of the driving electrodes and/or the adjacent dielectric (and therefore any droplet on the cell under the dielectric/driving electrode) may be regulated, e.g., by a PID control loop, in combination with the thermistor. To cool it down the dielectric (and the entire seating surface), a liquid cooler may be circulated through the substrate, e.g., on the bottom of the seating surface. In the example of FIG. 4C, the resistive heater is shown as a continuous trace of low-resistive material (e.g., having a resistance between about 10-15 ohms).

Any appropriate temperature regulating technique may be employed. For example, stirring (e.g., magnetic stirring) may be used. Even a small-volume droplet may contain a range of local temperatures, so the temperature distribution may have a standard deviation. This can be reduced by stirring, e.g., via magnetic beads. With enough stirring, the droplet may be brought close to isothermal. In any of these variations, the top plate may be used to help regulate the temperature. For example, the top plate may be used for heatsinking. A thermal conductor (e.g., a steel block) on top of the top plate may greatly speed up the time it takes for the top plate to cool down. If the top plate has a large thermal mass, or a mass is added to it, this may reduce the time needed for a set number of thermal cycles.

Differences in temperature between the top plate and a bottom heater (e.g., a buried heater) may help determine the temperature standard deviation. Heating the top plate in tandem with the electrode may reduce the time necessary to raise the temperature. For example, the top plate may include a local resistive heater, similar to that shown in FIG. 4C. The heated/cooled top plate may be achieved separately from the cartridge by including a top thermal mass that engages with the top of the cartridge when it is on the seating surface. For example, a heated and/or cooled top thermal mass may be a manifold that is pressed down onto the cartridge.

As mentioned, a liquid coolant may be applied to the bottom and/or the top of the cartridge. In particular, a circulating liquid coolant may be used. In some variations, the entire bottom of the cartridge may be cooled (e.g., to within 3-5 degrees of room temperature, e.g., between 15-35 degrees C.). In FIG. 5A, an example of a seating surface 501 is shown removed from the device to illustrate a liquid coolant coupled to the substrate of the seating surface so that coolant may be pumped into 503 and out of 505 through the seating surface 501.

Figure 5B:
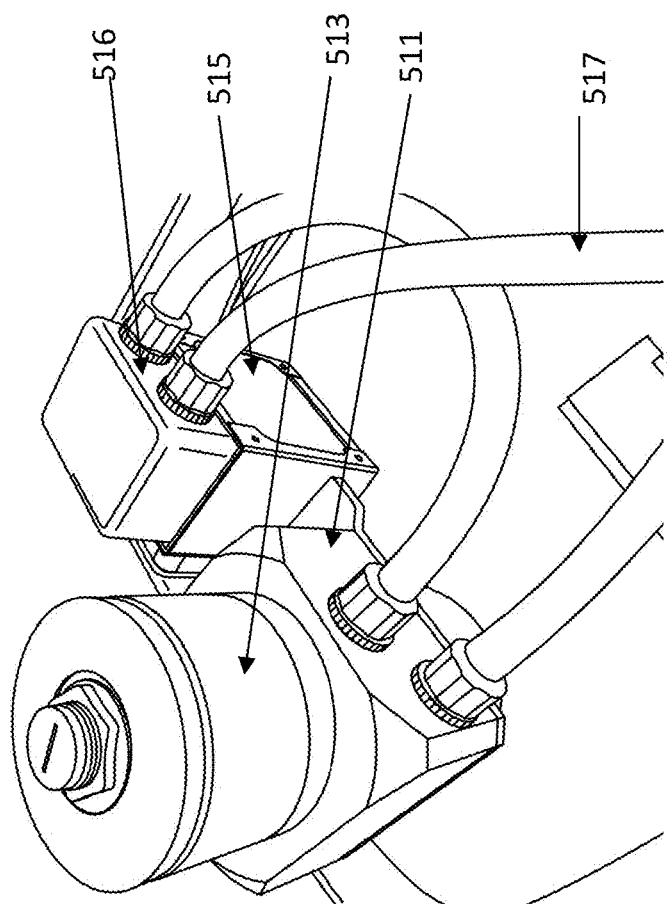
FIG. 5B shows an example of a fan and heatsink, reservoir and pump that may be used for the liquid coolant of the cartridge-contacting surface(s), including the electrodes. The pump, tubing, fan, heatsink and reservoir may be used to move water or liquid coolant below the electrodes so that the coolant can absorb the heat while passing below the electrodes, where it may then be re-circulated after being cooled again while passing through the fan and heatsink.
Figure 5A:
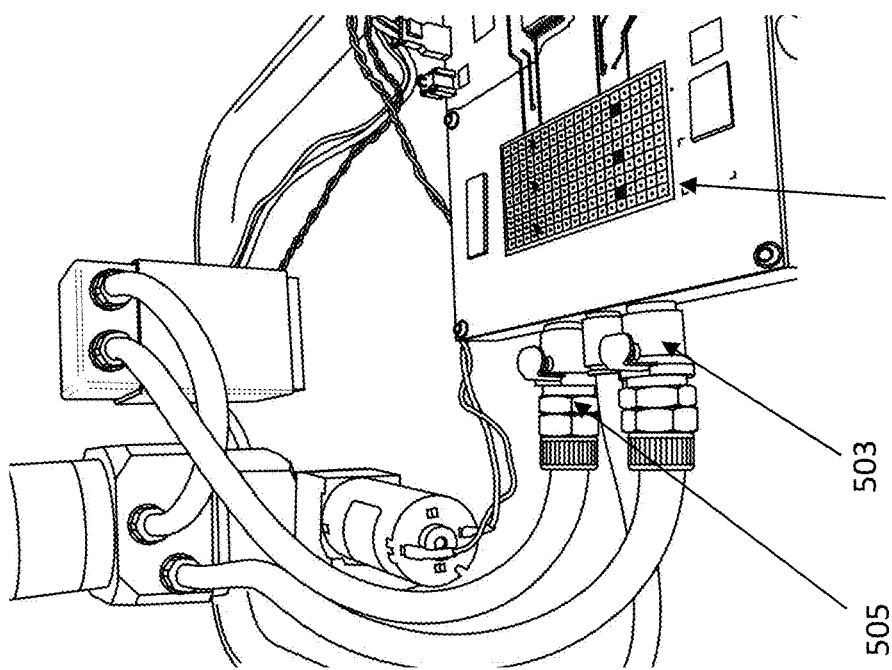
FIG. 5A shows a partially dis-assembled view of the apparatus, showing connections that may be made between the electrode-containing PCB, a liquid coolant, and the vacuum for securing the cartridge dielectric onto the electrodes.

FIG. 5B illustrates a pump 511, tubing 517, fan 515, heatsink 516 and a reservoir 513 are used to move water or liquid coolant below the electrodes. The coolant absorbs the heat while passing below the electrodes and is cooled again while passing through the fan and heatsink.

Figure 5E:
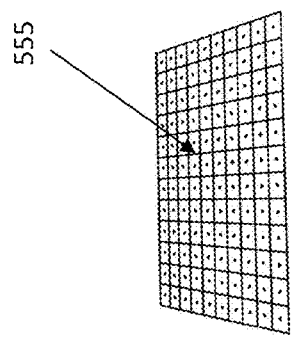
FIGS. 5D and 5E illustrate the application of vacuum to secure a cartridge (shown here as a proof of concept by just the dielectric material.

As mentioned above, the vacuum applied by the device through the openings in the electrodes permits the dielectric of the cartridge to be securely and releasably held. Openings that do not pass through the electrodes do not hold the dielectric smoothly on the seating surface. However, when the vacuum is applied through all of the driving electrodes that may be activated, the dielectric is held flat against the driving electrodes and a consistently lower energy may be applied. For example, FIGS. 5D and 5E illustrate securing a dielectric (shown unattached to a cartridge, for illustration purposes) onto a seating surface having electrodes with openings through which a vacuum is applied. In FIG. 5D, the vacuum is off, and the dielectric 555 is loosely resting on the seating surface, with numerous wrinkles. In FIG. 5E, the vacuum is applied through the electrodes.

The use of a vacuum in this way allows for a reduced dielectric thickness, and thus lower power (e.g., voltage) requirements. Compared to the use of adhesive, or the use of a vacuum applied external to the electrodes, the configuration shown in FIGS. 5A-5E resulted in a reduction of the power requirements for DMF being halved. In the examples shown, the thickness of the dielectric may be between 7-13 microns. When an adhesive is used, the dielectric is almost twice as thick (e.g., 25 microns).

Figures 5F, 5G:
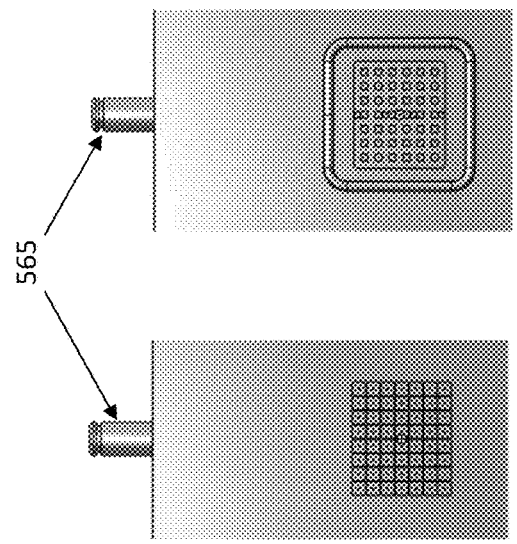
FIG. 5F shows an example of a top view of a PCB showing a small electrode array with holes formed through the central region of each electrode.
FIG. 5G shows a portion of the PCB of FIG. 5F below the electrodes (over which the other layers may be formed), showing the holes through the PCB forming that may be connected to the vacuum pump.
Figure 5D:
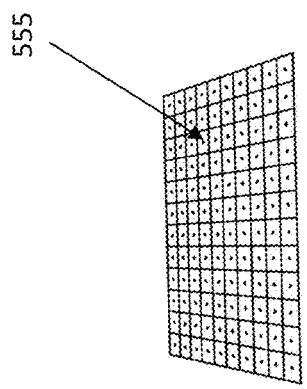
Figure 5C:
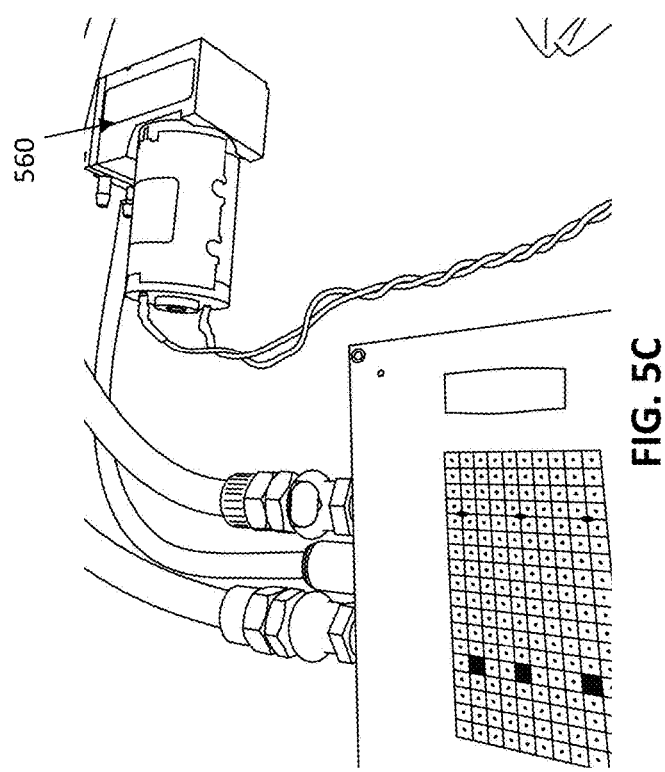
FIG. 5C shows another view of a PCB with the electrodes similar to that shown in FIGS. 4A-4C, connected to a vacuum pump as well as the liquid coolant (input and output).

In FIG. 5C, a pump 560 is shown connected via tubing to a vacuum manifold that is configured to pull air through the holes in the electrodes. The dielectric film sits on top and stays rigid as long as the pump is pulling air. In addition, any projection in the surface of the dielectric (particularly those that are around or slightly smaller than the width of the air gap of the cartridge) will not interfere with the seal, but will form enclosures, channels, barriers, or other structures within the air gap, which may help partition the air gap.

FIGS. 5F and 5G illustrate the upper and an intermediate layer of the seating surface, showing the connection between the vacuum source (via connector 565), though a mechanical and/or tubing manifold (FIG. 5G) and out of the openings through the electrodes (FIG. 5F).

FIGS. 10 to 12 illustrate an example of a seating surface 900 onto which the cartridge may be held by the vacuum ports through the electrodes. In FIG. 10, the seating surface is formed on a substrate (e.g., a PCB or other electrically insulated surface), and includes an array of electrode 901, shown in this example as quadrilateral (e.g., square) shapes. Any other appropriate shape may be used. The drive electrodes 901 are thin conductive surfaces that may be flush or substantially flush with the seating surface, or may project slightly above the seating surface. In FIG. 11, a cartridge 905 is shown placed atop the array of drive electrodes 901 on the seating surface 900. This cartridge may be placed on the seating surface by a drawer (as shown in FIGS. 3E and 3F, above. Once on the seating surface, a vacuum may be applied through all or a subset of the drive electrodes (e.g., those over which a fluid will be transported in the air gap) to hold the dielectric (and therefore the cartridge) in position. As mentioned above, without the vacuum being applied through the electrodes themselves, more energy may be required to drive fluid within the air gap reliably, and the dielectric must be thicker. FIG. 12 shows an enlarged view of a portion of the seating surface 900, showing electrodes 901 having a central opening 909 into the vacuum manifold.

The seating surface of the apparatus may be divided up into functional regions, controlling the location and operation of different portions, including heating, magnetic bead control, washing, adding solution(s), cooling, imaging/detecting, etc. These regions may be defined in the DMF apparatus. For example, returning now to FIG. 6, FIG. 6 illustrates different functional regions that are defined based on the connections within and/or beneath (or in some variations, above) the seating surface. For example, in FIG. 6, solution may be dispensed through the top of the cartridge (e.g., the top plate), via one or more holes. The drive electrodes under the secured dielectric may therefore form a plurality of unit cells (one drive electrode per unit cell), and each cell or region of cells (multiple cells) may be controlled to perform a specified function. For example, in FIG. 6, the DMF apparatus includes an arrangement of zones or unit cells such as cooling zones (e.g., cooling via underlying Peltier zone) 605 that are arranged around the periphery of the cartridge. These regions may also be used to store solution, and may be held at between 3 degrees C. and 20 degrees C. (e.g., below 10 degrees C., between about 2 degrees C. and 25 degrees). The central heating zone(s) 609 may be used for heating a droplet. One or more magnetic zones 603 may be used for turning on/off magnetic fields that may be useful to immobilize a magnetic particle (e.g., for removing a material, etc.). Any of the zones may overlap. For example, at least one unit cell in the heating zone may also be a magnetic zone. Other functional zones include imaging/optical zones. In this case, the dual functions may be possible because the magnet may be positioned right under the heating zone when using resistive heating.

Figure 6:
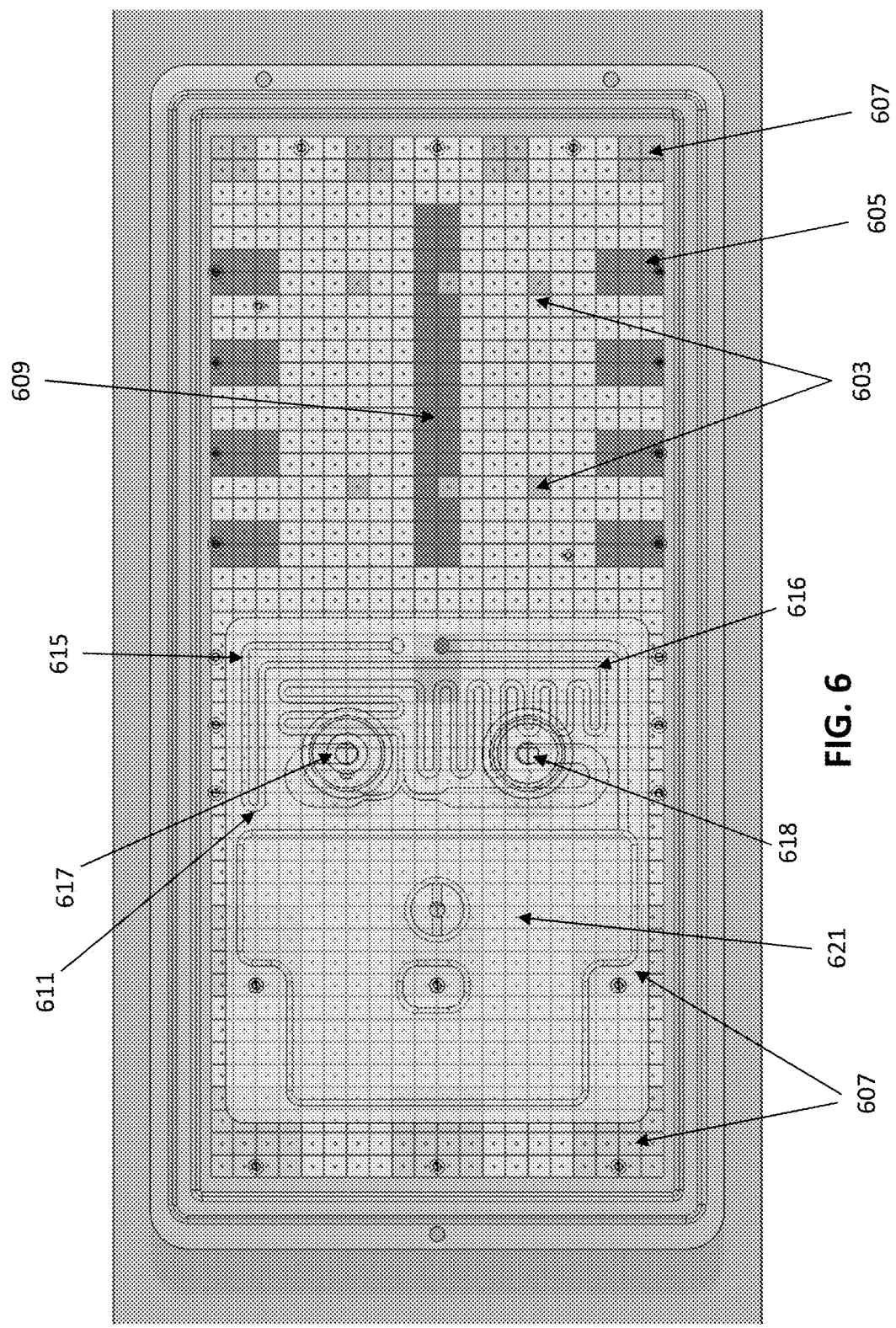
FIG. 6 illustrates the different functional regions that maybe formed by the electrode array and/or removable cartridge.

In addition to the zones formed by the configuration of the seating surface of the DMF apparatus, functional zones for providing an aliquot of solution, mixing a solution, and/or removing solutions may be formed into the cartridge, e.g., but cutting into the top plate to provide intimate access the air gap. In FIG. 6, the upper (top plate) microfluidics region has been made transparent. In general, a micro channel may be used for mixing, dispensing and taking to waste on top plate from the air gap region. In addition, any of these cartridges may also include a reagent reservoir in the top plate. The microfluidics may be controlled by one or more valves (e.g., valve control) for dispensing and mixing and taking to waste.

Cartridges

In general a two-plate cartridge as described herein may include a dielectric, a first hydrophobic coating on the dielectric, a second hydrophobic coating on a ground electrode (and/or top plate) and the top plate onto which the ground electrode is coupled. The hydrophobic coating may be a Teflon coating, for example. The cartridge may also include one or more microfluidic channels, particularly those formed directly into the top plate with controlled access into the air gap.

For example, FIGS. 7A-7D illustrate one example of a two-plate cartridge 700 including a microfluidics region 703 on the upper surface, covered by a cover 703 having one or more access ports 705, 707 for accessing the microfluidics portion of the device. The cover 703 may also include one or more valves and/or one or more openings 709 that may be used for delivering removing fluid and/or gas (e.g., air). The cartridge may also include openings through the top plate 713, including openings that connect the microfluidics channel to the air gap region within the channel.

Any of the cartridges described herein may also include one or more transparent window regions 711 for optically imaging one or more regions (readout regions) within the air gap. Alternatively, the two-plate cartridge may have a top plate that is transparent, translucent or substantially transparent or substantially translucent. In embodiments where a one-plate cartridge is used, the lack of a top plate can provide full access to any point within the inner surface of the one-plate cartridge.

FIG. 7B is a top perspective view of the cartridge of FIG. 7A. FIG. 7B shows a side view of the cartridge, showing the lowest bottom dielectric film 751 material. The air gap is not visible in FIG. 7C, but may refer to the spacing 753 between the dielectric and the ground electrodes. FIG. 7D shows the top plate with the cover removed. Comparing FIG. 7A to FIG. 7D, with the top removed, both the first and the second microfluidics channels are shown, each with an opening from the microfluidics channel into the air gap. In FIG. 7D, the two channels may be simultaneously used by pushing/pulling fluid through one channel into the cell underlying them for rinsing, mixing, removing waste, etc. In FIGS. 7A-7D, there are via holes through the top plate in to air. Although the top plate may be thicker, in some variations it may be beneficial to include more reagents, including freeze-dried reagents that may be rehydrated.

FIGS. 8-9 illustrate different example of cartridges that may be used. In FIG. 8, an exemplary two-plate cartridge 800 (similar to that shown in FIGS. 7A-7D) is shown over a seating surface 803 including electrodes. The cartridge 800 includes a microfluidics portion 805 formed above the air gap (not visible in FIG. 8), on one end of the cartridge. The other end of the cartridge includes a window region 807 through which a portion of the air gap may be imaged. The both the front (window) region and the back (microfluidics) regions of the cartridge may include access regions for accessing the air gap and/or microfluidics portions. In FIG. 9, three different DMF design configurations on paper are shown. Paper DMF devices were formed by inkjet printing arrays of silver driving electrodes and reservoirs connected to contact pads onto paper substrates.

Within the cartridge, the top plate may be any appropriate material, including transparent materials, such as acrylics. The top plate may be formed of (or may contain) one or more conductive polymers. A ground electrode(s) may be formed on the top plate.

As already discussed above, any of these apparatuses and methods may include one or more microfluidics channel(s) integrated into the cartridge. In particular, the apparatus may include a microfluidics mixing and extraction region. This is illustrated in FIGS. 13-15. For example, two microfluidics channels 1501, 1503 may be formed into the top plate of the air gap, and an opening in to the air gap may be positioned within a fixed distance from each other. Fluid may be passed from one microfluidics channel to another microfluidics channel, through the air gap. The region of the air gap between these openings may bridge these two regions 1505. This configuration may be used to mix a larger droplet (e.g., greater than 5 microliters, greater than 7 microliters, greater than 10 microliters, greater than 15 microliters, greater than 20 microliters, greater than 25 microliters, greater than 30 microliters, greater than 1 ml, etc.) than could be easily done within the air gap.

For example, in FIG. 13, a first pressure source 1507 (negative pressure and/or positive pressure) is shown attached to one end of the microfluidics channel, and a second pressure source 1509 (positive and/or negative pressure) is shown attached to another microfluidics channel. Fluid may be withdrawn from the air gap through the opening 1505 into the first channel 1501; alternatively or additionally, by applying positive pressure 1507, fluid may be moved from the first channel 1501 into the air gap through the opening 1505; concurrently, fluid may be drawn from the air gap at or near the same opening 1505 into the second channel by applying negative pressure 1509 within the second channel. Alternating positive and negative pressure may pass relatively larger volumes of solution between the two microfluidics channels, in and out of the air gap, as shown in FIGS. 14 and 15.

In the example shown in FIGS. 13-15, the top plate integrates microfluidic channels, as well as reservoirs and tubing; alternatively or additionally, one or more ports (e.g., for connecting to the pressure source(s), valves, and the like may be included. For example, a cover over the microfluidics channels may be included with port(s) and/or valves and the like. Positive and negative pressure may be applied within the microfluidics channel(s), for example, by reversing the polarity of a peristaltic pump.

FIGS. 16A and 16B illustrate schematically examples of a method for applying and removing (including washing) fluid to/from the air gap of a DMF apparatus 1120. In FIG. 16A, for example, the air gap 1121 of the cartridge is formed between the top plate 1117 and the bottom dielectric 1126. A connector interface 1127 connects a combined inlet/outlet port for a first fluid channel 1143 and a second fluid channel 1145. These fluid channels may be connected one or more reservoirs 1105, 1107. As already described above, in some variations, two separate connector interfaces (ports) may be used, one connected to each fluid line (e.g., which may be a microfluidics channel, as described above). A bridging droplet in the air gap region 1121 may connect to both inlet and outlet lines, and fluid may be drawn into and out of the fluid lines 1143, 1145 to mix the droplet, add fluid to the droplet, remove fluid from the droplet, expose a solid phase capture element (e.g., magnetic bead, non-magnetic bead, etc.) to the same fluid repetitively to deplete the fluid from the analyte of interest, e.g., to concentrate the analyte on the solid phase or other surfaces), etc.

Alternatively, as shown in FIGS. 17A and 17B, the cartridge may include air gaps of different heights. For example, in FIG. 17B, the air gap for the region around the connector interface 1127 may be greater (e.g., between 0.5 and 2 mm) larger than the air gap between other regions of the top plate and the dielectric 1121, as a portion of the top plate 1115 (or a separate top plate 1115 connected to another top plate 1117) may be spaced further from the dielectric 1126. Similarly, in FIG. 17B, the air gap 1119 near the connector interface at the edge of the apparatus may be larger than the air gap 1121 in other regions, e.g., by spacing a portion of the top plate 1117 further from the dielectric 1126 bottom layer.

A prototype DMF apparatus and cartridge illustrating the principle shown in FIG. 17A is illustrated in FIGS. 18A-18C, and was used to demonstrate the proof of principle for mixing larger volumes of solution in an air gap of a DMF cartridge. In FIG. 18A, the upper plate of the DMF cartridge included an opening through the top plate 1801 connected to a first fluid line 1843 and a second fluid line 1845. By alternating negative pressure (suction) between the first and second fluid line, fluid was moved back and forth between the first reservoir 1805 and the second reservoir 1807, as shown in the sequence of FIGS. 18A, 18B and 18C. In this example, magnetic particles holding an analyte of interest are magnetically held within the air gap (e.g., against the bottom, e.g., hydrophobic coated dielectric) by the DMF apparatus 1809 while the fluid is exchanged between the reservoirs, enhancing binding and/or rinsing.

In any of the air-gap apparatuses described herein, evaporation may be controlled or reduced, particularly when heating the droplets within the air gap. FIGS. 19A-19C illustrate the effects of evaporation on a droplet 1903 after only a few minutes. The intact droplet is shown in FIG. 19A. After one minute at 95 degrees C., the droplet volume has noticeably decreased (e.g., losing between 5-15% of the volume of the droplet, as shown in FIG. 19B. After two minutes (FIG. 19C), the droplet is between 20-34% smaller. To prevent this loss due to evaporation, the droplet within the air gap may be sheathed or covered in a nonpolar jacket, as illustrated in FIGS. 20A-20C. For example, a liquid paraffin material (e.g., a nonpolar material that is liquid at the working range described herein, e.g., between 10 degrees C. and 99 degrees C., may be used. In FIG. 20A, a droplet 2003 jacketed in liquid paraffin 2005 is heated (e.g., to 65 degrees C. or above). After one hour (FIG. 20B), the droplet has not appreciably evaporated. Similarly after 2 hours (FIG. 20C), the droplet has remained approximately the same volume.

In use, the nonpolar jacketing material may be added and removed at any point during a DMF procedure, as illustrated in FIGS. 21A-21I. Surprisingly, removal may be accomplished, for example, by drawing the jacketed droplet up out of the air gap, e.g., out of a port entering into a microfluidics channel as described above. The liquid paraffin, for example, may be removed into a waste reservoir by applying a negative pressure to a droplet from a port through the top or side of the air gap. The lower-density liquid paraffin may be the first layer that gets drawn up, leaving the aqueous droplet behind. Previously it was believed to be difficult or impossible to remove the jacket of nonpolar liquid.

For example, FIG. 21A shows a jacketed droplet in which the aqueous droplet 2101 is surrounded by a nonpolar liquid 2103 (e.g., liquid paraffin). In this example, a small bubble has also been formed in the liquid paraffin. The droplet may be easily moved, as shown in FIG. 21B, showing the droplet moving by the coordinated application of energy to the driving electrodes to alter the electrowetting of the aqueous droplet. In FIG. 21B, the jacketed droplet has been moved to the right. Initially, the aqueous droplet may be combined with the nonpolar liquid by applying the nonpolar liquid into the air gap either directly on the droplet, or in a region of the air gap that the droplet may be moved into. The jacketed droplet may also be combined with one or more additional droplets that may include a nonpolar liquid droplet of their own, or may be unjacketed. In some variations, a jacketing droplet (including a small aqueous droplet and a relatively large volume of nonpolar solution may be combined with the target droplet in order to jacket the target droplet. The small amount of aqueous liquid in the jacketing droplet may be a buffer, diluent, or other solution that allows the jacketing droplet to be moved in the air gap. This technique is particularly helpful when used with DMF cartridges having larger (e.g., 0.5 mm or greater) gap widths. A larger gap width may otherwise make it difficult for the larger droplets to maintain a jacket of typically less dense nonpolar jacketing material. FIGS. 21C and 21D illustrate a droplet 2101 that has been combined with another droplet, forming a larger jacketed droplet 2101'. The larger droplet may also be moved by controlled actuation of the driving electrodes, as shown in FIGS. 21C and 21D.

Figure 21E:
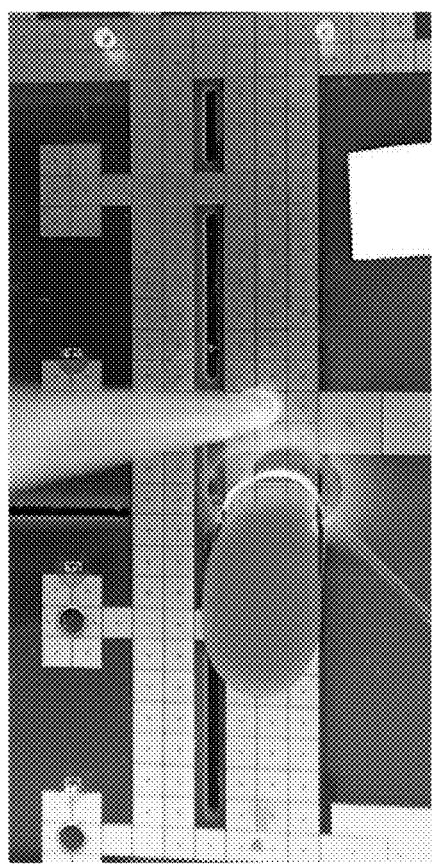
Figure 21F:
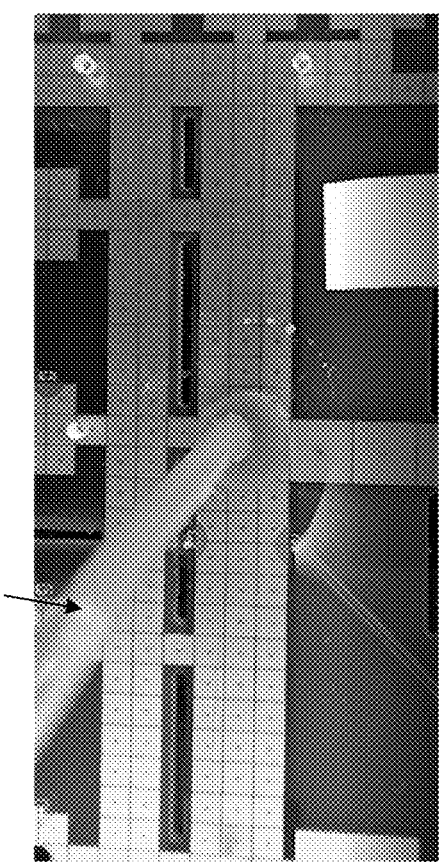
Figure 21G:
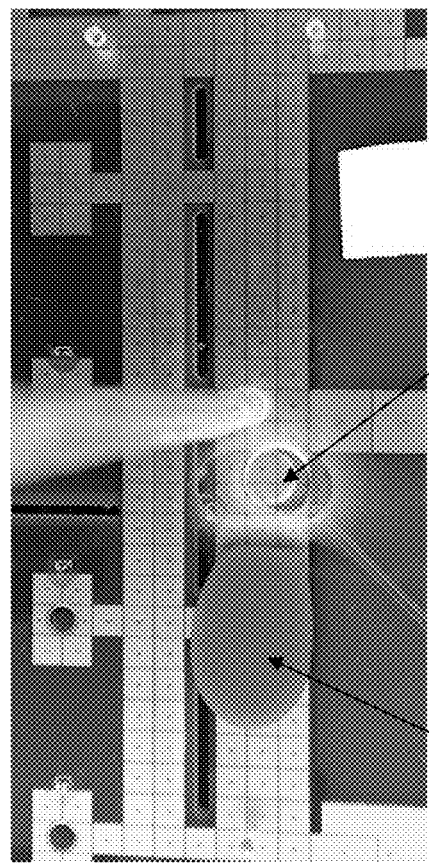

FIGS. 21E to 21I illustrate the use of a nonpolar liquid jacket in a sample including a magnetic bead material. In FIG. 21E, a jacketing droplet includes a small amount of aqueous liquid 2121 and a relatively large amount of nonpolar jacketing material 2123, the two may be combined, for example, by moving the jacketing droplet 2123 into the sample droplet 2121, as shown in FIG. 21F, allowing them to combine so that the jacketing material is now jacketing the sample droplet. In in his case, the sample droplet is quite large, and includes a concentration of sample absorption magnetic beads.

Figure 21H:
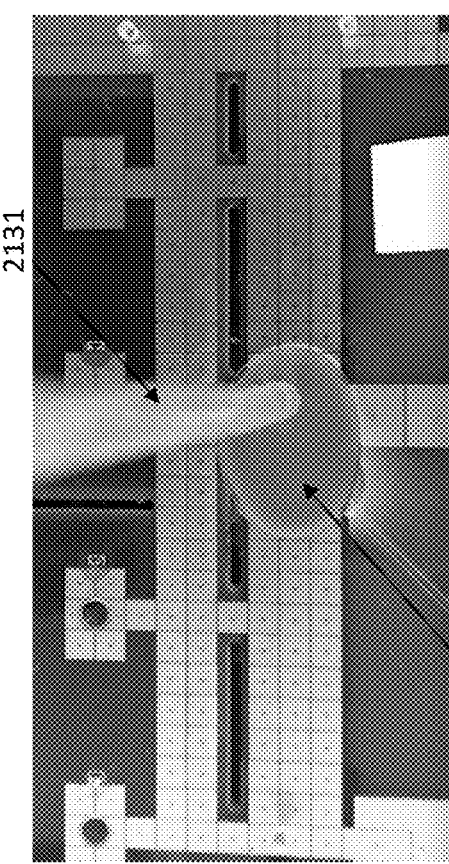
Figure 21I:
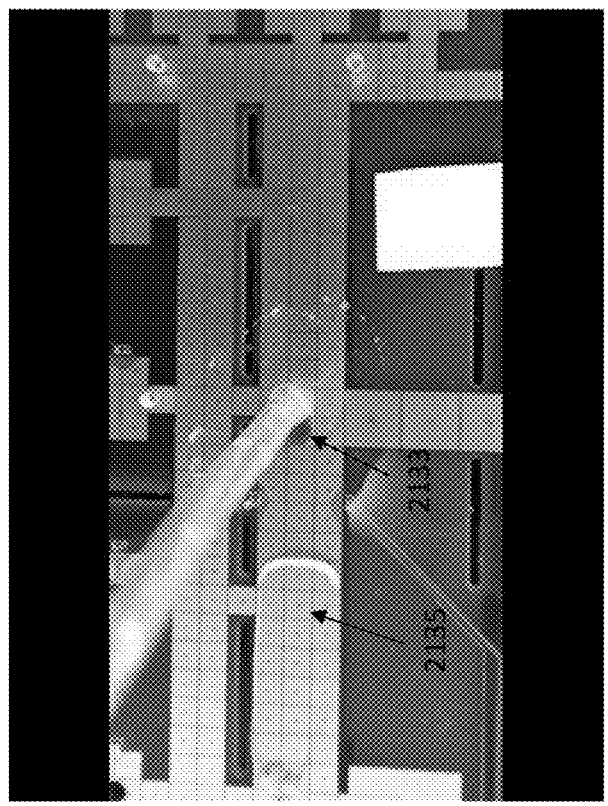

Once combined, the jacketed droplet 2121' may be moved (by DMF) to a port into the air gap from which solution may be extracted, as shown in FIG. 21H. In this example, the solution may be mixed by applying positive and negative pressure to move the solution into and out of the fluid channel 2131. The nonpolar solution jacketing the droplet may be removed by applying negative pressure to pull the solution out of the air gap though the top port; the first solution removed is the jacketing material. Thereafter, as shown in FIG. 21I, the magnetic particles to which a desired analyte has been bound may be held onto the bottom side of the air gap, e.g., by applying a magnetic field, and the droplet solution may be removed, and/or washed, in the absence of nonpolar jacketing solution, which may otherwise interfere with the binding or release of the analyte from the magnetic particles. In FIG. 21I, the magnetic particles 2133 are left in the air gap, and a separate washing buffer may be applied by moving a washing and/or elution droplet 2135 over the magnetic particles.

In addition to the techniques for controlling evaporation discussed above (e.g., using a jacket of nonpolar liquid), any of the methods and apparatuses described herein may also include controlling the partial pressure of water vapor inside the cartridge to create "zero evaporation" conditions, e.g., by balancing the rates of water molecules leaving and entering the water surfaces. The balance does not need to be perfect, but may be adjusted by adjusting the temperature and pressure so as to stay as close as possible to the zero evaporation condition. This may vary with temperature; for example, once relative humidity is controlled, it may be best to adjust the humidity up and down with the temperature, e.g., during hybridization or PCR cycling using the apparatus. Alternatively or additionally, any of these apparatuses may use local replenishment to adjust for evaporation by moving droplets slightly to recapture nearby condensation (see, e.g., FIGS. 19B-19C, showing evaporative droplets surrounding the main droplet). Any of these methods and apparatuses may also or alternatively use walled-in heating zones to reduce the surface area from which evaporation may occur. For example, as mentioned above, in some variations the seating surface of the DMF apparatus may include projections forming local regions within the cartridge, since the vacuum may be precisely applied to control the contact between the flexible dielectric and the electrodes, projection on the seating surface may create chambers or channels within the air gap, including forming partially wall-in heating zones that may reduce evaporative surface area. In some variations, the top plate may be spaced differently across the cartridge; the evaporation rate may be lower for thinner droplets compared to thicker droplets. Thus, any of the heating regions may have a narrower width of the air gap to reduce evaporation.

In any of the large-volume droplet DMF cartridges, e.g., DMF cartridges having a gap separation of 0.5 mm or greater (e.g., 0.6 mm or greater, 0.7 mm or greater, 0.8 mm or greater, 0.9 mm or greater 1 mm or greater, e.g., between 0.4 mm and 2 mm, between 0.5 mm and 2 mm, between 0.5 mm and 1.8 mm, between 0.5 mm and 1.7 mm, etc.), it has proven particularly difficult to dispense droplets having a predictable volume, as the surface tension of the relatively large droplets may require a greater amount of energy to release a smaller droplet from the larger droplet. In general, in digital DMF systems, the ratio between spacer (air gap) thickness and electrode size dictates the volume of droplet dispensing. In the conventional digital microfluidic approach, spacer thickness of less than about 500 micrometers (0.5 mm) allows for electrowetting forces to split a unit liquid droplet from a larger amount of liquid volume; this has not been possible with higher spacer thicknesses (e.g., greater than 500 micrometers). Described herein are methods for splitting unit droplets from larger volumes in air gaps having a width (e.g., spacer thicknesses) of 500 µm or greater. In some variations this may be performed by, e.g., flooding a region of the air gap with a solution to be dispensed from a port (which may be a side port, top port or bottom port), and then selectively activating a cell (corresponding to a driving electrode) in the flooded region, then withdrawing the solution back into the port (or another port) that is offset from the activated electrode so that a droplet remains on the activated electrode as the solution is withdrawn into the port; the droplet on the activated electrode breaks off from the larger flood volume (e.g., by necking off), leaving the dispensed droplet behind, where it may then be driven by the drive electrodes, combined with one or more other droplets, etc.

For example, an integrated companion pump may be used to drive a large volume of aqueous solution into a DMF device (e.g., into an air gap of the DMF cartridge) and over an activated electrode. The aqueous solution may then be withdrawn away from DMF device, dispensing behind a unit droplet over the activated electrode. FIGS. 22A-22D illustrate an example of this method. In FIG. 22A, a port 2201 into the air gap 2205 of the DMF cartridge connects to a fluid channel (e.g., a microfluidics channel as described above), shown in FIG. 22A as a tube 2209, holding an aqueous solution (reagent 2203). In this example, a single drive electrode 2207 has been actuated; alternatively, in some variations, the electrode is not activated until after flooding the region of the DMF apparatus. Pre-activating it may help distribute a predefined amount onto the unit cell defined by the drive electrode. In any of these examples more than one contiguous drive electrodes may be activated to dispense larger-volume droplets.

Next, as shown in FIG. 22B, the region of the air gap including the activated drive electrode is flooded with the aqueous solution 2203. FIG. 22A shows the release of a large volume (e.g., 250 µL) from the channel (tube 2209). In some variations, as the reagent nears the distal end channel 2209, a drive electrode 2207 is activated (e.g., AC potential of 390 Vrms, or by otherwise creating an alternating field effect using a DC potential), which may generate an electrowetting force that further encourages transfer of the reagent from tube 2209 to the activated drive electrode 2207; further flow from the channel occurs so that the droplet grows to fully cover the activated drive electrode(s).

In FIG. 22C, the aqueous solution (reagent 2203) is then withdrawn from the air gap through the same port 2201 or a separate port, where the activated drive electrode(s) is/are separated from the port into which the solution is being drawn by a distance (e.g., the distance may be approximately equivalent to the width of the activated electrode); this distance is sufficient so that the droplet on the activated drive electrode(s) necks off of the liquid being withdrawn back into the channel 2209. For example, aspirating the reagent back into the tube as shown in FIG. 22C may result in necking of the droplet from the rest of the solution; the neck region continuously shrinks until a unit droplet (e.g., 10 µL) is left behind on activated drive electrode, as shown in FIG. 22D. The same process can be repeated with activating two, three and five electrodes to dispense approximate multiples of the unit droplet (e.g., 20, 30 and 50 µL), respectively as shown in FIG. 23A-23E. Multiple droplets may be separately dispensed and combined, or alternatively multiple electrodes may be used to dispense larger volumes at once, as mentioned. The size of the droplet (droplet volume) may be based in part by the size of the driving electrodes and the spacing of the air gap.

FIGS. 23A-23F illustrate the dispensing of various predefined volumes of solution from a reservoir above the cartridge using the method described above. In FIG. 23A, for example, the region of the air gap including the port connecting to a channel holding solution above the larger air gap (e.g., 0.5 mm width) is flooded with solution 2301, as shown, and a single activated electrode is used to break off a predetermined volume of solution (e.g., 10 microliters), shown in FIG. 23B. This droplet may be moved away from the flooding region, and the process repeated multiple times to produce multiple droplets of approximately uniform volume (e.g., 10 microliters+/−5%, 10%, 15%, 20%, 25%, etc.). In FIG. 23D, a first unit droplet 2303 (e.g., having a 10 microliter volume) is shown adjacent to two combined unit droplets 2305, which form a second droplet having 2× the volume, e.g., 20 microliters. Similarly, FIG. 23E shows a large droplet 2307 (e.g., 50 microliters) formed by combining five unit droplets. FIG. 23F illustrates the use of a larger driving electrode 2315 (e.g., having approximately 4× the surface area) that may be activated when flooding the air gap region to form a larger unit droplet 2311 (e.g., a 40 µL unit droplet).

Thus, by flooding or flushing a dispensing region of the air gap with a large volume of aqueous solution, and activating a drive electrode (or over an already-active drive electrode), then removing the solution (e.g. pumping it out) a relatively precise volume droplet may be left behind. As mentioned, when using large-volume DMF apparatuses (cartridges), e.g. having a spacing of between 0.4 or 0.5 and up to 3 mm, this technique may be used to dispense smaller-volume droplets from larger-volume reservoirs with a reasonable amount of force; unlike air gap DMF apparatuses having smaller air gaps, which may directly dispense smaller volume droplets form a larger volume by applying electrowetting energy, the larger force effectively prevents directly dispensing by DMF in larger air-gap devices. In many of the examples provided herein, the gap spacing of the air gap is between 1 mm and 1.3 mm (e.g., approximately 1.14 mm), though at least up to a 3 mm spacing has been successfully used.

Dispensing of solution as described herein may be particularly important in processing samples (e.g., mixing, etc.) as well as replenishing solution lost due to evaporation in such systems.

User Control Interface

In any of the apparatuses and methods described herein, a DMF apparatus may be controlled by a user so that the DMF apparatus can execute one or more protocols (e.g., laboratory procedures) on a sample that is inserted into the DMF apparatus (e.g., cartridge). For example, a DMF apparatus may include a user interface that dynamically and flexibly allows the user to control operation of the DMF apparatus to perform a user-selected or user-entered protocol. In general, there are numerous considerations when translating a processing protocol for operation by a DMF apparatus, including preventing contamination during the procedure. Contamination may occur when moving a sample droplet, in which the protocol is being performed, over a path taken by earlier steps in the procedure (or parallel steps). Typically, the one or more reaction droplets that are being processed may need to be moved to different locations within the air gap of the DMF cartridge, and/or temporarily out of the air gap region. It would otherwise be difficult for the user to coordinate these movements both to avoid earlier or future paths (e.g., contamination) and to remember which locations are appropriate for heating, cooling, mixing, adding, removing, thermal cycling, etc.

Described herein are user interfaces for controlling the operation of the DMF apparatus that allow the user to more easily enter protocol information/steps into the DMF. This may be accomplished in part by providing a set of graphical step representations (e.g., showing mixing, adding, heating, cooling, cycling, washing, etc.) of steps that may be performed, and allowing the user to select/enter these steps in a manner that also intuitively provides the duration of the steps, or the degree (e.g., temperature, etc.) to be applied. Once entered, the apparatus may then determine an efficient pathway to perform the entered protocol within the predefined layout constraints of the DMF apparatus and/or cartridge to avoid contamination. For example, any of these apparatuses may determine a pathway (pathfinding) that prevents or reduces path crossing within the air gap where such crossovers may result in contamination.

FIG. 24 is an exemplary schematic, illustrating the steps involved in controlling any of the DMF apparatuses described herein. For example, in FIG. 24, the user may enter the protocol using a graphical/visual user interface (referred to herein as "SAM"). This may be described in greater detail in reference to FIGS. 25A-26B). The graphical protocol may then be translated into a series of target goals and this target protocol may then be used by the apparatus to tailor this protocol to the DMF apparatus. In FIG. 24, the system may determine a path, and derive the control of the drive electrodes, heater, cooling (e.g. Peltier), magnetic(s), microfluidics (pump(s), etc.), etc. in order to accomplish the protocol. The path may be optimized to require the shortest pathways, but constrained by limiting or reducing overlap in the path(s), to prevent contamination, loss of materials (including reagents and/or Teflon), heat dissipation, etc.

As mentioned, FIGS. 25A and 25B illustrate one example of a visual interface (e.g., graphical user interface) for entering a desired protocol. In FIG. 25A, a set of control icons ("move", "heat", "removal", "cycle", "mix", "breakoff", "dispense", and "wait") are shown. The user may select or arrange these icons in order to provide a graphical representation of a processing protocol, as shown in FIG. 25B. Each of the icons may have an associated duration, and thus, these icons may be used to select processing instructions, or steps, for a sample. In this example, the icons are uniquely identified by one or more of: color, image, and text.

The user may input the protocol directly into the apparatus, or into a computer or other processor in communication with the DMF apparatus.

Once entered, the protocol may be translated into a data structure format (e.g., a JSON format that indicates the name of the protocol and sample, where the sample goes, what volume to use, etc.). This data structure may then be directly used or converted into a format (e.g., java script) so that the apparatus may determine the paths to take in the cartridge in order to achieve the desired protocol. The path finding may be done locally (e.g., in the DMF apparatus) or remotely and communicated to the DMF apparatus. The path finding may be configured to maximize based on the shortest path length that also avoids cross over, or some cross-overs, to prevent contamination. Thus, the apparatus may determine the shortest route that avoids contamination. In general, the user interface can allow the user to easily select the desired actions and elements (e.g., mixing, etc.); the apparatus may already be familiar with the reagents (e.g., elements of the device). The user can then select the actions, durations, temperatures, etc.

Figure 26A:
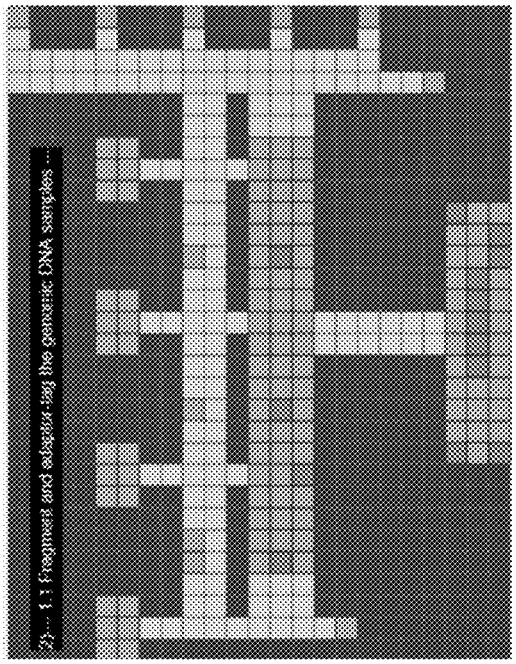
Figure 26B:
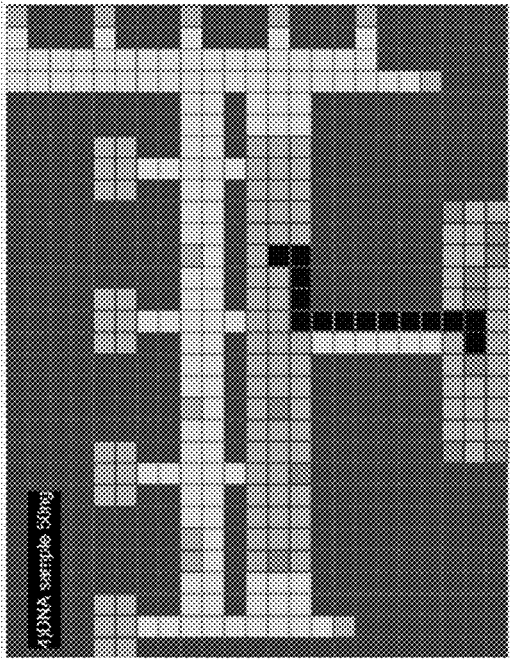
Figure 26C:
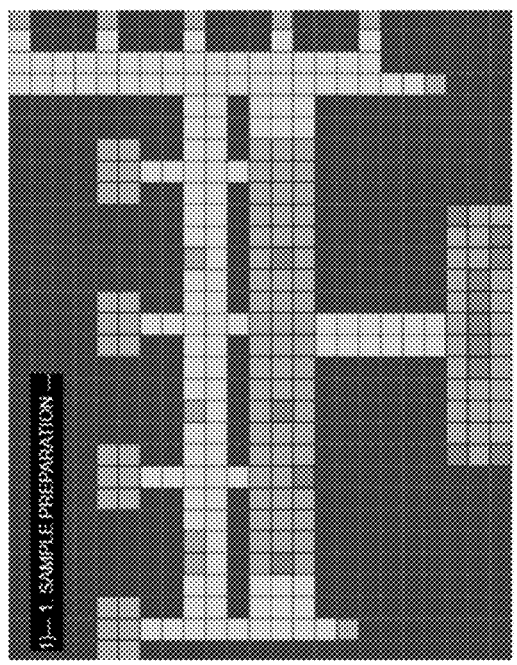
Figure 26D:
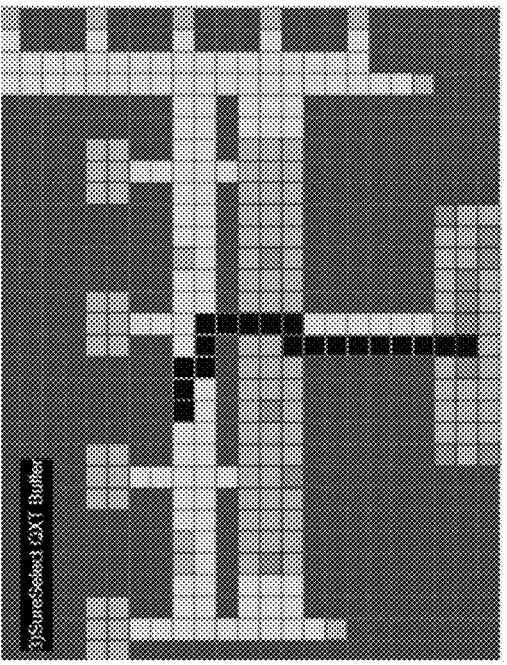
Figure 26E:
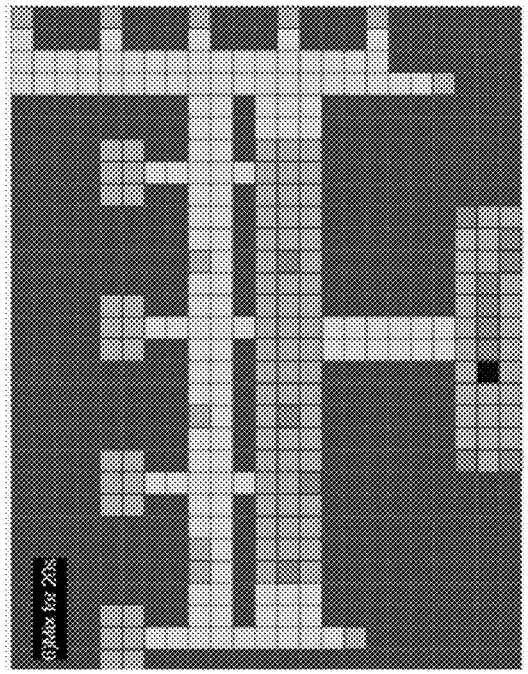
Figure 26F:
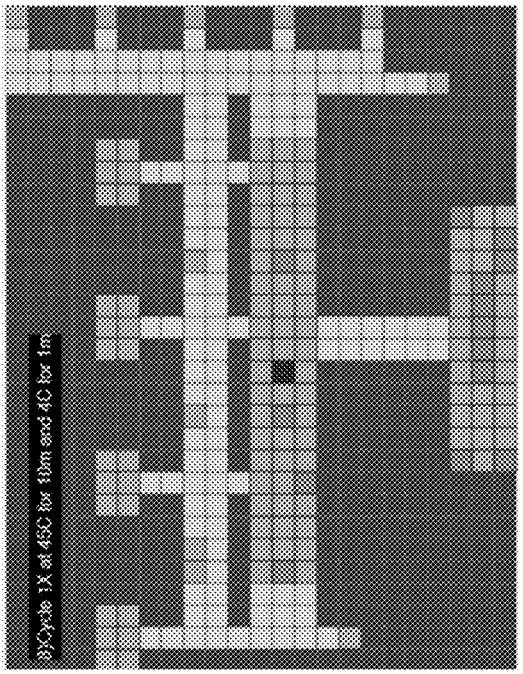
Figure 26G:
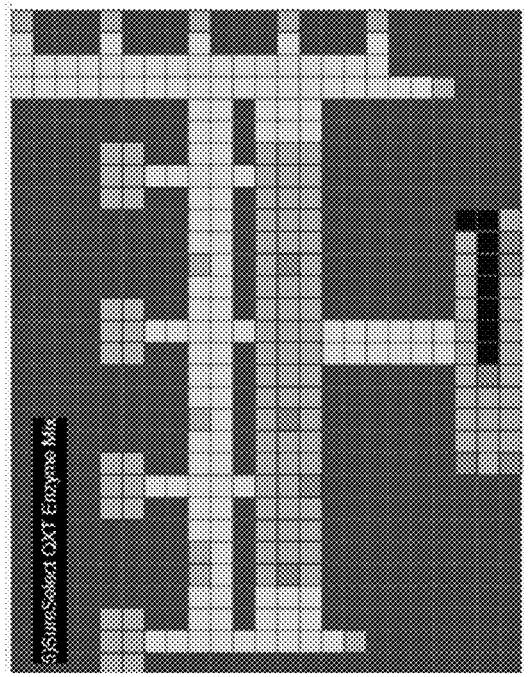
Figure 26H:
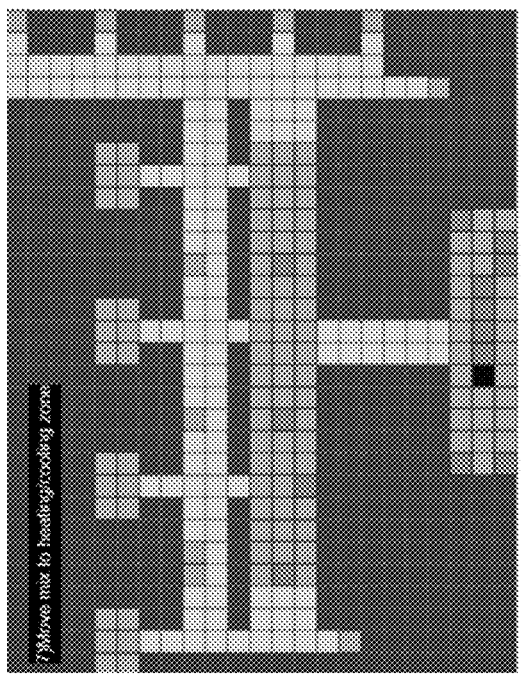

FIGS. 26A-26H illustrate one example of an apparatus determining a pathway from an input protocol. For example, FIG. 26A shows a graphical illustration of a particular configuration of DMF cartridge air-gap planning a first set of steps, e.g., sample preparation. The apparatus may know the distribution of the cells within the air gap, as well as the configuration of the functional zones (heaters, coolers, mixing/microfluidics, waste removal, dispensing, etc.) in the DMF cartridge. FIG. 26B is a graphical illustration of the apparatus determining the path for tagging a sample having genomic DNA (or fragments of DNA) with an adapter tag. In FIG. 26C, a step of moving a first buffer (e.g., SureSelect QXT buffer) to an appropriate location for future processing is performed. The path may be chosen in light of both past movements and future movements and may be recursively modified as the future protocol steps are defined. In FIG. 26D, the path for moving the DNA sample is shown (in black). FIG. 26E shows the movement of an enzyme mix from a cooled region where it is beings stored to combine with the sample; FIG. 26F shows the user of mixing of the sample with the buffer and enzyme mix. The mixed sample may then be moved (FIG. 26G) along a calculated pathway to a heating/cooling zone for cycling (FIG. 26H). Additional steps may then be performed as indicated.

FIGS. 65-68 illustrate examples including user interfaces and method including them for controlling the operation of the systems described herein, as well as selecting, editing, and storing protocols.

In FIG. 61, the user interface may be shown on the display of the device (e.g., a touchscreen) and/or a remote computer device, such as a smartphone, laptop, desktop, etc. FIG. 62 shows an example of a user interface, instructing the user what to apply to the various cartridge inputs. FIG. 63 is an example of a cloud interface for a selecting, modifying (editing) and/or sharing a protocol, using the visual protocol design language described herein. This user interface is an open canvas interface that allows a user to create, edit, delete and save any protocol in a drag and drop interface. Users can select reagents, sample, unit operations of the system (heat, cool, mix, elute, wash, incubate, thermocycle) and build their own protocols. The pathfinder (translation of the blocks to actions on the device) algorithm may takes the constraints of the sample and reagents (contamination, volume and viscosity), electrode grid and cartridge constraints and find the most optimal paths between two points avoiding all mentioned constraints, as described above. Users can share their constructed protocols made on the open canvas in the protocol store. The open canvas unit operations may automatically be translated into the scripting language for protocol execution by the apparatus.

For example, a user may share protocols from other users or labs. For example, a user from organization A has created protocol X in the cloud interface for x application with their preferred conditions and volumes. A user from organization A can share the protocol X with the community in a market place. A user from organization B can read and download the protocol X, edit it or load it directly in their machine and run it. The protocol can have a cost that user from organization B pays and the machine provider and user from organization A may share revenue. This is illustrated in FIG. 64.

Figure 65:
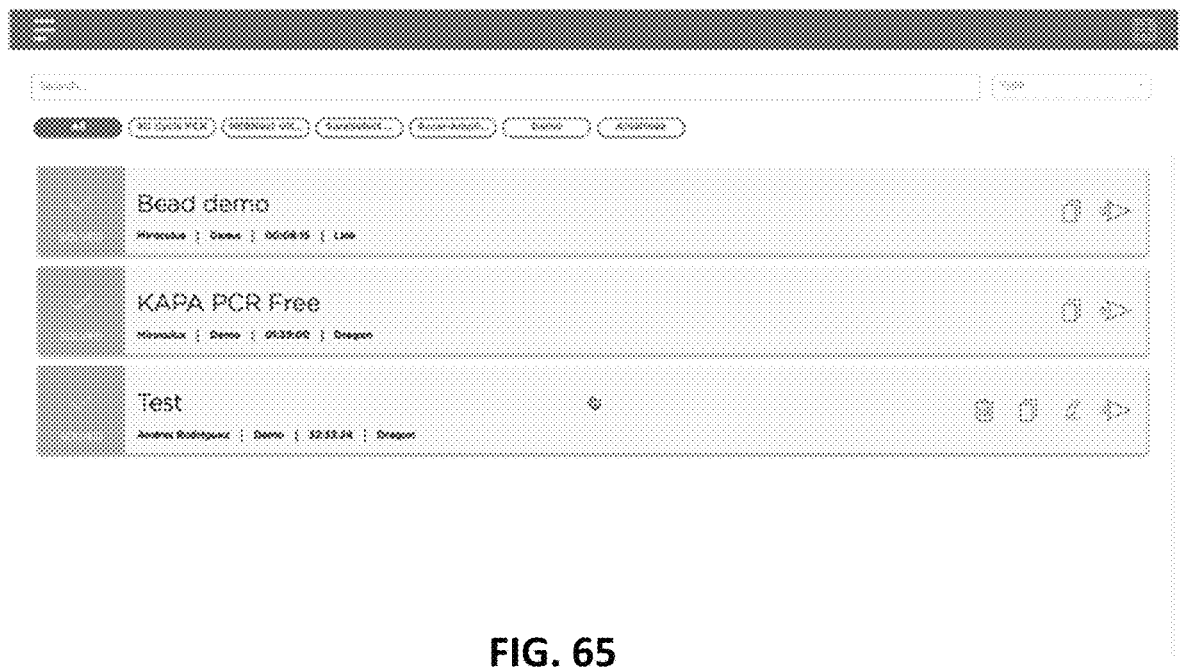
Figure 66:
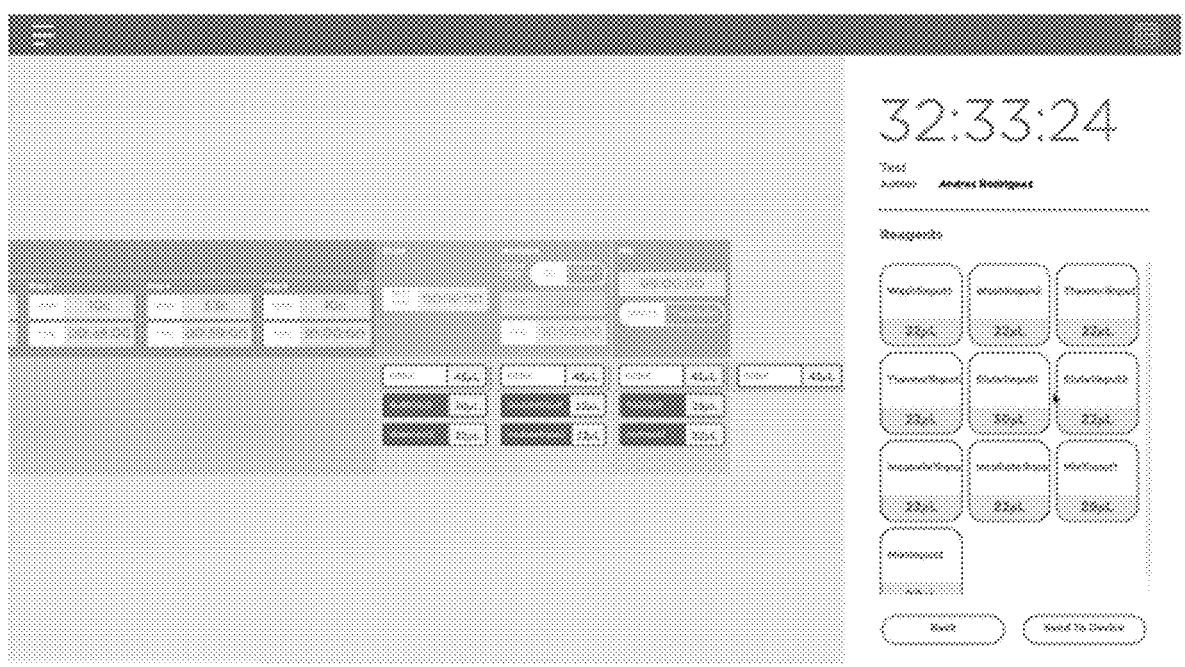

FIG. 65 and FIG. 66 show examples a user interface for selecting a protocol and reviewing the protocol, respectively.

Figure 67:
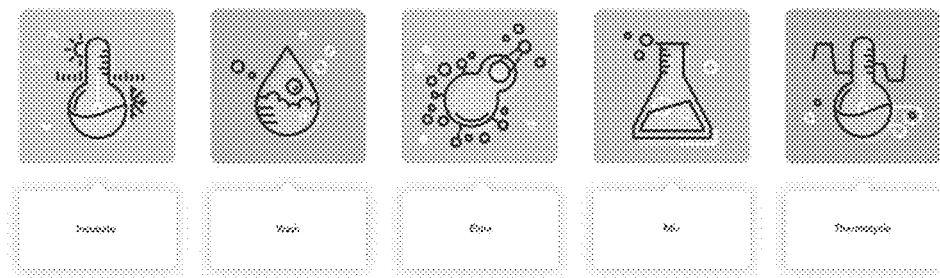
Figure 68:
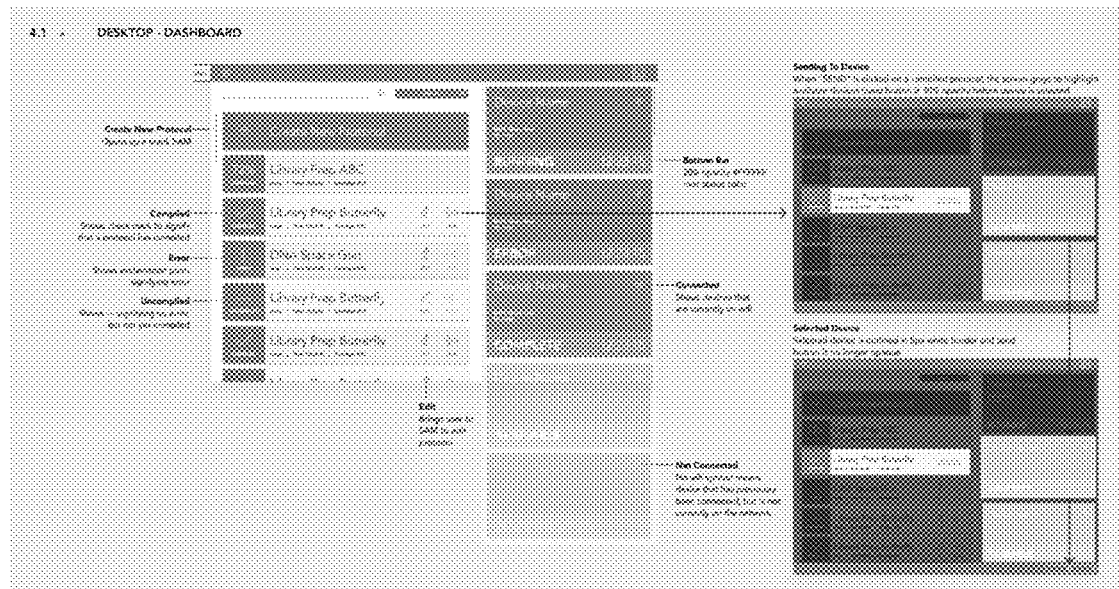

FIGS. 66 to 68 illustrate the user interface for programming and operating the device on both the device and/or on a remote processor (e.g., desktop, laptop, pad, etc.).

Thermal Control

Any of the apparatuses described herein may include features for thermal control (e.g., heating and/or cooling), and/or droplet detection (e.g., tracking and/or identification). For example, the apparatus, including the cartridge and apparatus, may be configured to quickly and accurately cycle droplet temperatures. Alternatively or additionally, droplet detection may quickly and accurately scan the electrode grid for droplets (including, but not limited to reagents, wax, water, etc.).

As described above, the apparatus may be configured to include one or more thermal control elements, including cooling and/or heating. For example, the apparatus may include resistive heating in some of the cells, to heat a droplet within the air gap. For example, in some variations a resistive heater may be included in layer 2 of the printed circuit board (PCB), such as part of a first copper layer under the surface of the PCB. The apparatus may also include a heat sink or cooling element, such as a liquid cooler (chiller) that is in constant thermal connection with the PCB. Any of these variations may also include one or more of thermal mass reduction, which may enhance the rate of temperature change in a cell, and/or thermal conduction through the PCB (e.g., through the electrodes that form part of the PCB in the apparatus).

Thermal Mass Reduction may refer to the reduction or removal of thermal mass from the apparatus (e.g., system, device, etc.) to reduce the total required amount of energy to reach a temperature or temperature range. Ideally, when there is less thermal mass, less energy needs to be taken out of the system to decrease the sample temperature during thermal cycling, thus enabling faster cycle rates without the need for a very large heating and cooling system (i.e. no more liquid cooling to the stack up). The apparatuses and methods described herein may reduce thermal mass by reducing/removing thermal mass from above a droplet or region holding one or more droplets in the upper (top) plate of the cartridge. For example, when the upper/top plate is formed of an acrylic or polycarbonate material, the thermal mass above the air gap region may be reduced by including one or more cavities in the top plate (e.g., the polycarbonate and/or acrylic structure) and filling the cavity with a thermally insulating material, or a material that has a low thermal conductivity (such as air). The cavities may be positioned in the top plate of the cartridge over a thermally controller region, so that when a droplet of material is below the cavity, the heating/cooling applied by the apparatus, e.g., from the PCB, may more rapidly change the temperature of the droplet in the air gap region. Removing the thermal mass above the droplet may be incorporated in the design of any of the cartridges described herein. The cavity may be formed near the bottom surface of the top plate (e.g., immediately on one side of the air gap); the cavity may be partially through the thickness between the top and bottom surfaces of the top plate. FIG. 28 illustrates an example of a portion of a cartridge showing a thermally controlled region in the top plate 2801 of the cartridge 2804. The cartridge may be positioned onto the apparatus 2803. A droplet 2807 within the air gap region of the cartridge (e.g., the region bounded by the bottom surface of the upper plate 2801 and the top surface of the lower sheet of dielectric material 2809. Thus, in variations in which the cartridge body, including the top plate is formed of a solid piece of polycarbonate on the top plate, one or more cavities may be created (e.g., FIG. 29) and may be enclosed or filled with an insulating material that has a low thermal mass. This may prevent heat from the sample transferring to storage region above it. The void replacement material can be air or a similar material that has low thermal conductivity and low thermal mass.

Alternatively or additionally, thermal mass may be removed from the PCB by removing material (e.g., with precision milling) and/or using materials having a very low thermal mass. For example, one or more layers of the PCB may be removed in the heater zone (e.g., heating or thermally controlled region) to reduce thermal mass. This may be done from the bottom side of the board as to not disrupt the surface finish of the electrodes.

FIG. 29 is an example of a milled region in a PCB of an apparatus that has a lower thermal mass in order to increase the response time for temperature change of a droplet in the air gap of the cartridge. In This schematic example, showing sectional view, the layers of the bottom (e.g., PCB) may include one or more layers, e.g., of copper and dielectric beneath the droplet (in the PCB of the apparatus) has been milled to create a cavity or void which may be filled with a thermally insulating material, including air. Thus, thermal conduction through the PCB may be reduced. In general, the cavities in the top and/or bottom plate may help thermally isolate the droplet in the air gap between the top and bottom plates.

In addition to speeding temperature changes in the droplet by reducing thermal mass, any of the methods and apparatuses described herein may increase the thermal conductivity between a heater source and an electrode to improve performance. For example, if the heater layer on the PCB is in layer 2, then using a high thermally conductive dielectric layer will increase heat transfer from the heater layer to the electrodes, as illustrated in FIG. 30. FIG. 30 shows a high conductive dielectric 3005 between the heater 3003 and electrode 3001 copper regions.

In some variations, the apparatus (and in particular the PCB portion of the apparatus) may alternatively or additionally be configured to increase thermal conductivity by including one or more thermal vias near each active (e.g., driving) electrode/cell. The thermal via may be a channel or passage in thermal contact with the region near the electrode(s), including the region underlying the electrode (s), such as the PCB material, of the thermal control region, and may be filled with any thermally conductive material. For example filling the vias with a thermally conductive material (such as, but not limited to: copper, epoxy, resin, etc.) may further increase the thermal conductivity and may dramatically increase the thermal response time of the droplet or other material in the air gap. Thus heating and/or cooling may be much faster than without the vias. The thermally conductive vias can be implemented with or without a milled region in the PCB (shown in FIG. 31A, showing a milled region with thermally conductive vias, and 31B, showing thermally conductive vias without a milled region). For example, FIG. 31A illustrates a plurality of thermal conductive vias 3105 in an example of a bottom plate (e.g., PCB) with that has been milled to provide a region of thermal isolation around the thermally controlled active region.

The vias may be filled with any appropriate thermally conducive material. In some variations the vias are filled with a thermally conductive material that is not electrically conductive (e.g., epoxy, resin, etc.).

One end of the vias may be in thermal contact (e.g., may touch) with a region adjacent to the ultimate upper surface (e.g., the cartridge-contacting surface) and/or the electrodes of the apparatus. In particular, when the thermal vias are filled with an electrically conductive material (e.g., copper) the thermally conductive vias may contact a region immediately adjacent to the electrodes, but not in electrical contact with the electrodes. Another portion of the thermal via may be in thermal contact with a heat sink beneath the upper surface (e.g., on a side and/or bottom surface). In some variations, the opposite end of the vias may be in contact with a temperature controlled surface (e.g., cooled surface, heated surface, etc.). In some variations, the vias may be in thermal communication at one end region with a thermal controller (e.g., heater, cooler, heat sink, etc.); the vias may pass through the vacuum chuck on which the PCB sits.

The vias may be any appropriate dimensions. For example, the thermally conductive vias (referred to herein as thermal vias or simply vias) may have a diameter of between 0.1 mm and 3 mm, 0.1 mm and 2 mm, 0.5 mm and 1.5 mm, about 0.8 mm, about 1 mm, about 1.2 mm, about 1.4 mm, etc. The thermal vias may have a round, oval, rectangular, square, triangular, or any other cross-section and may be cylindrical, extending through the printed circuit board from the thermal control (e.g., one or more of a heater, cooler, heat sink, etc.) to the region immediately beneath the electrode or immediately adjacent to the electrode (in some variations, without contacting the electrode, so that they remain electrically, but not thermally, isolated from the electrodes).

As mentioned, any appropriate number of vias may be formed per each cell (e.g., associated with each electrode driving movement of fluid in the air gap of a cartridge). For example, each cell in the thermally controlled region (which may include multiple thermally controlled cells) may be in contact with 2, 3, 4, 5, 6, 7, 8, 9, 10, 11, 12, etc., or more vias. For example, each thermally controlled cell may be in contact with more than 8 vias.

The use of thermal vias may provide a dramatic improvement over variations in the rate of heating and/or cooling of the thermally controlled regions, compared to systems that do not include thermal vias.

Cartridge Features

In addition to the features described above, any of the cartridges may alternatively or additionally include one or more openings into or through the top plate over some of the cells (e.g., regions that will correspond to one or more drive electrodes). These openings may be open and may allow direct imaging 3221, as illustrated in FIG. 32. Alternatively or additionally, an opening may be used for passive dispensing of fluid from the air gap. For example, in FIG. 32, an opening 3203 in the top plate of the cartridge 3205 may be used to passively dispense fluid from a droplet 3211 positioned beneath the opening; the drop let may be moved under the opening via DMF as described above. Once positioned a predetermined amount of fluid may be passively dispensed from the droplet into the opening, e.g., via capillary action, and the droplet may be moved away from the opening. The sampled material may then be analyzed or processed using the microfluidics in top of the cartridge and/or may be analyzed in place. Alternatively, the material sampled may be added to another droplet 3219 after the first droplet 3211 has been moved away; positioning the second droplet under the opening through the top plate that includes the sampled material 3203. This sampled material (fluid) from the first droplet may be a metered amount, based on the dimensions of the opening 3203. The top plate may include a hydrophilic surface or surface coating. In some variations, an opening in the top plate may be pre-loaded with a material, such as a liquid wax or other coating material that maybe combined with a droplet when the droplet is moved under the opening (e.g., to dispense a coating material, such as an anti-evaporation coating of liquid paraffin, oil, etc.). An opening in the top plate may also act as a thermal insulator. The opening may extend over a portion of the cell so that the return electrode may be on the edges of the opening. The opening may be any size and dimension (e.g., round, square, etc.). Although the variation shown in FIG. 32A illustrates imaging through the top plate (using optic 3221), in some variations the imaging may be done from the bottom, through the bottom of the cartridge. For example, a region of the bottom of the cartridge (e.g., the dielectric film) may be transparent or optically permeable for imaging (e.g., fluorescence).

In any of the cartridges described herein, the top plate may include a plurality of manifold for delivery of one or more materials into the air gap. FIGS. 27A and 27B illustrate one example of a top plate, formed of a polymeric material (e.g., acrylic and/or polycarbonate). FIG. 27A shows the upper region of the top plate (which may be covered by one or more covers, not shown. In FIG. 27A, a plurality of dispensing regions 2704, 2706, 2708 of different sizes are included. For example a smaller 2706 (e.g., 2-20 microliter size), medium 2704 (e.g., 100 microliter to 1 mL) and large 2708 (e.g., 1 mL to 5 mL) are shown, as are waste and/or mixing regions 2710. These chambers may be preloaded with fluid, and each may include an opening into air gap region. A pressure control may be used to apply pressure to drive the fluid out of the opening of the dispensing region and into the air gap, which may be controlled by the apparatus or other device holding the cartridge. Thus, the apparatus may include one or more pressure interface(s) that may be used to control the release of fluid from and fluid handling in the top plate.

In some embodiments, the top of the cartridge may be covered by a protective film, such as the 200 µm thick top cover file shown. The bottom surface of the cartridge body, forming the top surface of the air gap, may be covered in a conductive substrate material that may be hydrophobic or may include a hydrophobic coating. For example, the film may be a COC film sputtered with ITO (conductive material) and Cytop (omniphobic substrate) to seal the channels on the bottom side of the main cartridge body.

FIG. 27B illustrates a bottom side of the top plate portion shown in FIG. 27A. The bottom side may be coated or covered with the electrode and/or a dielectric and/or a hydrophobic coating, a described above. In FIG. 27B, the top plate may also or alternatively include one or more channels 2712 in the surface of the plate that may allow for mixing as described above. The bottom surface of these channels may be formed by the upper dielectric and/or return electrode (which, in some variations, may include a dielectric, hydrophobic film and/or electrode layer). In general, the cartridges described herein may include one or more serpentine mixing channels, which may provide a fluidic pathway for entire volumes of liquids so they can be chaotically mixed on the EWOD zone.

In any of the cartridges described herein, the bottom surface, which may be configured to contact the seating surface of the apparatus and in particular the drive electrodes in the apparatus, is formed of a dielectric material, as described above. The bottom surface may be a sheet of dielectric material having a first side and a second side (the first side forming an exposed bottom surface on the bottom of the cartridge). The second side of the sheet of dielectric material may comprise a hydrophobic surface and may form one side of the air gap. The bottom surface may be, for example, a film that is either itself dielectric, and/or that is coated with a dielectric material. For example, in some variations the film is a dielectric and/or hydrophobic film. It may be beneficial to have this bottom surface be substantially flat. Any of the cartridges described herein may be configured apply tension to the sheet of dielectric material. For example, any of these cartridges may include a frame to hold the dielectric material in tension. Thus the cartridge may include a tensioning frame holding the bottom sheet of the cartridge.

The dielectric and/or hydrophobic film tensioning design may pretension a sheet (e.g., a dielectric and/or hydrophobic film) such that the surface of the sheet is planar throughout, and remains planar during its interface with the apparatus seating surface (e.g., the PCB) and during use of the DMF apparatus. The goal of the tensioning frame holding the film (e.g., A dielectric and/or hydrophobic) in the cartridge is to interface with the seating surface (e.g., of the PCB interface) to ensure that the film remains in complete contact with the electrode grid (e.g., driving electrodes) throughout use of the apparatus.

In any of the cartridges described herein, the bottom of the cartridge may include a sheet of dielectric material having a first side and a second side, the first side forming an exposed bottom surface on the bottom of the cartridge, as described above. Any of the cartridges described herein may include a tensioning frame to hold the sheet flat by applying tension. The sheet, while exposed as the bottom of the cartridge, may be slightly recessed compared to the outer perimeter of the cartridge bottom, which may fit into a lip or recess on the apparatus, as will be described in further detail below. Thus, the sheet of dielectric material at the bottom of the cartridge need not be the bottommost surface.

For example, FIGS. 49A-51 illustrate one example of a cartridge assembly that includes a frame to stretch/smooth the bottom (e.g., dielectric sheet) of the cartridge. FIGS. 49A-49D illustrate one example of a tensioning frame. In this example, the cartridge body features a two-part film tensioning mechanism. The two parts, shown in FIGS. 49A-49B (and assembled views in 49C-49D), may include a tensioning frame 4901 and a dielectric and/or hydrophobic film frame 4903. When assembled, the film forming the bottom of the cartridge may be adhered to the dielectric and/or hydrophobic film frame 4903. The film and film frame 4903 assembly may be inserted into a groove in the tensioning frame 4911 employing a connector (e.g., a snap-fit mechanism). Upon snapping into the tensioning frame, the film may be pulled taught in all directions in an X-Y plane. This frame assembly may then be fastened into the cartridge body. The assembled frame may include lower profile (e.g., cut-out) region 4909 that may provide access to electrically connect the return electrode on the upper plate, bypassing the film on the cartridge bottom surface.

One example of a cartridge including a frame for holding the bottom membrane flat is shown in the exploded view of FIG. 50A. In FIG. 50A, the individual components in the cartridge and film tensioning assembly are shown. This figure also outlines their arrangement during assembly. The first two components to assemble may include, e.g., an optically clear double-sided adhesive 5002, and a sheet of dielectric material 5003 (e.g., coated on conductive material). The frame (e.g., tensioning frame 5004) and the sheet including a dielectric material 5005 may also be included, and the film secured in place by a second portion of the film frame 5006. The air gap 5009 maybe formed between the film 5005 and the bottom surface 5003 of the top piece (which may include the return electrode(s)).

FIG. 50B depicts the individual components in the cartridge and film tensioning assembly after assembling the optically clear double-sided adhesive and the dielectric and/or hydrophobic material coated on conductive material. Conductive material can be any conductive material such as ITO, aluminum film, copper and others.

The film/cartridge and PCB interface may include a film tensioning frame as described above and a groove drilled out (trough) of the top surface of the PCB may form a boundary around the electrode grid of the apparatus. FIG. 51 shows an isometric, exploded view of an example of an assembly of a cartridge, including a film 5120 and film tensioning frame (outer frame 5121 and inner frame 5123), and an upper (top) portion of the cartridge 5109; FIG. 51 also shows a portion of an apparatus, including a PCB 5111 forming a seating surface for the cartridge. The seating surface also includes a trough 5105 to accept the lip around the bottom film of the cartridge (in this example, formed by the tensioning frame 5103). The trough may be a groove that is drilled out around the perimeter of the electrode grid. As the assembly arrangement in this embodiment shows, the film tensioning frame 5103 may slot into this trough 5105 around the electrode grid. Once assembled, the film tensioning frame 5103 may tension the film in X and Y, but also pulled downward in the Z direction at the edges of the film. The film may wrap over filleted edges of the trough, just slightly outside the boundaries of the electrode grid (not shown).

FIGS. 52A and 52B show top and cross-section views, respectively, of one example of a cartridge, including a bottom dielectric (and hydrophobic or hydrophobically coated) film, and film tensioning frames seated on a PCB assembly portion of an apparatus. The cross-section in FIG. 52B highlights how the dielectric and/or hydrophobic film may be pulled taught across the electrodes, and sealed down using the vacuum ports through at least some of the electrodes (drive electrodes) of the PCB, and also illustrates seating of an edge (extending proud of the film) in a trough formed in the PCB seating surface to seat the film. When fully assembled, these components may allow for a secure, fully tensioned, and planar dielectric (and/or hydrophobic) film to be secured to the driving electrode grid on the PCB. FIG. 53 is an exploded view showing individual components and their arrangement in assembly, including a cartridge upper body frame 5306, a dielectric film 5305 held in tension by a tensioning frame 5304, a PCB 5302 forming a seating surface on the apparatus, a groove or channel on the seating surface around the perimeter of the array of drive electrodes (driving electrodes) on the PCB, and a vacuum chuck 5301.

FIGS. 54A and 54B shows a top view of the assembly and a cross sectional view, respectively. The cross section view highlights the relationship of the vacuum chuck 5411 on the cartridge 5413 and film assembly, as well as on the PCB 5415. The section in FIG. 54B also highlights a few different effects of this system. The arrows 5405 depict the flow path for vacuum originating from a diaphragm vacuum pump 5407 on the outside of the chuck. This may be the same flow path as is described above in FIG. 35B. The arrows outline the downward force being applied to the film by the vacuum through the via holes in the PCB. The vacuum chuck and interface with the PCB securely adhere the film to the electrodes and apply downward force in Z. The film tensioning mechanism and PCB trough ensure the film remains planar by applying force in X and Y, while maintaining contact around the edges due to a fillet along the internal edge of the trough.

One-Plate Cartridge.

In some embodiments, one or more one-plate cartridges may be used in the multiplex system. In this case, a one-plate cartridge includes a single plate and may be open to the air above the single (e.g., first) plate; the "air gap" may correspond to the region above the plate in which one or more droplet may travel while on the single plate. The ground electrode(s) may be positioned adjacent to (e.g., next to) each actuation electrode, e.g., in, on, or below the single plate. The plate may be coated with the hydrophobic layer (and an additional dielectric layer may be positioned between the hydrophobic layer and the dielectric layer, or the same layer may be both dielectric and hydrophobic).

The one-plate cartridge may be prepared similarly to the two-plate cartridges described herein, without the variety of layers that enclose and form the second plate of a two-plate cartridge of any of FIGS. 49-51. Similarly, tensioned frames and bottom plates may be prepared using the same methods, to provide sufficiently rigid one-plate cartridges. One-plate cartridges offer advantages in providing full access to both droplet dispensing/withdrawal and optical imaging/activation from above the open air-gap. The one-plate cartridge may have any suitable feature described above for the two-plated cartridges in any combination. In some embodiments, the bottom of the one-plate cartridge may be optically permeable or transparent to permit imaging/photoactivation from below.

In any of the apparatuses described herein, the cartridge material of either a two-plate or a one-plate cartridge may allow for dimensional accuracy, hydrophobicity of channel surfaces, & bio-compatibility. As mentioned above, the use of one or more thermal windows above a region of a thermally controlled zone may be useful. Typically, the reduction of material in thermal heating zone may decrease thermal mass and increase PCR ramp rates, when the system is used to perform PCR on the apparatus.

Apparatus Features

In general, any of the apparatuses described herein may include a PCB portion, that may include the electrode array, active thermal control (e.g., heater, cooling, etc.), magnetic field applicator(s), etc., and a chuck (e.g., vacuum chuck) that may be mounted to the PCB. This portion of the apparatus may form the seating surface for the bottom of the cartridge, so that it may sit on the apparatus securely and in a predetermined orientation. For example, the cartridge may be keyed to fit onto the seating surface in a predetermined manner (e.g., by including one or more orientation slots, pins, etc.). The apparatus may also include one or more control units, including one or more processors, which may control the activity of the apparatus and may be configured to drive droplets and analyze information from the cartridge. The controller may also include memory, one or more datastores.

The seating surface of the apparatus may be configured both to seat a cartridge, but also to prevent arcing, sparking or shorting between the plurality of electrodes on the seating surface. For example, the seating surface may coated with an additional dielectric (onto which the dielectric bottom surface of the cartridge may sit) such as paralyene and/or alternative or additional materials. The dielectric bottom surface may prevent arcing between the electrodes in the array or electrodes (driving electrodes) on the seating surface. The spacing between the driving electrodes may be between about 50-120 micrometers. This close packing between electrodes on the otherwise flat surface may otherwise be susceptible to arcing/shorting between electrodes, thus the use of an outer dielectric coating (in addition to the dielectric layer of the cartridge) may limit sparking/arcing between electrodes.

As discussed and described above, some or all of the electrodes may include an opening through them which may be connected to a vacuum source for seating the electrodes onto the device. For example, in some variation every electrode in the array includes an opening therethrough; in other variations every other electrode may include an opening (e.g., alternating). In some variations every third electrode, every fourth electrode, etc. In some variations only corner electrodes may include an opening.

Droplet Detection

Any of the apparatuses described herein may include droplet detection. As described above, droplet detection may be performed based on the capacitance of the electrode(s) in the array of driving electrodes by monitoring the current through the electrode(s). Also described herein are apparatuses (e.g., systems or devices, including apparatuses) in which droplet detection is based on a capacitance measurement by creating a capacitor divider. In this example, the top plate may form a reference frame (e.g., reference electrode, such as an ITO electrode) and may be usually driven between 0 and 300 V to create the AC signal; during droplet detection the reference electrode (top electrode) may be disconnected from the driving signal and its voltage sensed by the controller (e.g., microprocessor), referred to in FIGS. 33A and 33B as "ITO sense" as it may act as a sensing electrode, and may be electrically coupled to one or more reference capacitors. One or a group of electrodes may be activated at a higher known voltage (e.g., 300V DC), while all other electrodes are grounded. This creates the divider as shown in FIG. 33A. FIG. 33A shows an ITO sensing circuit with a switch to toggle between sensing (e.g., capacitive sensing from the reference/top plate) and driving, e.g., to move one or more droplets.

In FIG. 33A, the voltage at the ITO sense node (the ITO sense electrode) is driven by the ratio of $C\_A$ to the total capacitance ($C\_A+C\_B$). The capacitance of $C\_A$ changes based on the material permittivity in between the plates of the capacitor (electrode to ITO). The capacitance of $C\_B$ also changes relative to what is present between the ITO and the remaining electrodes. Air, wax, water and reagents have different permittivity, and thus changing the capacitance and the voltage at ITO sense. This enables this droplet detection method to not only detect droplets (e.g., the presence/absence of a droplet) but also to differentiate between droplets and identify specific reagents within the electrode grid.

Due to the variability of base capacitance, two calibration capacitors may be included (e.g., in FIG. 33B, C_REF and C_REF_LARGE). FIG. 33B illustrates another example of a capacitive sensing circuit that includes multiple reference capacitors. By driving all electrodes (e.g., all of the drive electrodes) to 300V, the total capacitance C_Total can be calculated by using the reference capacitors. The reference capacitance can be increased if there is a large enough C_Total to saturate the voltage at ITO SENSE. The conditioning circuitry for the ITO SENSE may isolate the voltage from minor leakage currents.

FIG. 34A shows exemplary values for capacitance that may indicate the presence or absence (and/or identity of the material) of a droplet in one or more cells within the air gap. As discussed above, a 'cell' in the air gap may correspond to the region above a driving electrode when the cartridge including the air gap is placed into the DMF apparatus, which may have the array of drive electrodes on the cartridge seating region. In FIG. 34A, the "ITO" corresponds to the upper (e.g., return) electrode on the upper plate of the cartridge. In this example, C18, C21, C24, C27, C30 are the reference capacitor (e.g., 11.9 pF in this case) and C16, C19, C1, C25, C28 is the capacitance measured as described above, corresponding to the capacitance when different drive electrodes are measured (e.g., set to the high voltage, while grounding the other drive electrodes), either with or without a droplet. Water, wax and air (no droplet) have very different capacitances that can be used to identify the presence or absence of a droplet (e.g., capacitance greater than or equal to 0.09 pF, greater than or equal to 0.1 pF, etc.). In this example, a capacitance above this threshold (e.g., above 0.06 pF, 0.07 pF, 0.08 pF, 0.09 pF, 0.1 pF, 0.11 pF, etc.) indicates that the presence of a material in the air gap above the examined (set to high voltage, e.g., 300 V). Further, the range of the measured capacitance above this threshold may indicate the composition of the droplet, e.g., aqueous (water) and/or wax/oil. For example, a capacitance of greater than about 3 pF (e.g., 3 pF, 3.1 pF, 3.2 pF, 3.3 pF, 3.4 pF, 3.5 pF, etc.) may indicate that the droplet is aqueous, while a capacitance of between about 0.09 pF to about 3 pF may indicate that the droplet is wax or oil (e.g., between about 0.07 pF and about 3.3 pF, between about 0.09 pF and about 3.0 pF, etc.).

FIG. 34B is a graph showing example of measured voltages using this technique, based, showing the differences between different voltages measured with various droplets (water, wax) versus with no droplet (air) over a single test cell. In FIG. 34, the voltage detected when an aqueous droplet is present is about 3.3V, compared to 0.085V when there is no droplet present and 0.176V when wax is present. The measurement for wax is double that of air (no droplet/material), and water is much higher; in this example the circuit caps the value at 3.3V. Different materials can be detected by their differing permittivities. The permittivity of water may also be a function of temperature. Thus, in some variations, the capacitance may change as a function of temperature when a droplet is present. This property may be further used to identify water, and may also be used to estimate temperature. Thus, in some variations the capacitance measurement of the droplet may be used to estimate their temperature as well. For example, FIG. 34C is a graph showing the static relative permittivity of water, showing a change in relative permittivity with change in temperature (between 0-300 degrees C.).

Chuck Design

Any of the apparatuses described herein, e.g., the apparatuses, may include a chuck (e.g., a vacuum chuck) that may form part of the seating surface, as mentioned above. The vacuum chuck may be attached to the electrode array (e.g., the drive electrodes that may be part of a printed circuit board) and may also be integrated with a magnet and/or heat dissipation features. Any of these elements or portions of these elements may be include or omitted, and may be used in any combination.

The vacuum chuck design may help ensure a reliable and effective vacuum adheres the bottom of the cartridge (e.g., in some variations a Dielectric and/or hydrophobic forming the dielectric layer) to the electrode grid. The vacuum may be applied through one or more (e.g., a manifold) of vias (e.g., copper vias).

In addition, any of the apparatuses described herein may include a magnet that is integrated into the base, including the chuck and/or the seating surface. The integrated magnet(s) may be configured to allow an actuatable magnet to engage with material in the cartridge (e.g., magnetic beads in the liquid droplets in the air gap) through the vacuum chuck. The magnet(s) may rest slightly below the PCB forming the seating surface of the apparatus, without impacting the vacuum performance or function.

Any of the reads described herein may also or alternatively include one or more thermal regulators, including one or more heat dissipation elements that may quickly and accurately dissipate heat from the heater(s) in the apparatus that control the temperature of one or more cells in the cartridge when it is seated and retained on the seating surface of the apparatus. For example, described herein are two designs for heat dissipation elements that may be used separately or tighter. One exemplary thermal dissipation designs is configured to dissipate heat from a thermoelectric heater and another design is configured to dissipate heat from an embedded heater.

FIGS. 35A-48 illustrate a vacuum chuck portion of the apparatus that may be used with any of the apparatus apparatuses described herein. In general, the vacuum chuck may be configured such that negative pressure is applied through the chuck (e.g., from a vacuum pump), and is directed underneath the seating surface (e.g., the PCB forming part of the seating surface) in an area that is pneumatically isolated, e.g., by an O-ring. The seating surface may have via holes (e.g., in the PCB) that allow for the negative pressure to act directly on the bottom of the cartridge (e.g., a dielectric and/or hydrophobic film) that is seated on the topside of the seating surface (e.g., the PCB forming the seating surface), pulling the cartridge bottom down in the Z direction, and adhering it onto the electrode grid.

The vacuum chuck may include one or more of: a vacuum channel with ports on either end, a groove for an O-ring, threaded holes to attach the PCB, and a recess under the electrode grid. For example, FIG. 35A is a top view and FIG. 35B is a cross sectional view of one example of a vacuum chuck 3500. Section A-A highlights the vacuum channel and its accompanying ports. The pneumatic flow 3505 follows the path of the arrows shown in FIG. 35B: first pulling through at least one inlet port, then flowing through the channel 3507, and finally flowing out of the side port 3509. A portion of the chuck (over which the seating surface formed by the PCB will be placed) is surrounded by an O-ring 3503.

For example, FIG. 36 shows an isometric view of the chuck shown in FIGS. 35A-35B. The groove 3509 (that may be designed using, e.g., a Parker O-Ring design standard) is configured to fit an O-ring. Once in place, and with the chuck fastened to the PCB, the O-ring may pneumatically isolate the vacuum directly under the electrode grid. The seating surface may be formed by securing a PCB having the electrodes (not shown) to the chuck. For example, as shown in FIG. 37, the chuck may include multiple threaded holes 3701 for attaching the seating surface (e.g., PCB). FIG. 37 shows a top view of a chuck similar to the one shown in FIGS. 35A-35B. In some variations the chuck includes a minimum of four threaded holes (eight shown in FIG. 37), each equidistant apart in at least the X or Y directions, and centered about the origin of the chuck. The screw holes may serve a dual-purpose: first to fasten the PCB to the chuck such that the interface of the two components is planar, second to apply a downward force in the Z direction about the perimeter of the O-ring, effectively creating a pneumatic seal.

FIG. 38A shows a top view of a chuck similar to the one shown in FIGS. 35A-35B and FIG. 38B shows a cross sectional and zoomed-in view of this chuck. FIG. 35B shows an enlarged image of section A-A, showing the boundaries of the recess 3801, 3803 (along the X axis) that may create space between the PCB and the surface of the chuck, but only in the isolated area where the vacuum is active. This space may optimize the pneumatic flow of the vacuum as described in the herein. In FIG. 38, an opening 3805 for a magnet is present on the upper region and may include sufficient space for the magnet to be moved to/from the cartridge (e.g., by moving up/down within the space, or in some variations laterally). The region around the magnet opening may include a gasket or sealing ring (e.g., O-ring) 3809 for isolating the magnet region from the vacuum region, similar to the outer O-ring.

As mentioned, any of the apparatuses described herein may include an integrated magnet. In FIGS. 35A-39, a recessed region 3905 may be used to hold an integrated magnet that may be moved up/down by the system to engage/disengage a magnetic field. Alternatively in some variations the magnet may be stationary, but may be toggled (on/off, and/or changing the intensity) by the apparatus's controller.

Thus, the vacuum chuck may include an integrated magnet and may therefore include one or both of: a cut-out that allows a magnet to travel through the chuck, and second an O-ring groove that isolates the magnet zone from the pneumatic flow of the vacuum. FIG. 39 shows a bottom view of a chuck similar to that shown in FIGS. 35A-35B. A through-cut region 3905 is shown, and can be sized to fit the desired magnet, and allows for uninterrupted travel of an actuatable magnet. A magnet can pass through the cut-out, landing directly below the PCB when engaged, or can be disengaged through the cut-out when not in use.

FIG. 40 shows an isometric view of a chuck similar to that shown in FIG. 35A. A groove 4001 may fit an O-ring. Once in place, and with the chuck fastened to the PCB, the O-ring may pneumatically isolate the magnet cut-out zone from the rest of the vacuum chuck, specifically ensuring the vacuum is not compromised by the magnet cut-out.

FIGS. 41A and 41B illustrate top and side sectional views, respectively, of a chuck similar to that shown in FIGS. 35A and 35B, but including a gap 4115 for thermally accessing a heating component, such as a heater (e.g., resistive heater) 4105. The heater 4105 is shown above the cavity 4115 in the chuck so that it may be easily thermally regulated (e.g., cooled). The resistive heater may be in the PCB (not shown in FIGS. 41A and 41B).

For example, FIG. 41A shows one example of a heat dissipation system that may be included in any of the apparatuses described herein. This heat dissipation system may be built such that any thermal load created by a heater 4105 in the apparatus (e.g., in the PCB) may be dissipated properly and effectively. A first heat dissipation configuration may be built to dissipate heat generated by a heater embedded in the PCB and is described below as a heat dissipation of an embedded heater. The second heat dissipation design may be built to dissipate heat generated by a thermoelectric cooler embedded in the vacuum chuck and describe below as Heat Dissipation of Thermoelectric cooler. Both heat dissipation designs may employ unique features in the vacuum chuck, as well as accompanying components to dissipate the heat. Both designs can be used together or in the assembly, or independently.

For example, the heat dissipation of the embedded heater in the vacuum chuck may be configured as a vented chamber. In FIG. 41A, the top view of the chuck shows the heat dissipation aspects of the chuck; FIG. 41B shows a pair of air channels 4101 that feed into a cooling chamber 4103 that may be part of or below (or otherwise connected to) the region where the heater is positioned. In FIG. 41B, the flow path of the multiple air elements (channels 4101, 4101') acting in this system are shown. The air drawn in 4101 may be warmed by the heat, including residual heat, from the heater in the PCB (e.g., seating region, not shown), and may flow over the through-cut 4115 region in the vacuum chuck, which may be covered or partially covered, or open to the heater in the PCB (or to one or more thermal vias in thermal communication with the heater). Section A-A (shown in FIG. 41B) shows a pneumatic flow of two air elements, warm air 4105 and ambient air when a fan, fastened flush against the chuck and centered about the through-cut 4115, is turned on. The fan (not shown) may push the warm air generated by the heater out of the through-cut of the vacuum chuck. Simultaneously, the fan may pull ambient air into the chuck and through-cut via two channels in the chuck 4101, 4101'. The system can continuously or intermittently cycle ambient air into and warm air out of the chuck, effectively dissipating any heat generated by the PCB heater.

Also described herein are systems for heat dissipation of an embedded heater. For example, the assembly shown in FIG. 42 may be configured to include both the chuck 4203 and a fan 4205. The pneumatic flow described in the previous above may be controlled by a fan 4205 fastened to the bottom of the chuck 42031. FIG. 42 shows a front view of the chuck 4203 and the fan 4205. The first arrow 4221 points to the vacuum chuck (top structure) and the second set of arrows 4201, 4201' depict the airflow path. FIG. 43 shows an example of an arrangement of the chuck 4303, a fan 4307, a PCB 4305 forming a seating surface (e.g., including the array of electrodes, not shown) and a cartridge 4311. The cartridge may be held down by the vacuum through the openings (e.g., in some of the electrodes).

FIG. 44 shows an example of a heat dissipation system for regulating the temperature of a thermoelectric cooler through a vacuum chuck. In FIG. 45, an isometric view of a chuck (similar to that shown in FIG. 35A) is shown in FIG. 45B. The chuck shown includes a recess 4509 designed such that a thermoelectric cooler (TEC) can slot into it.

FIGS. 45A-45B show top and sectional views, respectively, of a chuck similar to that shown in FIG. 35A. The section (though A-A) shown in FIG. 45B highlights the thermal path of the heat generated by a thermoelectric cooling element 4525. The rectangle 4525 represents the TEC, and the arrows within the chuck depict the heat spreading throughout the chuck. The apparatus may include one or more heat sink of a desired size that may be fastened to the bottom of the chuck and below the TEC, and then absorbs the heat. Lastly, two fans, fastened to either side of the heat sink (shown in FIG. 46), may act in unison to push the hot air away from the entire system and funnel ambient air into the system.

FIGS. 47A-47C illustrate assembly of one or more devices configured for heat dissipation of a thermoelectric cooler. For example, FIG. 46 shows the front view of a chuck. The arrows 4613 in FIG. 46 directed downwards show a thermal path of the heat in the chuck as described in FIG. 45. The arrows 4611, 4611' depict the flow path of air being pushed into the heatsink by a fan as well as the path of air being pulled out of the heatsink by a fan. The fans act in the same direction, simultaneously. FIGS. 47A-47C show an assembly process as well as multiple components that may be included in this apparatus and method of using it. For example, FIG. 47A shows a chuck 4701, FIG. 47B shows a chuck 4701 plus a heatsink 4703, and FIG. 47C shows the chuck 4701, plus the heatsink 4703, plus two fans 4709, 4709'. FIG. 48 depicts an exploded view of a partial arrangement of an apparatus assembly, including the assembly in FIG. 47 (e.g., chuck 4801, heat sink 4803, fans 4809, 4809') as well as the PCB 4807 including the driving electrodes and a heater (not visible); in addition a cartridge 4811 is attached via vacuum to the seating surface of the PCB.

Figure 56A:
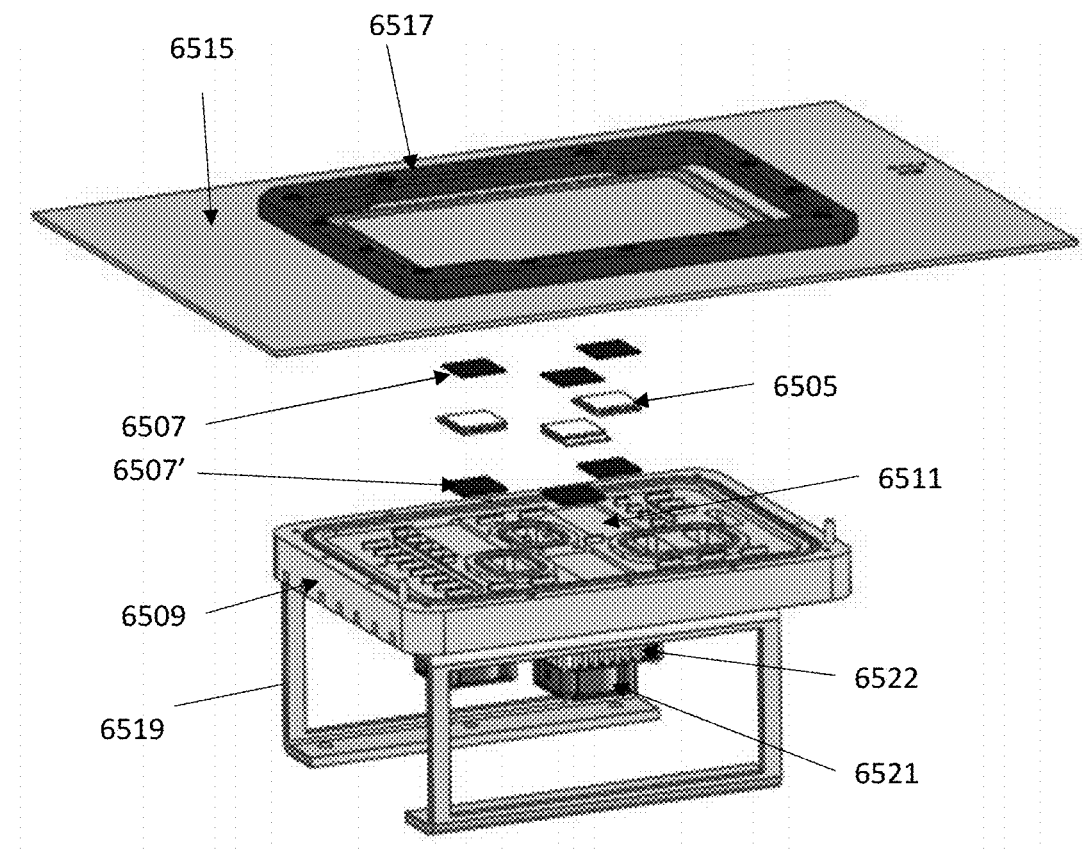
Figure 56B:
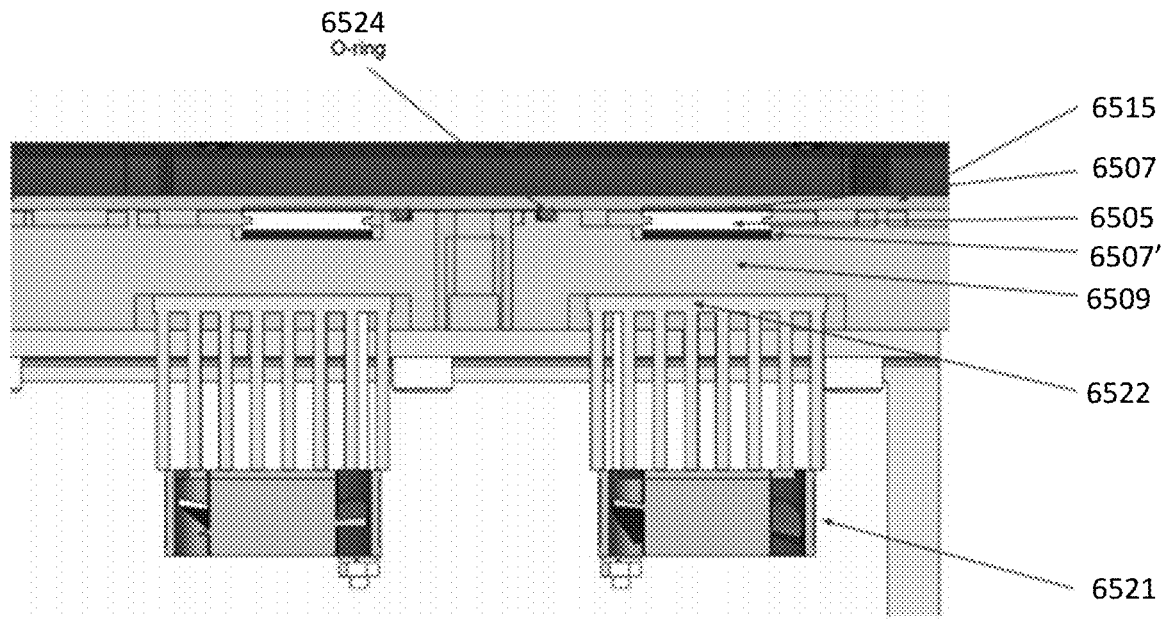

FIGS. 60A-60D illustrate another example of a vacuum chuck that may be used with any of the apparatuses described herein, e.g., beneath and coupled with the electrode board, as illustrated above. In FIG. 60A, the upper surface of the vacuum chuck is shown and includes an O-ring 6035 channel for holding an O-ring 5624 surrounding (sealing) the chuck the board (as shown in FIG. 56B. The chuck includes one or more vacuum holes 6009, and placement sits for TECs 6054, as well as magnet pass-through regions 6068. The chuck shown in FIG. 60A also includes a plurality of alignment pins 6071. FIG. 60B shows the bottom of the chuck of FIG. 60A, and includes a vacuum pump connection 6074, heatsink connection location 6088 and magnet pass-through 6068'.

Action Zones

Any of the apparatuses described herein may include one or more action zones that strategically position the different possible actions that a droplet can be subjected to for protocol execution. The goal of the plexing strategy is to adapt to different laboratory requirements in a more flexible, modular way. Different stages of the protocol to be executed may be grouped strategically into action zones to allow the protocol designer define abstract targets on the board. The action zones may be fixed regions under or over the electrode board used for reactions (i.e. mixing, merging, heating, cooling, thermocycling, magnet capture, waste, optical detection, etc.).

FIG. 55A shows an example of an electrode grid setup with independent action zones for either magnetic capture 5501 (three magnetic control zones, which may be used as mixing chambers, are shown), a heater (five heating zones 5503 are shown) which can be isothermal or thermocycler, a Peltier 5505 which is an active cooling zone down to 4° C. and may also heat, and a waste connection to the top plate through a channel and into a waste chamber (three waste zones 5507 are shown, which may connect to separate or the same waste chambers). The cartridge setup may also include a mixing connection to the top plate through a channel (e.g., one or more of the waste regions/zones 5507 may be used for mixing, as described herein) and one or more optical detection regions 5511. Thus, FIG. 55A shows an electrode grid with distinct action zones. These zones may be determined by the cartridge and the apparatus. For example, the cartridge may determine the waste zones, and the unit cells corresponding to the heating and/or cooling (e.g., thermal control), optics, and magnet(s) may correspond to regions of the apparatus, as described above.

FIG. 55B illustrates another example of a system (cartridge and apparatus) having a variety of action zones that are defined by either or both the cartridge and the apparatus. In FIG. 55B, the system includes 912 driving electrodes, corresponding to the 912 (0-911, e.g., a 38×24 grid) unit cells. Some of these cells within the air-gap of the cartridge may be action zones for loading, mixing, rinsing, imaging, etc. In general, these systems may include one or more loading inlets 5551 (in FIG. 55A, 10 loading inlets are shown, each corresponding to a single driving electrode unit cell; more than one unit cell may be used). Three thermocycling zones 5553 are shown in this example. One or more pinning features (e.g., protrusions, walls, barriers, etc.) may extend at least partially in to the air gap to pin or hold a droplet, and particularly the outer hydrophobic (e.g., liquid wax) material to maintain the position and droplet. In FIG. 55B, 10 pinning fixtures 5555 are shown. These pinning features may be a barrier (e.g., a fence, wall, stop, etc.). In general, the pinning features may be formed of a hydrophobic, oleophilic, hydrophilic, etc., material that may hold the coating material (e.g., the hydrophobic, liquid wax material) at least partially surrounding an encapsulated (e.g., coated) reaction droplet. The barrier may form a chamber that is open on one or more sides, as shown in FIG. 55B in which two or four pinning fixtures are used at the corners of the three thermocycling zones 5553. The barrier may extend from the top to the bottom of the air gap, or partially into the air gap. For example, the barrier may be formed of a material including a wax (e.g. paraffin) such a polymeric material mixed with a paraffin. In FIG. 55B, the pinning features are shown as PTFE posts that may be inserted into the main cartridge body (e.g., the top plate) and are hydrophobic but oleophilic and thus attracting the paraffin wax when a droplet is within the thermocycling zone, which may keep the droplet centered to the thermocycler zone when in use. In some variations, the pinning feature may be formed of a material such as an acrylic, polycarbonate, Parafilm®, DuraSeal™, high melting temperature fluorowaxes/solid ski waxes, etc. The pinning feature may be formed as part of the top or bottom plate and/or may connect to both. In use, the barrier may pin the wax droplet around the reaction droplet. For example, a wax droplet may surround the aqueous reaction droplet 1501 and be held within the open chamber in the air gap formed by the barrier.

The systems described herein may also include one or more waste zones 5557 (in FIG. 55B, two zones are shown) that may be connected to a vacuum region for drawing, by suction, all or part of a droplet from the air gap. In FIG. 55B, one of the waste zones is a lower capacity (e.g., 1 mL) waste zone 5559 and the other may be higher capacity (e.g., 2 mL, 3 mL, 5 mL, etc.) waste zone 5557.

Any of the systems described herein may also include one or more magnetic regions 5563. In FIG. 55A, the system includes four magnetic unit cells distributed in the air gap, in some cases, overlapping with other regions, such as thermal control and/or isothermal regions. Generally, any of the zones described herein may overlap (e.g., magnetic, thermally regulated inlets, mixing channels, waste channels, etc. may overlap with each other).

The system may also include one or more isothermal regions 5561 (in FIG. 55B, a single isothermal region is shown, having 16 unit cells, 4×4, in which two of these unit cells are configured as magnetic control 5563 and waste 5557 zones.

Any of these systems may also include one or more mixing channels 5565. Four mixing channels are shown in the example of FIG. 55B. This example also shows a plurality of reservoir outlet holes 5569, from which fluid held in the cartridge's one or more reservoirs may be added to the air gap. Any of these systems may also include one or more recovery holes 5571 (one is shown in FIG. 55B). In general, the cartridge may include a smaller region than the number of possible active electrodes. For example, in FIG. 55B, the working region includes 912 active unit cells, as mentioned above, however they are surrounded by non-working (inactive) unit cells/electrodes 6673 that may be part of the apparatus. In FIG. 55B, approximate dimensions (e.g., 3.17 by 4.75 inches) of the cartridge base portion (forming the air gap dimensions) are shown, as examples only. As in any of the figures shown herein, these dimensions may be approximate only, and may be +/−1%, 5%, 10%, 15%, 20%, 25%, 30%, 40%, 50%, 75%, 100%, etc.

Thermal subsystems. Thermal subsystem may be like any described herein. FIGS. 56A-56B illustrate another example of a portion of the thermal subsystem, similar to that described above in FIGS. 42, 43, 46 and 47, above. In FIG. 56A, the thermal subsystem includes one or more TECs 5605 that may be sandwiched between a pair of thermal conductors (graphite pads 5607, 5607') and secured on the vacuum chuck 5609 in TEC slots 5611. The chuck may then be positioned beneath the electrode board 5615 that underlies the cartridge seat (including cartridge rim 5617, which is keyed to accept the cartridge and may seal with the clamp frame as described above). The chuck may be coupled to a frame 5619 within the housing (e.g., a housing frame), and may be positioned beneath one or more fans 5621 and one or more heat sinks 5622, as shown. FIG. 56B shows a cross-section through a side view of the thermal subsystem shown in FIG. 56A. The PCB of the electrode board 5615 is placed on top of the chuck 6509 holding the TECs. The chuck may be thermally conductive (e.g., formed of a thermally conductive metal and/or polymer) and one or more heat sinks 5622 and cooling fans 5621 may underlie each of the TECs.

Figure 56C:
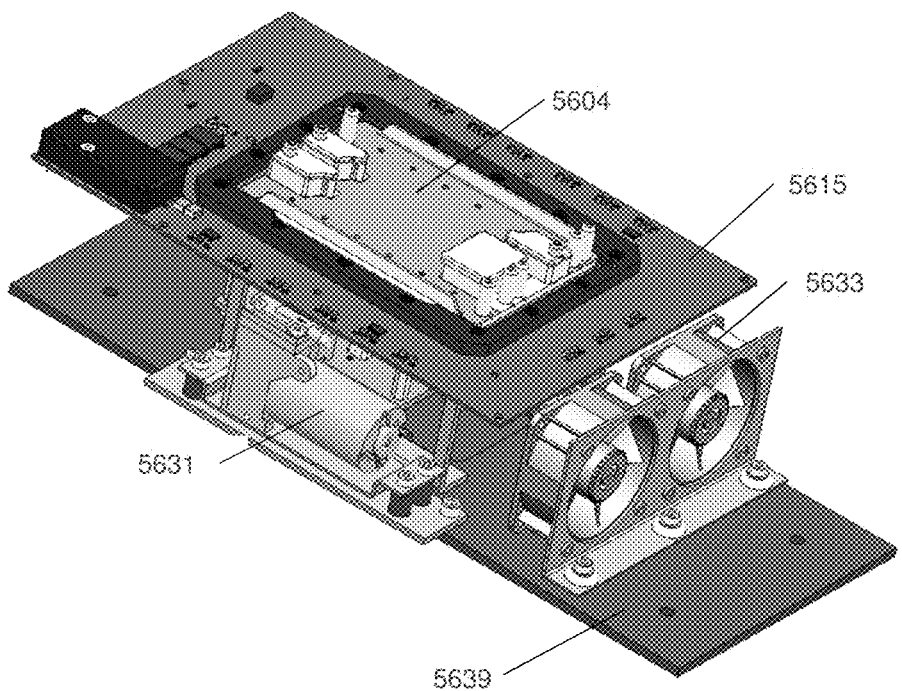
Figure 56D:
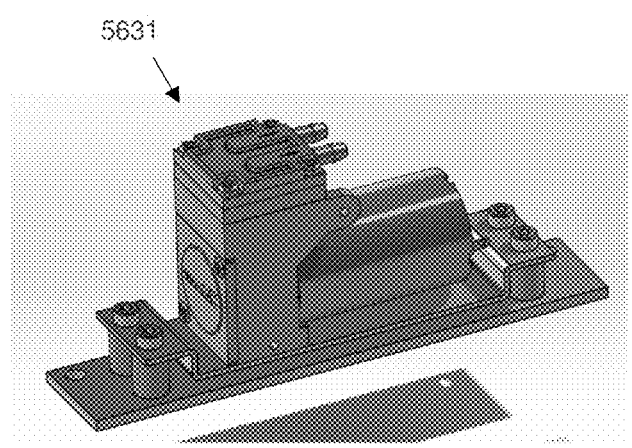

FIG. 56C shows a top perspective view of a portion of the apparatus including the thermal subsystem. In FIG. 56C the cartridge 5604 is shown housed within the cartridge seat on the electrode board 5615. A pump 5631 and additional front cooling fans 5633 (fan assembly) are mounted within the housing as part of the thermal control subsystem. The fan assembly, pump and housing frame are all mounted on a base plate 5639, which may be part of the housing or coupled to the housing. FIG. 56D shows an enlarged view of the pump 5631.

As mentioned above, any of the thermal control subsystems described herein may also include one or more resistive heater traces, drive circuitry and thermal protection (e.g., insulation); the resistive heater(s) may provide isothermal heating up to about 75 degrees C. in an action zone, as described above in reference to FIG. 55B (and may also include a magnet).

A resistive heater may include active cooling or passive (e.g., air) cooling, and the resistive heater may be in the electrode board, integral to, e.g., a second layer side.

The TEC thermal transfer regions may include the TEC, drive circuitry and protection (e.g., insulation), and may be configured to transfer energy from a TEC to the EWOD, including thermocycling with temperatures between about 4 degrees C. and 98 degrees C. Any of the apparatuses described herein may also include custom TECs and mountings, which may be used to provide a robust TEC that achieves ramp rates of up to 10 degrees C./sec and may have a high degree of temperature measurement accuracy.

In any of the apparatuses described herein, the TEC may be a high power thermocycling TEC (e.g., 30 W) soldered to the bottom of the electrode board directly. In some variations, the ramp rate may be 3 degrees C./sec or higher, and can be controlled by controlling the current applied to the TEC. For some variations of a control system, a closed feedback loop system may be used both in ramp rate and steady state with precision temperature control to at least 0.5 degrees C. accuracy. For example, the heaters (and ramp rates) may be configured to be in a 4×4 electrode grid array (heater zone), fitting approximately 200 µl droplets per heater zone.

Magnetic subsystems. A magnet control system (magnet control) may be included within the housing, and may coordinate (via the controller) one or more magnets to apply a local magnetic field to one or more zones of the cartridge. This is described briefly above in relation to FIGS. 38A, 39, 40, and 41A-41B, 57A-B. FIGS. 57A-57B also illustrate example of magnetic subsystems that may be included as part of an apparatus to apply and/or remove a local magnetic field to a region (zone) of a cartridge. For example, in FIG. 57A, the cartridge 5705 is seated in a cartridge seat in communication with the array of drive electrodes (on the electrode board 5715), beneath the vacuum chuck 5709. In this example, a magnet is shown as a Haibach array of magnets 5722 (an arrangement of permanent magnets that augments the magnetic field on one side of the array while cancelling the field to near zero or near-zero on the other side), and a magnetic jacket 5726 around the lower-filed side of the array; the jacket may be connected to a post that includes a bias (e.g., spring) 5724. The magnet (e.g., jacket) on the post may also be connected to a motor (e.g., a stepper motor 5729) that can move the magnet up and down (e.g., in the z-axis, to/from the cartridge). A sensor, such as an optical sensor 5733 may determine the position of the magnet and this position may be used for feedback to help regulate the position of the magnet relative to the cartridge. For example, a flag 5737 or marker may be coupled to the magnet (e.g., through the post or jacket) and may be tracked by an optical sensor. The magnet may also be limited in movement to prevent it from crashing into the cartridge; for example, a hard stop 5738 (lip, rim, etc.) may be connected to the jacket or post to engage with a corresponding limit (rim, edge, etc.) on the chuck. The bias may help return the magnet back to a retracted position, away from the cartridge. FIG. 57B illustrates an enlarged view of the magnet assembly show in FIG. 57A. In this example, the spring compliance of the magnet head has a tolerance of about 1.5 mm, and the motor resolution is about 18°/step for about 80 steps/mm. As mentioned, the Halbach magnet array focalizes the magnetic field and amplifies the magnetic flux (in this example, of three neodymium magnets) at one point that is approximately 3.0 mm in diameter (roughly the dimensions of one unit cell, e.g., one electrode) and may generate enough force to achieve successful captures of magnetic beads in the cartridge. The magnet array housing ("magnet jacket") may secure the Halbach magnet array. The magnet actuator (e.g., a captive linear actuator, or stepper motor)

may vertically actuate the magnet housings and magnet arrays to move it into both an engaged position and a disengaged position. The magnet assembly may also include an optical home sensor that detects the "home" position (e.g., disengaged position) of the stepper motor.

Electrode array. The apparatuses described herein generally include an electrode subsystem including the array of drive electrodes and the return electrode connection, as well as the control circuitry for controlling actuation of the EWOD to move droplets on the device. FIG. 58A is an example of the top of an electrode subsystem that may be included in an apparatus as described. In FIG. 58A, the electrode subsystem includes an electrode array 5805 (as mentioned, above, all or some, of the electrodes in the array, e.g., the peripheral rows of electrodes, may include a vacuum opening formed through the electrode), and one or more return (e.g., ground) contacts 5807 for connecting to the return electrode in the cartridge. The electrode array and return contacts may be mounted or formed on a circuit board (e.g., a PCB) 5801, which may be referred to as the electrode board. The electrode board may include a high voltage power supply 5809 for providing high voltage for the EWOD (e.g., the drive electrodes). The electrode board may also include the cartridge detection subsystem 5811 mentioned above, e.g., one or more sensors for detecting the presence of the cartridge in desired location, and/or the clamp detection subsystem 5815, including the one or more clamp latching sensors, and/or the lid detection subsystem, including one or more lid sensors for detecting when the lid has been closed.

The electrode board may also include an identification marker apparatus (e.g., optical apparatus, RFID apparatus) and/or a near-field communications apparatus (NFC apparatus) 5830 for reading an identifying marker from a cartridge seated in the apparatus. The electrode board may also include the high-voltage regulating circuitry 5833, and/or high-voltage measurement resistor strings 5835, as well as decoupling capacitors 5841, which may prevent electrical shock. Any of these boards may also include the circuitry including one or more thermistor amplifiers, TEC interlocks and optionally and accelerometer 5844.

FIG. 58B shows the bottom side of the electrode board, including the TECs (TEC1, TEC2, TEC3) as described above, as well as the isothermal heater power supply, the TEC power supply, the high voltage power supply regulation circuitry, and circuitry for power supply conditioning, droplet detection, digital and analog isolation circuitry, solid state relays, thermistor amplifiers, TEC and heater protection logic, vibrational motor for vortexing (vibe motor) and one or more pressure sensors.

In general, the electrode board forming at least part of the electrode sub-assembly may include a parylene coating, as mentioned. The electrode board may also include the controller (e.g., one or more processors) of the control may be part of a separate board. The electrode board may also include the fan and/or vacuum pump drivers, for during the proper voltage to the fan and vacuum pump within the apparatus housing. As mentioned above, the electrode board may include the NFC electronics and/or antenna, for reading and writing to a NFC tag in the cartridge.

Vortexing on DMF. As mentioned above, and illustrated in FIG. 58B, any of the apparatuses described herein may include a mechanical vibration (e.g., vortexer), e.g., on the electrode board, configured to apply mechanical vibration to one or more regions of the DMF apparatus, including any sub-region or zone. The dynamics of vortexing liquids are key to implementing many standard molecular biology protocols steps including thorough mixing, dissolving compounds into solution, emulsion formation, cells and tissue dissociation and or disaggregation. Conventionally, many of these processes are carried using vortexer devices onto which small vials of liquid are placed on their base, pressed and in consequence vials rapidly oscillate in a circular motion creating a vortex inside the liquid. A standard vortexer can have variable speed control ranging from 100 to 3200 rpm.

The apparatuses described herein may mimic this process on DMF. Although the DMF chamber is stationary and circular motion cannot take place, the dynamics of vortices in droplets may be achieved by coupling a vibrational motor to the bottom of DMF PCB board. The vibrational motor speed may control ranges from 0 to 10,000 RPMs and a force of minimum 50 Newtons (11.24 lbf).

As shown in FIG. 59, vortexing on DMF can enable compartmentalized reactions which are useful in a wide range of protocols and applications such as single cell biology, single cell RNA-seq, droplet digital PCR, droplet barcode and single molecule sequencing, all of which may be performed in the systems described herein. For example, a mechanical vibrator motor (shown in FIG. 58B) may be mounted to the electrode board under or adjacent to the electrode array (drive electrode array). In FIG. 59, a schematic showing a vibration motor underlying the drive electrodes ("actuation electrodes") is shown, with a droplet held in an air gap formed between the upper (top plate) and lower (bottom plate); the bottom plate may be the dielectric film of the cartridge vacuum attached to the drive electrodes in the apparatus). Examples of different procedures using this vibration motor are shown. The vibration motor operates at, e.g., a voltage of 3 V DC, at a speed of approximately 14,000 RPM (and is approximately 6×14 mm). In FIG. 59, the vortex is applied through vibrational forces generated from digital microfluidic PCB board. On the left side, an emulsion formation by vortexing two droplets that merged using electrowetting forces to form a mixture of aqueous/oil is shown schematically. It is possible for hydrogel particles and sample solution or single cells to be contained in monodispersed oil emulsions upon vortexing on DMF. Using DMF, heterogeneous mixtures such as slurries and solid tissue blocks can be mobilized and manipulated in protocol steps. Tissue dissociation on DMF can be enabled mechanically through vortexing. Combining a set of DMF features can enhance the ability to dissociate otherwise difficult tissues through parallel on-chip vortexing (mechanical feature) and incubation with dissociative enzymes (enzymatic incubation at set temperatures) such as trypsin, papain, collagenase. Dissociation of tissues/organs/organisms on DMF can be followed by single cell partitioning by applying vortex forces to partition cells in emulsion as described above and the use of mixing/heating/cooling/magnetic actuation DMF features can allow to continue with downstream single cell protocol steps followed by library preparation steps to yield a sequence ready single cell library. Vortexing on DMF can help resuspend slurries or heterogeneous mixtures such as magnetic or paramagnetic bead particles in suspension after they sediment during prolonged storage/incubation steps.

Non-transitory computer readable instructions. Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

In order to better adapt to different user needs and laboratory space, independent single modules, each with its own power, environmental, internal computer and connection to console unit for user interface may be multiplexed together. Additionally, a console unit for user interface can be integrated to control the different modules as well as other laboratory required functions such as scan the sample ID as well as the cartridge ID and integrate that information to the local laboratory or sample management system. Connection to console unit can be wireless or by cable.

EXAMPLES

FIG. 69 schematically illustrates one example of a system 7300 that includes a DMF apparatus and an enclosure 7303, where the DMF apparatus is housed within housing 7308, where the apparatus includes cartridge seats 7302 upon a seating surface, a robotic arm 7305 and a liquid handling subsystem 7307, all of which is enclosed within enclosure 7303. The DMF apparatus further includes an electrode subsystem 7311, vacuum ports 7313, a thermal subsystem 7315, a magnet subsystem 7317, and an optional software subsystem 7319 for operation of any of the components. The system 7300 further includes a Master controller subsystem 7321 which may include software, firmware or the like that may be run remotely (e.g., desktop, laptop, mobile device, pad, etc.) for communication with, controlling, and/or creating, transmitting or modifying protocols and other operational parameters of the system, including the apparatus. The system further includes display 7323, which incorporates input subsystem 7325. In some variations, the system includes an optical subsystem 7327, which may include one or more illumination sources 7329 and an imaging device 7331. In methods 7301 performed with System 7300, one or more cartridges 7333, and one or more reagents 7335 may be used. The DMF apparatus may have any combination of features as described herein.

The apparatus may also include a controller (including one or more processors, circuitry, clock, power regulators, wireless communication circuitry, memory, etc.), controlling operation of the DMF and microfluidics on the cartridge. The controller may include a microcontroller, input interface (e.g., touchscreen, button, knob, etc.) circuitry, output interface (e.g., Ethernet, WiFi, etc.), etc. The controller may communicate with and coordinate any of: a vacuum subsystem, the electrode subsystem, the thermal control subsystem, the magnet control subsystem and/or a software subsystem 7319; any or all of these subsystems may communicate and/or be coordinated by the controller 7321.

For example, the vacuum subsystem may include a vacuum chuck, a vacuum pump, and one or more pressure sensors for detecting (and/or providing feedback to control the vacuum) pressure. The software subsystem may include software, hardware or firmware, such as a non-transitory computer-readable storage medium storing a set of instructions capable of being executed by the one or more processors of the controller to coordinate operation of the systems, including any of the subsystems. The thermal subsystem may include the TECs, heat sinks/fans, and one or more thermal sensors (including thermal sensors configured to monitor temperature of the cartridge, e.g., the air gap region and/or one or more thermal sensors configured to monitor the temperature of/within the housing, of the TECs, etc.). The magnetic subsystem may include, for example, one or more magnets (such as one or more Halbach array magnets), one or more actuators for all or some of the magnets and one or more position sensors for monitoring/detecting the position of a magnet (e.g., a home sensor).

The housing may be connected to, and/or may partially enclose one or more inputs and/or outputs, such as a display 7323 and input subsystem 7325. The display may be a touchscreen and/or one or more buttons, dials, etc.

An electrode subsystem may include the array of drive electrodes (e.g. an electrode array) underlying the cartridge seat, one or more high-voltage drivers, one or more TEC driver, a safety interlock, one or more resistive heaters, etc.

As mentioned above, any of these systems may be used with and/or may include one or more reagents. Reagents may generally include buffers (e.g., PBS, etc., including those with one or more anti-fouling agents) but may also include a jacketing material (such as, e.g., a liquid paraffin material or other hydrophobic material).

In general, the systems described herein may be configured to thermocycle in one or more regions (e.g., one or a plurality of separate or adjacent unit cells) between about 15-99 degrees C. (e.g., −/+0.5° C.). These systems may be configured to manipulate reagent volumes between about 10-350 microliters by EWOD (e.g., by DMF). As will be described in more detail below, these apparatuses may be customized, allowing a user to create, modify, save, load and transmit one or more protocols for operating the system (e.g. performing operations on the cartridge(s).

In the example system shown, the apparatus may include more than 900 independent electrodes (drive electrodes), and in some embodiments may have about 408, 912, 1824, 3648, 5472, or about 20,000 independent (drive electrodes) and may include one or more thermoelectric coolers (TECs) for better thermal control, uniformity and reduced footprint. In this example, the apparatus and cartridge forms 3, 4, 6, 8, 10, or more independent thermocycling zones (controlled by the TECs in the apparatus), and one or more isothermal zones (e.g., controlled by one or more resistive heater). The apparatus also includes a plurality of magnetic independently controlled zones.

Any of the apparatuses described herein may also include one or more vibration motors for mechanically vibrating all or some of the electrodes (e.g., in a vibration zone, which may be separate or overlapping, e.g., with a thermal control zone), as described herein.

The system may be used for running multiple library prep kits and workflows (e.g., Kapa HyperPrep PCR Free, Sure-Select XTHS Sample Prep, SureSelect XTHS Hyb+Capture, etc., including custom workflows).

The one or more cartridges may be any of the cartridges described herein, and may generally be configured for reagent loading and storage. The one or more cartridges may be chosen independently to be a single-plate cartridge or a two-plate cartridge. The one or more cartridges may include an air gap (e.g., EWOD chamber), may be configured to tension the bottom film (forming the bottom of the air gap), and may include a readable identification, including, but not limited to a near-field communication (NFC identification, e.g., chip, circuit, etc.). Other readable identification may include an RFID circuit, bar code, etc.

The housing may also enclose the thermal control elements, such as one or more TECs for heating/cooling and thermocycling specific zones of the air gap within the cartridge, as described. One or more resistive heaters may also be included. Within the housing cooling vents and/or fans may be included to regulate the temperature therein. The housing may also at least partially form the seating surface for the cartridge(s), as shown in the exemplary apparatus of FIGS. 70A-C. An electrode board, defining the array of drive electrodes, may be within the housing, under the cartridge seat.

Turning to FIGS. 70A-C, a portion of an exemplary 7400 system is shown. Seating surface 7401 is disposed on a portion of the housing of the DMF apparatus, and is within a chamber of the enclosure, a portion of the enclosing wall 7403 shown here. The seating surface includes a plurality of temperature controlled areas 7405 and a plurality of magnetic controlled areas 7407 distributed throughout the seating surface. A variety of cartridges may be seated, using alignment features 7409, and access both temperature controlled areas and magnetic controlled areas for each cartridge. The DMF apparatus of the system 7400 further includes a three axis liquid pipetting head including a robotic arm (not shown) and liquid handling tip(s) 7411. The liquid handling tip(s) 7411 may retrieve a droplet of a reagent from reagent container 7413 to be delivered to a cartridge. The liquid handling tip(s) 7411 may retrieve a product droplet from a cartridge seated upon the seating surface and deliver it to a wellplate container 7415 for further processing. The liquid handling tip(s) 7411 may further retrieve droplets of waste fluid from a cartridge seated upon the seating surface, and deliver it to a waste container 7417 for disposal. The area 7419 where the reagent container 7413 and wellplate container 7415 are disposed may be temperature controlled.

The seating surface for the one or more cartridges (70× 110 to 780×2050 mm, Width×Depth, array of electrodes) is positioned below the liquid pipetting head (4, 8 12 or 96 tips). The digital microfluidic platform may be integrated with thermoelectrics and resistive temperature detectors for precise control of temperatures (−20-100° C.), magnets for control of magnetic beads, alignment features (e.g., alignment pins, camera-based vision algorithms and radio-frequency identification) for cartridge positioning. The liquid handling robots includes multiple distinct components: a liquid handling head for dispensing reagent and sample volumes (1 microliter to 100 mL) onto DMF platform and for thorough mixing at the pipette tip-DMF interface; reagent and waste containers for storing reagents/samples and disposing of waste (i.e., used tips and cartridges), respectively; well plates (24, 48, 96 and 384); and temperature controlled area for storing reagents at precise temperatures (−20-100° C.) prior to use and after collecting the samples. Finally, both fluid manipulation paradigms may be enclosed by an enclosure providing precise humidity, temperature- and gas-control.

In FIG. 70B, the seating surface is shown, after a plurality of cartridges have been disposed upon the surface and immobilized selectively using vacuum ports of the DMF apparatus. As is shown, either one-plate or two-plate cartridges can function on the surface. Cartridge 7421 is an example of a one-plate cartridge and cartridge 7423 and cartridge 7425 are examples of two-plate cartridges. The cartridges may be of different sizes as shown by cartridges 7423, 7425. The cartridges may be disposed upon the seating surface without relying upon a pre-defined position. Any position which aligns with the alignment features 7409 and includes thermal control areas and magnetic control areas as desired may be used. The insert diagrams show schematics for droplet positioning within a one-plate cartridge and a two-plate cartridge. In both configurations, the droplets to be manipulated are isolated from the electrodes by a hydrophobic insulator. When an electrical potential is applied, charge accumulates on either side of the insulator, a phenomenon that can be exploited to make droplets move, merge, mix, split, and dispense.

In FIG. 70C, the seating surface of the system is shown after droplets have been dispensed by the three axis liquid pipetting head including a robotic arm (not shown) and liquid handling tip(s) 7411. In some of the cartridges, pre-spotted reagent spots are disposed at locations within the cartridge. The three axis liquid pipetting head including a robotic arm (not shown) and liquid handling tip(s) 7411 may dispense a droplet of a buffer to solubilize the pre-spotted reagent for use.

In FIG. 71, a schematic for control and sequencing of activities within the one or more cartridges upon the seating surface is shown. In some embodiments, the software architecture may be implemented as follows, but the invention is not so limited. One of skill can envision many different architectures and protocols encompassed by the teachings herein.

Architecture: high level overview. Each electrode board layout may have an individual Electrode board-SW (software commanding the electrode board). The multichannel pipette may be connected using the Multichannel Pipette-SW (software commanding a multichannel pipettor). The Electrode board-SW and Multichannel Pipette-SW may exchange messages in the form of request response such as: electrode board-SW send action to the multichannel pipette indicating layout, action (dispense, mix, pick up) and electrode layout; Multichannel Pipette-SW receives the response (e.g., Multichannel Pipette-SW process the instruction information to see if it's able to run it, Multichannel Pipette-SW check pre conditions to run, Multichannel Pipette-SW execute action, Multichannel Pipette-SW check post conditions, etc.). The Multichannel Pipette-SW may respond with confirmation. The Electrode board-SW may receive the action and response from Multichannel Pipette-SW.

Algorithm: high level overview. The algorithm may perform one or all of the following functions: Pick reagents; Pick which layout to use (e.g., size of cartridge, requirement for temperature control and/or magnetic control); and Pick which script to run.

The On-script play may include (e.g., for each line): if instruction Electrode board related execute instruction. If instruction Multichannel Pipette-SW related: check multichannel pipette position (should be rest position); move multichannel pipette to desired position; check multichannel pipette position (should be desired position); execute multichannel pipette action; check multichannel pipette position (should be desired position); return to rest position; and check multichannel pipette position (should be rest position). After the script is completed: check multichannel pipette position.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A digital microfluidics apparatus, the apparatus comprising:
   a seating surface configured to concurrently seat one or more cartridges;
   a plurality of drive electrodes disposed on the seating surface, wherein the drive electrodes are configured to apply a voltage to move a droplet within one or more cartridges seated on the seating surface;
   a plurality of vacuum ports distributed across the seating surface;
   a vacuum control configured to selectively apply vacuum through a subset of the plurality of vacuum ports under the one or more cartridges seated on the seating surface;
   an electrical control for applying energy to the drive electrodes to move a droplet within an air gap of the one or more cartridges seated on the seating surface; and
   a liquid handling subsystem for dispensing or removing liquid to the one or more cartridges.

2. The digital microfluidics apparatus of claim 1, the liquid handling subsystem comprises a robotic arm.

3. The digital microfluidic apparatus of claim 1, wherein the vacuum control further comprises a vacuum pump for applying a vacuum to the plurality of vacuum ports.

4. The digital microfluidics apparatus of claim 1, wherein the subset of the vacuum ports are each coupled to an opening through a drive electrode of the plurality of drive electrodes.

5. The digital microfluidics apparatus of claim 1, wherein the vacuum control is configured to determine which vacuum ports underlie the one or more cartridges.

6. The digital microfluidic apparatus of claim 1, wherein the vacuum control further comprises a manifold and a plurality of valves.

7. The digital microfluidics apparatus of claim 1, wherein the plurality of drive electrodes comprises about 408 to about 20,000 drive electrodes.

8. The digital microfluidic apparatus of claim 1, wherein the liquid handling subsystem comprises a liquid handling head and at least one liquid handling tip.

9. The digital microfluidics apparatus of claim 8, wherein the liquid handling head is configured to dispense or withdraw volumes of about 1 microliter to about 100 milliliters.

10. The digital microfluidics apparatus of claim 1, further comprising a master control subsystem for coordinating activation of the plurality of drive electrodes, the plurality of vacuum ports and the liquid handling subsystem.

11. The digital microfluidics apparatus of claim 10, wherein the master control subsystem comprises non-transitory instructions for controlling the plurality of vacuum ports, the plurality of drive electrodes, and the liquid handling subsystem.

12. The digital microfluidics apparatus of claim 10, wherein the master control subsystem is configured to concurrently move droplets within the air gaps of the one or more cartridges seated on the seating surface.

13. The digital microfluidics apparatus of claim 1, further comprising one or more temperature-controlled regions within the plurality of drive electrodes.

14. The digital microfluidics apparatus of claim 1, further comprising one or more magnetic control regions within the plurality of drive electrodes, each comprising a magnet configured to deliver a magnetic field.

15. The digital microfluidic apparatus of claim 1, further comprising one or more cartridge alignment features on the seating surface.

* * * * *